(12) United States Patent
Nishi

(10) Patent No.: US 7,738,179 B2
(45) Date of Patent: Jun. 15, 2010

(54) IMAGE DISPLAY DEVICE USING P-POLARIZED LIGHT AND S-POLARIZED LIGHT

(76) Inventor: Kenji Nishi, Gandstage-Isogo 407, 3-1, Shiomidai 1-chome, Isogo-ku, Yokohama-shi, Kanagawa 235-0022 (JP)

( * ) Notice: Subject to any disclaimer, the term of this patent is extended or adjusted under 35 U.S.C. 154(b) by 1104 days.

(21) Appl. No.: 10/575,186

(22) PCT Filed: Oct. 7, 2004

(86) PCT No.: PCT/JP2004/015196

§ 371 (c)(1),
(2), (4) Date: Apr. 7, 2006

(87) PCT Pub. No.: WO2005/043216

PCT Pub. Date: May 12, 2005

(65) Prior Publication Data

US 2007/0018124 A1    Jan. 25, 2007

(30) Foreign Application Priority Data

Oct. 8, 2003   (JP) .............................. 2003-348961
Apr. 26, 2004  (JP) .............................. 2004-129129

(51) Int. Cl.
  *G03B 21/28*  (2006.01)
  *G03B 21/26*  (2006.01)
  *G09G 5/00*   (2006.01)
  *G02B 25/00*  (2006.01)
  *G02B 5/04*   (2006.01)
(52) U.S. Cl. ........................... 359/643; 353/81; 353/94; 353/99; 345/8; 359/644; 359/833; 359/837
(58) Field of Classification Search ................... 353/81, 353/30–31, 94, 98–99; 345/8; 359/643–647, 359/831, 833, 837

See application file for complete search history.

(56) References Cited

U.S. PATENT DOCUMENTS 4,278,334 A     7/1981   Maeda (Continued)

FOREIGN PATENT DOCUMENTS

EP          0 579 506 A1      1/1994

(Continued)

OTHER PUBLICATIONS

Kingslake, Rudolf, "Lens Design Fundamentals", 1978, Academic Press, San Diego, California, XP002412879, pp. 36 and 37; paragraph VI: "Ray Tracing At An Aspheric Surface".

(Continued)

*Primary Examiner*—Georgia Y Epps
*Assistant Examiner*—Magda Cruz
(74) *Attorney, Agent, or Firm*—Frishauf, Holtz, Goodman & Chick, P.C.

(57) ABSTRACT

An image display device projects lights emitted from each of two two-dimensionally light emitting type photoelectric devices onto first and second light diffusing bodies, and projects and images transmitted images of the light diffusing bodies onto the retina in the respective eyeballs of the user. The display device includes one light source, a first polarization beam splitter dividing light emitted from the light source into P-polarized light and S-polarized light, and an optical system which leads each of the P-polarized light and S-polarized lights respectively to the two photoelectric devices thereby illuminating the two photoelectric devices. The optical system leads polarized light to each of the two photoelectric devices via a second polarization beam splitter and a λ/4 plate, and leads reflected lights to the relay optical system via the λ/4 plate and the second polarization beam splitter.

10 Claims, 78 Drawing Sheets

U.S. PATENT DOCUMENTS

| | | | |
|---|---|---|---|
| 5,701,200 | A | 12/1997 | Horton |
| 5,757,544 | A | 5/1998 | Tabata et al. |
| 5,835,279 | A | 11/1998 | Marshall et al. |
| 6,232,934 | B1 | 5/2001 | Heacock et al. |
| 6,879,443 | B2 * | 4/2005 | Spitzer et al. ............... 359/630 |
| 2002/0109819 | A1 * | 8/2002 | Tuval .......................... 351/206 |
| 2003/0174290 | A1 | 9/2003 | Shikita et al. |

FOREIGN PATENT DOCUMENTS

| | | | |
|---|---|---|---|
| GB | 2 287 551 A | 9/1995 |
| JP | 6-308396 A | 11/1994 |
| JP | 6-308423 A | 11/1994 |
| JP | 6-319093 A | 11/1994 |
| JP | 7-128612 A | 5/1995 |
| JP | 7-318852 A | 12/1995 |
| JP | 11-133315 A | 5/1999 |
| JP | 2000-221499 A | 8/2000 |
| JP | 2002-214707 A | 7/2002 |
| JP | 2003-186112 A | 7/2003 |
| JP | 2003-222724 A | 8/2003 |
| JP | 2003-233032 A | 8/2003 |
| JP | 2003-307702 A | 10/2003 |
| WO | WO 95/10106 A1 | 4/1995 |
| WO | WO 02/065443 A1 | 8/2002 |

OTHER PUBLICATIONS

Notification Concerning Transmittal of Copy of International Preliminary Report on Patentability, Chapter I of the Patent Cooperation Treaty for PCT/JP2004/015196, and Written Opinion, 8 sheets.

* cited by examiner

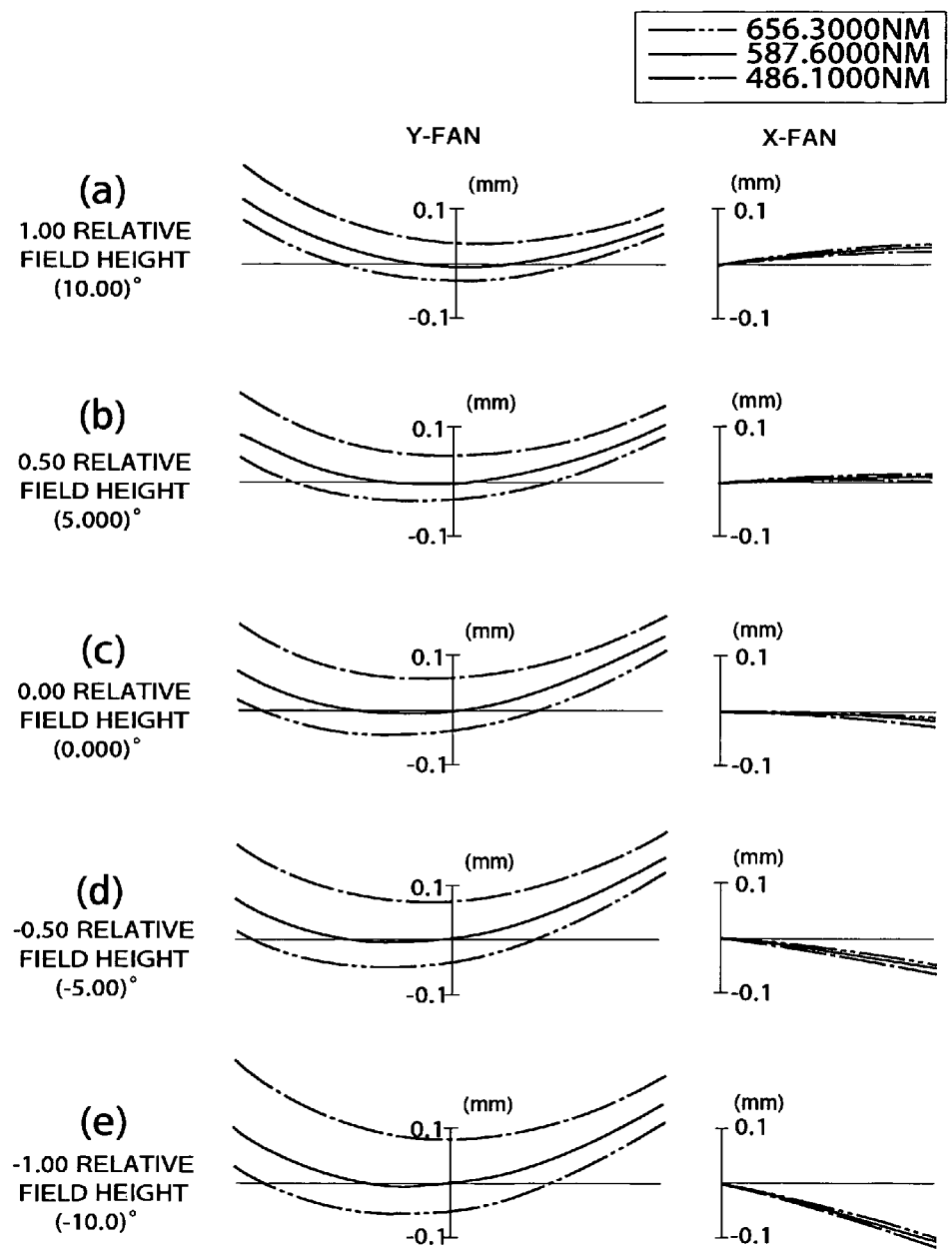

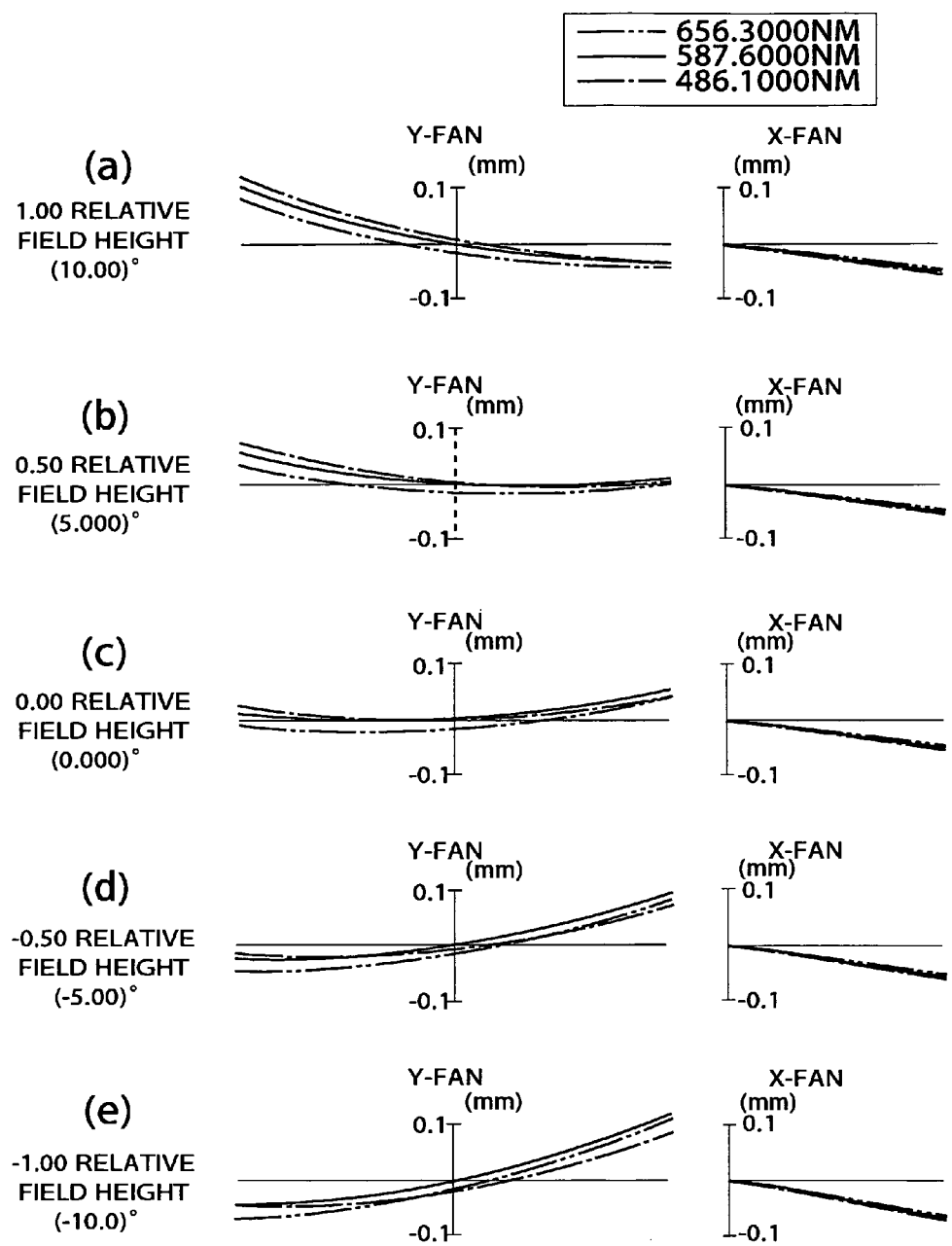

| Zoom system | Unit | Condition 1 | Condition 2 | Condition 3 | Condition 4 | Condition 5 | Condition 6 | Condition 7 | Condition 8 | Condition 9 | Condition 10 | Condition 11 | Condition 12 | Condition 13 |
|---|---|---|---|---|---|---|---|---|---|---|---|---|---|---|
| S28 | mm | 1 | 2.17 | 3.47 | 4.22 | 4.72 | 5.06 | 5.3 | 5.57 | 5.66 | 5.64 | 5.527 | 5.362 | 5.108 |
| S31 | mm | 1 | 2 | 4 | 6 | 8 | 10 | 12 | 16 | 20 | 25 | 30 | 35 | 41.5 |
| S34 | mm | 50 | 47.83 | 44.53 | 41.78 | 39.28 | 36.94 | 34.7 | 30.43 | 26.34 | 21.36 | 16.473 | 11.638 | 5.392 |
| Image side approximate AF plane | mm | 2.2073 | 2.2236 | 2.2151 | 2.2963 | 2.2947 | 2.3236 | 2.2535 | 2.1447 | 2.2917 | 2.2077 | 2.2104 | 2.2566 | 2.1962 |
| Screen projection image/2 | mm | 6.19 | 6.98 | 8.24 | 9.36 | 10.45 | 11.52 | 12.60 | 14.83 | 17.17 | 20.25 | 23.56 | 27.13 | 32.197 |
| Chip frequency/eyesight | Times | 0.87 | 0.98 | 1.16 | 1.32 | 1.47 | 1.62 | 1.78 | 2.09 | 2.42 | 2.85 | 3.32 | 3.82 | 4.53 |
| Evaluation frequency | Hz | 34.13 | 34.13 | 29.42 | 25.89 | 23.20 | 21.04 | 19.23 | 16.34 | 14.12 | 11.97 | 10.29 | 8.93 | 7.53 |
| Field of view angle (one-side) | Degree | 18.50 | 20.67 | 24.01 | 26.85 | 29.46 | 31.92 | 34.28 | 38.74 | 42.87 | 47.60 | 51.87 | 55.72 | 60.13 |
| MTF0 | % | 36.5% | 37.7% | 52.0% | 55.2% | 54.0% | 54.5% | 53.3% | 54.4% | 51.0% | 51.4% | 46.0% | 47.7% | 44.0% |
| MTF0.5 | % | 36.4% | 38.4% | 53.4% | 56.2% | 54.5% | 55.1% | 53.6% | 54.2% | 52.4% | 54.5% | 49.1% | 50.8% | 44.2% |
| MTF1 | % | 31.5% | 30.9% | 37.9% | 42.2% | 40.1% | 31.1% | 27.7% | 21.3% | 19.0% | 17.9% | 25.2% | 26.9% | 16.9% |
| Best focus | mm | 1 | 1 | 0.8 | 0.6 | 0.4 | 0.4 | 0.2 | 0 | -0.4 | 0.8 | 0 | 0.2 | 0 |

IMAGE DISPLAY DEVICE USING P-POLARIZED LIGHT AND S-POLARIZED LIGHT

This application is a U.S. National Phase Application under 35 USC 371 of International Application PCT/JP2004/015196 filed Oct. 7, 2004.

TECHNICAL FIELD

The present invention relates to an image display device that is used with it being positioned near to the eyeballs.

BACKGROUND ART

There are many kinds of image display devices, e.g., a television, a personal computer, a projector, a video camera, and a cell phone; however, such conventional image display devices are limited in their display size, and thus such a wide range of image as is actually viewed by human eyes has not been able to be obtained from such displays.

On the other hand, as portable displays, an eyeglass type display and a head mount type display, both called a wearable display, are known. As a wearable display, there is known a method in which, as shown in FIG. 28(a), small half mirror 40 is arranged at a portion of the field of view, and an image outputted from image output device 39 such as a plasma display or a liquid crystal is, via projection optical system 38, deflected by half mirror 40 and is projected onto the retina of the eyeball. This method uses the half mirror and thus is such a system (the first type) as the image outputted from image output device 39 is viewed as floating in a portion of the field of view. However, as the field of view angle, a few degrees can only be obtained. As the application of this type wearable display, presentation of the image information of a cell phone has been conceived, for example.

On the other hand, as a method to obtain a little larger image information, there is a system as shown in FIG. 28(b). In this method, a large optical element 41 is arranged before the eyeball, and the image outputted from image output device 39 is, via a plurality of reflecting surfaces and projection optical system 42, projected onto the retina of the eyeball. While with respect to this type of method, a relatively large field of view angle (about 15 to 22.5 degrees) can be obtained, only the type in which the field of view is completely obstructed has been proposed. Thus, as the applicable method thereof, there have been proposed a system (the second type) in which this type image display device is detachably disposed before one eye and is used as a display as a wearable personal computer, and a system (the third type) in which the same image display devices are each independently positioned before each of the eyes and are used instead of a television or a projector.

The above-described three types of the prior art image display devices were respectively expected to substitute, as a wearable display, the cell phone, the notebook computer, and the television or the projector. However, as a matter of fact, while they have the advantage of wearableness, they do not differ much from the conventional display devices with respect to the size of the display field of view, and when considering the bother of wearing them, the eyestrain with the field of view being obstructed, and the weight to be supported by the ears or the head, they have the disadvantage that they are featured in conspicuous defects. Furthermore, even in the case of the display devices having a large field of view angle, the field of view angle is in the range of about ±15 to ±22.5 degrees, and thus a sense of realism could be obtained.

On the other hand, as systems describing the method to obtain a large field of view by allowing the weight to increase and by using a plurality of lenses as the eyepiece, there are, for example, such systems as described in Japanese Unexamined Patent Publication No. 7-244246 or Japanese Unexamined Patent Publication No. 2001-311910, and in such systems, a field of view angle of ±22.5 degrees or more can be realized. However, such systems have a wide field of view angle only in the condition that the eyeball does not move, and neither the shift of the crystalline lens from the eyepiece center that occurs when the eyeball moves nor the associated chromatic aberration is sufficiently taken account of.

In addition, with respect to these kinds of devices having a large field of view angle, because the eyepiece optical system becomes large-sized, resulting in the weight increase, and thus there arises the disadvantage that such devices no longer meet the weight requirements of the HMD type display supported by the head or of the eyeglass type display of which weight is supported by the nose and the ears like eyeglasses.

DISCLOSURE OF THE INVENTION

The present invention has been made in consideration of such situations, and its object is to provide an image display device that has a large field of view angle comparable to the field of view actually viewed by a human and can further provide a sufficiently good image even relative to the shift of the crystalline lens from the eyepiece center that occurs when the eyeball moves and even in the condition of the associated chromatic aberration.

A first invention to achieve the above-described object is an image display device that projects, via a relay optical system, the light emitted from a first two-dimensionally light emitting type photoelectric device which is perpendicular to the light beam emitting direction onto first and second light diffusing bodies which are independent of each other relative to the right and left eyes and projects and images the transmitted images of said light diffusing bodies, via first and second eyepiece optical systems which respectively correspond to the first and second light diffusing bodies, onto the retina in the eyeball, with the imaged transmitted images being a wide range image having a field of view angle of ±22.5 degrees or more, said image display device being characterized in that the center distance between said first and second light diffusing bodies is within 5.5 to 7.5 cm, in that said first and second eyepiece optical systems are each constituted by at least two lenses composed of, sequentially from the eyeball's crystalline lens side, one or more convex lens(es) and a cemented lens, in that at least one surface of the lens surfaces of said convex lens(es) is a conic surface with conic constant K<0, in that the cemented portion of said cemented lens is made a convex surface on the side of said light diffusing body, and in that the color dispersion of the light diffusing body side lens of said cemented lens is made larger than that of the other lens thereof.

As will be described later in detail in the best mode for carrying out the invention section, the center distance between the first and second light diffusing bodies is required to be within 5.5 to 7.5 cm so that the image is transmitted to the right and left eyes and the positions of the optical systems for the right and left eyes do not interfere with each other. In order to successfully project and image, under this condition, the images onto the retina in the eyeball, with the imaged images being a wide range image having a field of view angle of ±22.5 degrees or more, which performance has been impossible in the past, it is necessary to dispose a convex lens at a position which is as near as possible to the crystalline lens and to make the respective principal light rays of different light beams from relatively near regions enter the crystalline lens, with each principal light ray being given a large angle change by the effect of the convex lens. Thus, in this invention, it is configured such that one or more convex lens(es) is (are) disposed at a position near to the crystalline lens and that no concave lens is provided in this portion.

Further, in this case, in order to obtain a good image even when the lateral shift of the pupil (hereinafter, also referred to as "look-around eye" or "look-around eye action") occurs, it is necessary to improve the astigmatism occurring around the convex lens(es). For this purpose, at least one surface of the lens surfaces of the convex lens(es) is made a conic surface with conic constant K<0. In addition, in order to improve the chromatic aberration occurring in this configuration, a cemented lens is provided on the light diffusing body side of the convex lens(es).

In particular, because, with respect to the first and second eyepiece optical systems, it is configured such that by positioning the aspheric convex lens(es) on the eyeball side, the respective principal light rays enter the pupil of the eyeball, with each of the principal light rays being given a large angle, the inclination of the principal light ray of each light beam at the light diffusing body is relatively small. Thus, with the cemented lens being used at a position near to the light diffusing body, the incident angles at the cemented surface are not very large, which makes it possible to correct the chromatic aberration well.

To improve chromatic aberration by means of a cemented lens, the cemented surface is required to be convex toward the lens having a larger color dispersion; and thus, in this invention, the cemented portion of the cemented lens is made a convex surface on the side of the light diffusing body, and the color dispersion of the light diffusing body side lens of the cemented lens is made larger than that of the other lens thereof.

By this, the field of view angle can be made larger without making the size of the optical system larger, and the optical system can be made an optical system of which various aberrations, including astigmatism and chromatic aberration, are small. In addition, in order to make the image observable when the field of view angle is enlarged with the light incident on the cemented lens being made non-telecentric, it is configured such that the light from the first photoelectric device is first imaged on the light diffusing body, and the diffused light from the intermediate image enters the eyeball.

A second invention to achieve the above-described object is an image display device that projects, via a relay optical system, the light emitted from a first two-dimensionally light emitting type photoelectric device which is perpendicular to the light beam emitting direction onto first and second light diffusing bodies which are independent of each other relative to the right and left eyes and projects and images the transmitted images of said light diffusing bodies, via first and second eyepiece optical systems which respectively correspond to the first and second light diffusing bodies, onto the retina in the eyeball, with the imaged transmitted images being a wide range image having a field of view angle of ±22.5 degrees or more, said image display device being characterized in that the center distance between said first and second light diffusing bodies is within 5.5 to 7.5 cm, in that said first and second eyepiece optical systems are each constituted by at least two lenses composed of, sequentially from the eyeball's crystalline lens side, one or more convex lens (es) and a cemented lens, in that at least one surface of the lens surfaces of said convex lens(es) is a conic surface with conic constant K<0, in that the cemented portion of said cemented lens is made a concave surface on the side of said light diffusing body, and in that the color dispersion of the light diffusing body side lens of said cemented lens is made smaller than that of the other lens thereof.

This invention differs from the above-described first invention only in that the cemented portion of the cemented lens is made a concave surface on the side of the light diffusing body, and accordingly the color dispersion of the light diffusing body side lens of said cemented lens is made smaller than that of the other lens thereof; and thus the operation/working-effect of this invention is the same as that of the first invention.

A third invention to achieve the above-described object is an image display device that projects, via a relay optical system, the light emitted from a first two-dimensionally light emitting type photoelectric device which is perpendicular to the light beam emitting direction onto first and second light diffusing bodies which are independent of each other relative to the right and left eyes and projects and images the transmitted images of said light diffusing bodies, via first and second eyepiece optical systems which respectively correspond to the first and second light diffusing bodies, onto the retina in the eyeball, with the imaged transmitted images being a wide range image having a field of view angle of ±22.5 degrees or more, said image display device being characterized in that the center distance between said first and second light diffusing bodies is within 5.5 to 7.5 cm, in that said first and second eyepiece optical systems are each constituted by at least two lenses composed of, sequentially from the eyeball's crystalline lens side, one or more convex lens (es) and a cemented lens, in that at least one surface of the lens surfaces of said convex lens(es) is a conic surface with conic constant K<0, in that said cemented lens has at least two cemented portions, in that the cemented surface located near to said light diffusing body is made a concave surface on the side of said light diffusing body, in that the other cemented surface is made a convex surface on the side of said light diffusing body, and in that the color dispersion of the center lens bounded by said cemented portions is made larger than those of the other two lenses surrounding the center lens.

This invention differs from the above-described first and second inventions only in that the cemented lens has at least two cemented portions to further improve the chromatic aberration, and the operation/working-effect of this invention does not differ basically from those of the first and second inventions. In this regard, it is configured such that with the color dispersion of the center lens bounded by the cemented portions being made larger than those of the other two lenses surrounding the center lens, the cemented portions are each made a convex surface toward the center lens, i.e., the center lens is made a concave lens. Generally, the cemented lens may be constituted by three lenses only; however, when four or more lenses are used, the combination of the lenses other than the both end lenses should only be a lens system equivalent to the one center lens above-described.

A fourth invention to achieve the above-described object is an image display device that projects, via a relay optical system, the light emitted from a first two-dimensionally light emitting type photoelectric device which is perpendicular to the light beam emitting direction onto first and second light diffusing bodies which are independent of each other relative to the right and left eyes and projects and images the transmitted images of said light diffusing bodies, via first and second eyepiece optical systems which respectively correspond to the first and second light diffusing bodies, onto the retina in the eyeball, with the imaged transmitted images being a wide range image having a field of view angle of ±22.5 degrees or more, said image display device being characterized in that the center distance between said first and second light diffusing bodies is within 5.5 to 7.5 cm, in that said first and second eyepiece optical systems are each constituted by at least two lenses composed of, sequentially from the eyeball's crystalline lens side, one or more convex lens (es) and a cemented lens, in that at least one surface of the lens surfaces of said convex lens(es) is a conic surface with conic constant K<0, in that said cemented lens has at least two cemented portions, in that the cemented surface located near to said light diffusing body is made a convex surface on the side of said light diffusing body, in that the other cemented surface is made a concave surface on the side of said light diffusing body, and in that the color dispersion of the center lens bounded by said cemented portions is made smaller than those of the other two lenses surrounding the center lens.

This invention differs from the third invention only in that it is configured such that with the color dispersion of the center lens bounded by the cemented portions being made larger than those of the other two lenses surrounding the center lens, the cemented portions are each made a concave surface toward the center lens, i.e., the center lens is made a convex lens, and thus the operation/working-effect of this invention is the same as that of the above-described third invention.

A fifth invention to achieve the above-described object is any one of the above-described first to fourth inventions, characterized in that at least one surface of the lens surfaces of said convex lens(es) is a conic surface with conic constant K<−1.

In this invention, because at least one surface of the lens surfaces of the convex lens(es) is made a conic surface with conic constant K<−1, the aberrations at the lens periphery can be further improved. Accordingly, the curvatures of the convex lens(es) can be made larger; and thus, a lens material with a small refractive index and a small color dispersion can be applied to the convex lens(es). This facilitates the design of the cemented lens for achromatization.

A sixth invention to achieve the above-described object is an image display device that projects, via a relay optical system, the light emitted from a first two-dimensionally light emitting type photoelectric device which is perpendicular to the light beam emitting direction onto first and second light diffusing bodies which are independent of each other relative to the right and left eyes and projects and images the transmitted images of said light diffusing bodies, via first and second eyepiece optical systems which respectively correspond to the first and second light diffusing bodies, onto the retina in the eyeball, with the imaged transmitted images being a wide range image having a field of view angle of ±22.5 degrees or more, said image display device being characterized in that the center distance between said first and second light diffusing bodies is within 5.5 to 7.5 cm, in that said first and second eyepiece optical systems are each constituted by at least two lenses composed of, sequentially from the eyeball's crystalline lens side, one or more convex lens (es) and a cemented lens, in that the cemented portion of said cemented lens is made a convex surface on the side of said light diffusing body, in that the color dispersion of the light diffusing body side lens of said cemented lens is made larger than that of the other lens thereof, and in that said light diffusing body is made a curved surface having a concave surface shape toward said cemented lens.

The most important characteristic of this invention is that the light diffusing body is made a curved surface having a concave surface shape when viewed from the cemented lens direction. By making the light diffusing body such a curved surface, the size of the light diffusing body can be evaded from being made large even when the light beams proceeding from the light diffusing body to the cemented lens are of a converging direction type. Thus, the light beams that are of a converging direction type when proceeding from the light diffusing body to the cemented lens can be used, and with this converging amount being taken advantage of, the image magnification of the convex lens(es) can be made smaller. By this, the occurrence of the distortion and aberrations can be lessened; in addition, because a lens material with a small refractive index and a small color dispersion can be applied to the convex lens(es), the achromatization design is also facilitated.

A seventh invention to achieve the above-described object is an image display device that projects, via a relay optical system, the light emitted from a first two-dimensionally light emitting type photoelectric device which is perpendicular to the light beam emitting direction onto first and second light diffusing bodies which are independent of each other relative to the right and left eyes and projects and images the transmitted images of said light diffusing bodies, via first and second eyepiece optical systems which respectively correspond to the first and second light diffusing bodies, onto the retina in the eyeball, with the imaged transmitted images being a wide range image having a field of view angle of ±22.5 degrees or more, said image display device being characterized in that the center distance between said first and second light diffusing bodies is within 5.5 to 7.5 cm, in that said first and second eyepiece optical systems are each constituted by at least two lenses composed of, sequentially from the eyeball's crystalline lens side, one or more convex lens (es) and a cemented lens, in that the cemented portion of said cemented lens is made a concave surface on the side of said light diffusing body, in that the color dispersion of the light diffusing body side lens of said cemented lens is made smaller than that of the other lens thereof, and in that said light diffusing body is made a curved surface having a concave surface shape toward said cemented lens.

This invention differs from the above-described sixth invention only in respect to the configuration of the cemented lens and has the same operation/working-effect as the sixth invention.

An eighth invention to achieve the above-described object is the above-described sixth or seventh invention, characterized in that at least one surface of the lens surfaces of said convex lens(es) is a conic surface with conic constant K<0.

In this invention, because at least one surface of the lens surfaces of the convex lens(es) is made a conic surface with conic constant K<0, the astigmatism occurring around the convex lens(es) can be improved.

A ninth invention to achieve the above-described object is the above-described eight invention, characterized in that at least one surface of the lens surfaces of said convex lens(es) is a conic surface with conic constant K<−1.

In this invention, because at least one surface of the lens surfaces of the convex lens(es) is made a conic surface with conic constant K<−1, the astigmatism occurring around the convex lens(es) can be further improved.

A tenth invention to achieve the above-described object is any one of the above-described first to ninth inventions, characterized in that the distance between the optical centers of said first and second eyepiece optical systems and the distance between the centers of the projected images on said first and second light diffusing bodies are made adjustable so that those two distances are equal to the eye-width.

In this invention, the distance between the optical centers of the first and second eyepiece optical systems and the distance between the centers of the projected images on the first and second light diffusing bodies are made adjustable; and thus, by adjusting the distances in accordance with the user's eye-width, the optical centers of the first and second eyepiece optical systems and the centers of the projected images on the first and second light diffusing bodies can always be positioned at the centers of the user's eyes. Note that the term "eye-width" as used in the present specification and claims means the distance between both eyes.

An eleventh invention to achieve the above-described object is any one of the above-described first to tenth inventions, characterized in that said relay optical system makes the projection magnification of the image of said first photoelectric device projected onto said light diffusing bodies variable, in that said relay optical system is a non-telecentric system in which the principal ray of each light beam incident on said light diffusing bodies changes from of a diverging direction type to of a converging direction type when the projection magnification changes from a magnifying magnification to a reducing magnification, and in that the principal rays that are emitted from said light diffusing bodies and reach the pupil of said eyeball are inclined toward the converging direction when the principal rays are emitted from said light diffusing bodies.

In this invention, because the relay optical system can make the projection magnification of the light beams to be projected onto the light diffusing bodies variable, the image of the first photoelectric device can be projected onto the user's eyes, with the magnification of the image being varied. In this regard, while depending on the projection magnification of the relay optical system, the principal ray of each light beam proceeding to the light diffusing bodies non-telecentrically changes from of a diverging direction type to of a converging direction type, the principal rays that are emitted from said light diffusing bodies and reach the pupil of said eyeball can be made, through the effect of the light diffusing bodies, inclined toward the converging direction when the principal rays are emitted from said light diffusing bodies. Thus, the eyepiece optical systems can be designed without being constrained by the principal rays of the relay optical system.

A twelfth invention to achieve the above-described object is any one of the above-described first to eleventh inventions, characterized in that said light diffusing bodies that diffuse light are a transmission type diffusing plate constituted by a transmission plate on which abrasive grains of a metal oxide or metallic carbide of which grain diameter is precisely controlled with micron-grade are coated.

By the use of such a diffusing plate, the diffusing angle can be made ±60 degrees or more, and even in the case of taking the look-around eye into account, a field of view angle of ±22.5 degrees or more can be secured. Further, even when observing an image quality comparable to that of a DVD or high-definition image, the diffusing plate coated with such abrasive grains does not make one feel a sense of abrasive grains and makes it possible to obtain a natural image quality.

A thirteenth invention to achieve the above-described object is the above-described twelfth invention, characterized in that said abrasive grains are made of at least one of silicon carbide, chromium oxide, tin oxide, titanium oxide, magnesium oxide, and aluminum oxide and in that said transmission plate is a polyester film.

The abrasive grains made of such materials are adequate to be made micron-grade grains, and because the polyester film is tough, a high durability can be obtained.

A fourteenth invention to achieve the above-described object is any one of the above-described first to thirteenth inventions, characterized in that it has a second two-dimensionally light emitting type photoelectric device that is arranged such that the light beams thereof are perpendicular to those of said first photoelectric device and also has, in said relay optical system, which projects the light emitted from said first photoelectric device onto said light diffusing bodies, a light divider that divides the light beams and leads them to said first and second light diffusing bodies, in that the light beams from said second photoelectric device are made incident on said light divider such that the light beams are perpendicular to the light beams emitted from said first photoelectric device, and in that said light divider has a function to divide the light from said first photoelectric device from the light from said second photoelectric device and also to combine the divided light beams of said first photoelectric device with the divided light beams of said second photoelectric device and lead them to said first light diffusing body and to said second light diffusing body, respectively.

In this invention, the light divider divides the light beams of the light emitted from the first photoelectric device and leads them to the first (right eye use) and second (left eye use) light diffusing bodies and also receives the light from the second photoelectric device, divides it, and further combines it with the light beams of the first photoelectric device to lead them to the first and second light diffusing bodies. Thus, the combined image of the image of the first photoelectric device and the image of the second photoelectric device is projected onto the light diffusing bodies for right and left eyes and is projected by the eyepiece optical systems onto the retinas of the right and left eyes.

A fifteenth invention to achieve the above-described object is the above-described fourteenth invention, characterized in that the difference between the number of reflections by mirrors experienced by the light beams emitted from said first photoelectric device from the first reflection by a mirror up to reaching the user's eyes and the number of reflections by mirrors experienced by the light beams emitted from said second photoelectric device from the first reflection by a mirror up to reaching the user's eyes is 0 or an even number.

In this invention, by adopting such configuration, the right and left states of the light beams emitted from the first photoelectric device and the second photoelectric device are projected to the user's eyes in the same condition.

A sixteenth invention to achieve the above-described object is the above-described fourteenth or fifteenth invention, characterized in that the difference between the number of reflections by mirrors experienced by the light beams emitted from said first photoelectric device from the first reflection by a mirror up to reaching the user's right eye and the number of reflections by mirrors experienced by the light beams emitted from said first photoelectric device from the first reflection by a mirror up to reaching the user's left eye is 0 or an even number and in that the difference between the number of reflections by mirrors experienced by the light beams emitted from said second photoelectric device from the first reflection by a mirror up to reaching the user's right eye and the number of reflections by mirrors experienced by the light beams emitted from said second photoelectric device from the first reflection by a mirror up to reaching the user's left eye is 0 or an even number.

By adopting such configuration, both of the image of the first photoelectric device and the image of the second photoelectric device are projected to the user's eyes, without the right and left state being reversed relative to the right and left eyes.

A seventeenth invention to achieve the above-described object is any one of the above-described fourteenth to sixteenth inventions, characterized in that the distance between the optical centers of said first and second eyepiece optical systems and the distance between the centers of the projected images on said first and second light diffusing bodies are made adjustable so that those two distances are equal to the eye-width and in that an optical path length adjusting mechanism that adjust, when the two distances, the distance between the optical centers of the eyepiece optical systems and the distance between the centers of the projected images, are adjusted, the optical path length from said first photoelectric device to the user's eyes and the optical path length from said second photoelectric device to the user's eyes so that each of them does not change is provided.

In this invention, because even when the two distances, the distance between the optical centers of the eyepiece optical systems and the distance between the centers of the projected images, are adjusted, the optical path length from said first photoelectric device to the user's eyes and the optical path length from said second photoelectric device to the user's eyes can be adjusted so that each of them does not change, the two distances, the distance between the optical centers of the eyepiece optical systems and the distance between the centers of the projected images can be adjusted, without the image magnification and the focus position being varied.

An eighteenth invention to achieve the above-described object is any one of the above-described fourteenth to seventeenth inventions, characterized in that said relay optical system, which projects the light emitted from said first photoelectric device onto said light diffusing bodies, makes the projection magnification relative to said light diffusing bodies of the light beams projected onto said light diffusing bodies variable and in that an illuminance varying mechanism for making, when the magnification is varied, the illuminances of the respective pictures projected from said first photoelectric device and said second photoelectric device onto said light diffusing bodies substantially equal to each other is provided.

In this invention, because the illuminance varying mechanism for making, when the magnification is varied, the illuminances of the respective pictures projected from said first photoelectric device and said second photoelectric device onto said light diffusing bodies substantially equal to each other is provided, the illuminances of the pictures observed can be kept substantially constant, even when the image magnification is varied.

A nineteenth invention to achieve the above-described object is any one of the above-described first to eighteenth inventions, characterized in that said first photoelectric device is a transmission type or reflection type liquid crystal device element and has three pieces of liquid crystal devices, each corresponding to each of the colors of G B, and R, and an illumination system that illuminates said liquid crystal devices and in that said illumination system is a uniformizing optical system that uniformizes the outputs from light emitting LEDs of G, B, and R.

In this invention, because the illumination system is made a uniformizing optical system that uniformizes the outputs from light emitting LEDs of G, B, and R, the liquid crystal device is uniformly illuminated and thus brightness irregularity does not occur.

A twentieth invention to achieve the above-described object is the above-described nineteenth invention, characterized in that said uniformizing optical system has, for each of the LEDs of G, B, and R, a plurality of high intensity LEDs, collects the lights from those plurality of LED light emitting portions by using optical fibers, and illuminates said liquid crystal device with the collected lights.

In this invention, because it is configured such that the outputs from the plurality of LEDs are collected by use of optical fibers and the liquid crystal device is illuminated with the collected lights, a high-illuminance uniform illumination can be obtained.

A twenty-first invention to achieve the above-described object is any one of the above-described first to eighteenth inventions, characterized in that said first photoelectric device is a transmission type or reflection type liquid crystal device element and has three pieces of liquid crystal devices, each corresponding to each of the colors of G, B, and R, and an illumination system that illuminates said liquid crystal devices and in that said illumination system is cold cathode tubes of G, B, and R.

Cold cathode tubes can be made small-sized with ease, consume a smaller amount of power, and have a long life, and thus are suitable for illumination light for liquid crystal devices.

A twenty-second invention to achieve the above-described object is the above-described twenty-first invention, characterized in that said uniformizing optical system has, for each of the colors of G, B, and R, a plurality of cold cathode tubes, collects the lights from those plurality of cold cathode tubes by using optical fibers, and illuminates said liquid crystal device with the collected lights.

In this invention, because it is configured such that the outputs from the plurality of cold cathode tubes are collected by use of optical fibers and the liquid crystal device is illuminated with the collected lights, a high-illuminance uniform illumination can be obtained.

A twenty-third invention to achieve the above-described object is any one of the above-described first to twenty-second inventions, characterized in that at least a portion of said image display device is supported by a portion other than a user, is also in contact with the face of said user, and is made movable in response to the movement of the face of said user.

In this invention, because at least a portion of the image display device is supported by a portion other than a user, the user's burden can be reduced. Further, because the portion is made movable in response to the movement of the user's face, the image can be observed in a comfortable posture.

A twenty-fourth invention to achieve the above-described object is an image display device which has an optical system that has at least, relative to each of the right and left eyeballs, portions independent of each other and which projects an image into each of said right and left eyeballs, said image display device being characterized in that said independent portions are each constituted by at least two lenses composed of, sequentially from said eyeball side, one or more convex lens(es) and a cemented lens and in that the surface, located distant from the eyeball, of the convex lens, among said convex lenses, located nearest to the eye ball is made a conic surface with conic constant K<0.

In this invention, it is configured such that one or more convex lens(es) is (are) disposed at a position near to the crystalline lens and that no concave lens is provided in this portion.

Further, in this case, in order to obtain a good image even when the lateral shift of the pupil occurs, it is necessary to improve the astigmatism occurring around the convex lens (es). For this purpose, the surface, located distant from the eyeball, of the convex lens, among the convex lenses, located nearest to the eye ball is made a conic surface with conic constant K<0. In addition, in order to improve the chromatic aberration occurring in this configuration, a cemented lens is provided on the light diffusing body side of the convex lens (es).

More specifically, because it is configured such that by positioning the aspheric convex lens(es) on the eyeball side, the respective principal light rays enter the pupil of the eyeball, with each of the principal light rays being given a large angle, the inclination of the principal light ray of each light beam at the light diffusing body is relatively small. Thus, with the cemented lens being used at a position near to the light diffusing body, the incident angles at the cemented surface are not very large, which makes it possible to correct the chromatic aberration well.

By this, the field of view angle can be made larger without making the size of the optical system larger, and the optical system can be made an optical system of which various aberrations, including astigmatism and chromatic aberration, are small.

A twenty-fifth invention to achieve the above-described object is the above-described twenty-fourth invention, characterized in that said cemented lens is provided, in the independent portion of said optical system, on the nearest side of an image forming surface forming said image.

In this invention, because the cemented lens is provided, in the independent portion of the optical system, on the nearest side of the image forming surface forming said image, chromatic aberration, in particular, can be efficiently corrected.

A twenty-sixth invention to achieve the above-described object is an image display device characterized in that it has, instead of the first photoelectric device of any of the above-described first to thirteenth inventions and nineteenth to twenty-second inventions, two two-dimensionally light emitting type photoelectric devices which are perpendicular to the light beam emitting direction and in that it is configured such that, instead of projecting, via said relay optical system, the light emitted from said first photoelectric device onto said first and second light diffusing bodies which are independent of each other relative to the right and left eyes, the lights emitted from said two photoelectric devices are each projected, via said relay optical system, onto said first and second light diffusing bodies which are independent of each other relative to the right and left eyes.

This invention differs from the above-described first to thirteenth inventions and nineteenth to twenty-second inventions only in that, without using a photoelectric device in common for the right and left eyes, an independent photoelectric device is used for each of the right and left eyes, and thus the essential operation/working-effect of this invention is the same as that of each of the above-referenced inventions.

A twenty-seventh invention to achieve the above-described object is the above-described twenty-sixth invention, characterized in that the distance between the optical centers of said first and second eyepiece optical systems and the distance between the centers of the projected images on said first and second light diffusing bodies are made adjustable so that those two distances are equal to the eye-width and in that an optical path length adjusting mechanism that adjust, when the two distances, the distance between the optical centers of the eyepiece optical systems and the distance between the centers of the projected images, are adjusted, the optical path lengths from said two photoelectric device to the user's eyes so that each of them does not change is provided.

A twenty-eighth invention to achieve the above-described object is the above-described twenty-sixth or twenty-seventh invention, characterized in that said relay optical system, which projects the lights emitted from said two photoelectric devices onto said light diffusing bodies, makes each of the projection magnifications relative to said light diffusing bodies of the light beams projected onto said light diffusing bodies variable and in that an illuminance varying mechanism for making, when the magnifications are varied, the illuminances of the respective pictures projected from said two photoelectric devices onto said light diffusing bodies substantially equal to each other is provided.

In this invention, because the illuminance varying mechanism for keeping the illuminances, which vary depending on the magnification of the relay optical system, constant is provided, images with an adequate illuminance can be presented even when the magnification or reduction of the images is performed, and thus an image display device that does not tire the user can be realized.

A twenty-ninth invention to achieve the above-described object is an image display device that projects, via a relay optical system, each of the lights emitted from two two-dimensionally light emitting type photoelectric devices which are perpendicular to the light beam emitting direction onto first and second light diffusing bodies which are independent of each other relative to the right and left eyes and projects and images the transmitted images of said light diffusing bodies, via first and second eyepiece optical systems which respectively correspond to the first and second light diffusing bodies, onto the retina in the eyeball, with the imaged transmitted images being a wide range image having a field of view angle of ±22.5 degrees or more, said image display device being characterized in that said two two-dimensionally light emitting type photoelectric devices are each a reflection type liquid crystal device element, in that one light source, a first polarization beam splitter that divides the light emitted from said light source into P-polarized light and S-polarized light, and an optical system that leads each of the P-polarized light and S-polarized light respectively to said two two-dimensionally light emitting type photoelectric devices, thus illuminates said two two-dimensionally light emitting type photoelectric devices, and leads the lights reflected thereby to said relay optical system are provided, and in that said optical system leads said P-polarized light and S-polarized light to said two-dimensionally light emitting type photoelectric devices via a second polarization beam splitter and a λ/4 plate and leads the lights reflected thereby to said relay optical system via said λ/4 plate and second polarization beam splitter.

In this invention, reflection type liquid crystal device elements are used as the two-dimensionally light emitting type photoelectric devices. In this regard, one light source is used in common for illumination thereof; however, if half mirrors or the like are used when illuminating liquid crystal device elements and leading the lights reflected thereby to other optical paths, about a half amount of light would be lost each time.

In this invention, to preclude this, it is configured such that the light used for the left eye and the light used for the right eye are made P-polarized light and S-polarized light, respectively, and by using polarization beam splitters and a λ/4 plate, the loss of light amount is avoided. A specific method therefor will be described later in the embodiment section.

A thirtieth invention to achieve the above-described object is an image display device that projects, via a relay optical system, each of the lights emitted from two sets of two-dimensionally light emitting type photoelectric devices which are perpendicular to the light beam emitting direction onto first and second light diffusing bodies which are independent of each other relative to the right and left eyes and projects and images the transmitted images of said light diffusing bodies, via first and second eyepiece optical systems which respectively correspond to the first and second light diffusing bodies, onto the retina in the eyeball, with the imaged transmitted images being a wide range image having a field of view angle of ±22.5 degrees or more, said image display device being characterized in that said two sets of two-dimensionally light emitting type photoelectric devices are each constituted by three reflection type liquid crystal device elements, each corresponding to each of the colors of G, B, and R, in that one light source, a first polarization beam splitter that divides the light emitted from said light source into P-polarized light and S-polarized light, and an optical system that leads each of the P-polarized light and S-polarized light respectively to said two sets of two-dimensionally light emitting type photoelectric devices, thus illuminates said two two-dimensionally light emitting type photoelectric devices, and leads the lights reflected thereby to said relay optical system are provided, and in that said optical system leads said P-polarized light and S-polarized light to said two-dimensionally light emitting type photoelectric devices, which accommodate the colors of G, B, and R, via a second polarization beam splitter, a λ/4 plate, and an RGB light beam division multiplexer prism and leads the lights reflected thereby to said relay optical system via said RGB light beam dividing/multiplexing prism, said λ/4 plate, and said second polarization beam splitter.

In this invention, the light from the light source is divided by the RGB light beam division multiplexer prism into each of the colors of G, B, and R, and the reflection type liquid crystal device elements are each illuminated with each light. Each lights reflected by each reflection type liquid crystal device element are made one light beam by the RGB light beam division multiplexer prism. Thus, different reflected lights from different patterns, each of which correspond to each of the colors of G, B, and R, can be obtained.

A thirty-first invention to achieve the above-described object is the above-described twenty-ninth or thirtieth invention, wherein said light source is a plurality of white light LEDs two-dimensionally arranged in an array form.

White light LEDs have a larger brightness and a higher electricity-to-light conversion efficiency compared with other types of light sources and thus feature low heat generation and low power consumption, which makes such LEDs excel as the light source.

A thirty-second invention to achieve the above-described object is the above-described twenty-ninth or thirtieth invention, characterized in that said light source has a group of R color LEDs, a group of G color LEDs, and a group of B color LEDs, each being constituted by a plurality of the respective color LEDs two-dimensionally arranged in an array form, and an RGB light beam division multiplexer prism that combines the lights emitted by those groups.

White light LEDs have a simple optical system and excel in space saving; however, because their color wavelength condition and light intensity depend on their specifications, there are many problems in finely adjusting their color condition. In the invention, to address such situation, it is configured such that the LEDs are divided into three groups, the group of R color LEDs, the group of G color LEDs, and the group of B color LEDs, and each light beams are combined by the RGB light beam multiplexer prism. This enables the adjustment of the color of the light source.

A thirty-third invention to achieve the above-described object is any one of the above-described twenty-ninth to thirty-second inventions, characterized in that the optical system, which leads the light emitted from said light source to said two-dimensionally light emitting type photoelectric devices, has an illumination uniformizing optical system.

Especially when LEDs are two-dimensionally arranged, illumination irregularity may occur. In this invention, because the optical system, which leads the light emitted from the light source to the two-dimensionally light emitting type photoelectric devices, has an illumination uniformizing optical system, the illumination irregularity can be alleviated.

A thirty-fourth invention to achieve the above-described object is the above-described thirty-third invention, characterized in that said illumination uniformizing optical system is at least one rod and in that the final exit plane of said rod and the surface of said two-dimensionally light emitting type photoelectric devices are made substantially conjugate with each other.

A rod is a cylinder of which inner surface is mirror finished. Light that passes through a rod is uniformized, with the light experiencing multiple reflections at the rod's inner surface, and the rod's final exit plane can be regarded as a uniform secondary light source. With this plane and the surface of the two-dimensionally light emitting type photoelectric devices are made substantially conjugate with each other, the two-dimensionally light emitting type photoelectric devices can be uniformly illuminated. "Substantially conjugate" means that deviation from the exact conjugate position is allowed so long as a required uniform illumination degree can be obtained.

BRIEF DESCRIPTION OF THE DRAWINGS

FIG. 5C is a plot output drawing showing the lateral aberration of 30±10 degrees of the eyepiece optical system shown in FIG. 5A.

FIG. 7D is a plot output drawing showing the lateral aberration of 30±10 degrees of the eyepiece optical system shown in FIG. 7A.

FIG. 12F is a drawing showing the table of each state when the zoom condition of the zoom optical system shown in FIG. 12A is varied.

BEST MODE FOR CARRYING OUT THE INVENTION

Figure 1A:
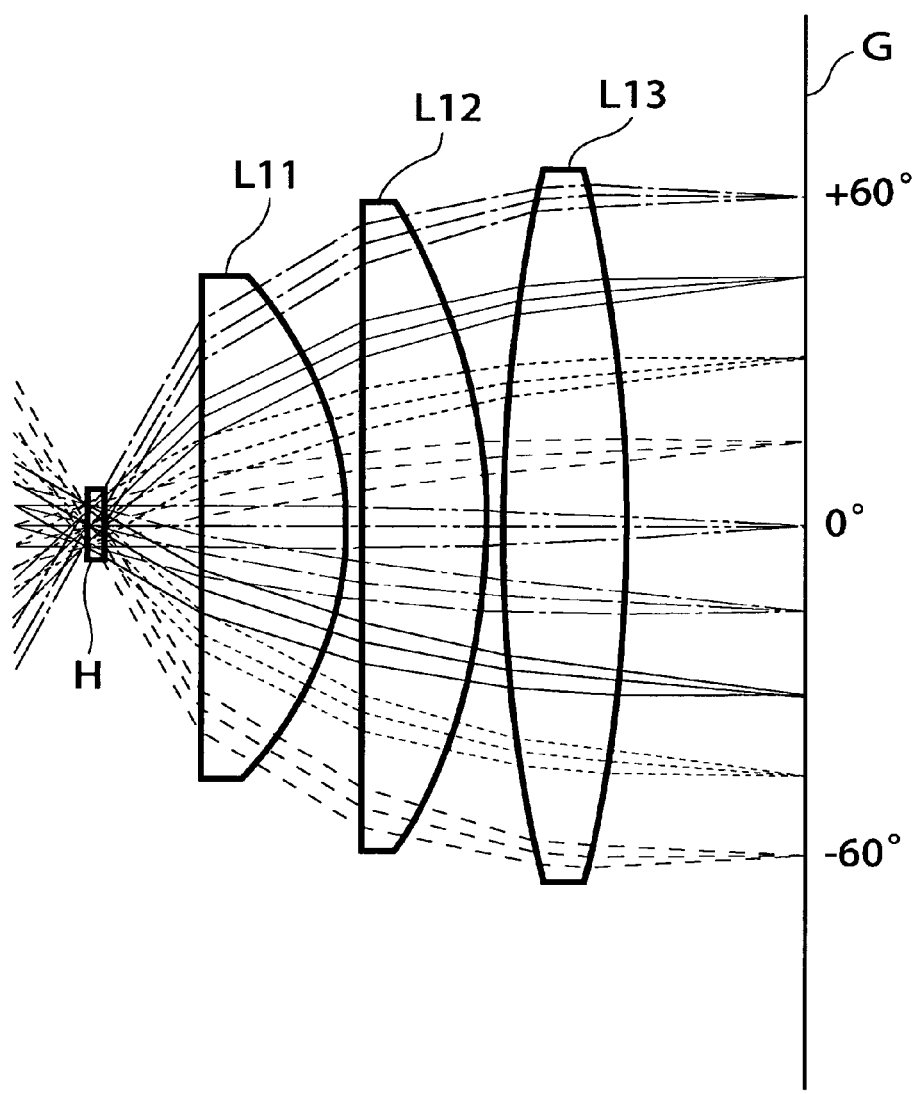
FIG. 1A is a drawing showing an outline of an eyepiece optical system from which the embodiments of the present invention start.

In the following, examples of the mode for carrying out the present invention will be described, referring to the drawings. First, to foster better understanding, the reason why it is difficult to realize an optical system having a field of view angle of ±22.5 degrees or more will be explained briefly. FIGS. 26A-26D show an example of an optical system designed to obtain a large field of view angle. This is, as shown in the optical system schematic of FIG. 26A, an example of the case in which assuming the human pupil as H relative to light emitting picture plane G (which, although called light emitting picture plane here, includes not only an object that emits light by itself or forms an image by reflecting light, but also an object, such as a screen, in which an image is projected thereon and the light coming out therefrom is observed by the eye), three convex lenses L1, L2, and L3 that are made of glass material LAC7 having a low refractive index but having a small color dispersion and have a curvature of 220 cm are used, and each of the light beams respectively represents a field of view angle of −60 degrees, −45 degrees, −30 degrees, −15 degrees, 0 degree, 15 degrees, 30 degrees, 45 degrees, and 60 degrees.

Figure 26A:
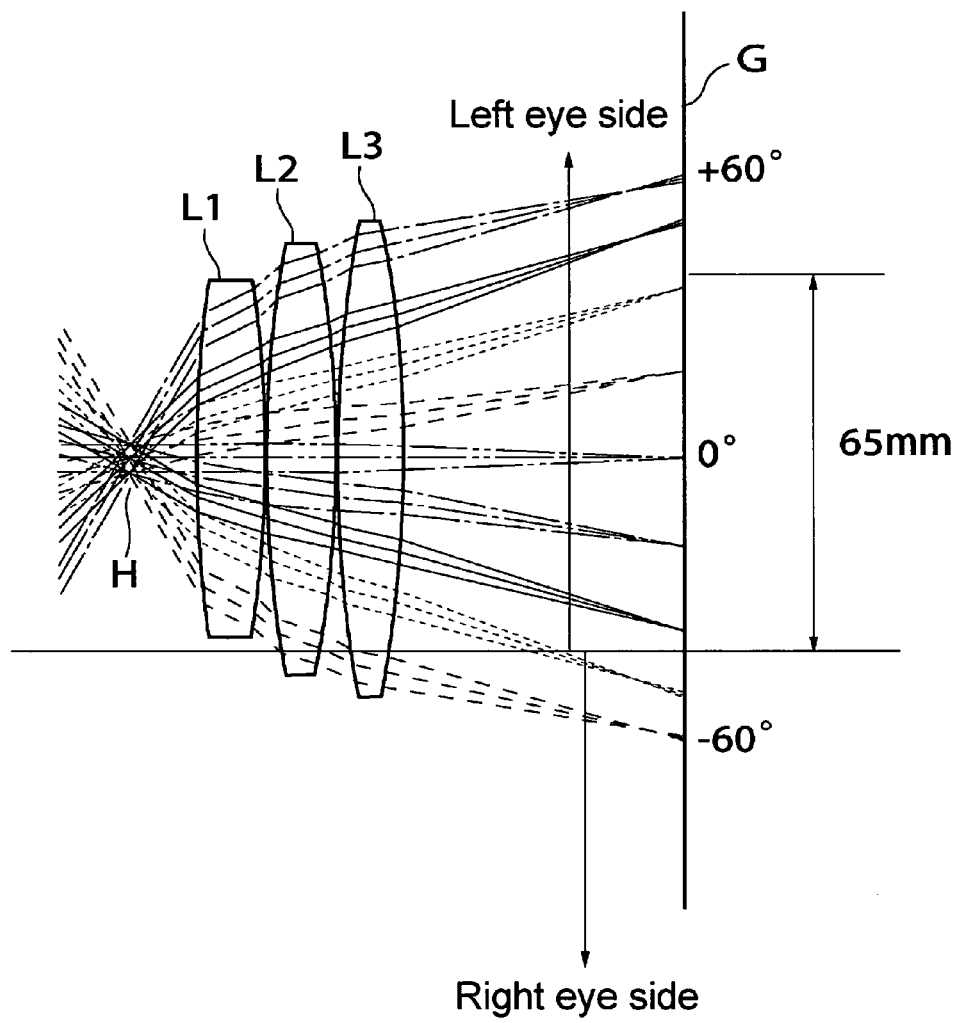
FIG. 26A is a drawing showing an example of a configuration of a conventional eyepiece lens system.
Figure 26B:
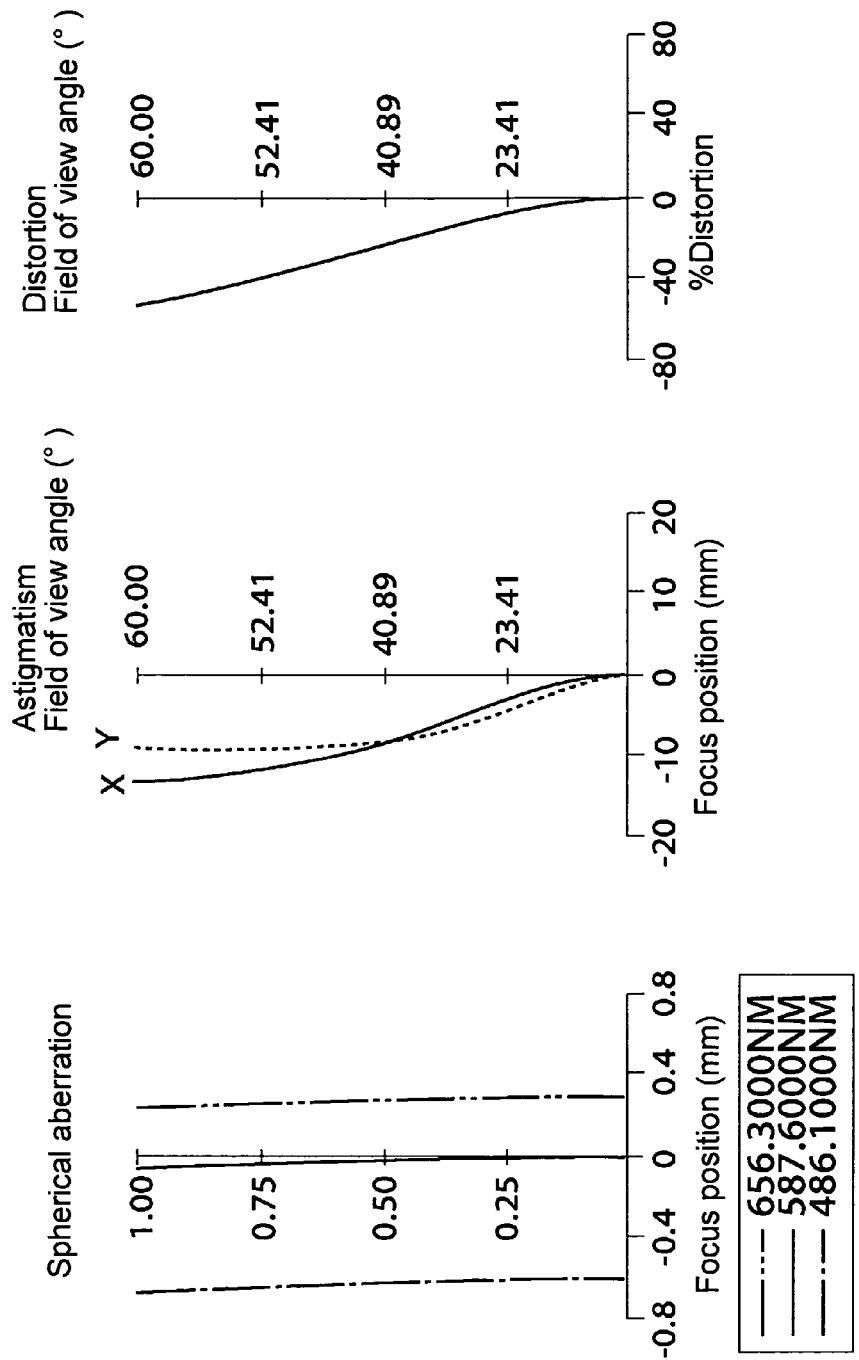
FIG. 26B is a field aberration output drawing of the eyepiece optical system shown in FIG. 26A.
Figure 26C:
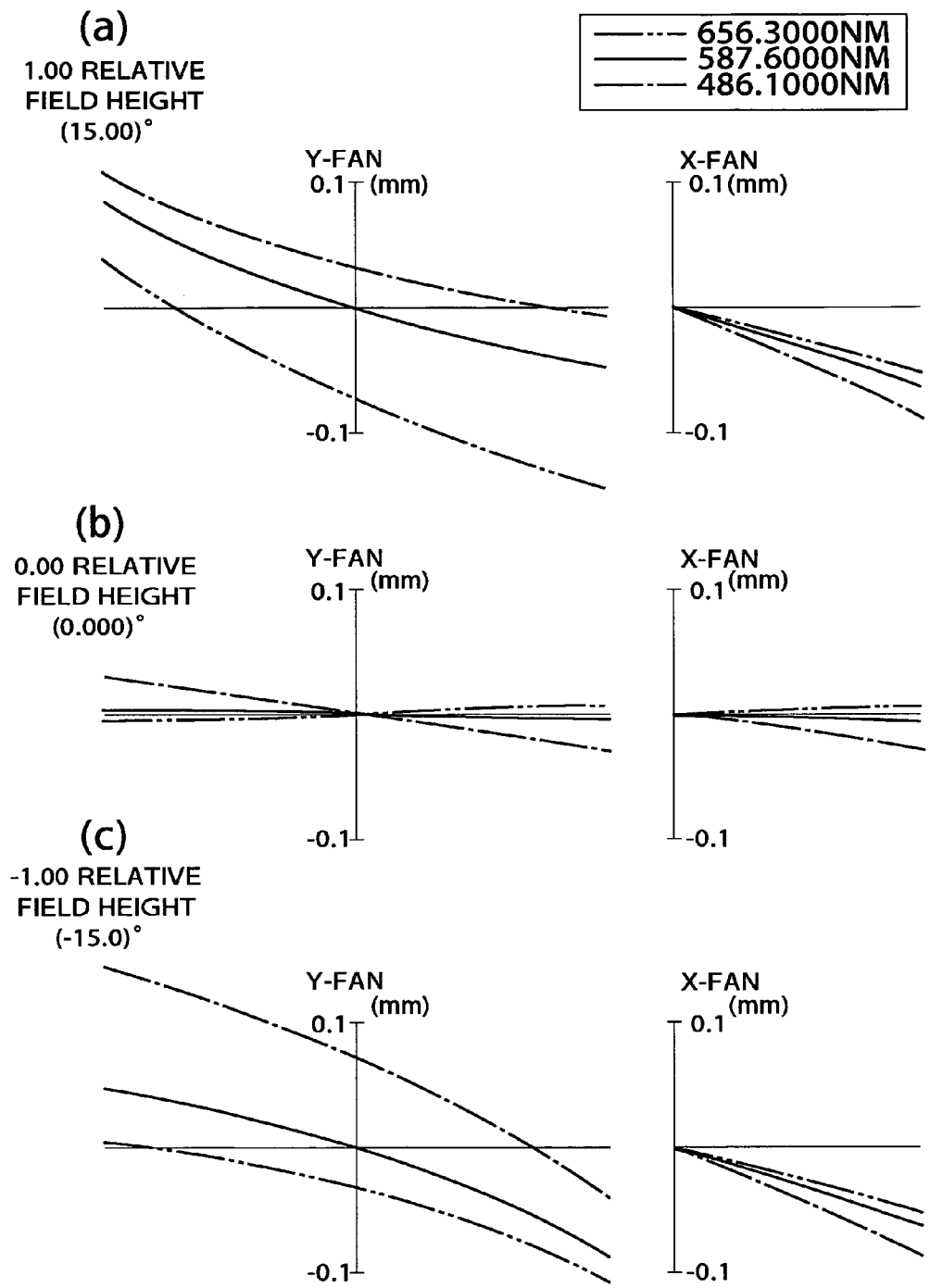
FIG. 26C is a lateral aberration plot output drawing at ±15 degrees of the eyepiece optical system shown in FIG. 26A.

While, in FIG. 26B, spherical aberration, astigmatism, and distortion are shown sequentially from the left, an astigmatism of 10 mm is present at a field of view angle of about ±30 degrees, and a distortion of 12.6% is present. Further, it can be seen from FIG. 26C that a chromatic aberration of about 150 μm is present even at a field of view angle of about ±15 degrees.

It is generally known that two or more kinds of glass materials having different color dispersions are combined to correct chromatic aberration, and thus there exist optical systems, such as loupe optical systems, in which a pupil size of about 5 mm is set and various aberrations, including chromatic aberration, are corrected within the range of ±30 degrees. The reason that such an optical system can be designed with ease is that because the optical system need not be used with the positions of the optical system and the eyeball being fixed, the position of optical axis of the optical system and the position of the pupil of the eyeball can always be adjusted so that they are positioned most appropriately.

Figure 26D:
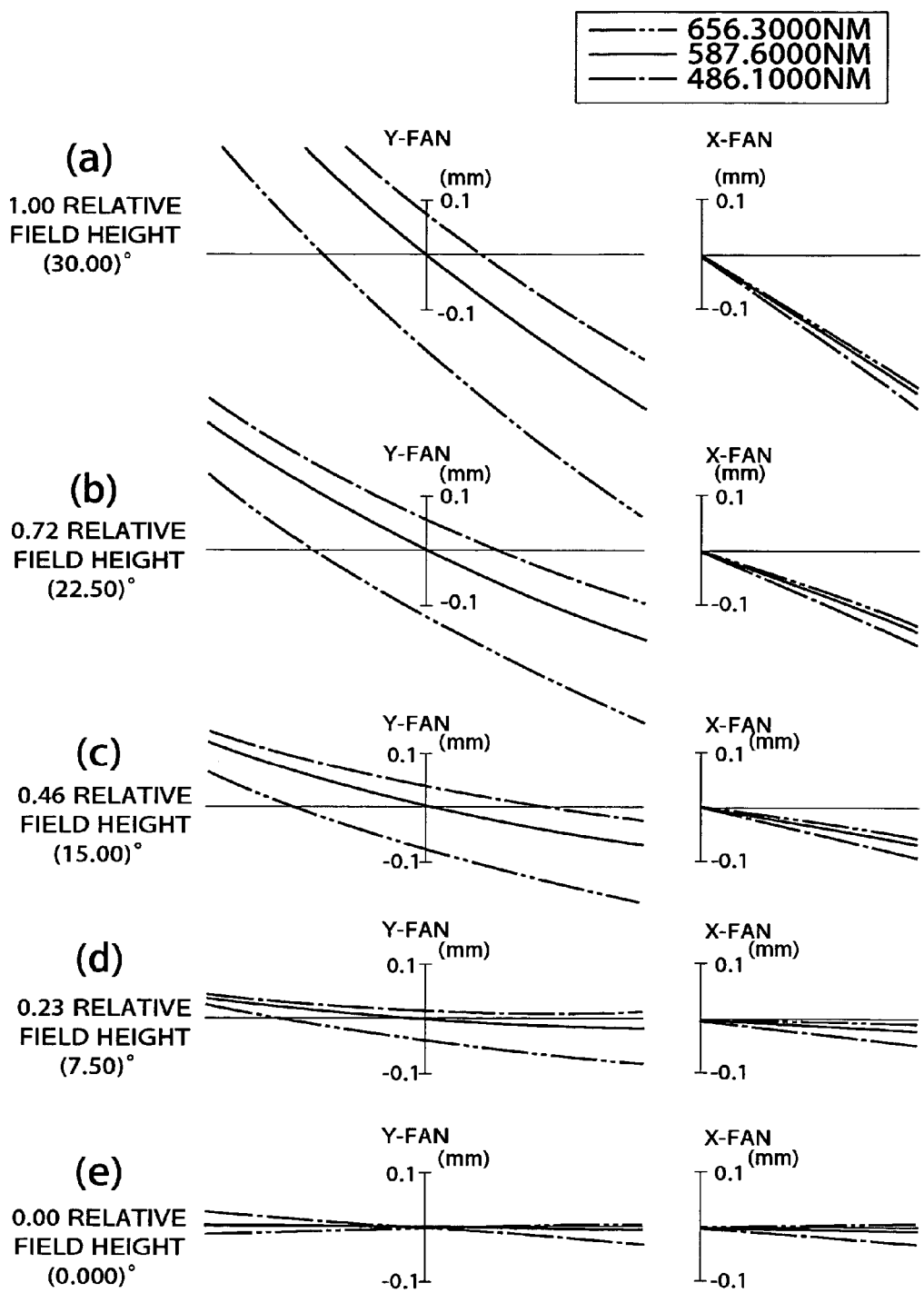
FIG. 26D is a lateral aberration plot output drawing at ±30 degrees of the eyepiece optical system shown in FIG. 26A.

However, as an eyepiece optical system for a wearable display that is used to observe an image with the position of an display and the position of the eyes being fixed and with separate eyepiece optical systems being used for the right and left eyes, there is only an eyepiece optical system having a field of view angle of about ±22.5 degrees at best. In FIG. 26D, various aberrations of the optical system shown in FIG. 26A in the cases of field of view angles of 0 degree, 7.5 degrees, 15 degrees, 22.5 degrees, and 30 degrees are shown. Although chromatic aberration is corrected by the use of the lens combination, a chromatic aberration of 200 μm and various aberrations of 400 μm are present at the position of field of view angle of 22.5 degrees, and it can be seen that assuming the size recognizable by the human eye to be about 100 μm, this condition is insufficient. Thus, it can be inferred that to make aberrations small down to the limit recognizable by the human eye, a combination of only convex lenses does not suffice, and a combination of a convex lens and a concave lens is required.

However, regarding a combination of a convex lens and a concave lens, the concave lens makes the differences between the inclinations of the principal rays of the respective light beams from the light emitting picture plane small and thus cannot, at a wide field of view angle, efficiently deflect diverging light beams, and thus the lens diameter has to be made larger. On the other hand, as can be clearly seen from the light beams of FIG. 26A, of which optical system is constituted only by the convex lenses, if such eyepiece lens is applied to each of the right and left eyes, then, assuming an eye-width (the distance between the right and left eyes) of 6.5 cm, the right and left eyepiece optical systems, even though they are constituted only by the convex lenses, overlap with each other on the nose side, and thus a nose side field of view angle of up to about 30 degrees can only be obtained. An attempt to eliminate aberrations by combining a convex lens with a concave lens results in the extension of the principal ray of each of the beams coming out of the eye by the effect of the concave lens, and thus the nose side field of view becomes still smaller, which means, at best, a field of view angle of about 22.5 degrees.

Next, it will be considered how to obtain a larger field of view. In order to obtain an image with a high sense of reality, it is necessary to obtain a field of view equivalent to or more than the field of view that is associated with the condition when a human wears glasses, and a sufficient field of view angle on the nose side, in which a limit is placed on the eyepiece lens diameter, must be secured. In order to obtain a still larger field of view angle on the nose side, the diameters of the convex lenses are to be made still larger, and glass materials having a higher refractive index are to be used.

Figure 27A:
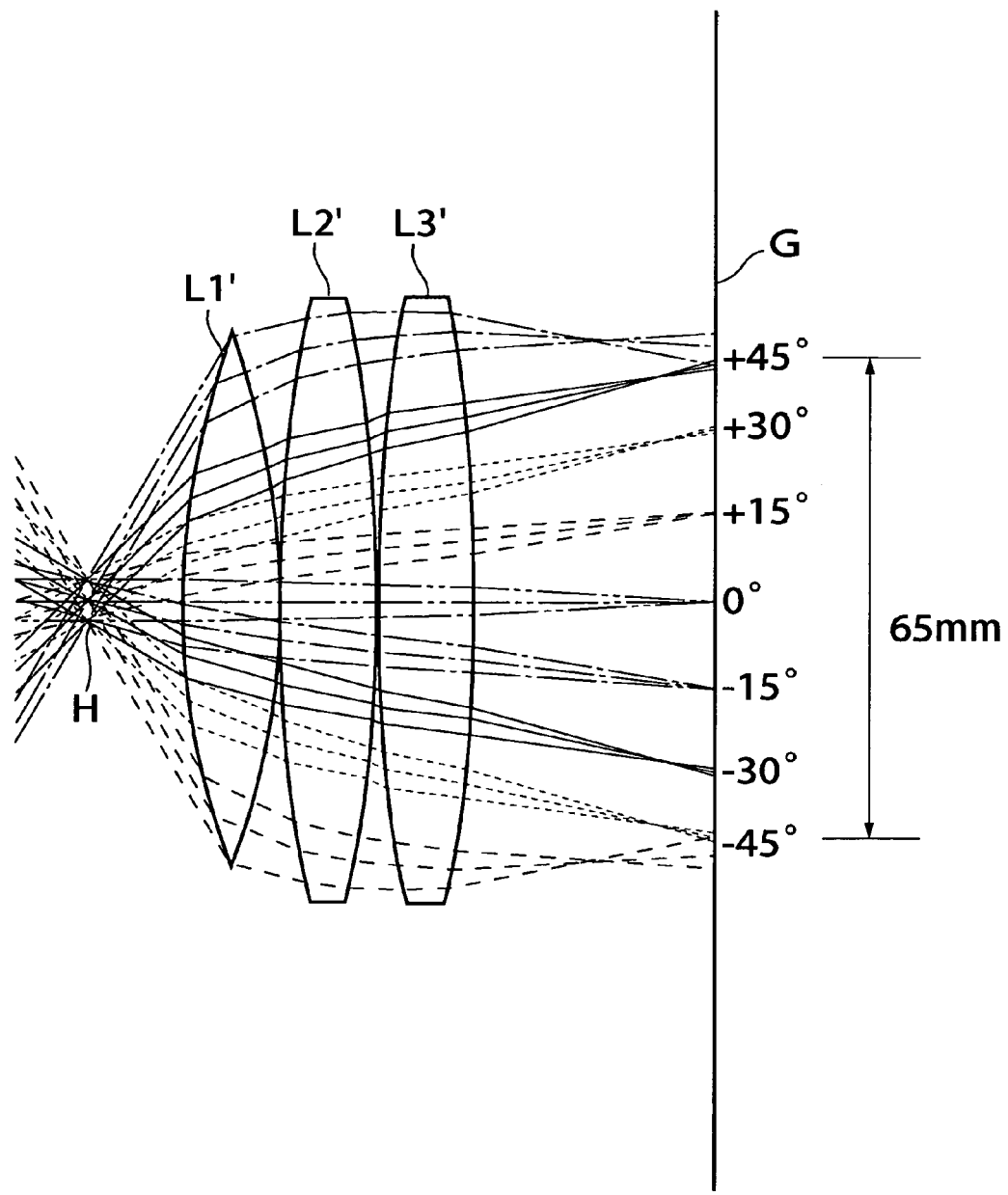
FIG. 27A is a drawing showing an example of a configuration of a conventional eyepiece lens system.
Figure 27B:
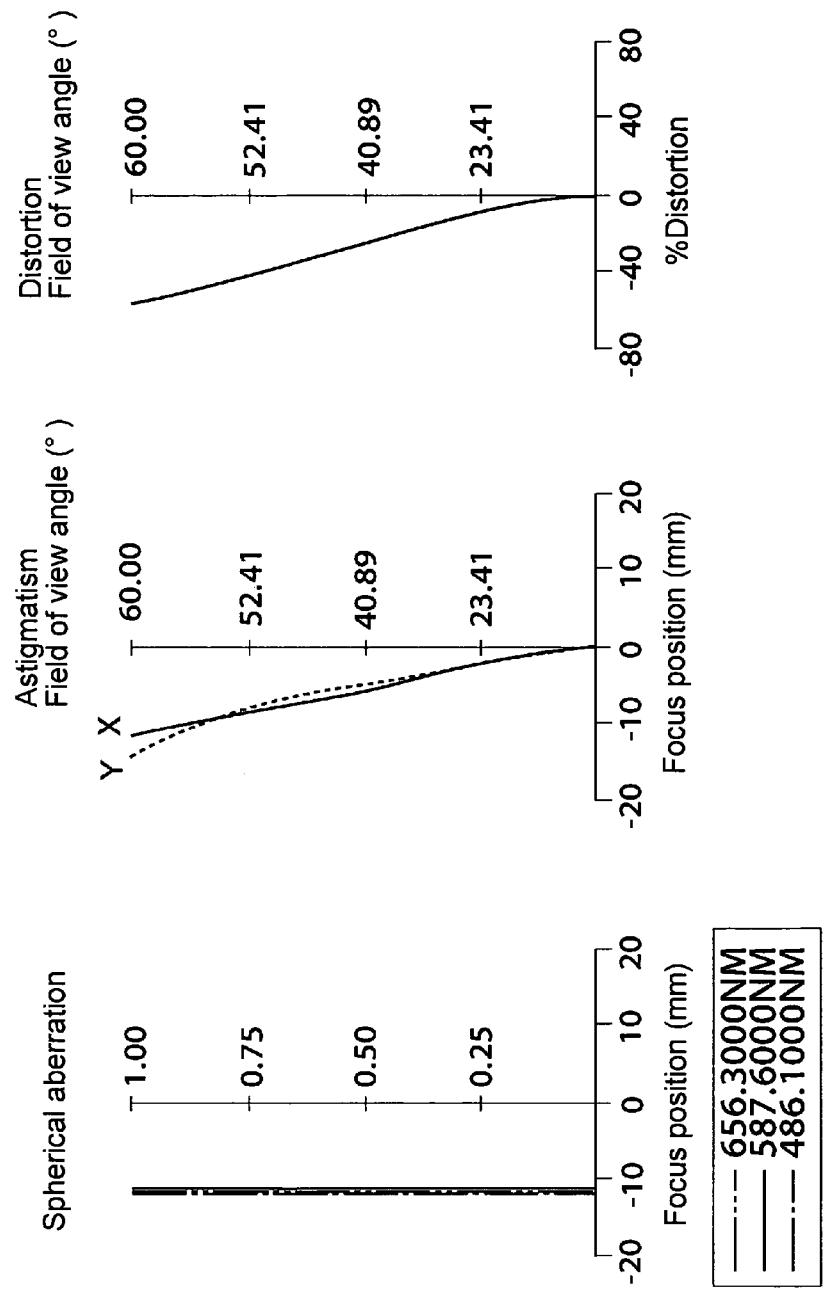
FIG. 27B is a field aberration output drawing of the eyepiece optical system shown in FIG. 27A.
Figure 27C:
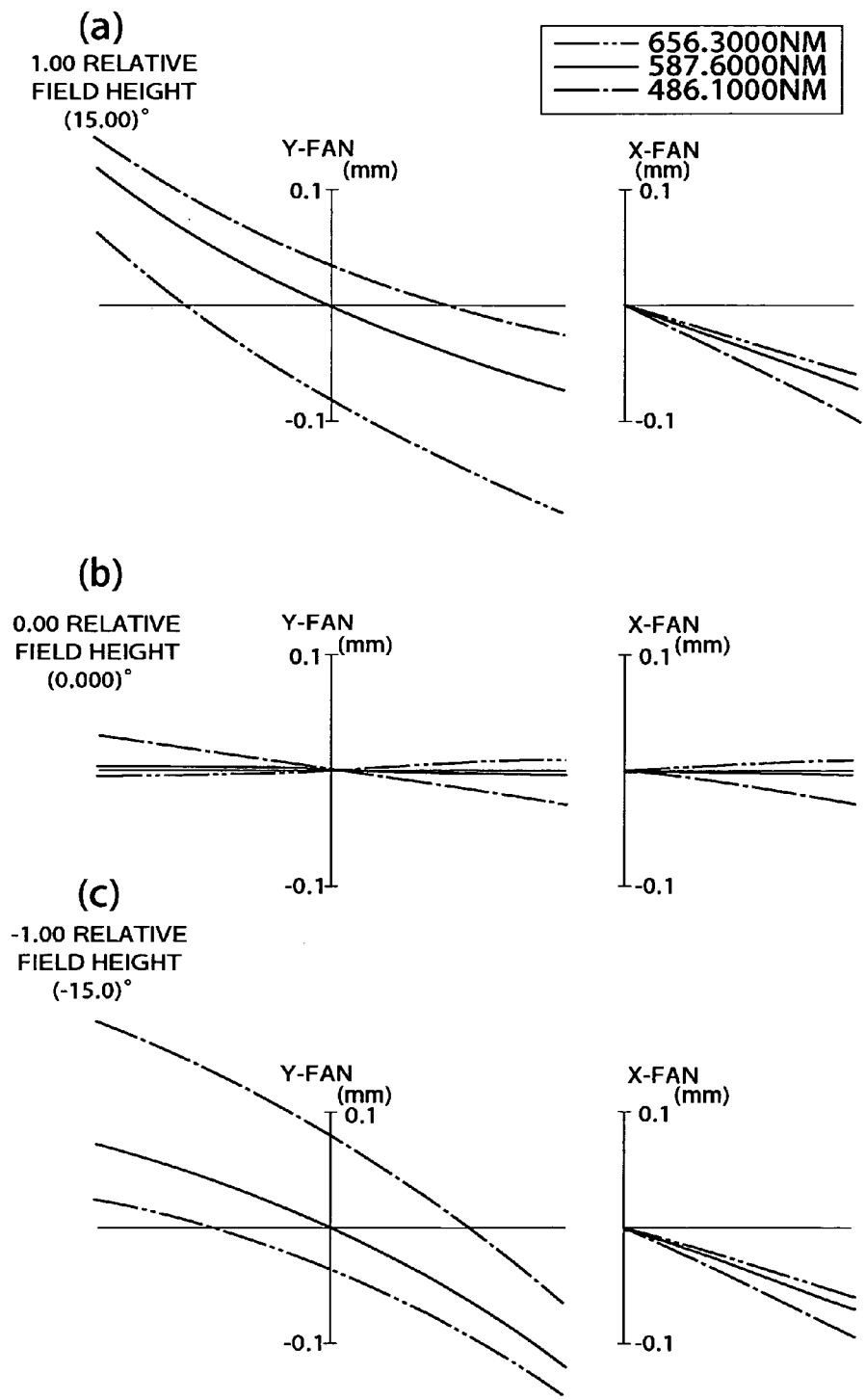
FIG. 27C is a lateral aberration plot output drawing at ±15 degrees of the eyepiece optical system shown in FIG. 27A.
Figure 28:
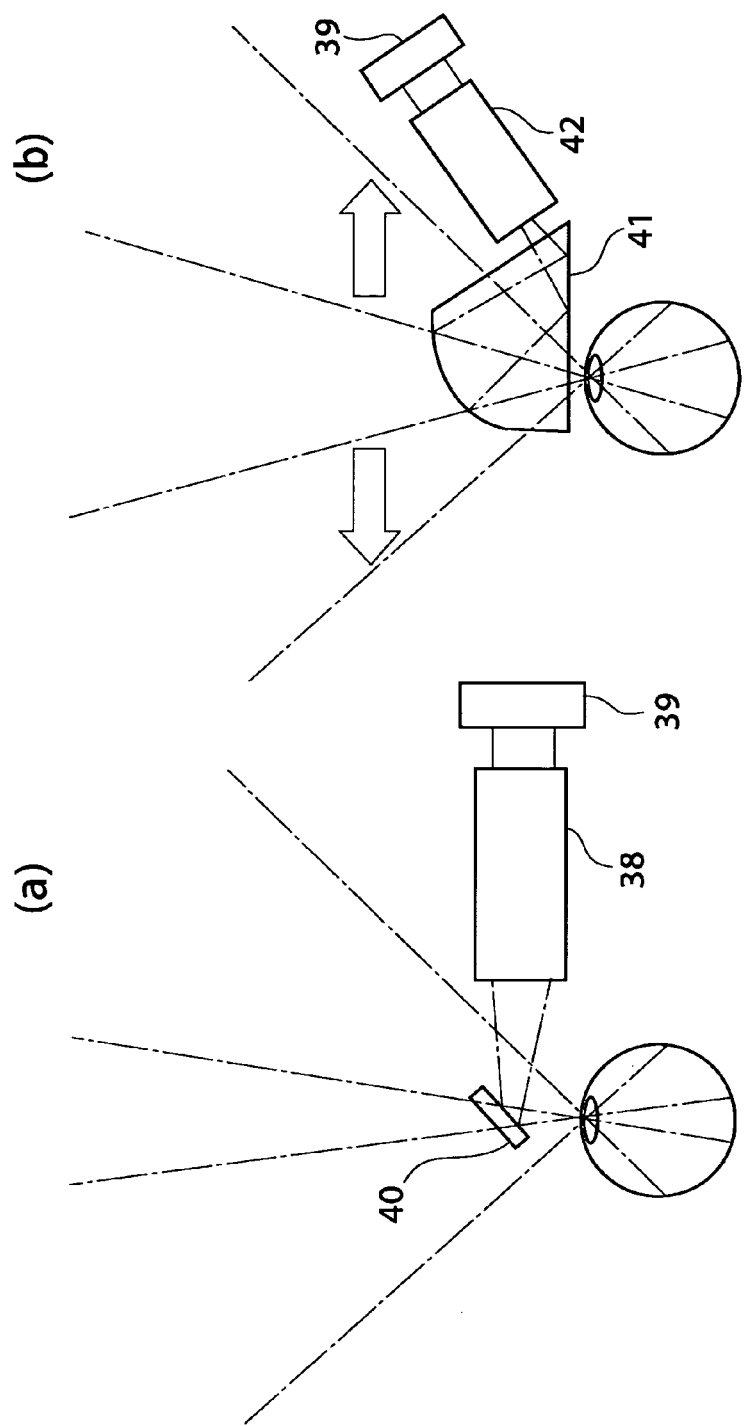
FIG. 28 is a drawing showing representative embodiments of eyeglass type display and head mount type display.

Here, an example in which, to obtain a wider field of view, three convex lenses L1', L2', and L3' which are arranged sequentially from the eyeball side and each of which has a curvature of 100 cm, 200 cm, and 220 cm is shown in FIGS. 27A-27C. In FIG. 27A, G denotes a light emitting picture plane, and H denotes the pupil of the human eye; as with FIG. 26A, the lenses are made of glass material LAC7 having a low refractive index but having a small color dispersion. It can be seen from the light beams in FIG. 27A that a wide field of view of about 45 degrees is obtained on the nose side within the range of 65 mm. However, as can be seen from FIG. 27B, which corresponds to FIG. 26B, while the astigmatism is improved, around the field of view angle of ±30 degrees, to be 3.5 mm, the distortion has become larger, i.e., 13.5%. Further, as can be seen from FIG. 27C, which corresponds to FIG. 26C, a chromatic aberration of about 150 μm is present even at the field of view angle of ±15 degrees. As just described, it can be seen that, with respect to an optical system of which field of view angle is enlarged up to more than ±22.5 degrees, it is very difficult to restrict the diameter of the optical system within the eye-width, in addition to correcting various aberrations including chromatic aberration.

Because, in the above, it has been understood that it is difficult, in the prior art, to design an eyepiece optical system having a field of view angle of more than ±22.5 degrees, the stages at which the present inventor has conceived the present invention under such understanding will now be described.

The reason that, in the prior art line of thought, the aberrations are not improved as indicated in FIG. 27A is that with respect to the light beams, having their light beam paths at the lens periphery, which correspond to the portions in which the field of view angle is large, the curvatures of the lenses are too high, and thus, typically, a design in which the curvatures are reduced, the aberrations are improved by combining a concave lens, and, further, the number of lenses is increased is performed. But, in the case of a mechanism in which both eyes are each provided with a separate eyepiece system, the lens diameter is required to be equal to or less than 65 mm as described above.

In an attempt to address the above difficulties, the present inventor has conceived that by making at least one surface of the convex lenses a conic surface, an improvement is realized. An example thereof is shown in FIG. 1. While in the optical system shown in FIG. 1A, the light beams from light emitting picture plane G are focused on pupil H of the human eye by using three convex lenses L11, L12, and L13, the back side surface (the surface located on the side distant from the eye) of lens L11 among those lenses, which is located nearest to the eyeball, is made a conic surface, thereby suppressing coma aberration and astigmatism, and thus it is configured such that even if the pupil position changes due to a look-around eye action, good images can be projected into the eyeball. In an x-y-z Cartesian coordinate system with the z-axis being the optical axis, curved surface Z(r) of a conic surface can be expressed:

$$Z(r) = \frac{c \cdot r^2}{1 + \sqrt{\{1 - (1+k) \cdot c^2 \cdot r^2\}}}$$

where c is a constant representing a curvature, and $$r^2 = x^2 + y^2.$$

k denotes the conic constant, and k<0 is used. The optical design values are shown in Table 1. Note that each of the curvature radiuses of the surfaces shown in the Tables in this specification, including Table 1, is expressed by a negative number when its curvature center is on the pupil side relative to the lens surface position and is expressed by a positive number when its curvature center is on the side of light emitting picture plane G. In addition, the curvature radiuses and the surface separations on the optical axis are expressed in the unit of mm, unless otherwise specified.

TABLE 1

| Surface No. | Surface Curvature Radius (mm) | Surface Separation on Optical Axis | Glass Material |
|---|---|---|---|
| Pupil: | INFINITY | 12.000000 | |
| 1: | INFINITY | 18.000000 | F2_SCHOTT (L11) |
| 2: | −40.00000 | 2.000000 | |
| Conic Constant K: | −0.800000 | | |
| 3: | INFINITY | 15.000000 | SK11_SCHOTT (L12) |
| 4: | −80.00000 | 2.000000 | |
| 5: | 200.00000 | 15.000000 | SK11_SCHOTT (L13) |
| 6: | −100.00000 | 22.074232 | |
| Light Emitting Picture Plane G: | INFINITY | 0.000000 | |

Figure 1B:
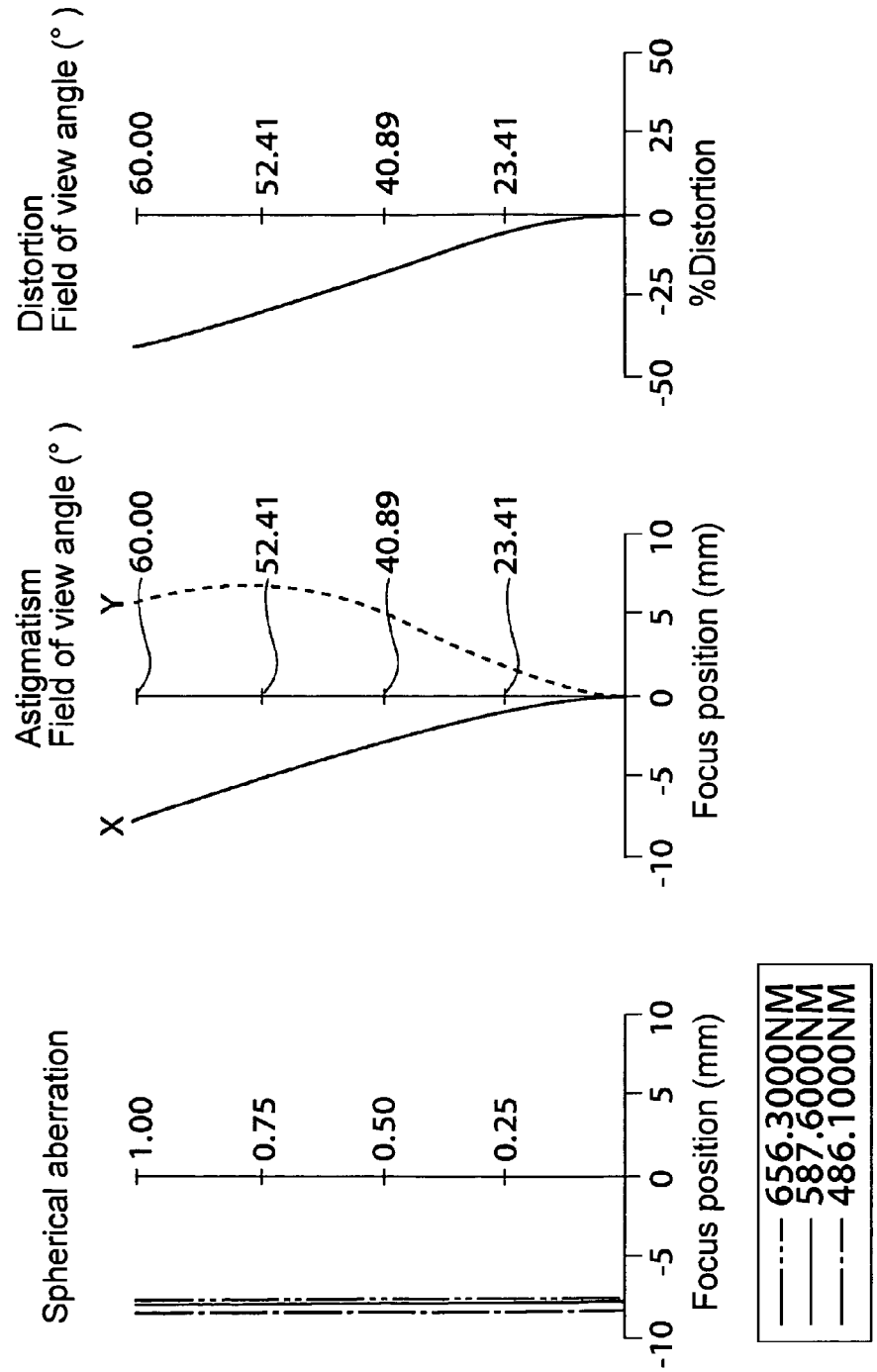
FIG. 1B is a drawing showing the aberration of the eyepiece optical system shown in FIG. 1A.

The spherical aberration, astigmatism, and distortion of such optical system are shown in FIG. 1B. As can be seen from FIG. 1B, around the field of view angle of ±30 degrees, the astigmatism is improved to be 3 mm, and the distortion is small, i.e., 9.5%.

Figure 1C:
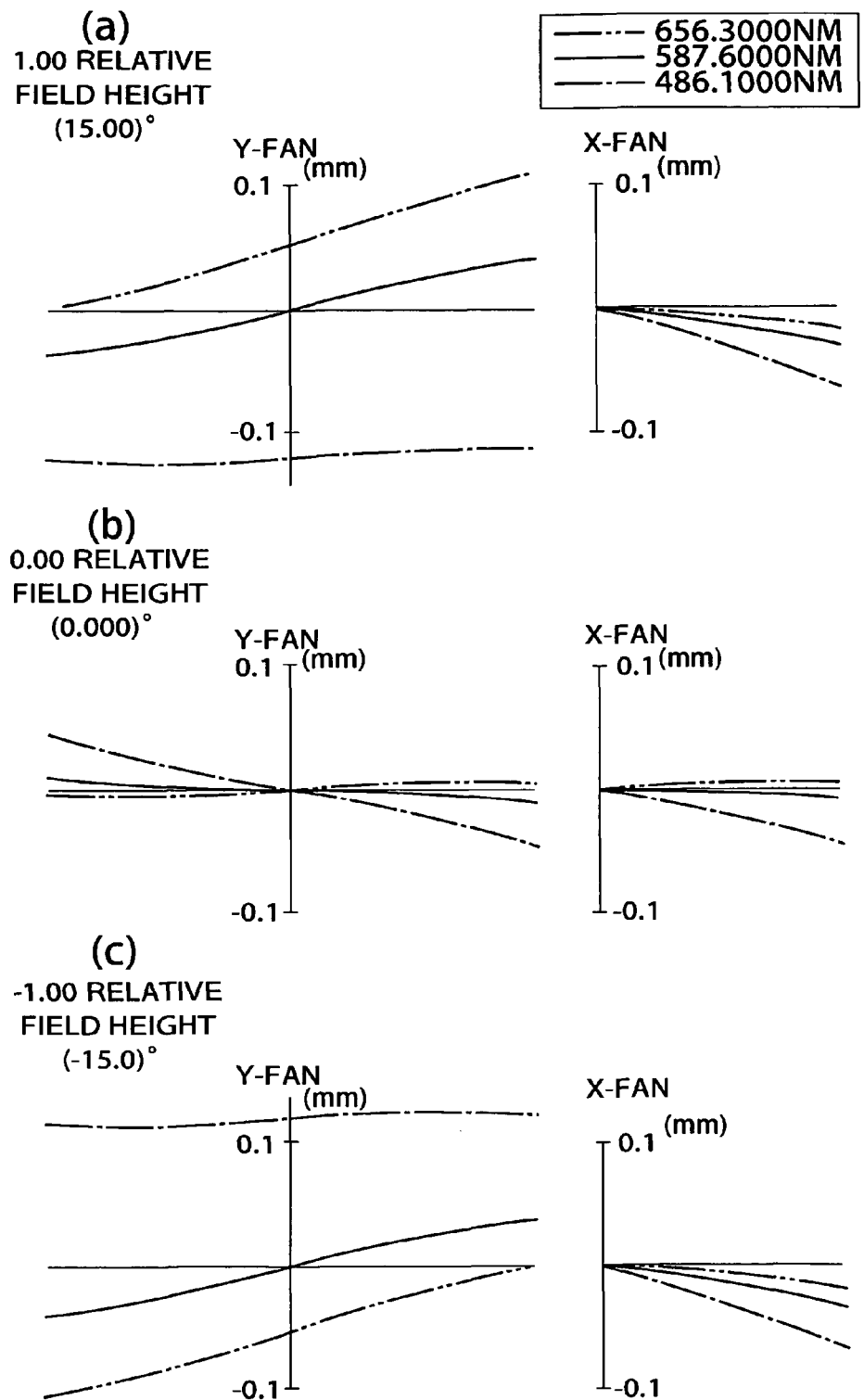
FIG. 1C is a lateral aberration plot output drawing of the eyepiece optical system shown in FIG. 1A.

It can be seen from FIG. 1C, which shows the chromatic aberration of the optical system, that a chromatic aberration of 200 μm is present even at the field of view angle of ±15 degrees, which means a contrasting deterioration.

Figure 2A:
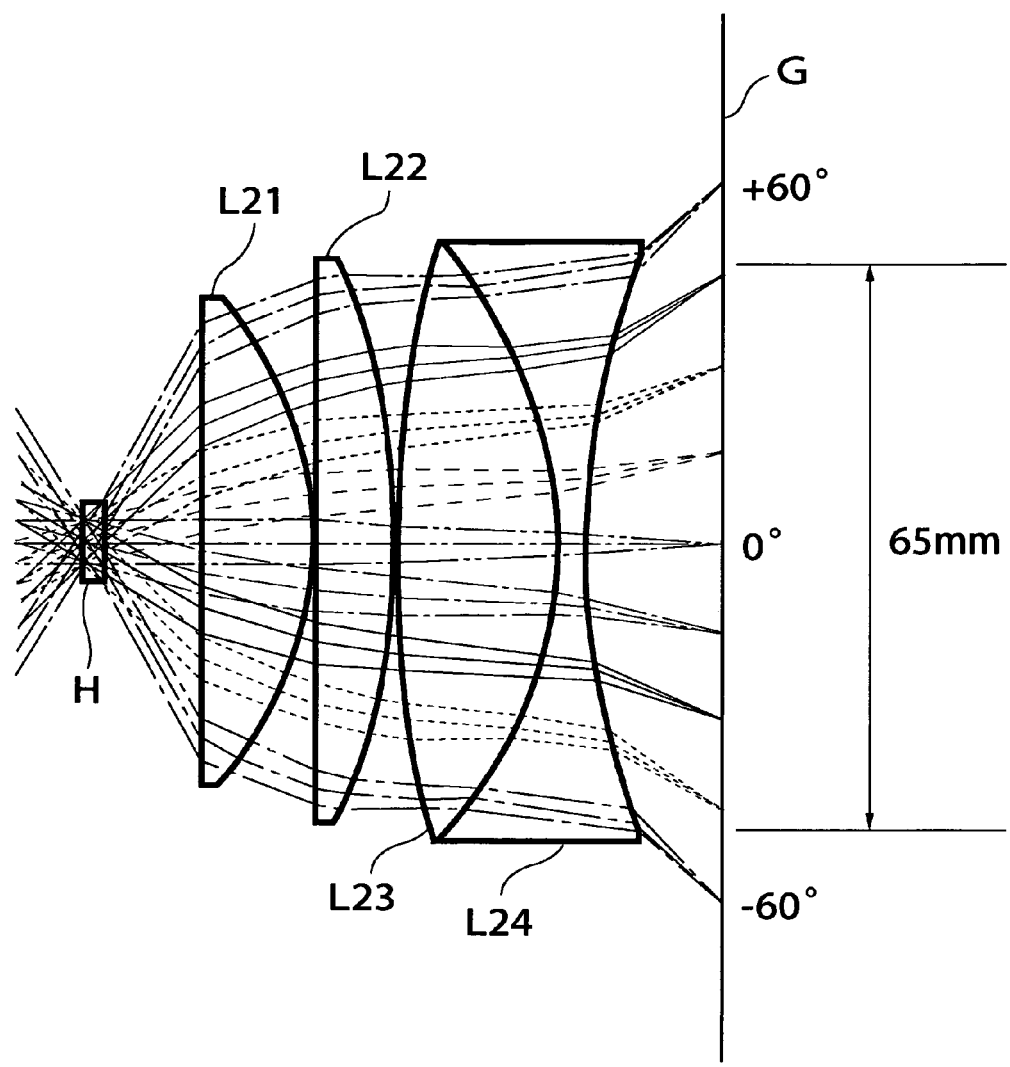
FIG. 2A is a drawing showing an outline of an eyepiece optical system used in an embodiment of the present invention.

However, since it has been found that the eyepiece lens system of FIG. 1A has very good characteristics regarding the aberrations other than the chromatic aberration, a first embodiment mode of the present invention is, as shown in FIG. 2A, configured such that one lens surface of the convex lenses (L21, L22) which are located near to pupil H of the eyeball and with respect to which the deflection angles of the light beams are larger is made a conic surface having conic constant K<0 and, at the same time, such that, to correct the chromatic aberration, a cemented lens (L23, L24) made by combining glass materials which are different from each other is provided. The cemented lens is constituted by at least two lenses; the cemented portion of the cemented lens is made a concave surface on the pupil side; the color dispersion of the pupil side lens of the cemented lens is smaller than that of the other lens; and the cemented lens has a convex-concave-convex form, which form has a high chromatic aberration correcting effect. ("Convex" here means a convex form in the direction of the pupil; "concave" means a convex form in the opposite direction. This applies throughout this specification, unless otherwise specified.) The optical design values of the optical system shown in FIG. 2A are shown in Table 2.

TABLE 2

| Surface No. | Surface Curvature Radius | Surface Separation on Optical Axis | Glass Material |
|---|---|---|---|
| Pupil: | INFINITY | 12.000000 | |
| 1: | INFINITY | 13.000000 | TAFD5_HOYA (L21) |

TABLE 2-continued

| Surface No. | Surface Curvature Radius | Surface Separation on Optical Axis | Glass Material |
|---|---|---|---|
| 2: | −38.00000 | 0.200000 | |
| Conic Constant K: | −0.700000 | | |
| 3: | INFINITY | 9.000000 | TAFD5_HOYA (L22) |
| 4: | −78.00000 | 0.200000 | |
| 5: | 138.00000 | 18.500000 | FCD1_HOYA (L23) |
| 6: | −50.00000 | 3.000000 | FDS1_HOYA (L24) |
| 7: | 91.00000 | 15.188265 | |
| Light Emitting Picture Plane G: | INFINITY | 0.000000 | |

The reason for having adopted such configuration is as follows: Namely, because, as described above, as opposed to general eyepiece lenses, the system must have a wide field of view angle, and there is a separate eyepiece lens for each of both eyes, the eyepiece lenses are required to be constructed on the condition that they have a diameter of equal to or less than a half of the 65 mm eye-width. Thus, the lens near to pupil H is constituted by a convex lens having a curvature which is as large as possible, thereby the light beams are considerably deflected toward the optical axis; a cemented lens for correcting chromatic aberration is incorporated in a position near to the object side, where the principal ray of each of light beams runs more parallel to the optical axis; and, further, the lens surface near to light emitting picture plane G is made a concave lens so that the light beams incline toward the diverging direction.

(It should be noted that while, in the above description, for convenience of description, the light beams are assumed to start from pupil H and reach light emitting picture plane G, the actual light beams proceed in the opposite direction. Hereinafter, for convenience of description, light beams may also be described as if they came out of pupil H, contrary to the fact.)

By this, the convex lens on the side of pupil H having a conic surface improves the astigmatism and coma aberration arising around the lens; the chromatic aberration is corrected by the cemented lens; the distortion is alleviated by the last surface of the cemented lens; and, a lens configuration of which lens diameter is not required to be made larger is realized. This configuration has a significant effect of correcting various aberrations without making the lens diameter larger and is effective in the case where, as a wearable display, the lens diameter is constrained.

Figure 2B:
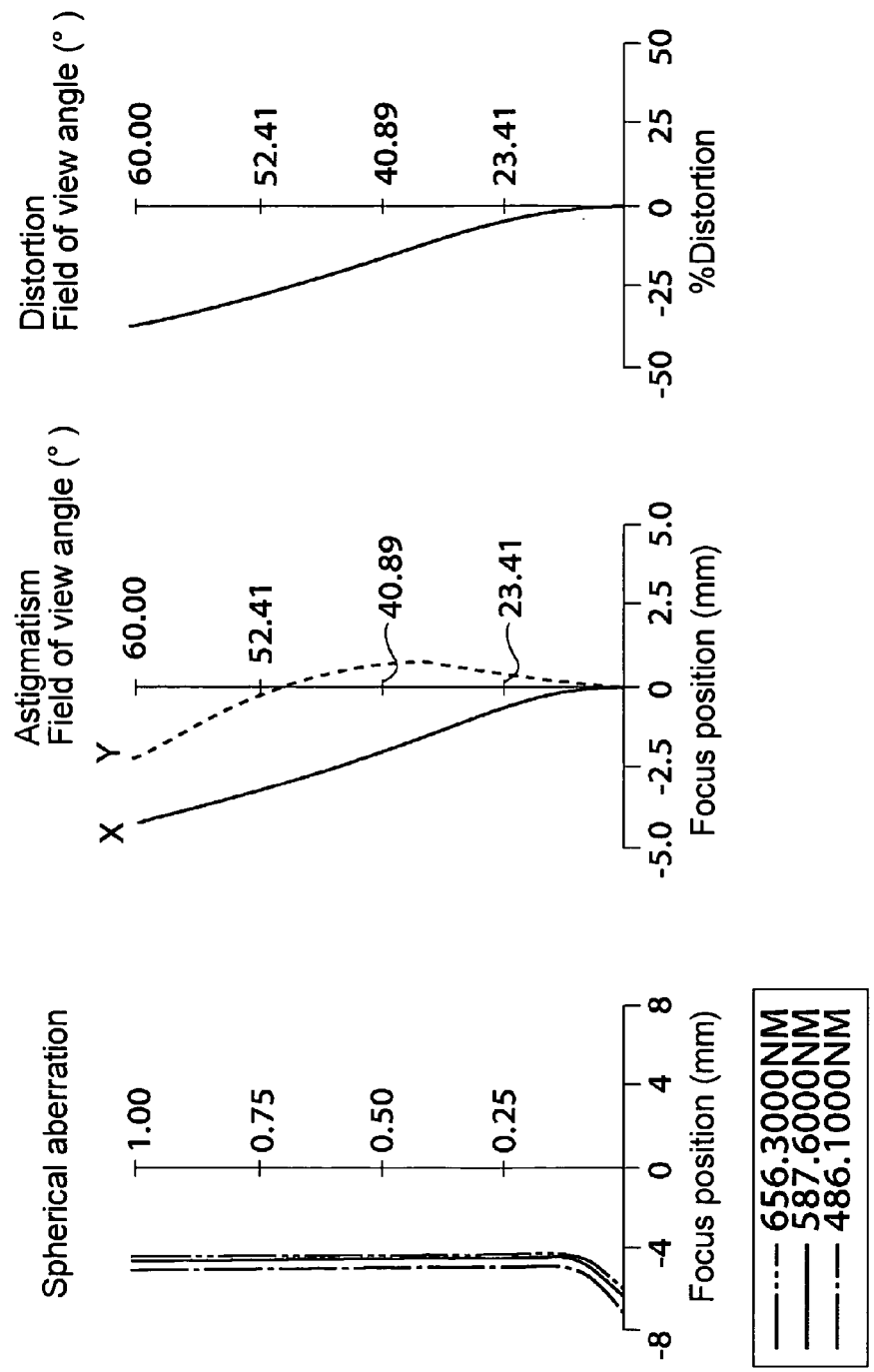
FIG. 2B is a drawing showing the aberration of the eyepiece optical system shown in FIG. 2A.
Figure 2C:
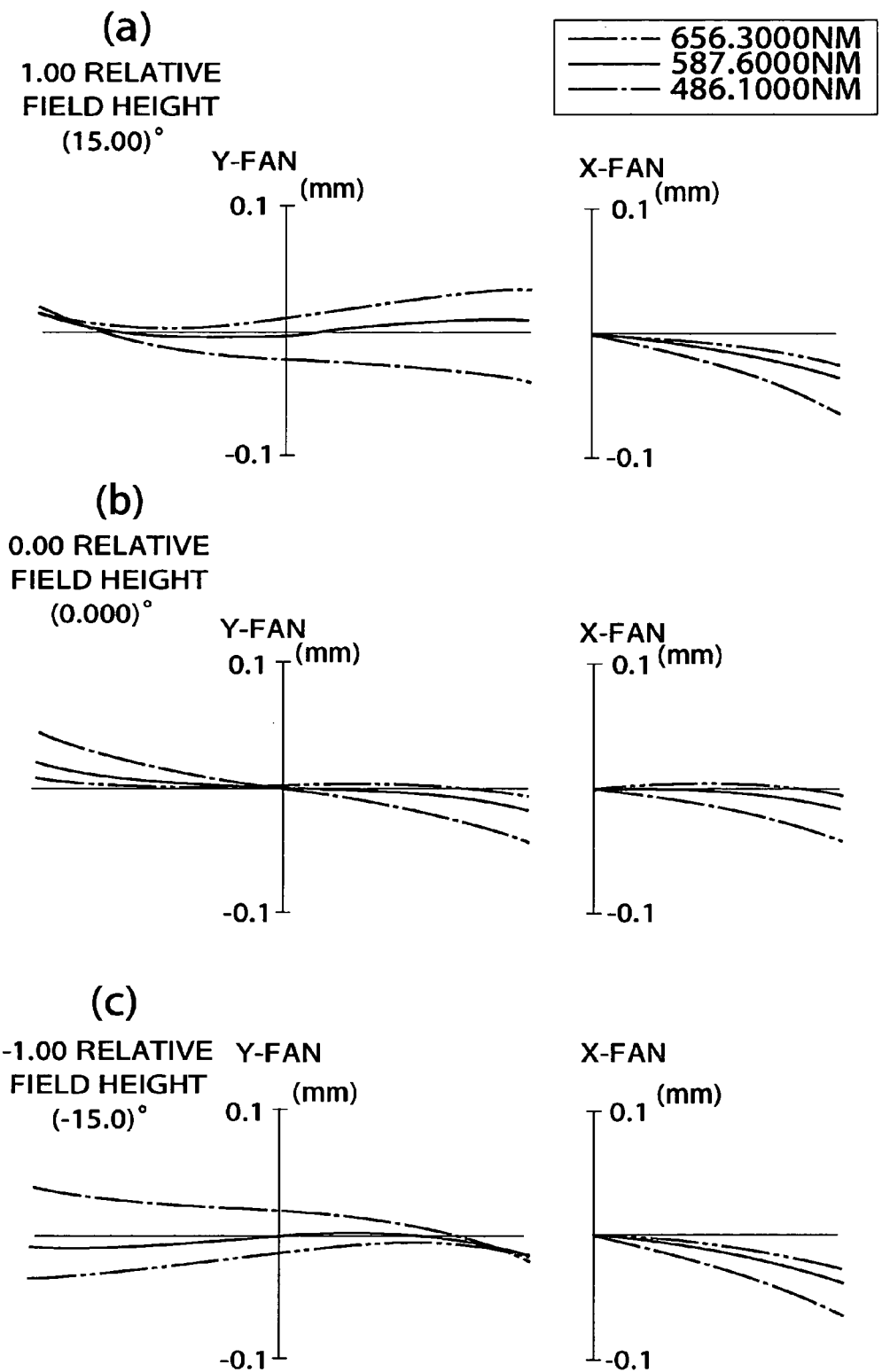
FIG. 2C is a lateral aberration plot output drawing of the eyepiece optical system shown in FIG. 2A.

The spherical aberration, astigmatism, and distortion of the optical system are shown in FIG. 2B. In FIG. 2A, a wide field of view angle of about 45 degrees is obtained on the nose side; further, the astigmatism is improved to be 3 mm around the field of view angle of ±30 degrees as with FIG. 1B, and the distortion is as little as 9%, even compared with FIG. 1B. While the chromatic aberration of the optical system is shown in FIG. 2C, it can be seen that the chromatic aberration is significantly improved to be less than 80 μm even at the field of view angle of ±15 degrees.

However, the configuration of FIG. 2A still has the following problems to be solved:

(1) When the 65 mm eye-width is considered, only a field of view angle of 45 degrees is obtained on the nose side, and a field of view angle of ±60 degrees available with an eyeglass field of view is not achieved; the regions observed by both eyes are different from each other, which creates a sense of discomfort, and thus, a wide field of view angle of ±60 degrees should be attained; and (2) The chromatic aberration of 80 μm may be observed with the naked eye, and the chromatic aberration should be more lessened; assuming that the resolution of the human eye is about 50 μm, a chromatic aberration of 50 μm or less should also be attained.

Further, it is required that, to obtain a wide field of view angle image, actions performed by the human eye be comprehended and that an optical system by which an image can be observed in a state as natural as possible be made. Accordingly, the present inventor has tried to study the actions performed by the human eye.

With respect to he human eye, up to an eyeglass field of view angle of about ±30 degrees, the eyeball laterally shifts to recognize surrounding things. However, investigation into the prior art technology has revealed that optical systems having good aberration characteristics within ±30 degrees simply have good numerical values only with respect to the ±30 degrees in which the pupil position is not moved, and that there is no optical system in which the actual eyeball lateral shift actions are considered. Thus, it has been studied how much the pupil moves through the lateral shift action of the human eye to make clear on what conditions aberrations are required to be eliminated. The method thereof will be explained with reference to FIG. 3.

Figure 3:
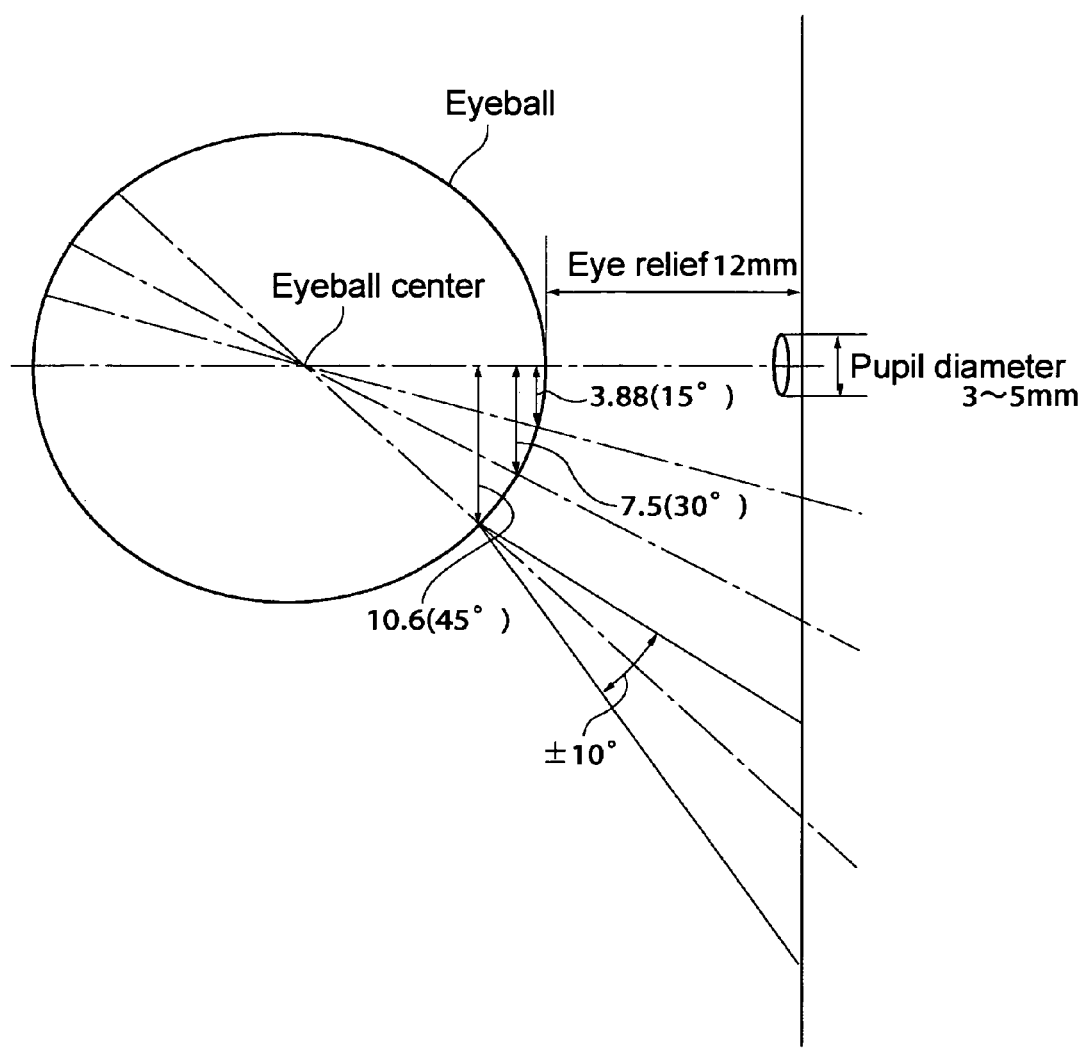
FIG. 3 is a drawing showing the shift of the field of view center associated with a human look-around eye action.

As the study method, a method in which, with the eyeball and an optical system being fixed, aberrations when the eyeball is moved from 0 degree to 45 degrees are studied has been used. First, since when the eye view center moves from 0 degree to 45 degrees, the pupil position rotates around the eyeball center as shown in FIG. 3, the picture plane image is to be observed, via an eyepiece optical system, from shifted positions of 3.88 mm at 15 degrees, 7.5 mm at 30 degrees, and 10.6 mm at 45 degrees, with the eye being directed toward the respective angle directions. In addition, it is known that while the human eye has a high eyesight at the eye view center, the eyesight at the shifted angle of ±5 degrees from the eye view center deteriorates down to a half thereof, the eyesight at the shifted angle of ±10 degrees deteriorates down to a fourth thereof; the eyesight at the shifted angle of ±15 degrees deteriorates down to an eighth thereof.

Thus, the eyepiece lens is not required to have good aberrations for its entire field of view angle, and it can be inferred that good aberrations within the range of ±10 degrees from the eye view center at the eye view center shift angle of ±30 degrees would suffice. While the first embodiment of the present invention (FIG. 2A) is designed so that it has good aberration up to about ±45-degree field of view angle, the behavior of the aberrations at each of the eye view centers, −10 degrees, −5 degrees, 0 degree, +5 degrees, and +10 degrees, when the eye view center shift angle of 30 degrees is assumed will be investigated hereinafter.

Figure 2D:
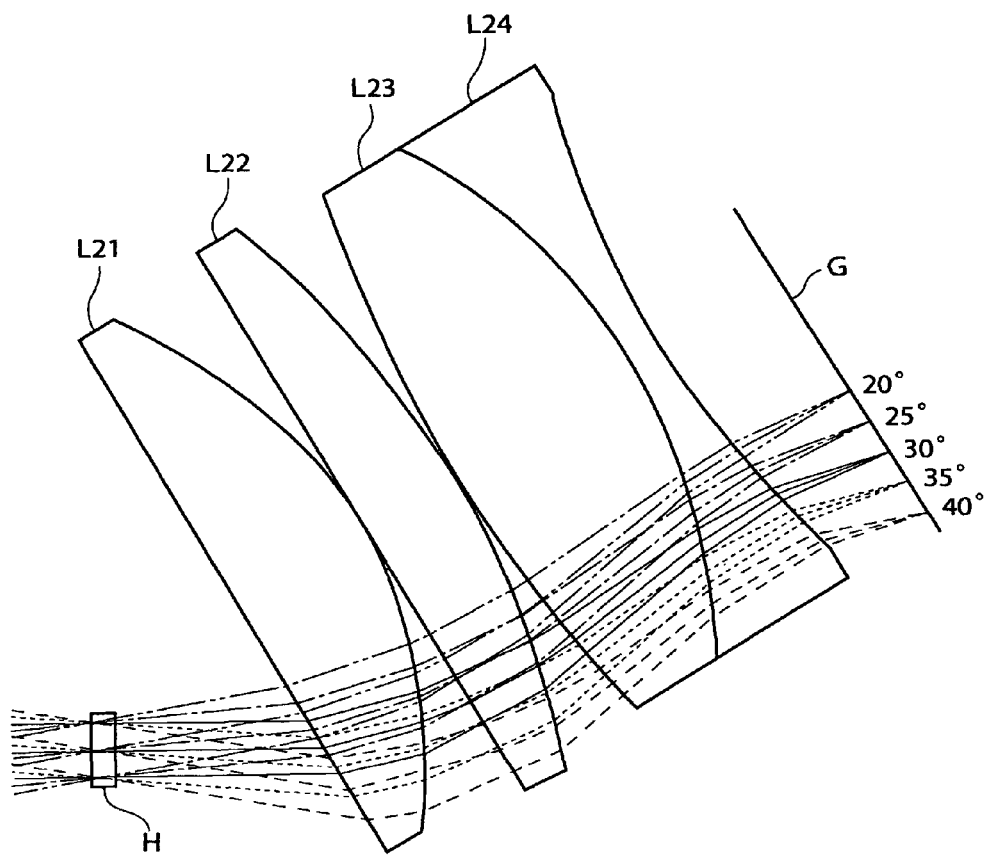
FIG. 2D is a ray tracing drawing of the eyepiece optical system shown in FIG. 2A in the case of 30-degree look-around eye.
Figure 2E:
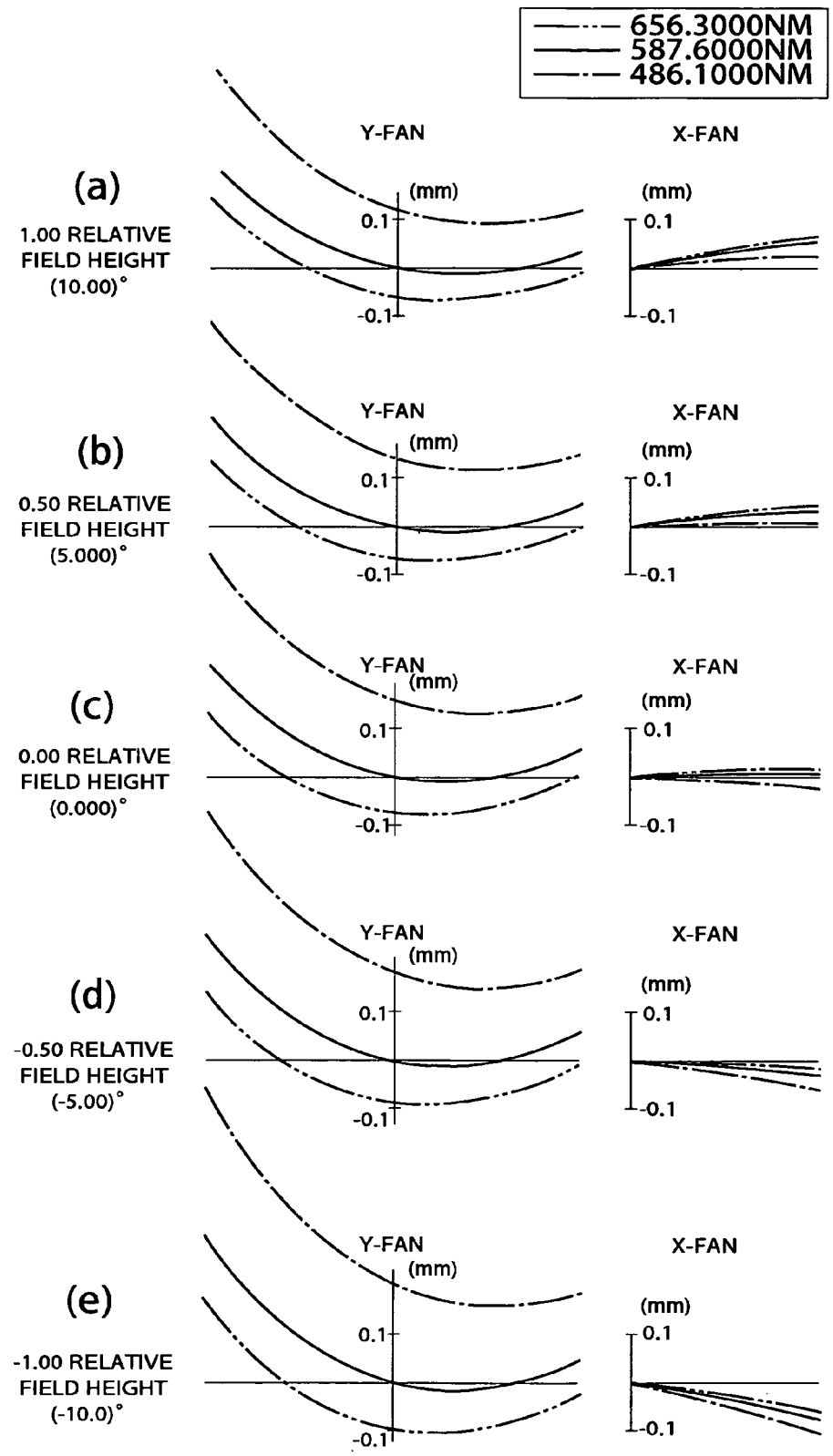
FIG. 2E is a plot output drawing showing the lateral aberration of 30±10 degrees of the eyepiece optical system shown in FIG. 2A.

While FIG. 2D illustrates the light beams of the first embodiment optical system when a look-around eye action is done, large aberrations are present at the position of image plane G, as can be seen just from the drawing. FIG. 2E shows the results of the investigation into the chromatic aberration behaviors at the angles, −10 degrees, −5 degrees, 0 degree, +5 degrees, and +10 degrees, each of which represents an angle separation from the eye view center shift angle of 30 degrees; the vertical axis represents the lateral aberration, and the horizontal axis represents the height relative to the optical axis at the aperture plane (pupil position). A chromatic aberration of 200 μm is present, the other aberrations of about 200 μm are also present, and the aberration spot diagram (RMS value calculated from the plotted spots of various aberrations) amounts to 400 μm, which shows that a clearly deteriorated image results at the time of look-around eye action. (It is to be noted that although FIG. 2A and FIG. 2D seem to show different lens systems, this is because, for convenience of explanation, only the regions of the lenses for which the light beams are required to be illustrated are illustrated, and thus both of the lens systems are identical. While, hereinafter, as with this instance, an identical lens system may be shown in different shapes depending on the light beam extent required for explanation, lenses denoted by an identical reference symbol indicate the same lens.)

In other words, as a third problem to be solved, another problem to be solved, i.e., (3) Aberrations in the eye view center range of ±30 degrees and at the angles separated therefrom by −10 degrees, −5 degrees, 0 degree, +5 degrees, and +10 degrees should be good; when assuming that the aberration at the eye view center is about 50 µm, performances of equal to or less than ±100 µm at ±5 degrees and equal to or less than ±200 µm at ±10 degrees should be realized, is added, and by simultaneously clearing the above-described problems to be solved (1)-(3), an image perfectly equivalent to the natural image observed by a human will be provided.

Figure 4A:
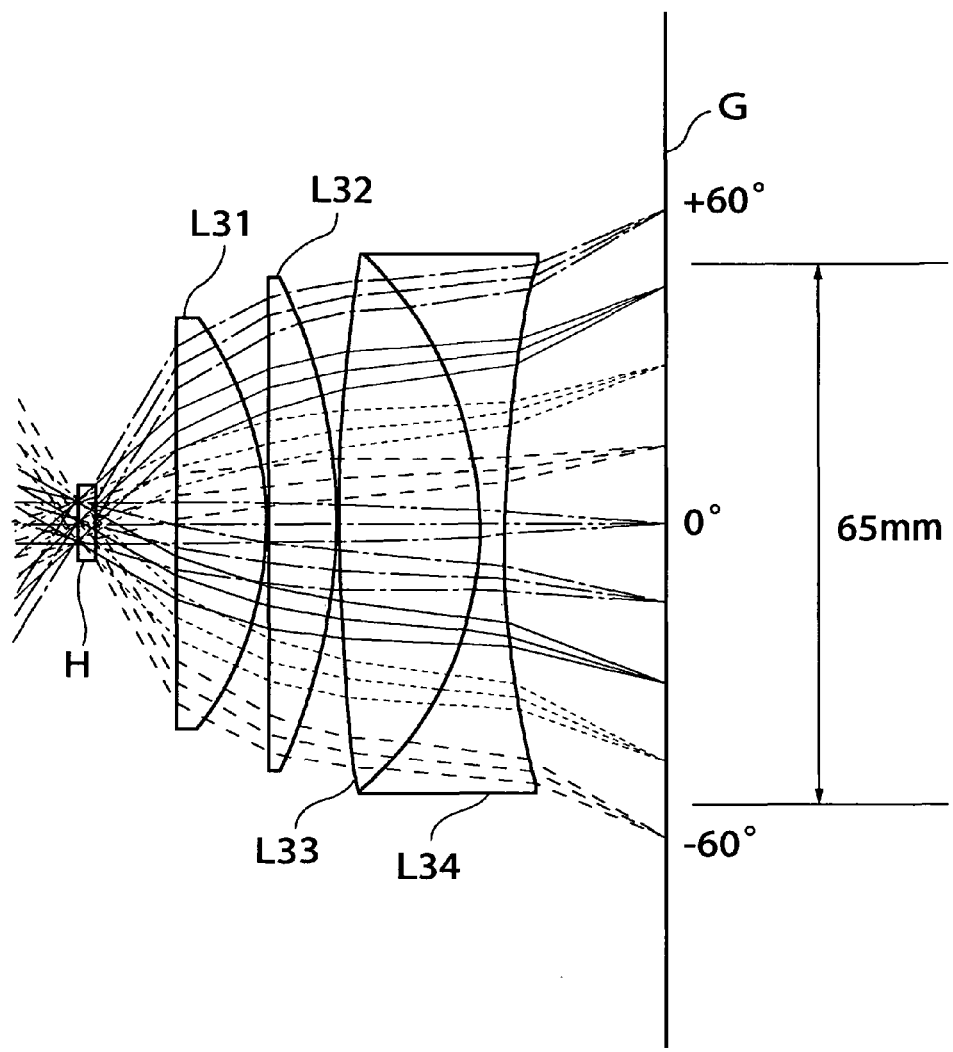
FIG. 4A is a drawing showing an outline of an eyepiece optical system used in an embodiment of the present invention.

To this end, in a second embodiment of the present invention shown in FIGS. 4A-4D, a method to improve various aberrations is devised in which to reduce the chromatic aberration, as the glass material for the convex lenses near to the pupil, a glass material having a low refractive index but also having a low color dispersion is used to improve the chromatic aberration and in which by making the conic coefficient k≦1, the curvature at the lens periphery is reduced. This optical system is, as shown in FIG. 4A, constituted by convex lenses L31 and L32 and the cemented lens made by cementing convex lens L33 and concave lens L34. The optical design values thereof are shown in Table 3.

TABLE 3

| Surface No. | Surface Curvature Radius | Surface Separation on Optical Axis | Glass Material |
|---|---|---|---|
| Pupil: | INFINITY | 10.000000 | |
| 1: | INFINITY | 11.000000 | TAC8_HOYA (L31) |
| 2: | −36.00000 | 0.200000 | |
| Conic Constant K: | −1.000000 | | |
| 3: | INFINITY | 8.000000 | TAC8_HOYA (L32) |
| 4: | −66.00000 | 0.200000 | |
| 5: | 210.00000 | 17.000000 | TAF3_HOYA (L33) |
| 6: | −44.00000 | 3.000000 | SF59_SCHOTT (L34) |
| 7: | 130.00000 | 19.067127 | |
| Light Emitting Picture Plane G: | INFINITY | 0.00000 | |

Figure 4B:
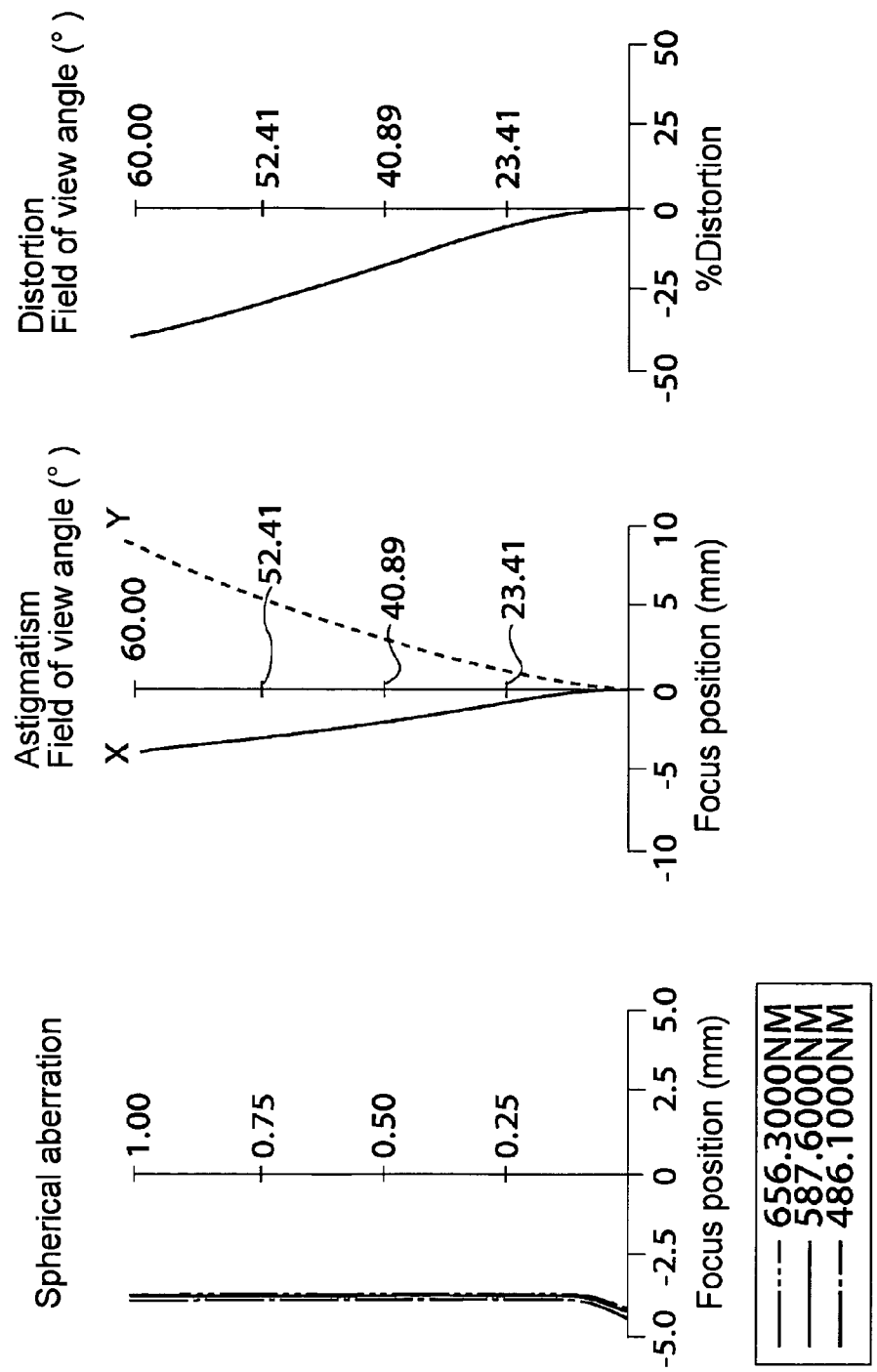
FIG. 4B is a drawing showing the aberration of the eyepiece optical system shown in FIG. 4A.
Figure 4C:
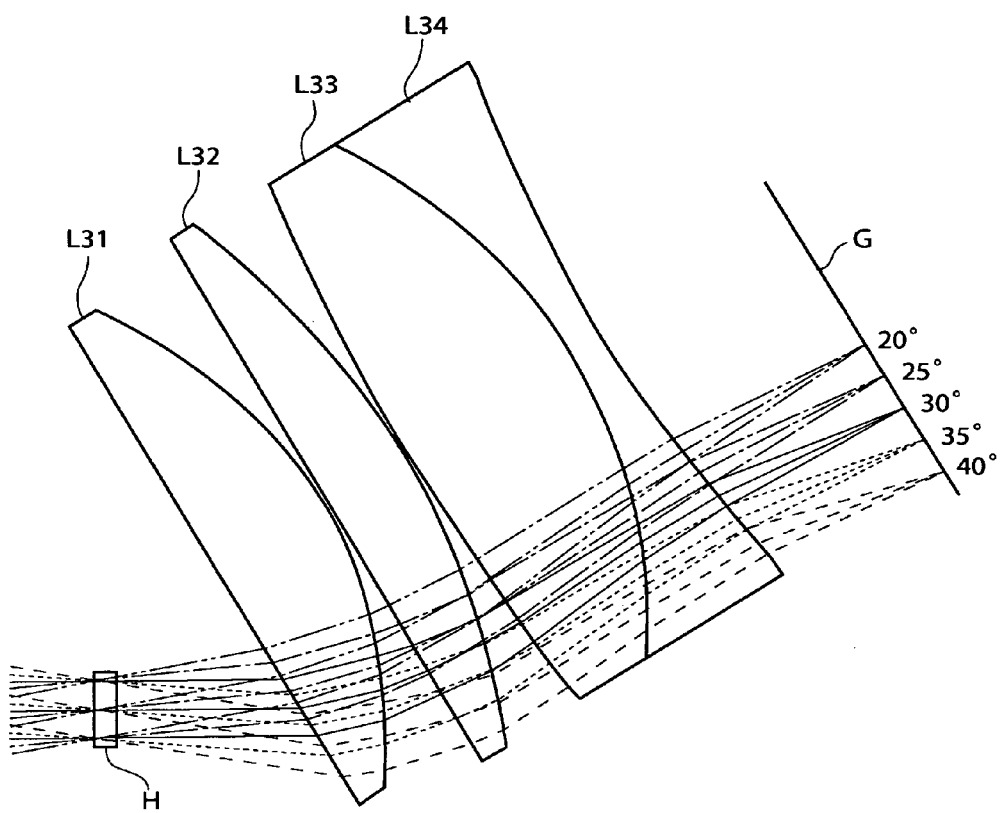
FIG. 4C is a ray tracing drawing of the eyepiece optical system shown in FIG. 4A in the case of 30-degree look-around eye.
Figure 4D:
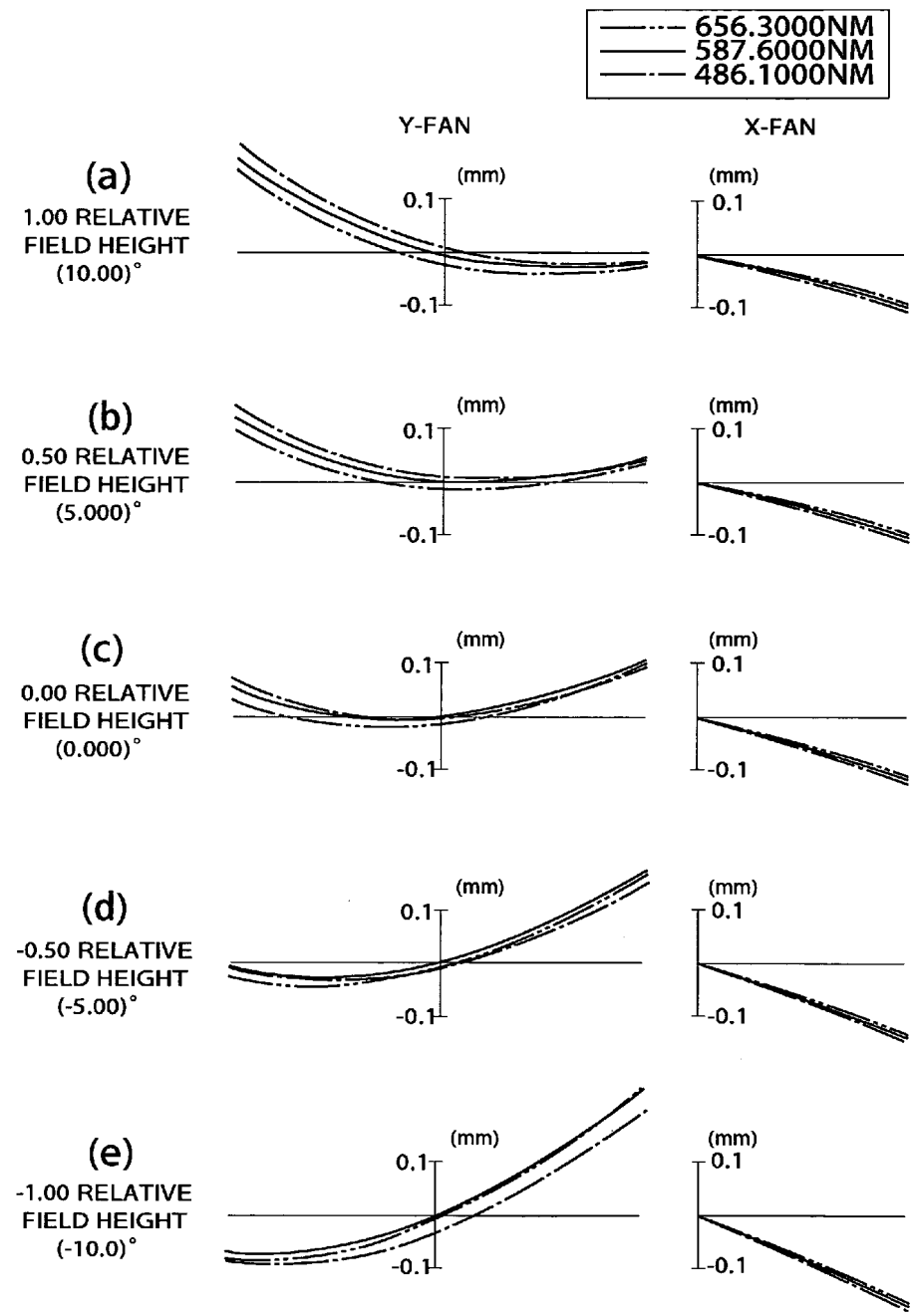
FIG. 4D is a plot output drawing showing the lateral aberration of 30±10 degrees of the eyepiece optical system shown in FIG. 4A.

As a result, as can be seen from FIGS. 4A and 4B, while the aberrations of the light beams passing through the lens periphery when the pupil is located in the center portion suffer deterioration compared with the first embodiment shown in FIG. 2A, the various aberrations present at the time of 30-degree look-around eye shown in FIGS. 4C and 4D are significantly improved, and clearly improved spot diagrams of about 100 µm at 0 degree, about 150 µm at ±5 degrees, and about 200 µm at ±10 degrees can be recognized.

Figure 5A:
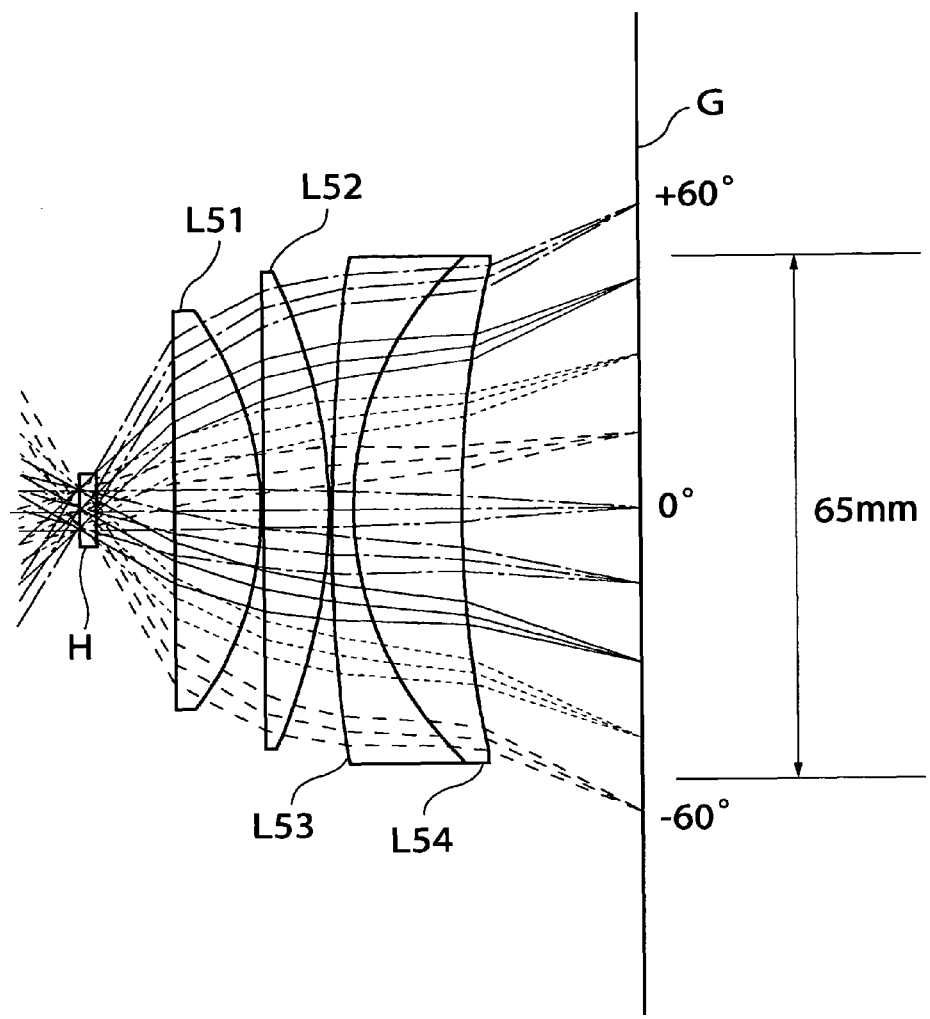
FIG. 5A is a drawing showing an outline of an eyepiece optical system used in an embodiment of the present invention.

A third embodiment of the present invention designed in accordance with such idea is shown in FIGS. 5A-5D. As shown in FIG. 5A, this optical system is configured such that while one lens surface of the concave lenses (L51, L52) which are located near to pupil H of the eyeball and with respect to which the deflection angles of the light beams are larger is made a conic surface having conic constant K<−1, the cemented lens (L53, L54) for correcting the chromatic aberration made by combining glass materials which are different from each other is constituted by at least two lenses; the cemented portion of the cemented lens is made a convex surface on the side of pupil H; the color dispersion of the pupil side lens of the cemented lens is smaller than that of the other lens; and the cemented lens has a convex-concave-convex form, which form has a high chromatic aberration correcting effect. As can be seen by comparing FIG. 4A with FIG. 5A, the third embodiment differs from the second embodiment mainly in that the cemented portion of the cemented lens is made a convex surface on the side of pupil H.

In the third embodiment also, as with the second embodiment, the astigmatism occurring at the lens periphery is improved by convex lens L51 having the conic surface on the side of light emitting picture plane G; the chromatic aberration is corrected by the cemented lens (L53, L54); and by making the final surface a convex surface that makes the light beams incline toward the diverging direction, the distortion is alleviated to improve the aberrations at the time of look-around eye action. Table 4 shows the optical design values of the optical system shown in FIG. 5A.

TABLE 4

| Surface No. | Surface Curvature Radius | Surface Separation on Optical Axis | Glass Material |
|---|---|---|---|
| Pupil: | INFINITY | 10.000000 | |
| 1: | INFINITY | 11.000000 | TAC8_HOYA (L51) |
| 2: | −36.00000 | 0.200000 | |
| Conic Constant K: | −1.000000 | | |
| 3: | INFINITY | 8.000000 | TAC8_HOYA (L52) |
| 4: | −66.00000 | 0.200000 | |
| 5: | 210.00000 | 3.000000 | SF59_SCHOTT (L53) |
| 6: | 44.00000 | 13.000000 | TAF3_HOYA (L54) |
| 7: | 130.00000 | 22.330761 | |
| Light Emitting Picture Plane G: | INFINITY | 0.000000 | |

Figure 5B:
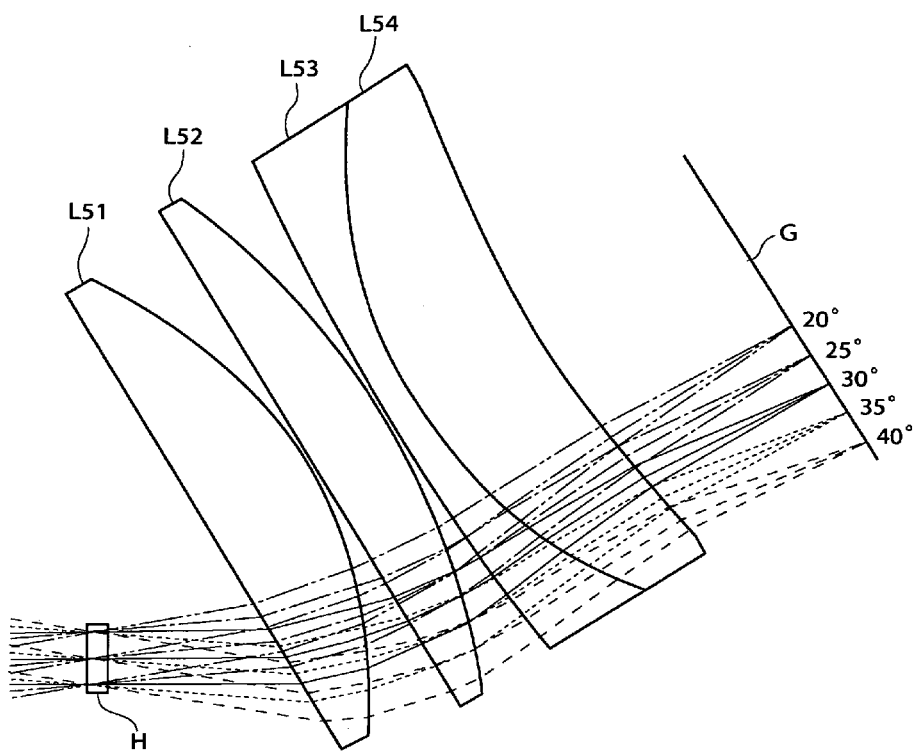
FIG. 5B is a ray tracing drawing of the eyepiece optical system shown in FIG. 5A in the case of 30-degree look-around eye.

As a result, as can be seen from FIG. 5A, while the aberrations of the light beams passing through the lens periphery when the pupil is located in the center portion suffer deterioration compared with the embodiment shown in FIG. 2A, the various aberrations present at the time of 30-degree eyeball lateral shift shown in FIGS. 5B and 5C are significantly improved, and, as compared with the first embodiment, improved spot diagrams of about 200 µm at 0 degree, about 200 µm at ±5 degrees, and about 250 µm at ±10 degrees can be recognized. However, because the cemented lens of this embodiment is made to have a convex-concave-convex form for the above-described reason (i.e., the final surface being made a convex surface that makes the light beams incline toward the diverging direction), the correction effect with respect to the chromatic aberration is small as compared with the second embodiment, and thus the chromatic aberration cannot be corrected completely, which makes an offset of about 150 µm occur.

The effect of the present invention has been examined by way of the above-described first to third embodiment of the present invention. And, while, regarding the above-described problems to be solved, i.e., (1) When the 65 mm eye-width is considered, only a field of view angle of 45 degrees is obtained on the nose side, and a field of view angle of ±60 degrees available with an eyeglass field of view is not achieved; the regions observed by both eyes are different from each other, which creates a sense of discomfort;

(2) The chromatic aberration of 80 µm may be observed with the naked eye, and the chromatic aberration should be more lessened; and (3) A good image in the eyeglass field of view observed by a human should be provided at the time of the look-around eye action, it has been explained that improvement with respect to (3) can be achieved, problems to be solved (1) and (2) are not yet sufficiently cleared. As a reason for not being able to improve (1) and (2) in the first to third embodiments, it can be pointed out that the use of the conic surface for solving the problem to be solved (3) and the use of a glass material having a low color dispersion for the convex lens on the pupil side for making the chromatic aberration small have made the light beam deflection angles at the lens periphery small, and thus the size of the final light emitting picture plane G cannot be made equal to or less than 65 mm, the eye-width. In addition, that the last surface of the lens on the side of light emitting picture plane G for suppressing the distortion and the aberrations is convex is also one of the reasons for which the size of the final light emitting picture plane G is large.

Figure 6A:
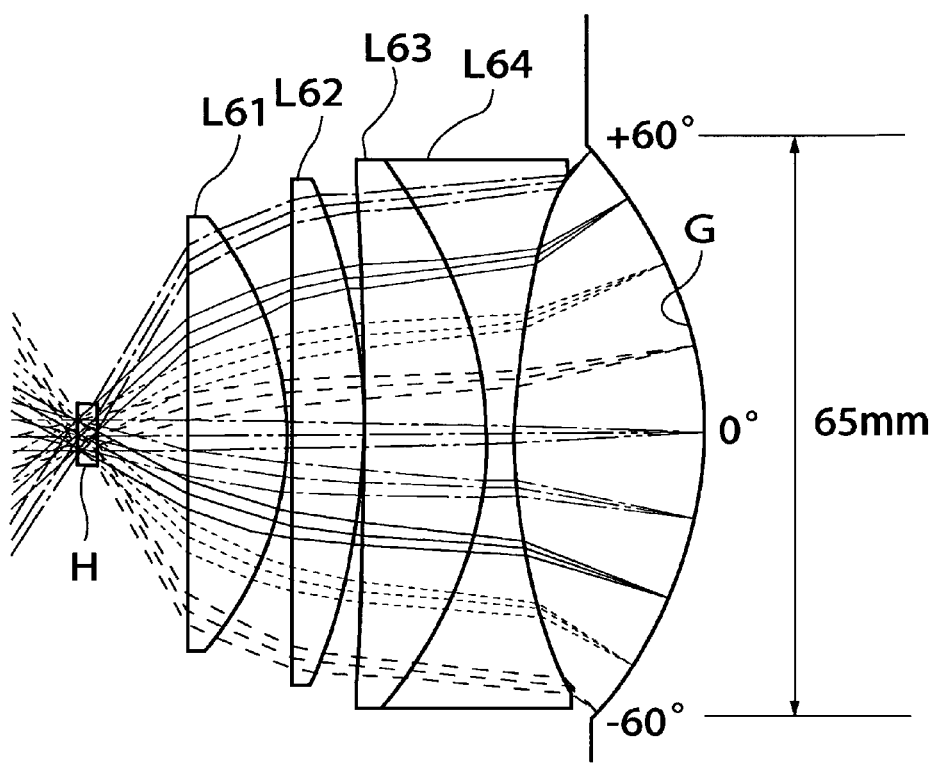
FIG. 6A is a drawing showing an outline of an eyepiece optical system used in an embodiment of the present invention.

In view of the above, in a fourth embodiment of the present invention, the picture plane G itself has been made a concave surface as shown in FIG. 6A. The optical design values of the optical system shown in FIG. 6A are shown in Table 5.

TABLE 5

| Surface No. | Surface Curvature Radius | Surface Separation on Optical Axis | Glass Material |
|---|---|---|---|
| Pupil: | INFINITY | 10.000000 | |
| 1: | INFINITY | 11.000000 | TAFD5_HOYA (L61) |
| 2: | −30.00000 | 0.200000 | |
| Conic Constant K: | −1.100000 | | |
| 3: | INFINITY | 8.000000 | TAFD5_HOYA (L62) |
| 4: | −66.00000 | 0.200000 | |
| 5: | −300.00000 | 12.500000 | TAF5_HOYA (L63) |
| 6: | −45.00000 | 3.000000 | SNPH2_OHARA (L64) |
| 7: | 70.00000 | 20.190463 | |
| Light Emitting Picture Plane G: | −45.00000 | 0.000000 | |

Figure 6B:
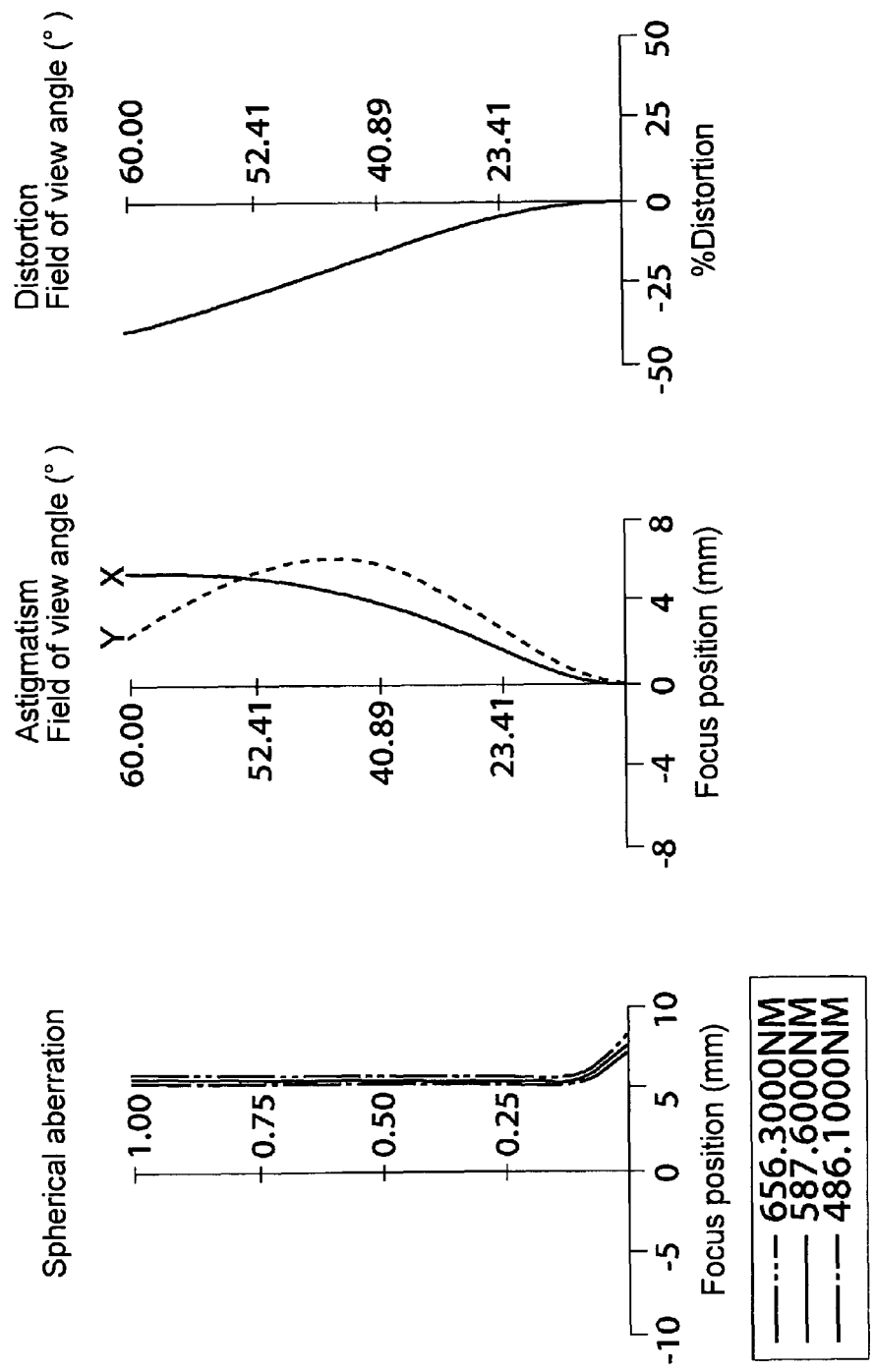
FIG. 6B is a drawing showing the aberration of the eyepiece optical system shown in FIG. 6A.
Figure 6C:
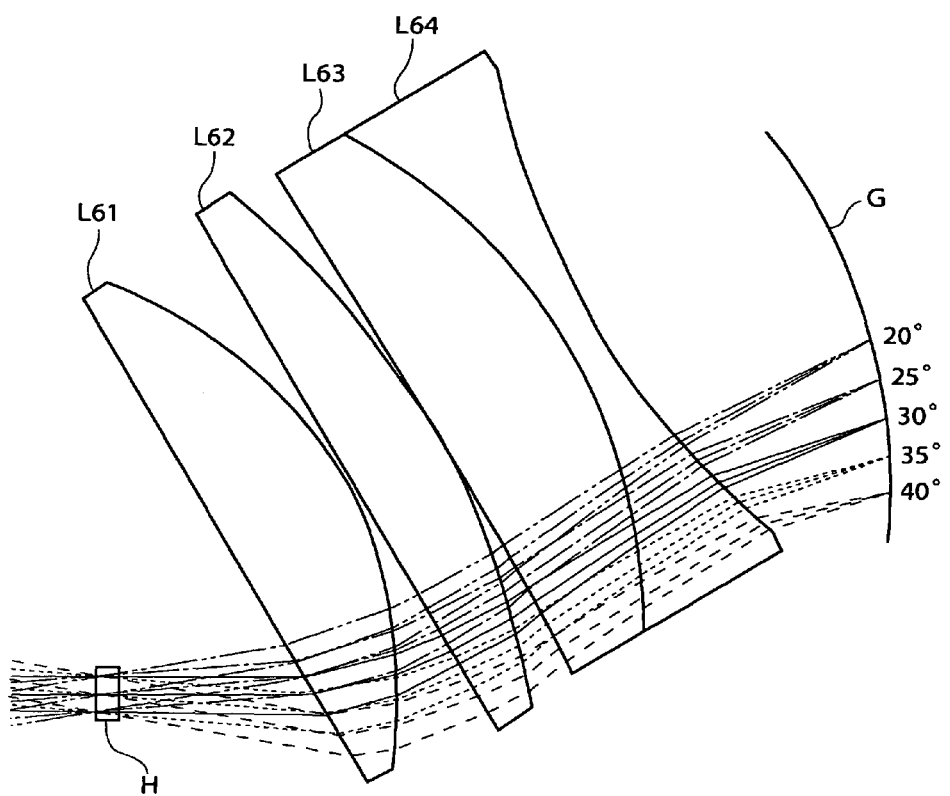
FIG. 6C is a ray tracing drawing of the eyepiece optical system shown in FIG. 6A in the case of 30-degree look-around eye.
Figure 6D:
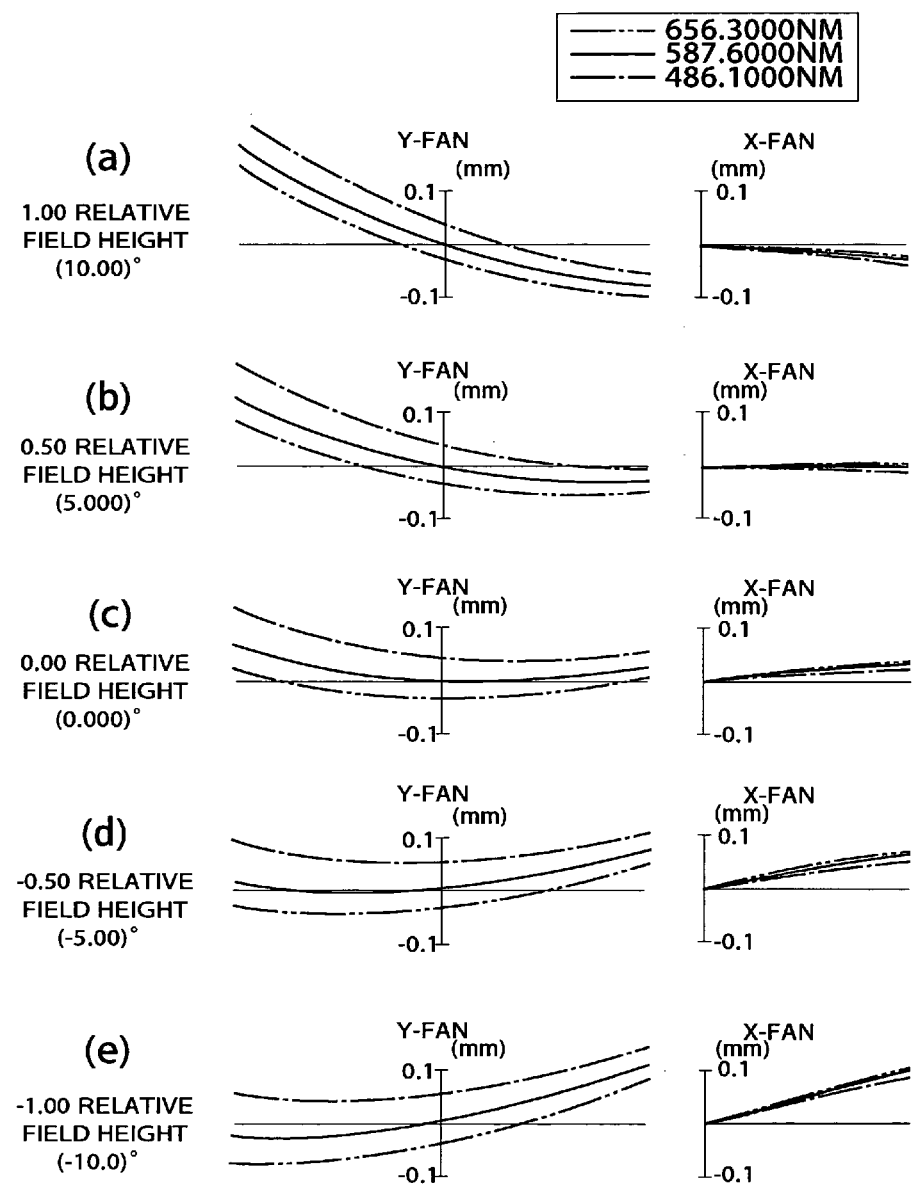
FIG. 6D is a plot output drawing showing the lateral aberration of 30±10 degrees of the eyepiece optical system shown in FIG. 6A.

Calculation of various aberrations on the condition that light emitting picture plane G is made a concave surface has revealed that without using a glass material for having a low color dispersion for the convex lenses on the pupil side (L61, L62) for suppressing the chromatic aberration to be small, the good aberrations shown in FIG. 6B can be obtained even by using a glass material having a relatively large refractive index and color dispersion and that also at the time of look-around eye shown in FIGS. 6C and 6D, performances equivalent to those of the third embodiment can be obtained.

What is most characteristic of this embodiment is that with light emitting picture plane G itself being made a concave surface, the light beams passing through the lens periphery reach light emitting picture plane G before they expand; with the conic constant being made to be even smaller, i.e., −1.1, various aberrations can be improved even when the lateral shift of the eyeball has occurred; and, moreover, as a result, the diameters of the lenses and light emitting picture plane G can be suppressed to be within the 65 mm eye-width. Through this method, it can be realized that a field of view angle of ±60 degrees is ensured for both eyes and, in addition, that good images are obtained even at the time of look-around eye.

However, here arise problems relevant to the structure of light emitting picture plane G. If light emitting picture plane G is to be constituted by a liquid crystal device or the like, then the liquid crystal device picture plane is required to be curved; if with light emitting picture plane G being made a screen, an image is to be formed from the reverse side of the screen, then the focus condition and telecentricity of the projection optical system are also required to be considered.

Figure 7A:
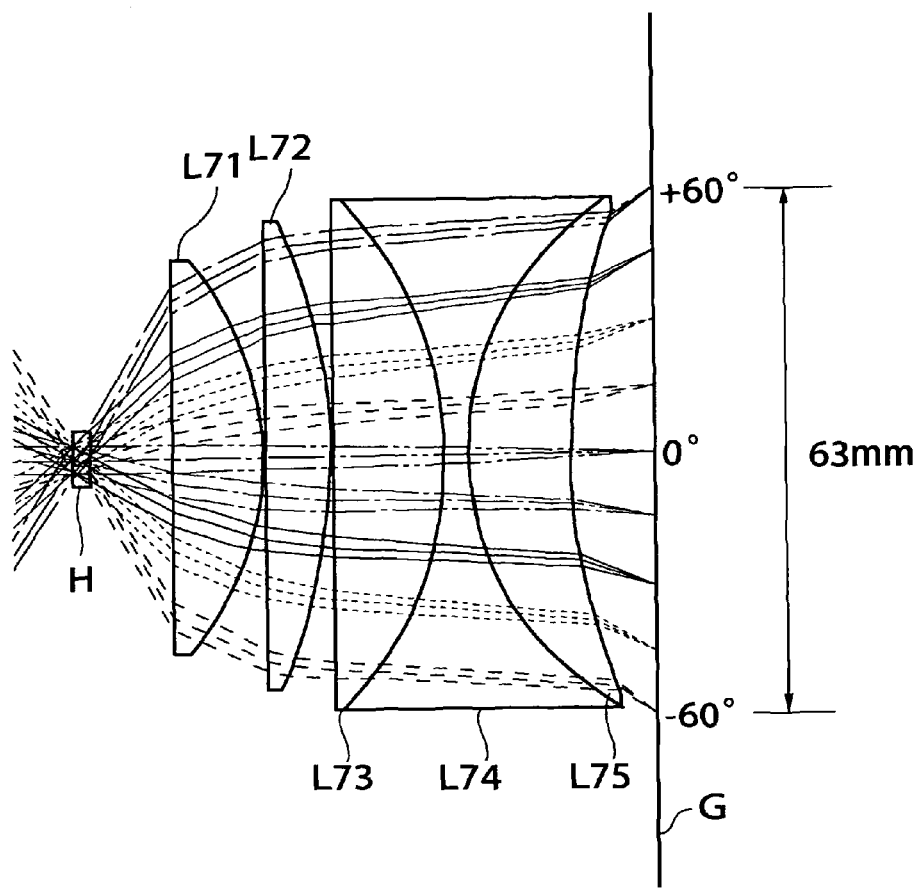
FIG. 7A is a drawing showing an outline of an eyepiece optical system used in an embodiment of the present invention.

A fifth embodiment of the present invention that can solve those problems is shown in FIGS. 7A-7E. In this optical system, as shown in FIG. 7A, with the cemented lens (L73, L74, L75) having two cemented surfaces being introduced, the deficiencies of chromatic aberration correction associated with each of the cemented lenses of the above-described embodiments are dissolved, and the deteriorations of the other aberrations arising therefrom are corrected, with a glass material having a high refractive index used for the convex lenses (L71, L72) on the pupil side and with the conic constant k being made still smaller, i.e., k<−1.1. The optical design values of the optical system shown in FIG. 7A are shown in Table 6.

TABLE 6

| Surface No. | Surface Curvature Radius | Surface Separation on Optical Axis | Glass Material |
|---|---|---|---|
| Pupil: | INFINITY | 10.000000 | |
| 1: | INFINITY | 11.000000 | TAFD5_HOYA (L71) |
| 2: | −31.00000 | 0.200000 | |
| Conic Constant K: | −1.450000 | | |
| 3: | INFINITY | 7.500000 | TAFD5_HOYA (L72) |
| 4: | −66.00000 | 0.200000 | |
| 5: | INFINITY | 13.000000 | TAFD30_HOYA (L73) |
| 6: | −44.00000 | 3.000000 | SNPH2_OHARA (L74) |
| 7: | 35.00000 | 12.000000 | TAFD30_HOYA (L75) |
| 8: | 80.00000 | 9.568060 | |
| Light Emitting Picture Plane G: | INFINITY | 0.000000 | |

The cemented lens is constituted by the three lenses, L73, L74, and L75; the color dispersion of the lens glass material of L74 is larger than that of L73 and L75; and the cemented surfaces are composed of, sequentially from the side of pupil H, a concave surface and a convex surface. Thus, large chromatic aberration can be corrected. Further, also with respect to the convex lenses (L71, L72) on the pupil side, a glass material having a high refractive index is used, which has enabled the deflection angles of the light beams passing through the lens periphery to be made large.

In accordance with this method, the lens diameter can be made equal to or less than the 65 mm eye-width; however, if the method is followed as it is, the aberrations at the time of look-around eye action deteriorate. To address this difficulty, in this embodiment, it is configured such that within a range satisfying the condition that the lens diameter does not exceed 65 mm, the conic constant is made still smaller, i.e., k=−1.45, and the surface on the side of light emitting picture plane G of lens L75 is also made a convex surface, thereby suppressing various aberrations.

Figure 7B:
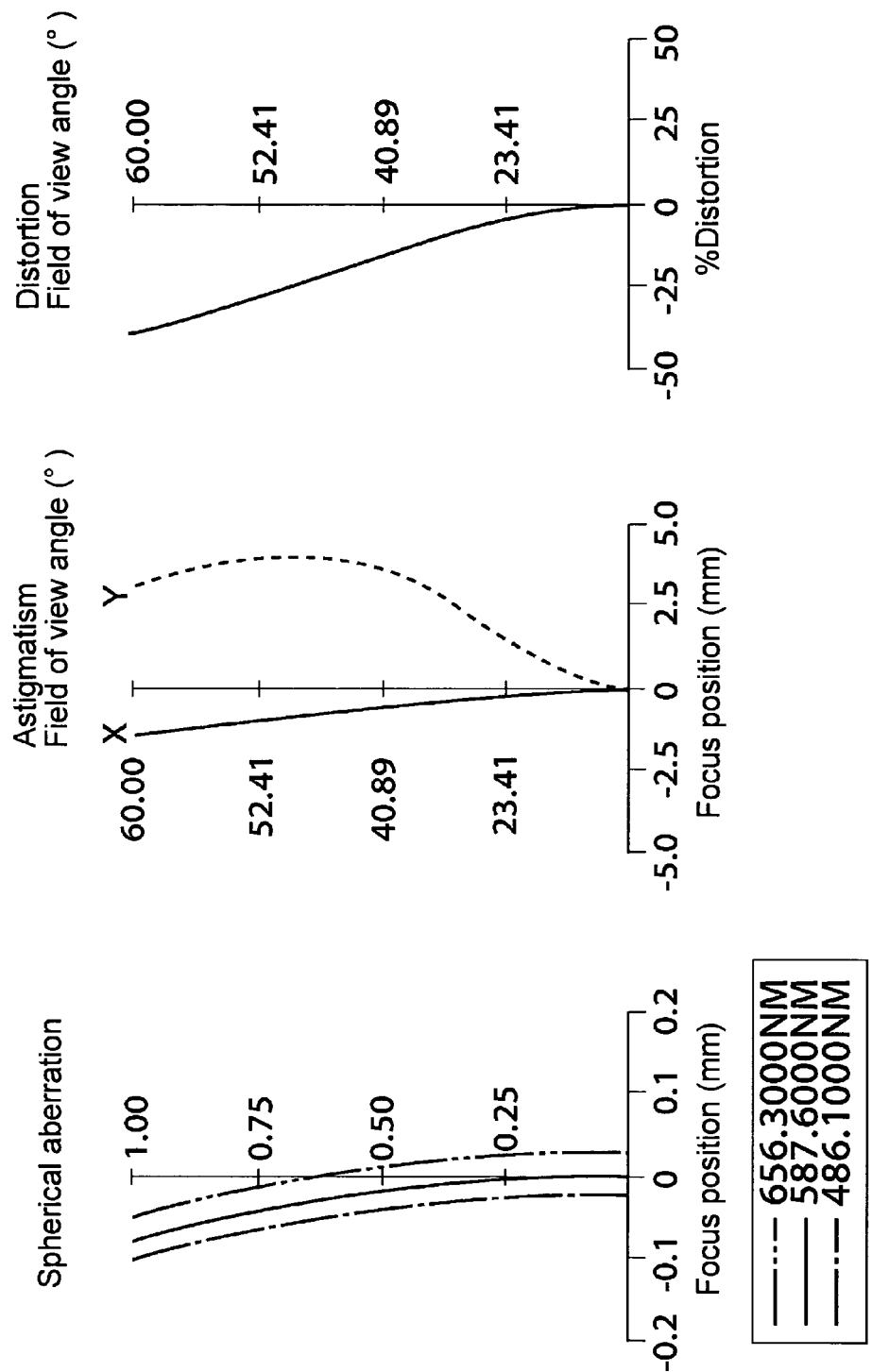
FIG. 7B is a drawing showing the aberration of the eyepiece optical system shown in FIG. 7A.
Figure 7C:
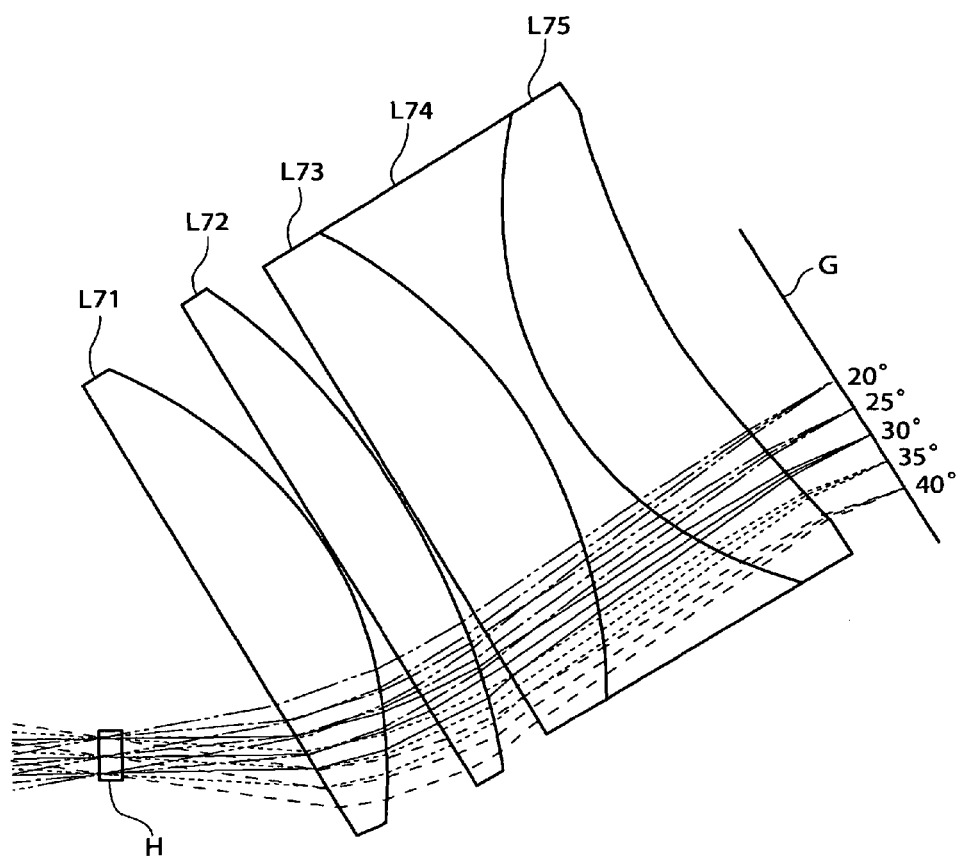
FIG. 7C is a ray tracing drawing of the eyepiece optical system shown in FIG. 7A in the case of 30-degree look-around eye.
Figure 7E:
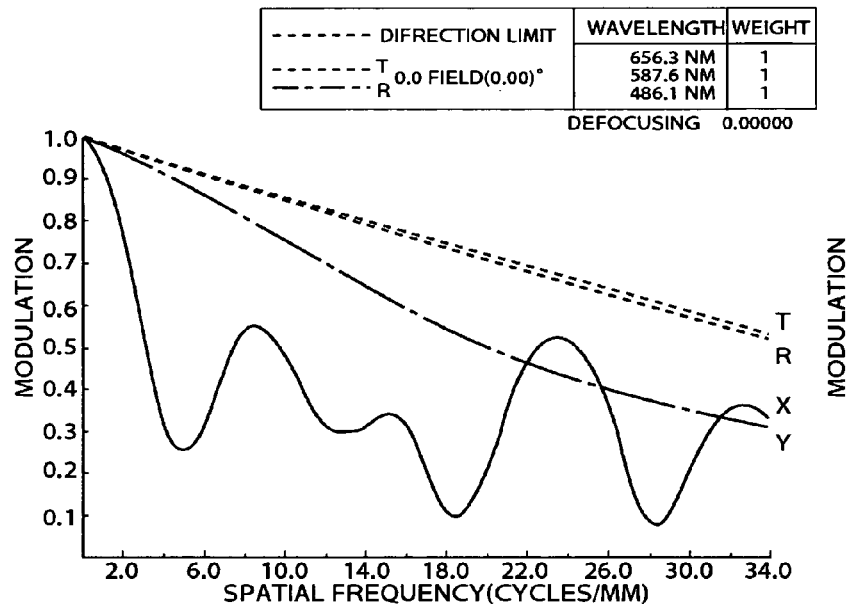
FIG. 7E is a drawing comparing the MTF (b) at the best focus position of the combination of the conic surface and the chromatic aberration correcting lens of the optical system shown in FIG. 7A where there is a field of view center with the MTF (a) at the best focus position of a conventional optical system.
Figure 7E:
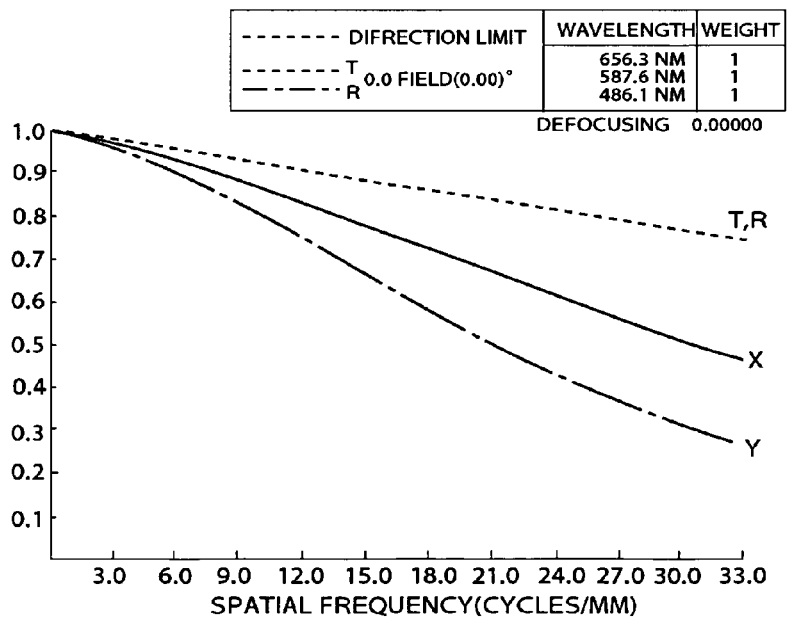

By this, good aberrations are obtained as shown in FIG. 7B, and as shown in FIGS. 7C and 7D, at the time of look-around eye also, the aberrations are suppressed to be an aberration of less than 25 µm at the position of 30-degree field of view center, an aberration of less than 50 µm even at the positions separated from the center by ±5 degrees, and an aberration of less than 100 µm even at the positions separated from the center by ±10 degrees, and at the same time a field of view angle of ±60 degrees is obtained.

In addition, with regard to the fifth embodiment and with regard to the case where the field of view center is located at 15 degrees, the MTF (which with respect to a image having a predetermined spatial frequency, shows in percentage the (MAX−MIN)/(MAX+MIN) values of the line/space amplitudes when the spatial frequency is varied) at the best focus position of the combination of the conic surface and the chromatic aberration correcting lens is compared with the MTF at the best focus position of the prior art system. In the drawings, T denotes the tangential, theoretical maximum value, and R denotes the radial, theoretical maximum value; X is the MTF in the X-direction, and Y is the MTF in the Y-direction. As can be clearly seen from this illustration, the embodiment has a small degree of dependence on the MTF at each of the frequencies and has a simple frequency characteristic. This means that, in the embodiment, when an image is observed, a sense of discomfort due to protruding of the image or due to differing focus positions depending on the frequencies is prevented from occurring, and thus a good image can be provided.

While, in the above, the fifth embodiment optical system is shown in FIG. 7A, various problems arise in the actual manufacture thereof. Specifically, the glass materials used for the optical elements are glass materials having a large refractive index; and thus, it is not easy to secure the sizes of the glass materials or to process them in a stable condition, which may cause cost increase. Thus, as the glass material for which aspheric surface processing is required to create the lens having a conic constant of less than 0, use of SLAH66, a hard material, rather than TAFD5 will facilitate processing.

Figure 7F:
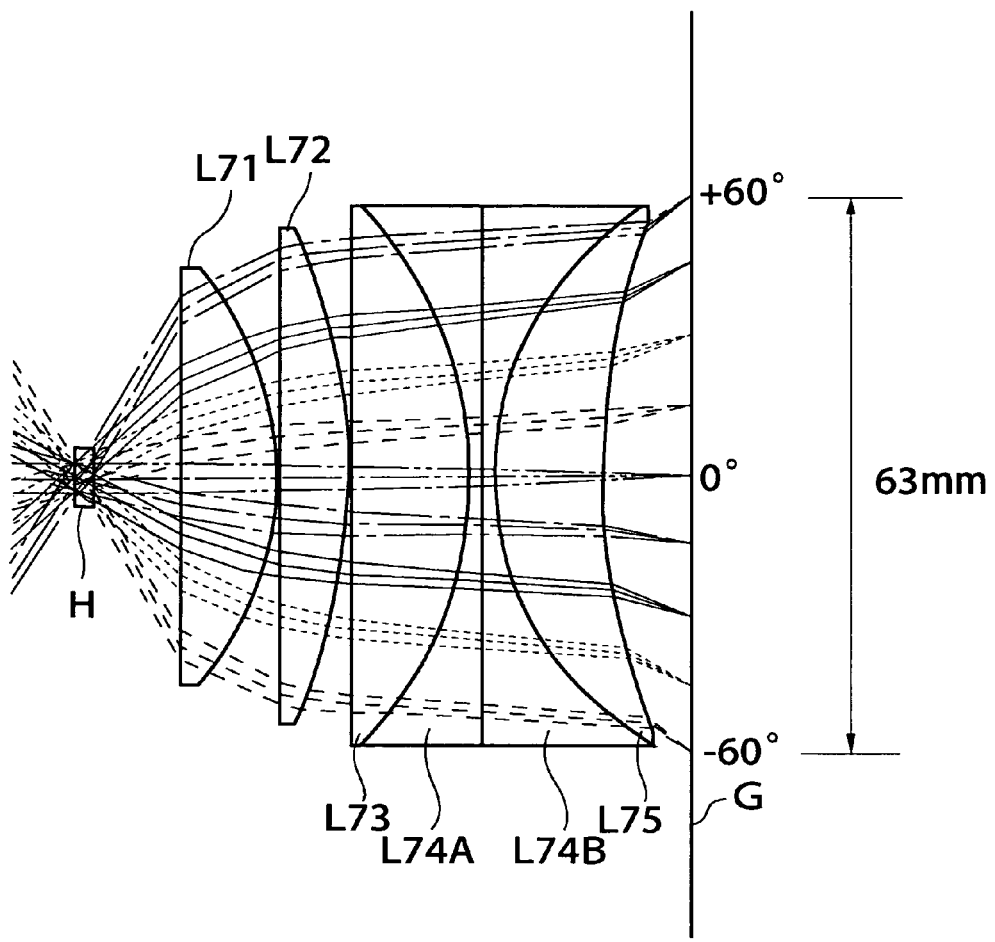
FIG. 7F is a drawing showing an outline of a modification example of the eyepiece optical system shown in FIG. 7A.

In addition, with respect to the glass materials such as SNPH2, there is a problem that it is difficult, in terms of quality control, to secure a predetermined thickness. Thus, as a first modification example of the fifth embodiment, the case in which, as shown in FIG. 7F, the glass material of aspheric lens L71 is changed from TAFD5 to SLAH66, and L74 of the cemented lens constituted by L73, L74, and L75 is divided into the two lens, L74A and L74B will now be described. The optical design values of the optical system shown in FIG. 7A are shown in Table 7. The lens diameter of L71 is 51.0 mm; that of L72 is 58.9 mm; those of the other lenses are all 58.6 mm.

TABLE 7

| Surface No. | Surface Curvature Radius | Surface Separation on Optical Axis | Glass Material |
|---|---|---|---|
| Pupil: | INFINITY | 10.000000 | |
| 1 | INFINITY | 11.000000 | SLAH66_HOYA |
| 2 | 31.00000 | 0.200000 | |
| Conic Constant K: | −1.3 | | |
| 3 | INFINITY | 8.500000 | SLAH55_HOYA |
| 4 | 66.00000 | 0.200000 | |
| 5 | INFINITY | 10.500000 | SLALH58_HOYA |
| 6 | 53.00000 | 0.000000 | |
| 7 | 53.00000 | 3.000000 | SNPH2_HOYA |
| 8 | INFINITY | 0.000000 | |
| 9 | INFINITY | 3.000000 | SNPH2_HOYA |
| 10 | −42.00000 | 0.000000 | |
| 11 | −42.00000 | 11.000000 | SLAH58_HOYA |
| 12 | 150.00000 | 9.568060 | |
| Light Emitting Picture Plane G: | INFINITY | 0 | |

In the case of the optical system shown in FIG. 7F (a modification example of the fifth embodiment), with the lens curvatures being slightly changed, a performance substantially equal to that of the fifth embodiment is obtained. Both of L74A and L74B have a center thickness of 3 mm; and while L74 in FIG. 7A requires a glass material thickness of about 25 mm, each of L74A and L74B, in contrast, requires only a glass material thickness of equal to or less than 15 mm, which enables a stable supply of the glass material.

In this connection, while L74A and L74B are cemented by way of a flat surface, those lenses are here, for the sake of convenience, regarded as a single lens because those lenses are made of an identical glass material. It should be noted that because also in the case, for example, where the refractive indexes of the glass materials of L74A and L74B are made slightly different from each other or where the cemented surface of L74A and L74B is made to have a slight curvature, a similar effect can of course be obtained, cemented lenses using such a method will all be defined here as a three lens piece cemented lens.

Figure 8A:
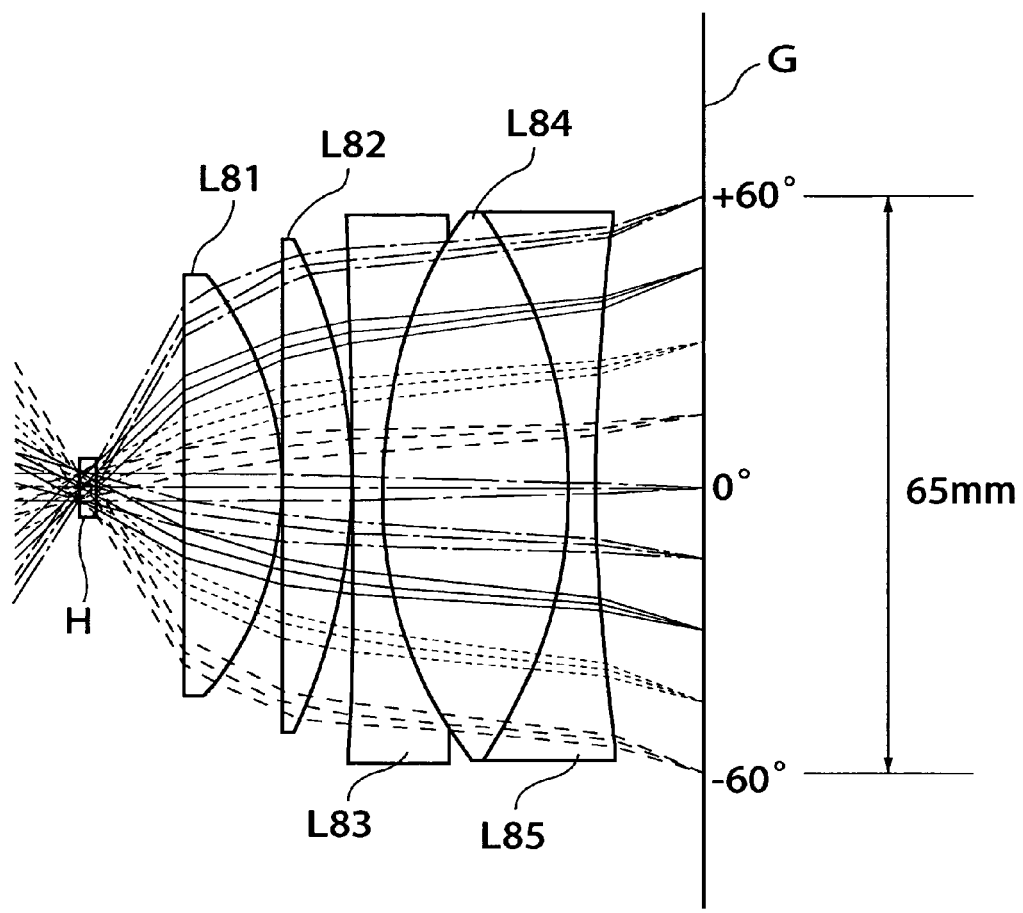
FIG. 8A is a drawing showing an outline of an eyepiece optical system used in an embodiment of the present invention.

As a modification example of the fifth embodiment, an example in which the combination of the lenses to be cemented is modified is shown in FIGS. 8A-8D as a sixth embodiment. More specifically, as shown in FIG. 8A, with the cemented lens (L83, L84, L85) having two cemented surfaces being introduced, the deficiencies of chromatic aberration correction associated with each of the foregoing cemented lenses are dissolved, and the deteriorations of the other aberrations arising therefrom are corrected, with a glass material having a high refractive index used for the convex lenses (L81, L82) on the pupil side and with the conic constant k being made still smaller, i.e., k<−1.1. In this embodiment also, the same effect as that of the fifth embodiment can be obtained. The optical design values of this optical system are shown in Table 8.

TABLE 8

| Surface No. | Surface Curvature Radius | Surface Separation on Optical Axis | Glass Material |
|---|---|---|---|
| Pupil: | INFINITY | 10.000000 | |
| 1: | INFINITY | 11.000000 | TAFD10_HOYA (L81) |
| 2: | −32.00000 | 0.200000 | |
| Conic Constant K: | −1.300000 | | |
| 3: | INFINITY | 7.500000 | TAFD10_HOYA (L82) |
| 4: | −66.00000 | 0.200000 | |
| 5: | −500.00000 | 3.000000 | SNPH2_OHARA (L83) |
| 6: | 53.00000 | 21.000000 | TAFD30_HOYA (L84) |
| 7: | −53.00000 | 3.000000 | SNPH2_OHARA (L85) |
| 8: | 200.00000 | 12.264784 | |
| Light Emitting Picture Plane G: | INFINITY | 0.000000 | |

The cemented lens is constituted by the three lenses, L83, L84, and L85; the color dispersion of the lens glass material of L84 is smaller than that of L83 and L85; and the cemented surfaces are composed of, sequentially from the side of pupil H, a convex surface and a concave surface. Thus, large chromatic aberration can be corrected. Further, also with respect to the convex lenses (L81, L82) on the pupil side, a glass material having a high refractive index is used, which has enabled the deflection angles of the light beams passing through the lens periphery to be made large. In accordance with this method, the lens diameter can be made equal to or less than the 65 mm eye-width.

However, if the method is followed as it is, the aberrations at the time of look-around eye action deteriorate. To address this difficulty, this embodiment is configured such that within a range satisfying the condition that the lens diameter does not exceed 65 mm, the conic constant is made still smaller, i.e., k=−1.3, and the last surface of lens L75 is also made a convex surface, thereby suppressing various aberrations.

Figure 8B:
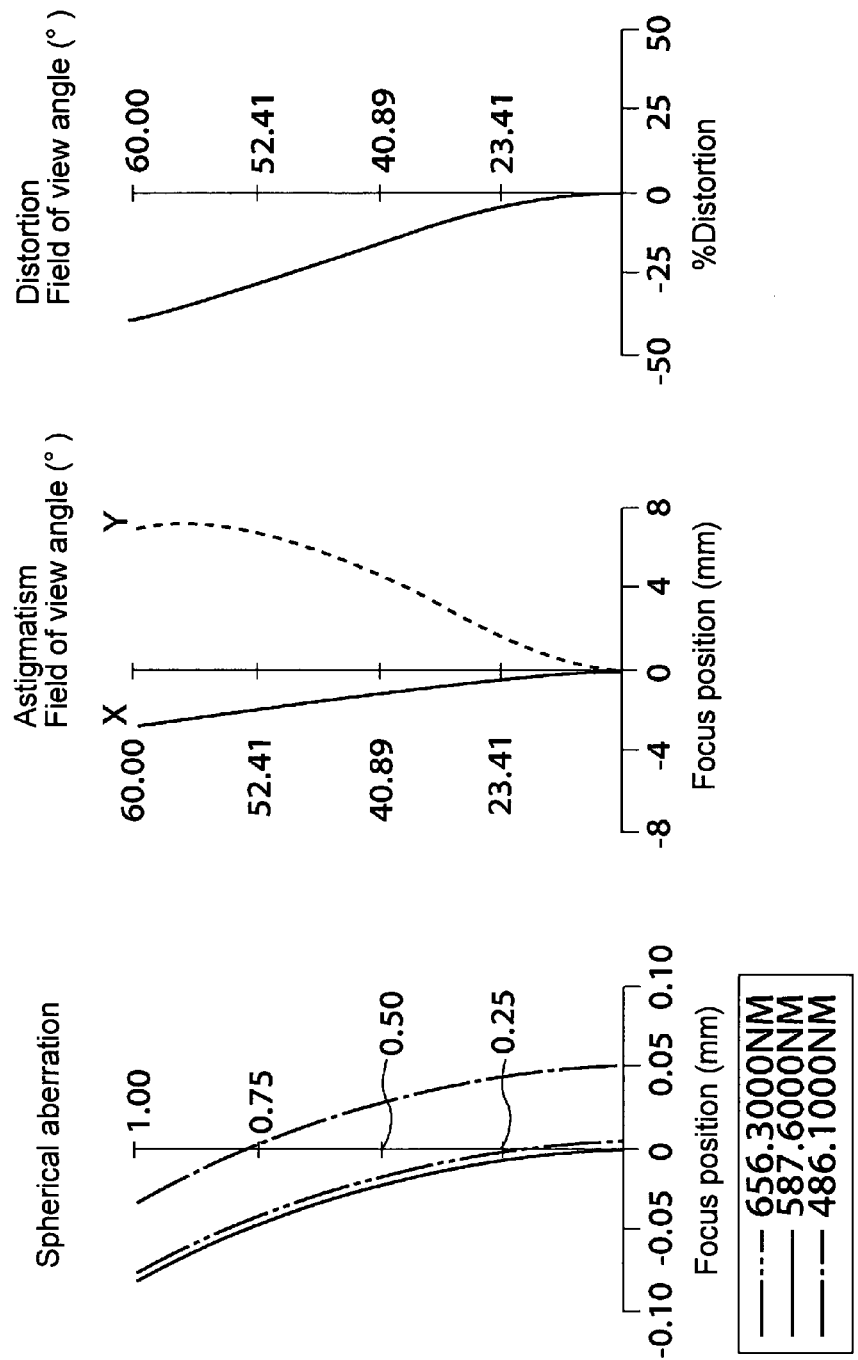
FIG. 8B is a drawing showing the aberration of the eyepiece optical system shown in FIG. 8A.
Figure 8C:
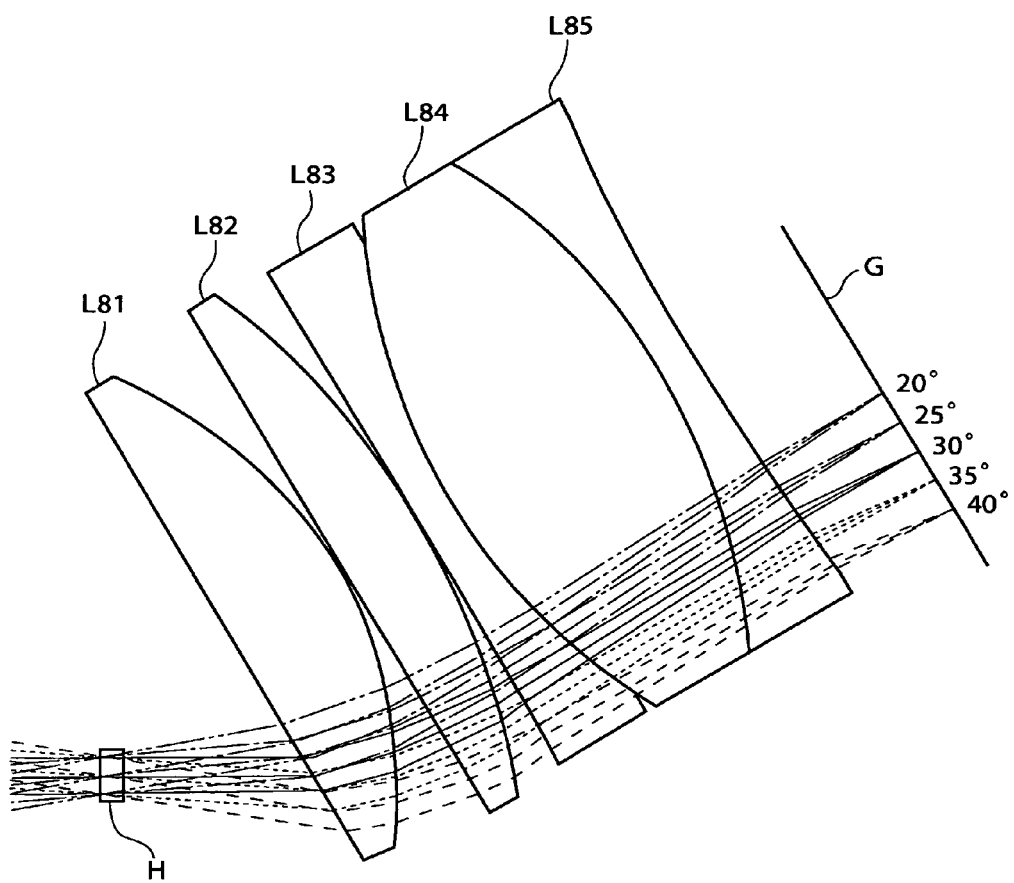
FIG. 8C is a ray tracing drawing of the eyepiece optical system shown in FIG. 8A in the case of 30-degree look-around eye.
Figure 8D:
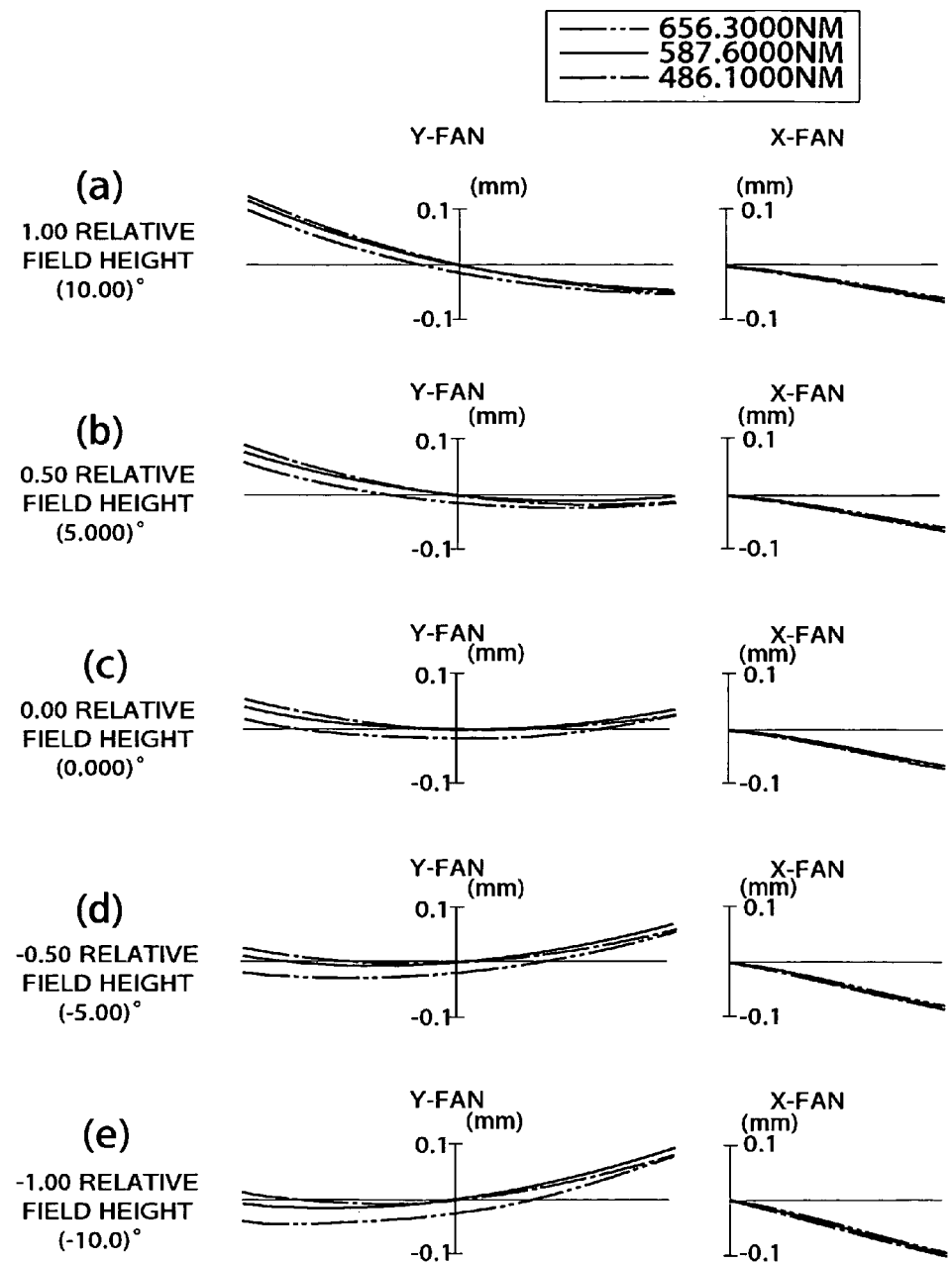
FIG. 8D is a plot output drawing showing the lateral aberration of 30±10 degrees of the eyepiece optical system shown in FIG. 8A.

By this, the good aberrations shown in FIG. 8B are obtained, and as shown in FIGS. 8C and 8D, also after the lateral shift of the eyeball, the aberrations are suppressed to be an aberration of less than 25 μm at the position of 30-degree field of view center, an aberration of less than 50 μm even at the positions separated from the center by ±5 degrees, and an aberration of less than 100 μm or so even at the positions separated from the center by ±10 degrees, and at the same time a field of view angle of ±60 degrees is obtained.

Next, light emitting picture plane G will be described. Two-dimensional image output devices of light emitting type, as represented by, i.e., liquid crystal displays, are most ideal for light emitting picture plane G. However, in the present technology, there is no two-dimensional image output device that is a display of 60 mm square or so and has, even if it is magnified by the above-described eyepiece optical systems, a dot size required to obtain a sufficient image resolution. Thus, in the case of projecting an image from a two-dimensional image output device to the pupil with a field of view angle of ±60 degrees, it is required to create a high-definition image by obtaining a magnified image of the image of a light emitting type two-dimensional image output device having a very small dot size, as is performed by a projector. There are presently various types of projectors, ranging from a type using a liquid crystal display device having a resolution matrix of 320 by 240, called QVGA, to a type in which by using three liquid crystal display devices having a resolution matrix of 1980 by 1024 or so, called SXGA, three color images, each of which corresponds to either one of the colors of G, R, and B, are separately formed and then combined together to triple the resolution.

If a liquid crystal display device having a low resolution is utilized as an embodiment of the present invention, the seams between the pixels of the liquid crystal display device are to be recognized by the eye in the case of a movie theater class screen, and the sense of reality will be lost. Thus, when an image quality equal to or higher than that of a projector is desired, it is indispensable to introduce the technology in which by using three liquid crystal display devices having a resolution matrix of 1980 by 1024 or more, called SXGA, three color images, each of which corresponds to either one of the colors of G, R, and B, are separately formed and then combined together to triple the resolution.

In addition, because all of the above-described eyepiece optical systems of the present invention are configured to be nontelecentric relative to light emitting picture plane G to result a good distortion and aberration corrections, the telecentricity conditions of the light emitting type two-dimensional image output devices having a very small dot size as used in the above-described projector are required to match the telecentricity conditions of the above-described eyepiece optical systems.

However, in the case of, for example, the sixth embodiment, the angle which the principal rays of the light beams of ±60 degree field of view angle make with the normal to light emitting picture plane G when the principal rays, starting from the position of light emitting picture plane G, reach the lens L85 of the eyepiece optical system is the maximum value of 20 degrees; and thus, assuming that the magnification from the light emitting type two-dimensional image output device to light emitting picture plane G is 3×, a nontelecentric optical system in which each of the light beams emitted from the respective pixels of the light emitting type two-dimensional image output device is emitted with an NA corresponding to 60 degrees, 3-times as compared with the value of 20 degrees, must be provided. This gives rise to a severe condition in designing such an illumination mechanism for the two-dimensional image output device, in view of, for example, the effective illumination angle of a liquid crystal display device or the like.

In view of the above, a method can be conceived in which a screen is provided at the position of light emitting picture plane G; light beams emitted from a light emitting type two-dimensional image output device are projected onto the screen via a relay system; and then an image created on the back side of the screen with the projected image being transmitted through the screen is re-projected onto the retina of the eyeball by one of the above-described eyepiece optical systems. From a prior art standpoint, this method is already disclosed in Japanese Unexamined Patent Publication Hei 7-128612 (Patent Literature No. 3); however, no technique for improving such aberrations arising at angles of ±22.5 degrees or more as described above is described therein.

In introducing a screen this time, it is necessary to provide a screen that provides an image to an eyepiece optical system having an inclination of 20 degrees, as a non-telecentric eyepiece optical system having achieved the above-described object and that is a diffusing/transmitting type screen formed by grains smaller than the very small dots of a resolution matrix of 1280 by 1024, called SXGA.

In the following, an example in which a diffusing glass is used as the above-described screen will be described. It can be seen from FIG. 8A that when the eyeball lateral shift is 30 degrees, the telecentricity is inclined (i.e., the principal is inclined) by a maximum of about ±10 degrees. Thus, as the screen, a screen that makes the diverging angle of the light beam proceeding from each position thereon a sufficiently large angle so that even if the eye view direction changes depending on the look-around eye, light rays incident in the pupil of the eyeball exist and that corresponds to a level at which the human eye cannot recognize the roughness thereof, i.e., to the type of diverging angle A, which has a roughness of equal to or larger than 700 under the terminology of ground glass can be used adequately. Because, of course, the look-around eye angle of a human is required to be considered up to about ±30 degrees, a screen of which light intensity distribution does not considerably varies within the range of about ±20 degrees is preferably used. It is to be noted that in FIG. 8A, the inclination of the telecentricity (inclination of the principal ray) is even larger at the position of the field of view angle of 60 degrees; however, because this portion is a portion in which the resolution of the human eye is low, the portion need not be considered.

Thus, as the screen, a screen made by applying an adhesive over a polyester film of which thickness is uniform and of which surface is smooth and then by, in a clean room, coating the film with abrasive grains of which grain diameter is precisely controlled with micron-grade is used. It should be noted that as the abrasive grains, an oxide or a carbide, such as silicon carbide, chromium oxide, tin oxide, titanium oxide, magnesium oxide, and aluminum oxide, is most suitable; and abrasive grains of uniform diameter of about 0.3 to 40 μm manufactured through a ultraprecision finishing are adopted.

In accordance with the screen formed in this way, the abrasive grains, opaque but uniform, can be multilayered in a random distribution and with a predetermined thickness; the diverging angle can be made equal to or larger than ±60 degrees; even in the case of a DVD or high-definition image, one does not feel a sense of grains; and a field of view angle of ±22.5 degrees or more can be secured. Further, the screen is desirable also in that it can be manufactured at a low cost. In addition, the thickness of the abrasive grain layer is preferably made to be within the focus depth of the projected image, and it is desirable that the layer is as thin as possible for the purpose of obtaining a sufficient illuminance.

Additionally, as the size of the abrasive grains, a mesh number can chosen among from #320 to #15000, and because a tough polyester film is used, the durability becomes high. Note that with respect to silicon carbide, chromium oxide, tin oxide, titanium oxide, magnesium oxide, and aluminum oxide, if micron-order abrasive grains thereof are used, the screen is to be recognized as an opaque object. In this case, the projection illuminance on the screen is required to be made high.

Although when the above-described screen is utilized, there is an effect that a sharp image can be obtained because the diverging angle is wide and, further, the grains on the screen are not recognizable, the light intensity decreases to about a tenth. Accordingly, a device to increase the projection illuminance to compensate the decrease is required. Of course, if a halogen lamp, as used in a projector, is used, a sufficient illuminance can be obtained; however, in view of the appearance of the present invention's devices illustrated later, it is required that in the illumination system, a light source of which size is as small as possible and of which life is as long as possible be used. Thus, in each of the embodiments of the present invention, two illumination systems as shown in FIGS. 8E and 8F are adopted.

Figure 8E:
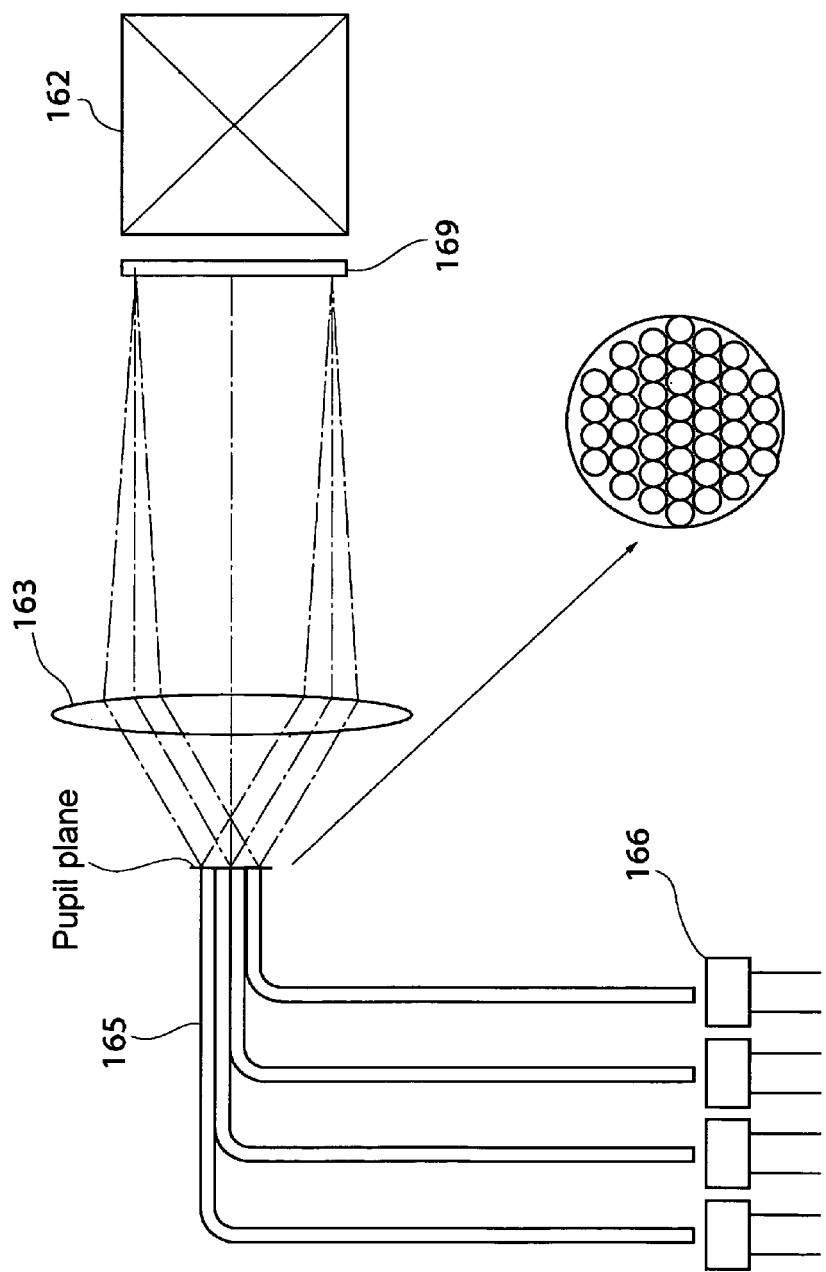
FIG. 8E is a drawing showing a liquid crystal device illumination of an embodiment of the present invention, using high intensity LEDs and fibers.
Figure 8F:
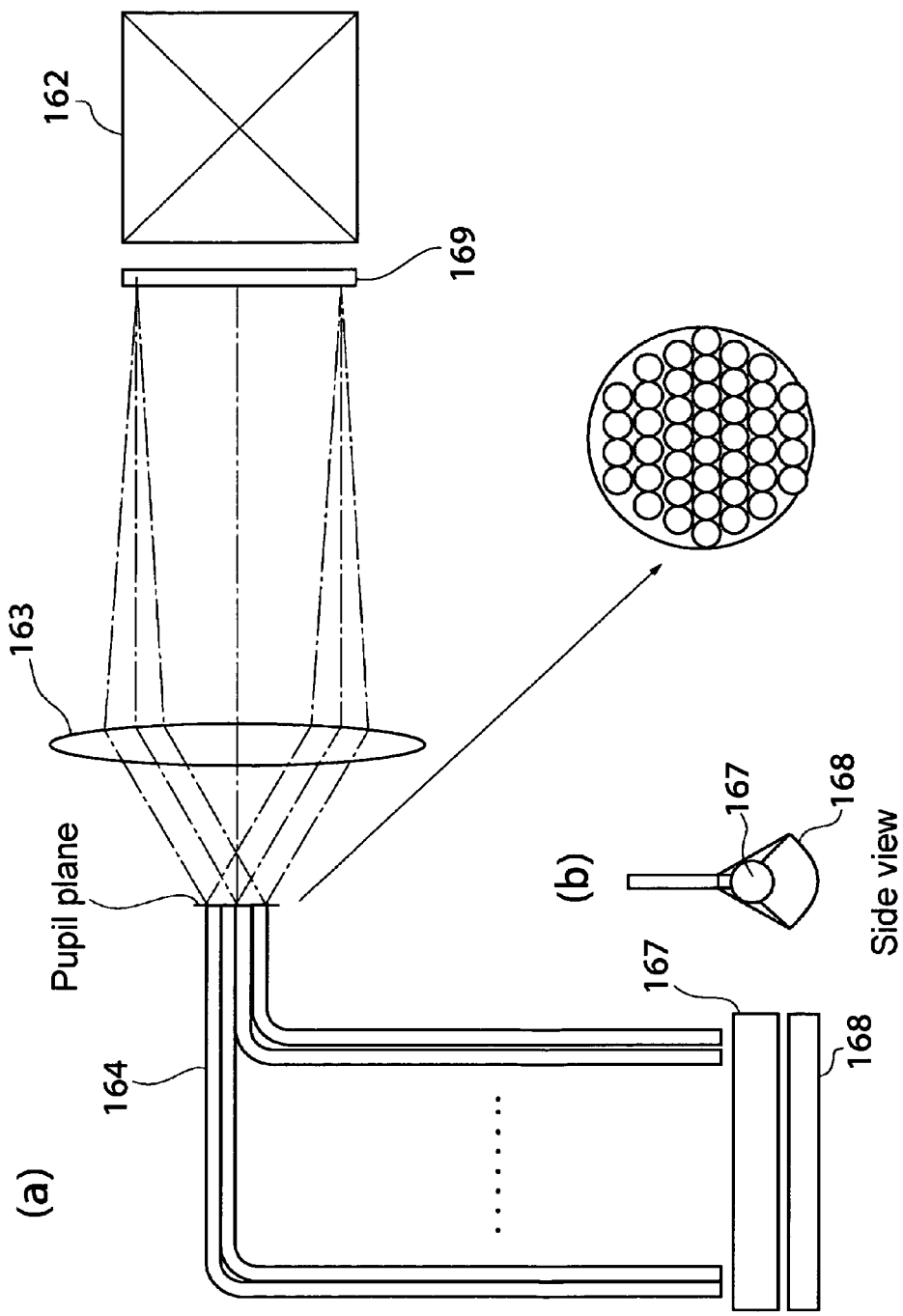
FIG. 8F is a drawing showing a liquid crystal device illumination of an embodiment of the present invention, using cold cathode tubes and fibers.

FIG. 8E is a drawing showing an illumination optical system in which high intensity LEDs 166 that emit blue (B) light, red (R) light, and green (G) light are used. As this illumination optical system, high intensity LEDs 166 for the colors of RGB, optical fiber bundles provided for each of the respective high intensity LEDs 166, back light illumination system 163 of which pupil position is located at the exit end of the optical fiber bundles, liquid crystal display device 169, and three color multiplexer 162 are illustrated.

On other two side surfaces other than the above are similarly provided a liquid crystal display device, an illumination optical system, optical fiber bundles, and high intensity LEDs. However, as each set of the three sets of the high intensity LEDs, high intensity LEDs from which one of the different colors emit are arranged. And, on the remaining one side surface is provided a relay optical system described and illustrated later.

Recent progress in LCDs is remarkable; LCDs that provide a light output of about 1 [lm] are on the market; and, future ultra-high intensity LEDs that can provide an output of about ten times as high as that light output are currently under development. In addition, LCDs provide an excellent performance also with respect to their power consumption and life. However, the light directivity thereof is about 15 degrees, and also the distribution is not uniform. Moreover, a light beam having an NA of about 0.02 to 0.03 is desirable for a zoom optical system for projecting an image of a liquid crystal display device to a screen (described later), and thus it is not easy to effectively use the light from high intensity LEDs as the back light for the above-described liquid crystal display devices.

Thus, in this embodiment, it is configured such that for each of the high intensity LED colors of blue (B), red (R), and green (G), one or more high intensity LEDs 166 are provided; optical fibers 165 are respectively disposed at the exit position of each of the LEDs; those optical fibers 165 are gathered to be bundled in a circular form; and the light is emitted from the pupil position of back light illumination system 163 of the above-described liquid crystal device. Generally, the light emitting area of the light emitting chip of a LED is about 200 μm; and an optical fiber with a core having a diameter of more than that is provided on the light emitting plane. For example, when assuming that the illuminance of the LED is 1 [lm], the pupil of back light illumination 163 has a design diameter of about 4 mm, and thus, in the case of designing an illumination system of this size, a bundle of, in the case of optical fibers of 0.8 mm diameter, about twenty optical fibers can be arranged on the pupil plane. Accordingly, a uniform two-dimensionally light emitting illumination light having an illuminance of 20 [lm] can be emitted from the pupil position of the illumination system.

In this regard, because light beams having a predetermined angle are repeatedly totally reflected in optical fibers 165 and proceed in optical fibers 165, the exit angle thereof at the optical fiber exit portion (pupil plane) coincides with the incidence angle. Thus, because, as with the case of optical rod effect, light having the same NA as that of the light incident on the optical fibers is emitted at the exit portion of the optical fibers, the light can be supplied to the zoom optical system (described later) without the light beams being uselessly expanded. The illumination optical system thus serves also as an illuminance uniformizing optical system by which the uniformity is improved. For example, because the exit angle at the pupil plane determines the illuminated area on liquid crystal device 169, the uniformity can be adjusted through the directivity characteristics of the LED, the adjustment of the magnification of the optical system, and the number of fibers.

Further, the number of the fibers led from one LED need not be one, and it can also be conceived that fibers with smaller diameter are bundled and used. In this case, because the number of fibers bundled on the pupil increases, the shape of the pupil can be made to approach a circle. Furthermore, when the fiber diameter is small, the fibers can be arranged to meet the directivity of the LED, and thus the exit angle at the pupil plane can be made smaller.

FIG. 8F is a drawing showing an illumination optical system in which cold cathode tubes 167 that emit blue light, red light, and green light are used. Note that in FIG. 8F, the same constituent elements as those shown in FIG. 8E are denoted by the same reference numerals, and descriptions thereof may be omitted. Cold cathode tubes can be made small-sized compared with hot cathode tubes and are used as back lights of, e.g., a CRT, also from the standpoint of power consumption and life. However, such display back lights are normally implemented by way of diffusing light beams from a cold cathode tube by means of a diffusing plate or the like, and thus it is difficult to use them for a zoom optical system (described later), located between a liquid crystal device and a screen, for which, as in this embodiment, only the light beams having an NA of about 0.02 to 0.03 are useable.

So, in this invention, it is configured such that for each of the colors of blue, red, and green, one or more cold cathode tubes 167 are provided; optical fibers 164 are disposed at the exit position of each of the cold cathode tubes; those optical fibers 164 are gathered to be bundled in a circular form; and the light is emitted from the pupil position of back light illumination system 163 of the above-described liquid crystal device. Generally, the cold cathode tube has, at a minimum, a size of about 2 mm diameter and 40 mm length; reflecting mirror 168 for making the cold cathode tube have directivity is disposed; and the fibers are arranged so that the 40 mm length span is lined with them. For example, in the case of fibers of 1 mm diameter, the span is lined with forty such fibers; when such fibers are bundled, leaving substantially no space therebetween, they can be made to form a circle of about 10 mm diameter; and thus, a uniform illumination light having a high illuminance can be emitted from the pupil position of the illumination system. If a required light intensity cannot be secured by one cold cathode tube, a plurality of cold cathode tubes may be used.

With, as described above, high intensity LEDs 116 or cold cathode tubes 167 being used as a back light, power consumption is suppressed; because of the long life, one is not bothered with the light source replacement work; and a fan or the like required when using a halogen lamp can be dispensed with, which makes it possible to realize a simple device configuration.

With reference to FIGS. 8E and 8F, the cases in which the transmission type liquid crystal display devices 169 are used have been explained, but in a case in which reflection type liquid crystal display devices are used, a light source type that emits white light will be used with respect to both of the high intensity LED and the cold cathode tube, and in accordance with a method similar to the methods shown in FIGS. 8E and 8F, a light emitting plane will be formed at the pupil position of the illumination optical system.

In both of the case in which transmission type liquid crystal display devices are used and the case in which reflection type liquid crystal display devices are used and in the case in which a light source emitting white light is used, it will be configured such that the light beam of the emitted light is thereafter divided into a red one, a blue one, and a green one by means of a three color beam splitter, and the light beams, each having been reflected by each of the reflection type liquid crystal display devices, are combined together again by means of a three color multiplexing prism to emit the combined light beam toward the zoom optical system.

Figure 25:
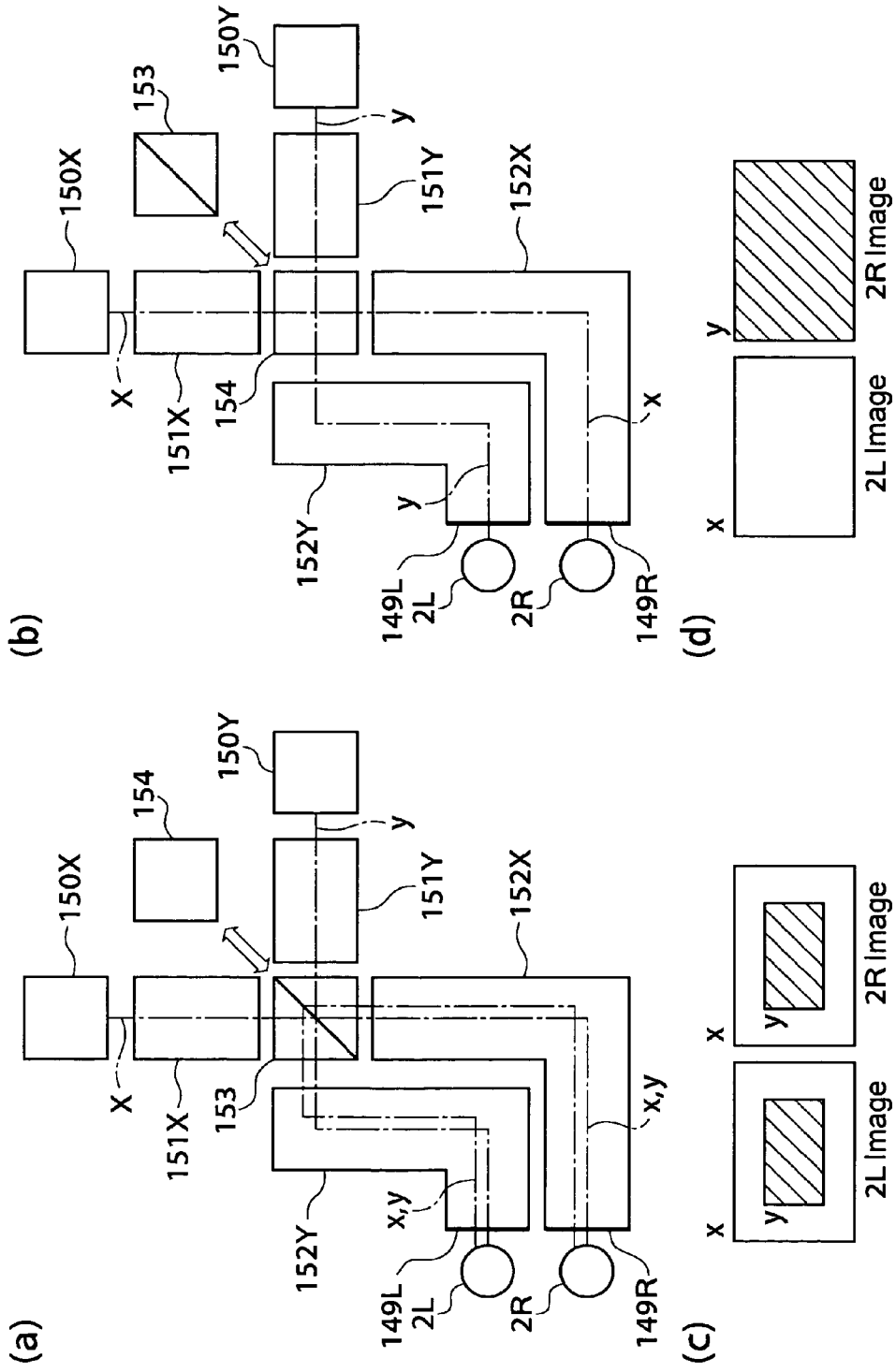
FIG. 25 is a schematic showing an example of a system for leading output images from two two-dimensional image output devices to both eyes.

Since the illumination system problem associated with the case where light emitting picture plane G is substituted by screen G has been resolved, all-time new effects can be brought about under the configuration. As an example thereof, referring to FIG. 25, a method will be described in which by dividing and combing images outputted from the two light emitting type two-dimensional image output devices (a liquid crystal display device and a color multiplexing prism will be collectively called so) 150X and 150Y, various images are provided to the right eye 2R and the left eye 2L. FIG. 25 shows a mechanism in which the two two-dimensional image output devices 150X and 150Y are used; beam splitters for combing and dividing the light beams from each of the image output devices are provided; and with respect to the beam splitters, with the half prism type prism 153 and the total reflection type (normal double-sided mirror) or total transmission type (normal transparent body) optical member 154 being exchanged with each other, both of the above-described presentation of combined images and the presentation of a three-dimensional image realized by separately projecting images having different parallaxes to the right and left eyes can be performed.

In FIG. 25, (a) of FIG. 25 is an example in which the images x and y having different sizes are combined and then displayed as an identical image in the right and left eyes (c). Y is a high-definition output image and x is an output image of marginal information or image. On the other hand, (b) is an example in which the different images x and y having an identical size are displayed as different images in the right and left eyes (d), and by making images x and y different images having different parallaxes, three-dimensional images can be enjoyed. (a) and (b) of FIG. 25 show the optical paths of light beams x and y when half mirror prism 153 that combines the light beam x outputted from two-dimensional image output device 150X and the light beam y outputted from two-dimensional image output device 150Y and optical member 154 (in this case, a normal transparent body) designed so that the optical path thereof coincides with that of half mirror prism 153 are exchanged with each other.

In (a) of FIG. 25, the light beam of image y outputted from two-dimensional image output device 150Y is, by optical relay mechanism 151Y and optical zoom mechanisms 152X and 152Y, zoomed down on screen 149L and 149R to a size corresponding to the resolution of the output image of the content. On the other hand, the light beam x outputted from two-dimensional image output device 150X is, by optical relay mechanism 151X and optical zoom mechanisms 152X and 152Y, zoomed up on screen 149L and 149R to a full field of view image. Those light beams, y and x, are respectively divided and combined by half prism 153, and the combined images are respectively, as light beams x and y, projected as an identical image (c) on the retina of the left eyeball 2L and on the retina of the right eyeball 2R.

In contrast, in (a) of FIG. 25, the light beam y outputted from two-dimensional image output device 150Y is, by optical relay mechanism 151Y and optical zoom mechanism 152Y, zoomed up with a predetermined image size on screen 149L. On the other hand, the light beam x outputted from two-dimensional image output device 150X is, by optical relay mechanism 151X and optical zoom mechanism 152X, zoomed up, as light beam x having the same size as that of light beam y, on screen 149R. Those light beams, y and x, pass through optical member 154 without being divided or combined by it and are separately projected, as images independent of each other, on the retina of the left eyeball 2L and on the retina of the right eyeball 2R by the above-described eyepiece optical system, not shown, which make one enjoy three-dimensional images created by parallax.

It is to be noted that such an eyepiece optical system as shown in, e.g., FIG. 8A, though not shown, is arranged between screen 149L and the right eyeball 2L and between screen 149R and the right eyeball 2R, and thus screen 149L and screen 149R correspond to light emitting picture plane G in, e.g., FIG. 8A.

In the example, both of the images are high-definition images utilizing SXGA liquid crystal display devices, and even in the marginal image portion as indicated in (c), sharp images can be obtained. By virtue of this, assuming, for example, that light beam in (c) is a screen image in a movie theater, a marginal image including the audience in the movie theater may be provided as the marginal image x. Since the image quality of the marginal image is good, one can enjoy a sense of reality, as if he or she were actually in the movie theater, which results an effect that one can view the images as perspective images. Additionally, because with only two SXGA liquid crystal display devices, the same performance as that of the above-described mechanism having a total of four liquid crystal display devices, there is the effect that the cost and the size are reduced.

While, as described above, by projecting the images outputted from the light emitting type two-dimensional image display devices on the above-described screen by means of the zoom optical systems, various advantages are obtained, discussions as to how much range of zoom magnification should be considered will follow.

First, assuming the case where a field of view angle of ±60 degree is to be secured and the images are to have on the screen a size of 65 mm, the same as the eye-width, a magnifying zoom mechanism of about 3 times that magnifies a 20 mm to 23 mm image to a 65 mm image will be required because the picture plane size of the two-dimensional image display device is about 0.8 to 0.9 inch. On the other hand, relative to the high-definition image compatible SXGA liquid crystal display device, in view of television setting, the setting by which dots become completely invisible corresponds to the case where a television of 40 to 50 inches is viewed from a position a few meters distant from the television. Thus, when it is configured such that the picture plane size can be optically reduced down to ±18 degrees, as the field of view angle, and such that, with respect to picture planes smaller than that, the picture plane size is reduced by electrical switching, dots cannot be recognized, and the fine dots of the SXGA liquid crystal display device can be effectively used. Accordingly, as the zoom magnification, a zoom magnification of about tan(60°)/tan(18°)=4 to 5 times will be required. This corresponds to, as the field angle, 13 to 65 mm, and, in view of the size of the two-dimensional liquid crystal display device, a zoom mechanism addressing a range ranging from reduction to magnification must be provided.

In the following, as a seventh embodiment, there will be described, referring to FIGS. 9-11, a zoom optical system example that projects an image located on a liquid crystal surface onto a screen that is used when, such an eyepiece lens that leads a screen image of 63 mm size, as light emitting picture plane G, to the user's eye with a field of view angle of ±60 degrees is used. This zoom optical system is a 5-time zoom system that can change the image on the SXGA liquid crystal display device so that the size on light emitting picture plane G is in a range of 12.4 mm to 63.3 mm.

Generally, zoom optical systems are used in cameras or photography enlargers; their object plane or projection plane is located distant therefrom; further, most of them are used for magnifying purposes. In contrast, because the zoom optical system related to the present invention has a short distance between the object plane and the projection plane and, at the same time, is required to cover the magnification change of up to 5 times, ranging from reduction to magnification, the design thereof is required to address the problem that the chromatic aberration characteristics change between its reduction conditions and its magnification conditions.

Figure 9A:
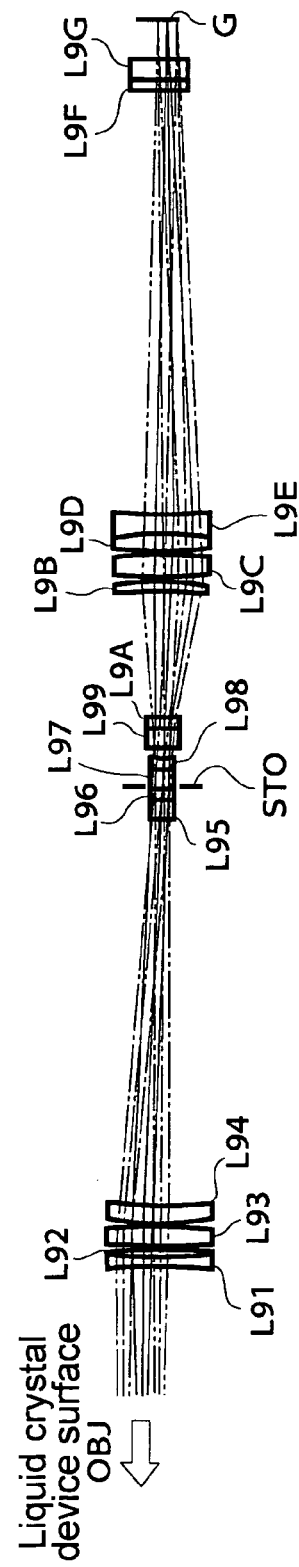
FIG. 9A is an optical path drawing where a zoom optical system used in an embodiment of the present invention has a field angle of 12.4 mm.
Figure 10A:
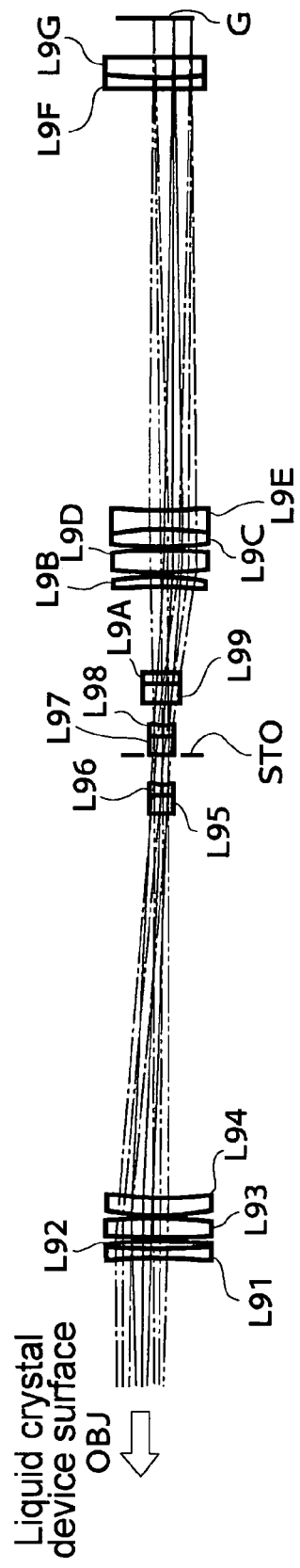
FIG. 10A is an optical path drawing where the zoom optical system shown in FIG. 9A has a field angle of 25.13 mm.
Figure 11A:
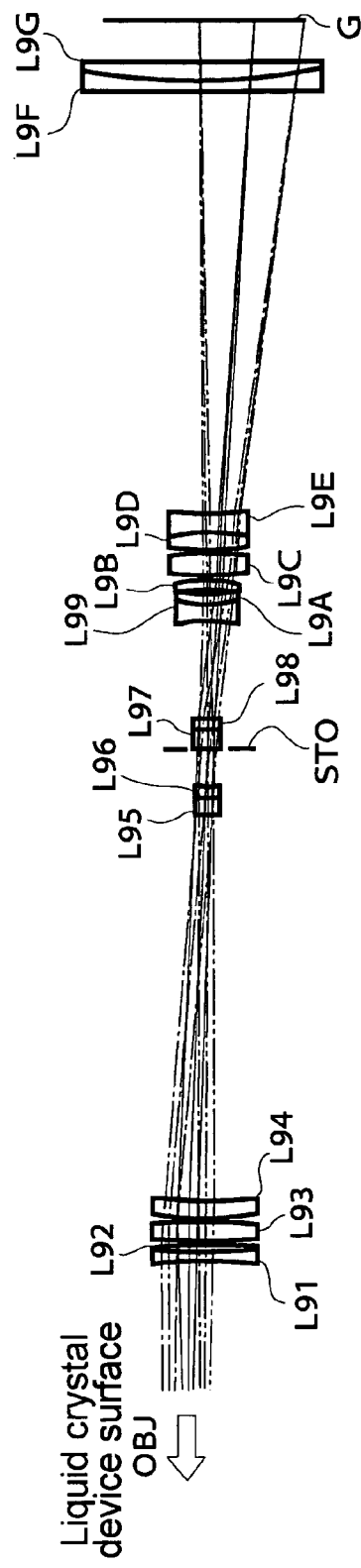
FIG. 11A is an optical path drawing where the zoom optical system shown in FIG. 9A has a field angle of 63.6 mm.

To solve the problem, as shown in FIGS. 9A, 10A, and 11A (each of which shows an identical optical system, except that their zoom conditions differ from each other), it is configured such that at least two cemented lenses are used in the lens group that is constituted by, sequentially from the side of liquid crystal display device image output plane OBJ, L91-L96, to, within the optical system up to the pupil plane (located at the same position as that of the front surface of lens L97), completely correct the chromatic aberration. On the pupil plane is provided aperture stop STO, and with the closing and opening motions thereof, the illuminance on screen G can be varied as required. It is configured such that with the cemented lens (L91, L92) being arranged at the position up to which no intervening lens exists between liquid crystal display device image output plane OBJ and the cemented lens and with the cemented lens (L95, L96) being arranged in the vicinity of the pupil plane, the image height-induced chromatic aberration is corrected by cemented lens (L91, L92), and the chromatic aberration related to the focus direction is corrected by the cemented lens (L95, L96). The reason that there is provided a long path light beam between liquid crystal display device image output plane OBJ and the pupil plane is that it is intended that by making the curvatures of each lenses small, various aberrations are kept as low as possible.

It should be noted that in FIGS. 9A, 10A, and 11A, liquid crystal display device image output plane OBJ is not illustrated, and only the optical system for one eye is illustrated. In the case where as the liquid crystal display devices, only one liquid crystal display device is used in common for both eyes, the light from liquid crystal display device image output plane OBJ is divided into a light for the right eye and a light for the left eye by using a half prism or a half mirror, and each of the lights is inputted to one of the optical systems, as shown in FIGS. 9A, 10A, and 11A, which are respectively provided for each eye. This technique is a well-known one and thus will not require detailed description.

The lens group for performing zoom operation will be described next. The zoom system is constituted by the cemented lens (L97, L98) and the cemented lens (L99, L9A), each of them is a concave lens. This is because a combination of concave lenses is necessary to give rise to the 5-time magnification change. The reason for this is that while the magnification of the zoom system is changed by one concave lens, the focus position moves in response to the magnification change, and thus, another concave lens is necessary to bring back the moved focus position to the original position. Those concave lenses are synchronously moved such that the magnification can be changed and the focus position does not move. While, of course, even with a combination of a concave lens and a convex lens, such performance can be brought about, the two concave lens combination makes the magnification changeable range larger, the design thereof is easier.

The former cemented lens (L97, L98) is used for determining the focus position, the latter cemented lens (L99, L9A) for changing the magnification. Because those cemented lenses move between the fixed lenses L96 and L9B, the chromatic aberration occurring conditions differ depending upon the moved positions thereof, and thus the chromatic aberration cannot be corrected over the entire magnification range. Thus, the cemented lens (L9D, L9E) is added, the lens materials and the curvatures of the cemented surface of the cemented lens are set so that at each magnification condition, the chromatic aberration and the other aberrations are successfully corrected. The optical design values of this optical system are shown in Table 9.

TABLE 9

Lateral Picture Plane Size 12.4 mm

| Surface No. | Surface Curvature Radius | Surface Separation on Optical Axis | RMD Glass Material |
|---|---|---|---|
| OBJ: | INFINITY | 97.000000 | |
| 1: | −300.00000 | 3.000000 | SNPH2_OHARA (L91) |
| 2: | 195.00000 | 2.000000 | TAFD30_HOYA (L92) |
| 3: | −300.00000 | 1.000000 | |
| 4: | 200.00000 | 5.000000 | TAFD30_HOYA (L93) |
| 5: | −400.00000 | 1.000000 | |
| 6: | 90.00000 | 5.000000 | TAFD30_HOYA (L94) |
| 7: | 115.00000 | 105.000000 | |
| 8: | 40.00000 | 5.000000 | TAFD30_HOYA (L95) |
| 9: | −31.00000 | 3.000000 | SNPH2_OHARA (L96) |
| 10: | −135.00000 | 0.000000 | |
| STO: | INFINITY | 0.500000 | |
| 12: | −38.00000 | 5.000000 | TAFD30_HOYA (L97) |
| 13: | 25.00000 | 3.000000 | SNPH2_OHARA (L98) |
| 14: | 98.00000 | 3.430000 | |
| 15: | −38.00000 | 5.000000 | TAFD30_HOYA (L99) |
| 16: | 28.00000 | 3.000000 | SNPH2_OHARA (L9A) |
| 17: | 86.00000 | 34.670000 | |
| 18: | −151.00000 | 3.000000 | TAFD30_HOYA (L9B) |
| 19: | −46.00000 | 1.000000 | |
| 20: | 300.00000 | 6.000000 | TAFD30_HOYA (L9C) |

TABLE 9-continued

Lateral Picture Plane Size 12.4 mm

| Surface No. | Surface Curvature Radius | Surface Separation on Optical Axis | RMD Glass Material |
|---|---|---|---|
| 21: | −150.00000 | 1.000000 | |
| 22: | 200.00000 | 5.000000 | TAFD30_HOYA (L9D) |
| 23: | −63.00000 | 5.000000 | SNPH2_OHARA (L9E) |
| 24: | 200.00000 | 115.000000 | |
| 25: | INFINITY | 3.000000 | TAFD30_HOYA (L9F) |
| 26: | 180.00000 | 5.000000 | SNPH2_OHARA (L9G) |
| 27: | INFINITY | 10.772097 | |
| Light Emitting Picture Plane G: | INFINITY | 0.000000 | |

Figure 9B:
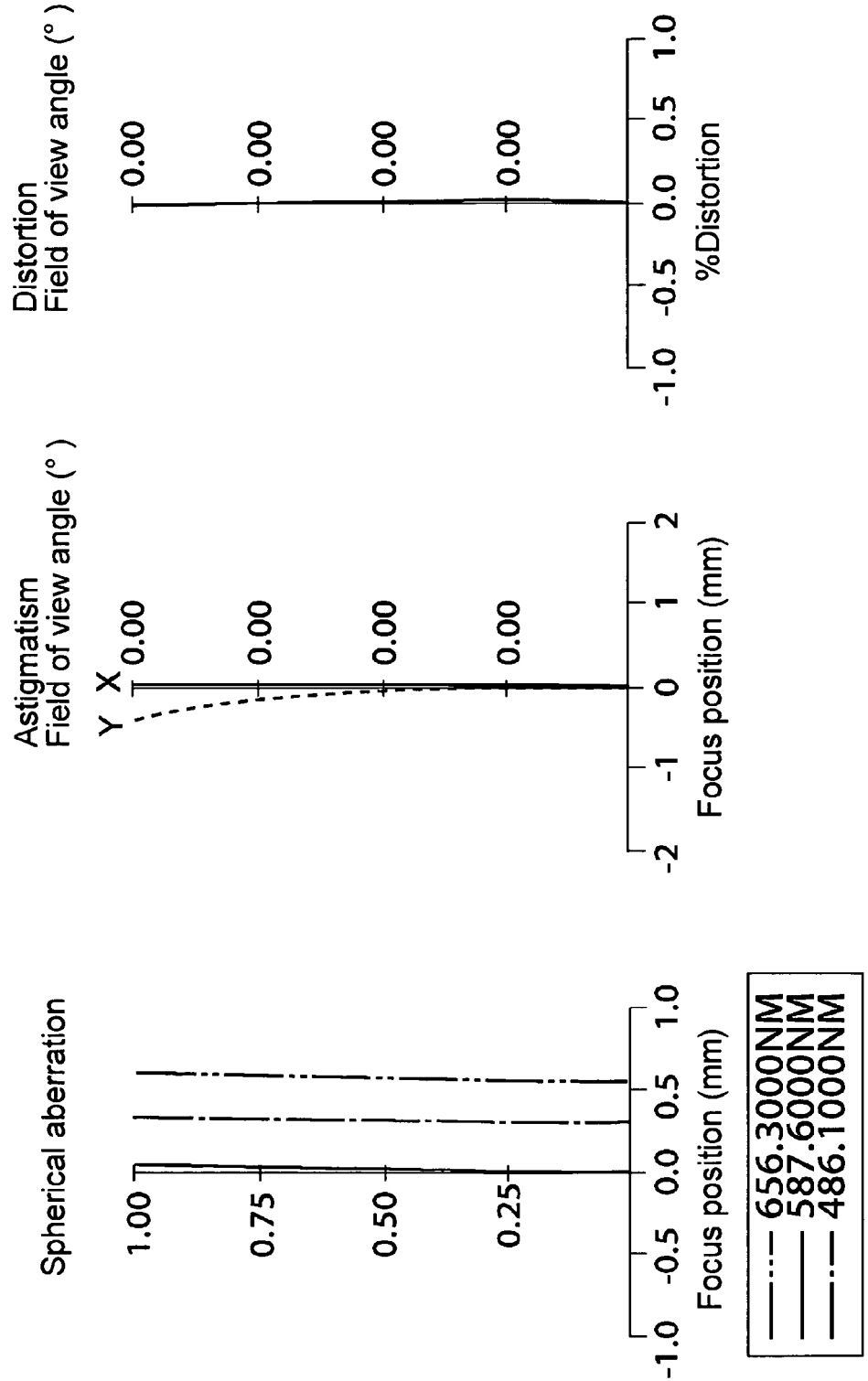
FIG. 9B is a field aberration output drawing in the state of FIG. 9A.
Figure 9C:
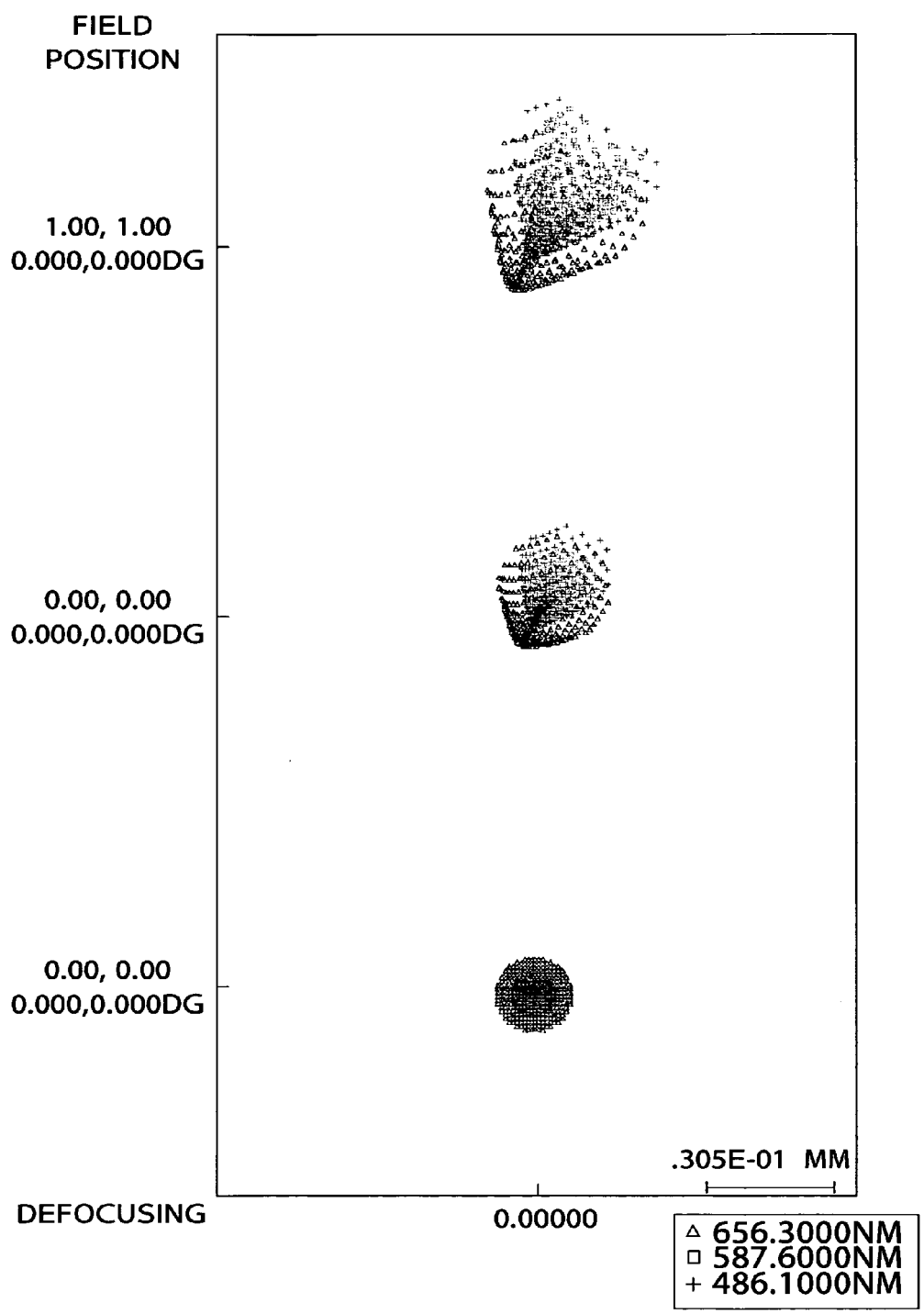
FIG. 9C is a spot diagram output drawing in the state of FIG. 9A.
Figure 9D:
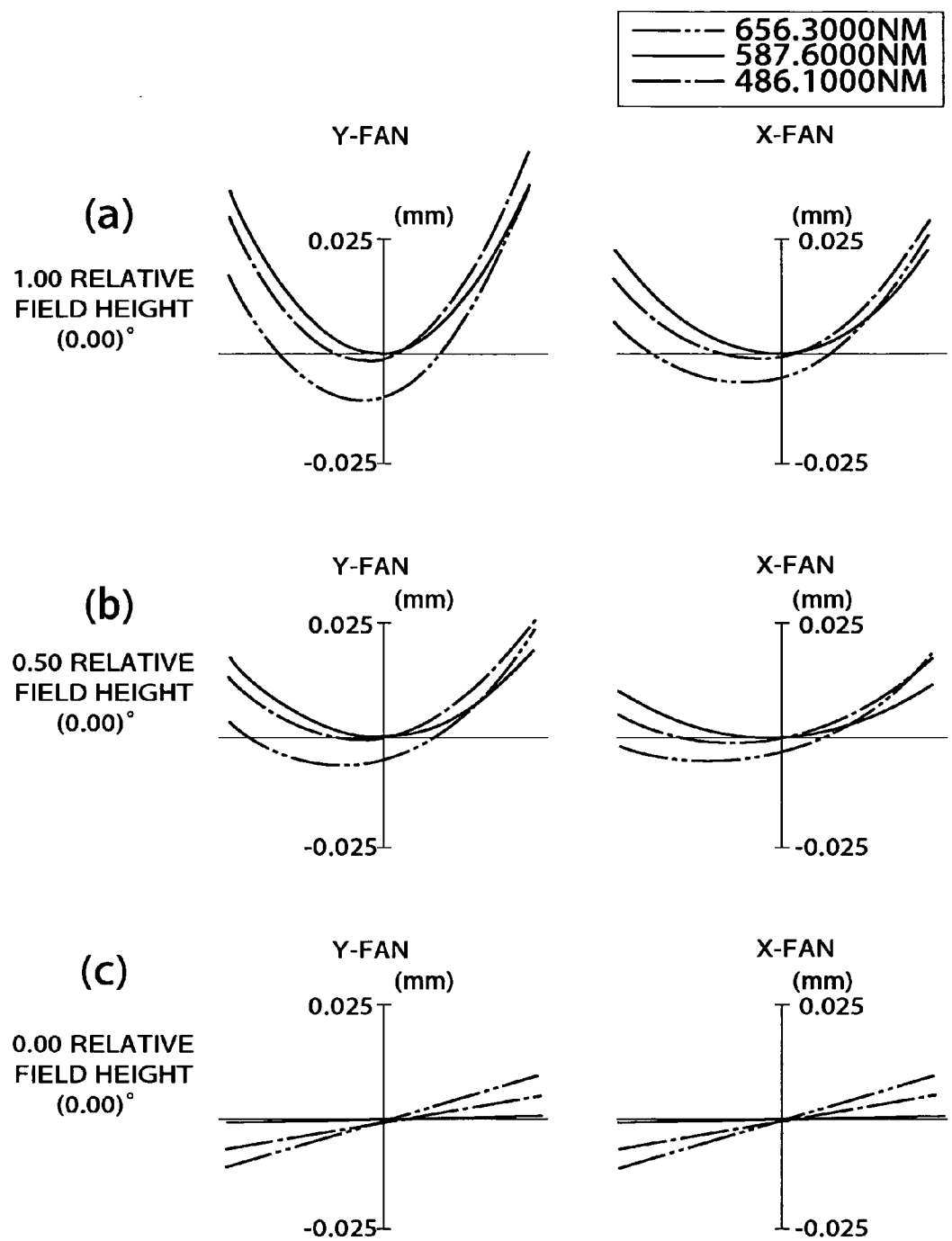
FIG. 9D is a lateral aberration plot output drawing in the state of FIG. 9A.

In FIG. 9A is shown the optical drawing that illustrates, with respect to the seventh embodiment designed under those design conditions, the least magnification system having an image size of 12.4 mm. As an optical system, the principal rays of the image projected on screen G are nontelecentric in the converging direction. FIG. 9B shows the chromatic aberration, astigmatism, and distortion of the optical system, which indicates good results. Further, while FIG. 9C shows the spot diagrams, and FIG. 9D shows lateral aberration plot output drawings for each of the image heights, aberrations of less than 35 μm are obtained over the entire image height range, and thus it can be seen that a good image quality is obtained.

Next, in FIG. 10A is shown the optical drawing in which the image size is 25.3 mm and which is in a zoom state of approximately 2.5 times compared with the state shown in FIG. 9A. By changing the distance between lens L96 and lens L97 from 0.5 mm to 8.38 mm and changing the distance between lens L98 and lens L99 from 3.43 mm to 6.5 mm, a zoom of a little less than 2 times is realized. The optical design values of this optical system are shown in Table 10.

TABLE 10

Lateral Picture Plane Size 25.13 mm

| Surface No. | Surface Curvature Radius | Surface Separation on Optical Axis | RMD Glass Material |
|---|---|---|---|
| OBJ: | INFINITY | 97.000000 | |
| 1: | −300.00000 | 3.000000 | SNPH2_OHARA (L91) |
| 2: | 195.00000 | 2.000000 | TAFD30_HOYA (L92) |
| 3: | −300.00000 | 1.000000 | |
| 4: | 200.00000 | 5.000000 | TAFD30_HOYA (L93) |
| 5: | −400.00000 | 1.000000 | |
| 6: | 90.00000 | 5.000000 | TAFD30_HOYA (L94) |
| 7: | 115.00000 | 105.000000 | |
| 8: | 40.00000 | 5.000000 | TAFD30_HOYA (L95) |
| 9: | −31.00000 | 3.000000 | SNPH2_OHARA (L96) |
| 10: | −135.00000 | 0.000000 | |
| STO: | INFINITY | 8.380000 | |
| 12: | −38.00000 | 5.000000 | TAFD30_HOYA (L97) |
| 13: | 25.00000 | 3.000000 | SNPH2_OHARA (L98) |
| 14: | 98.00000 | 6.500000 | |
| 15: | −38.00000 | 5.000000 | TAFD30_HOYA (L99) |
| 16: | 28.00000 | 3.000000 | SNPH2_OHARA (L9A) |
| 17: | 86.00000 | 23.720000 | |
| 18: | −151.00000 | 3.000000 | TAFD30_HOYA (L9B) |
| 19: | −46.00000 | 1.000000 | |
| 20: | 300.00000 | 6.000000 | TAFD30_HOYA (L9C) |
| 21: | −150.00000 | 1.000000 | |
| 22: | 200.00000 | 5.000000 | TAFD30_HOYA (L9D) |
| 23: | −63.00000 | 5.000000 | SNPH2_OHARA (L9E) |
| 24: | 200.00000 | 115.000000 | |
| 25: | INFINITY | 3.000000 | TAFD30_HOYA (L9F) |
| 26: | 180.00000 | 5.000000 | SNPH2_OHARA (L9G) |
| 27: | INFINITY | 10.749815 | |
| Light Emitting Picture Plane G: | INFINITY | 0.000000 | |

Figure 10B:
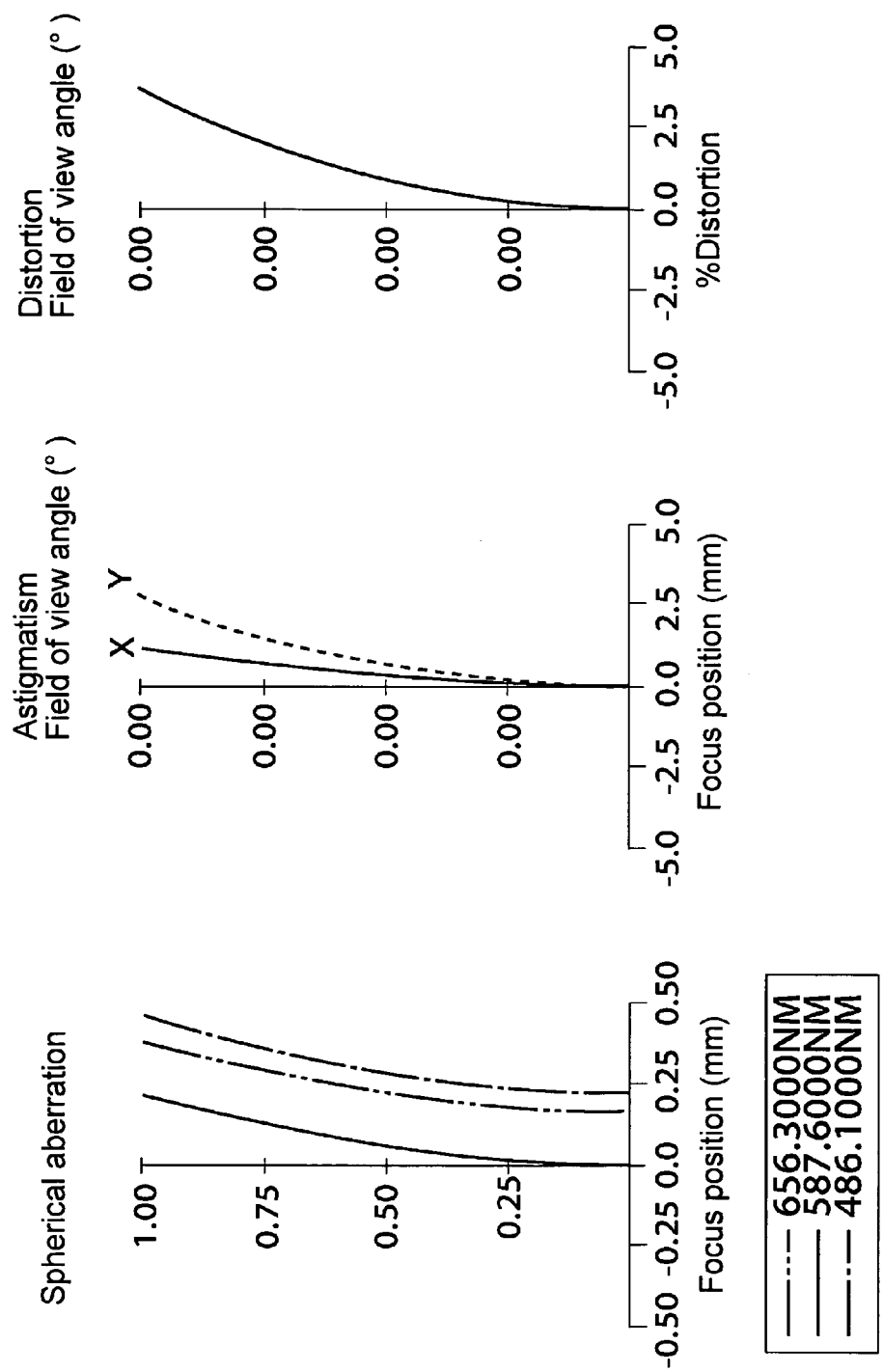
FIG. 10B is a field aberration output drawing in the state of FIG. 10A.
Figure 10C:
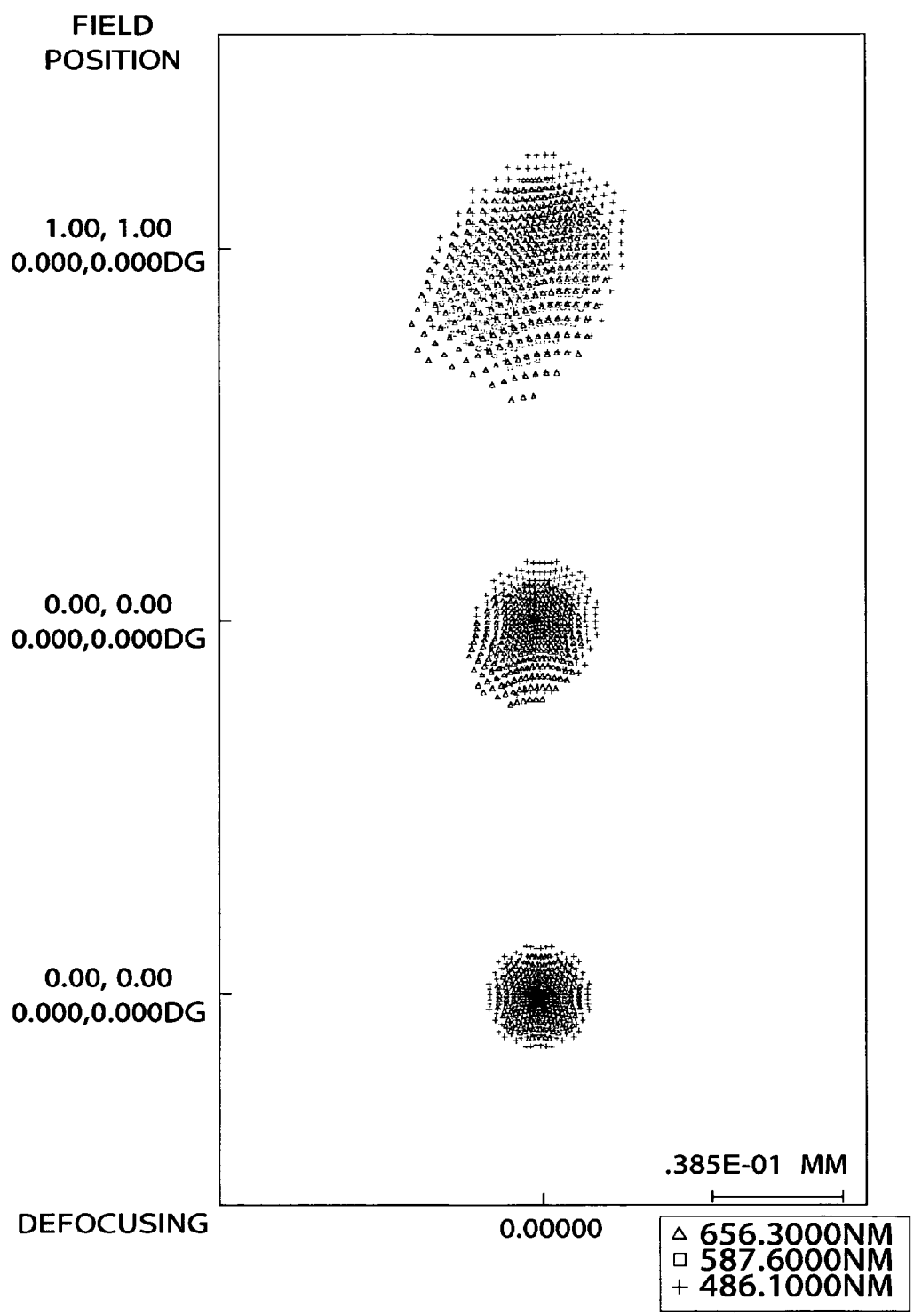
FIG. 10C is a spot diagram output drawing in the state of FIG. 10A.
Figure 10D:
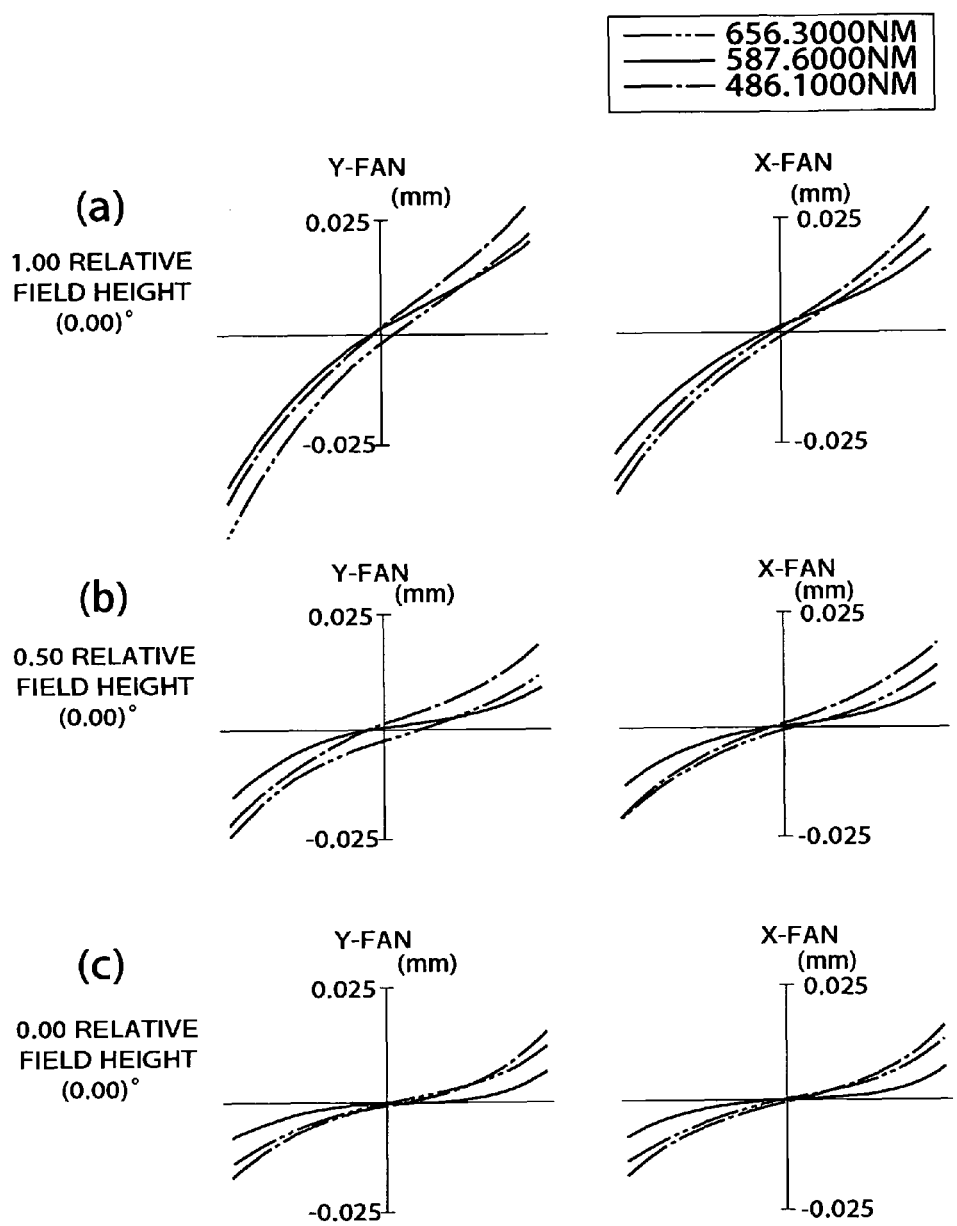
FIG. 10D is a lateral aberration plot output drawing in the state of FIG. 10A.

As an optical system, the principal rays of the image projected on screen G are nearly nontelecentric or slightly nontelecentric in the diverging direction. FIG. 10B shows the chromatic aberration, astigmatism, and distortion of the optical system, which indicates good results. Further, while FIG. 10C shows the spot diagrams, and FIG. 10D shows lateral aberration plot output drawings, aberrations of less than 50 μm are obtained over the entire image height range, and thus it can be seen that a good image quality is obtained. However, with comparative reference to the lateral aberration plot output drawings of FIGS. 9D and 10D, it can be clearly seen that the characteristics differ therebetween.

Next, in FIG. 11A is shown the optical drawing in which the image size is 63.6 mm and which is in a zoom state of approximately 5 times compared with the state shown in FIG. 9A. By changing the distance between lens L96 and lens L97 from 0.5 mm to 10.68 mm and changing the distance between lens L98 and lens L99 from 3.43 mm to 27.0 mm, a zoom of 5 times is realized. As an optical system, the principal rays of the image projected on screen G are significantly nontelecentric in the diverging direction; and, in the case where cemented lens L9F, L9G is not included, it has been recognized, by outputting as before the spot diagrams and lateral aberration plot output drawings, that the aberrations are large, as was expected, and a chromatic aberration of about 100 μm remains.

In contrast to normal camera zooms, an optical system can be arranged in the vicinity of the object plane in the present invention; and so, by taking advantage of this fact, it is configured such that with the cemented lens (L9F, L9G) being disposed in the vicinity of screen G the chromatic aberration can be corrected when the field angle becomes large. Although not having been described, the same cemented lens (L9F, L9G) is already present in FIGS. 9A and 10A. It has been ascertained that when the field angle is small, this cemented lens (L9F, L9G) does not significantly affect the aberrations. The optical design values of the optical system shown in FIG. 11A are shown in Table 11.

TABLE 11

Lateral Picture Plane Size 63.6 mm

| Surface No. | Surface Curvature Radius | Surface Separation on Optical Axis | RMD Glass Material |
|---|---|---|---|
| OBJ: | INFINITY | 97.000000 | |
| 1: | −300.00000 | 3.000000 | SNPH2_OHARA (L91) |
| 2: | 195.00000 | 2.000000 | TAFD30_HOYA (L92) |
| 3: | −300.00000 | 1.000000 | |
| 4: | 200.00000 | 5.000000 | TAFD30_HOYA (L93) |
| 5: | −400.00000 | 1.000000 | |
| 6: | 90.00000 | 5.000000 | TAFD30_HOYA (L94) |
| 7: | 115.00000 | 105.000000 | |

TABLE 11-continued

Lateral Picture Plane Size 63.6 mm

| Surface No. | Surface Curvature Radius | Surface Separation on Optical Axis | RMD Glass Material |
|---|---|---|---|
| 8: | 40.00000 | 5.000000 | TAFD30_HOYA (L95) |
| 9: | −31.00000 | 3.000000 | SNPH2_OHARA(L96) |
| 10: | −135.00000 | 0.000000 | |
| STO: | INFINITY | 10.680000 | |
| 12: | −38.00000 | 5.000000 | TAFD30_HOYA (L97) |
| 13: | 25.00000 | 3.000000 | SNPH2_OHARA (L98) |
| 14: | 98.00000 | 27.000000 | |
| 15: | −38.00000 | 5.000000 | TAFD30_HOYA (L99) |
| 16: | 28.00000 | 3.000000 | SNPH2_OHARA (L9A) |
| 17: | 86.00000 | 0.920000 | |
| 18: | −151.00000 | 3.000000 | TAFD30_HOYA (L9B) |
| 19: | −46.00000 | 1.000000 | |
| 20: | 300.00000 | 6.000000 | TAFD30_HOYA (L9C) |
| 21: | −150.00000 | 1.000000 | |
| 22: | 200.00000 | 5.000000 | TAFD30_HOYA (L9D) |
| 23: | −63.00000 | 5.000000 | SNPH2_OHARA (L9E) |
| 24: | 200.00000 | 115.000000 | |
| 25: | INFINITY | 3.000000 | TAFD30_HOYA (L9F) |
| 26: | 180.00000 | 5.000000 | SNPH2_OHARA (L9G) |
| 27: | INFINITY | 10.772577 | |
| Light Emitting Picture Plane G | INFINITY | 0.000000 | |

Figure 11B:
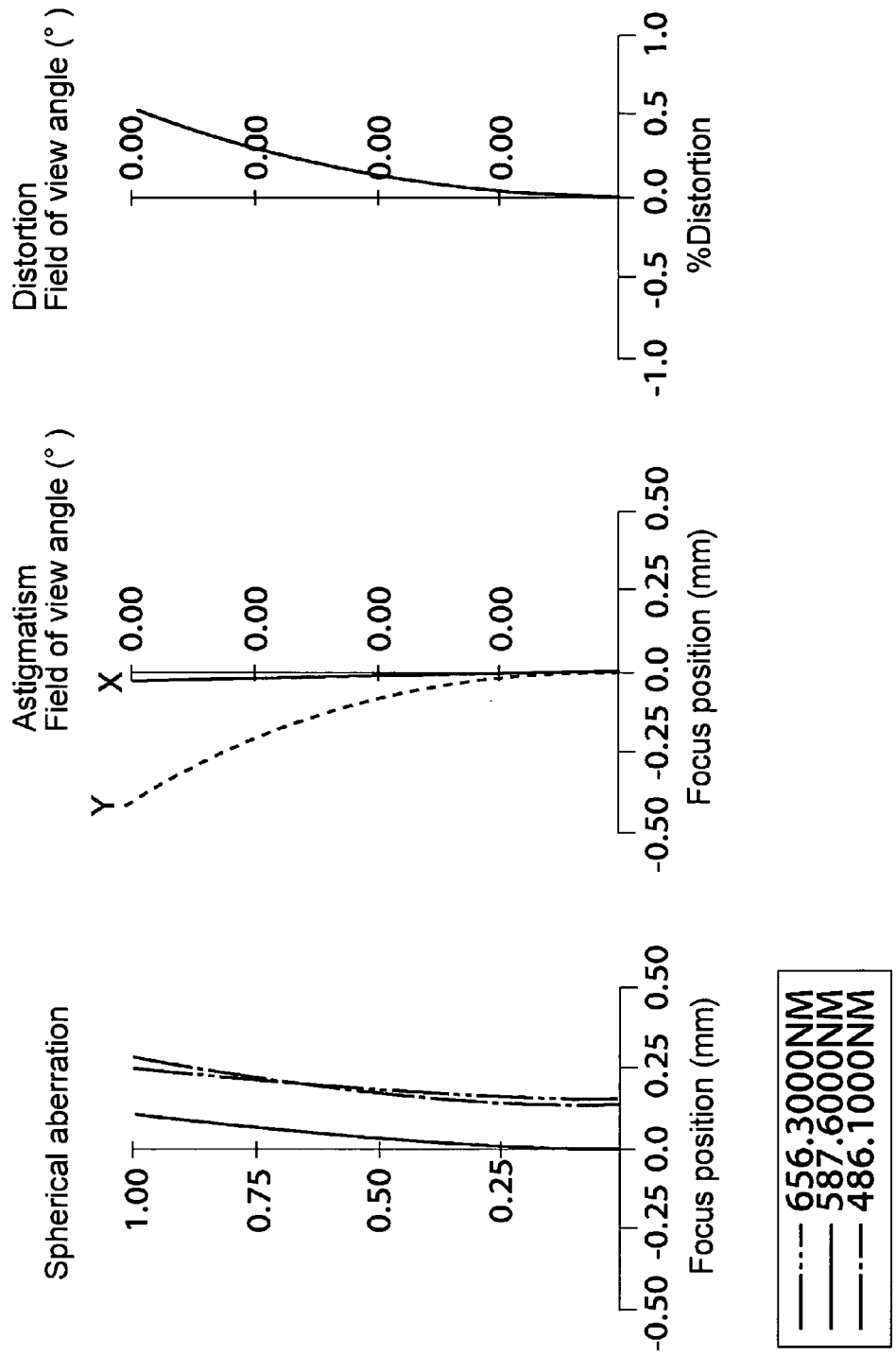
FIG. 11B is a field aberration output drawing in the state of FIG. 11A.
Figure 11C:
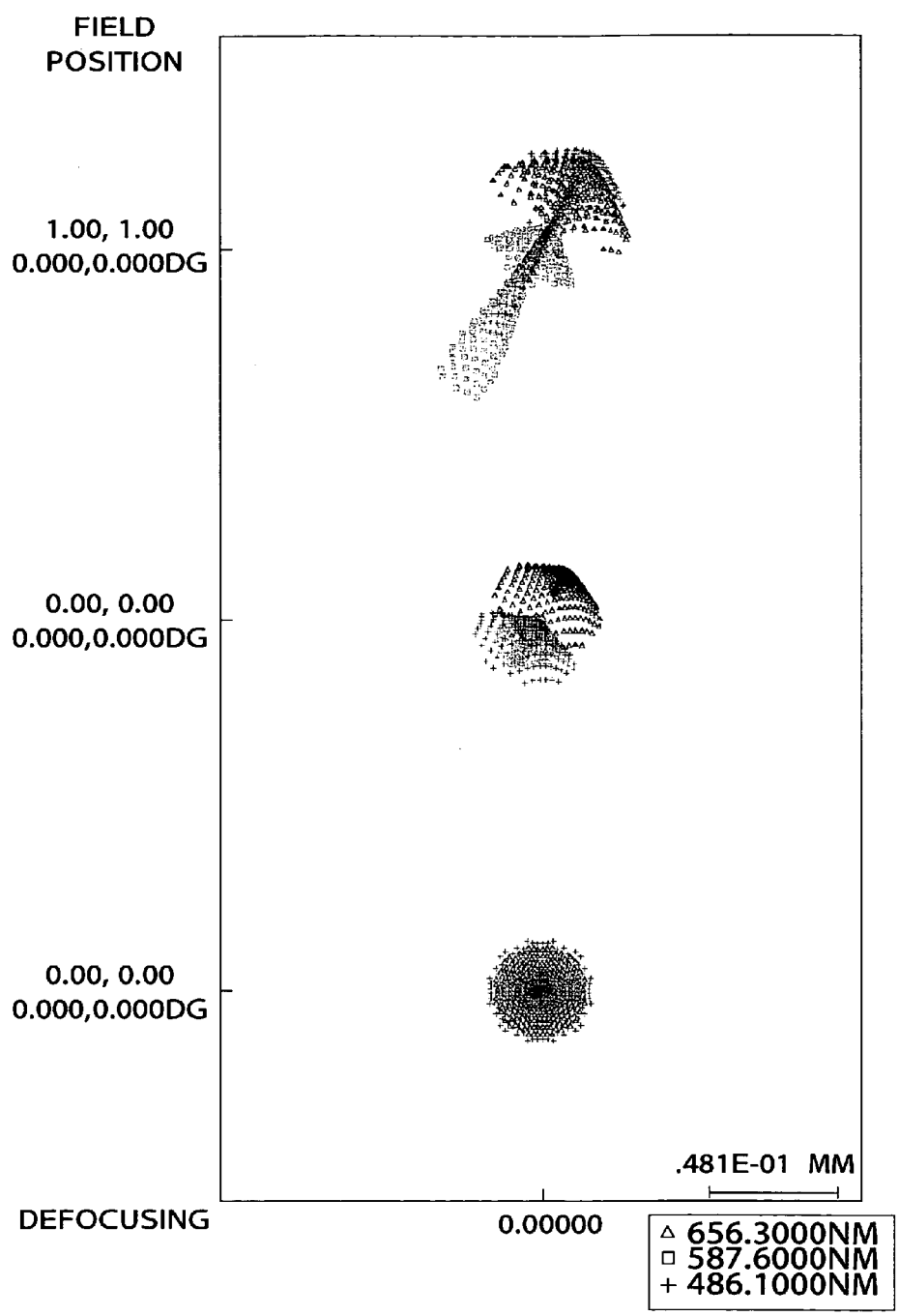
FIG. 11C is a spot diagram output drawing in the state of FIG. 11A.
Figure 11D:
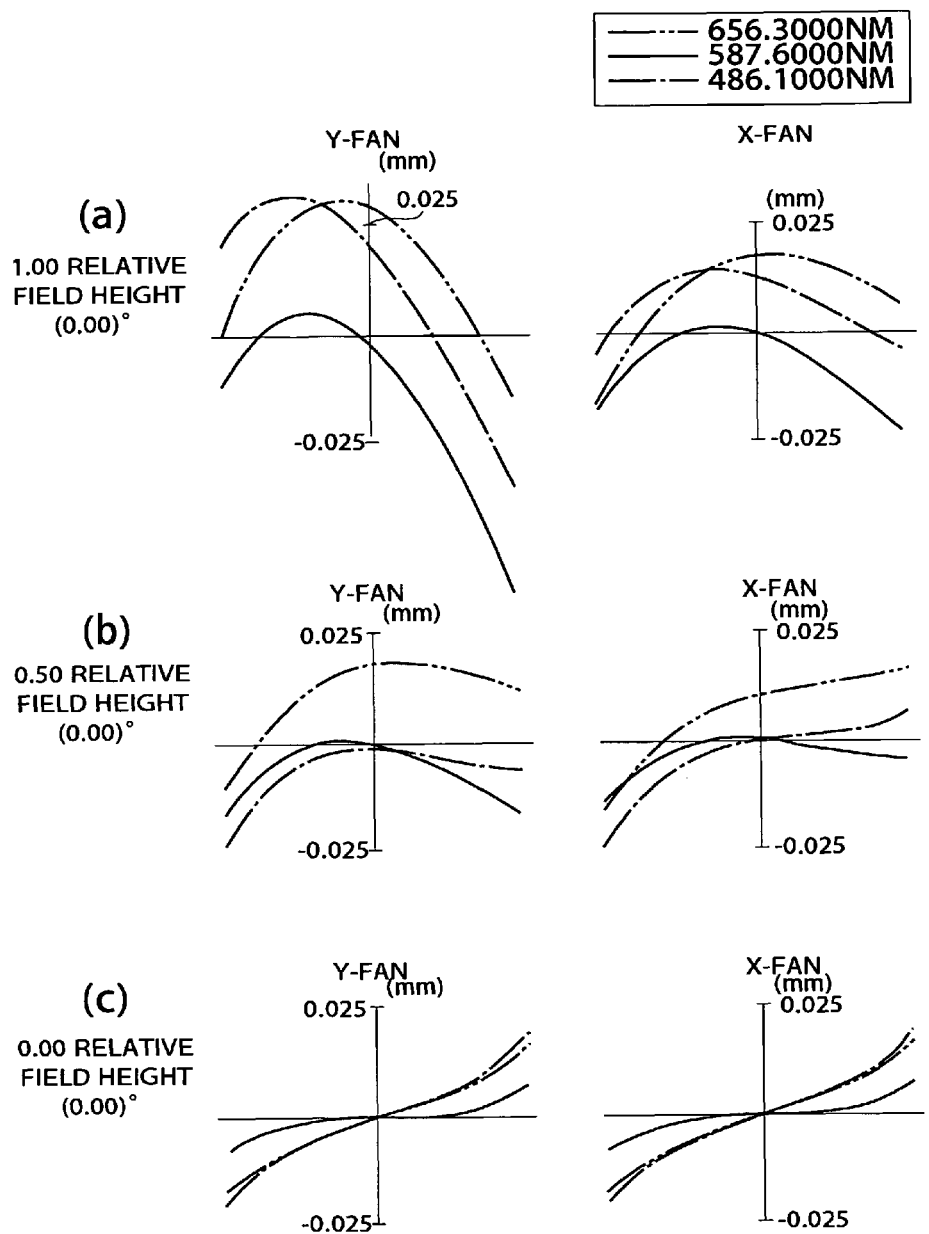
FIG. 11D is a lateral aberration plot output drawing in the state of FIG. 11A.

FIG. 11B shows the chromatic aberration, astigmatism, and distortion of this optical system, which indicates good results; while FIG. 11C shows the spot diagrams, and FIG. 11D shows lateral aberration plot output drawings, aberrations of less than 50 µm are obtained within the image height of 0.5 (in terms of field of view angle, ±30 degrees), and spot diagrams of less than 80 µm are obtained even in the condition of the image height of 1 (in terms of field of view angle, ±60 degrees), and thus it can be seen that a good image quality is obtained. As described above, while with comparative reference to the lateral aberration plot output drawings of FIGS. 9D, 10D, and 11D, it can be clearly seen that the characteristics differ therebetween in a three-stage manner, good projection images are obtained over the entire variable magnification range, with the above-described chromatic aberration correction through the five cemented lenses being realized.

Next, referring to FIGS. 12A-12H, a zoom optical system example with a higher performance used in an eighth embodiment of the present invention will be described.

The foregoing descriptions have been made by referring to only the spot diagrams and the lateral aberration plot drawings; however, as a matter of fact, image height- and color-induced aberrations each have their respective best positions in the focus direction, and thus, the estimation is required to be done at the best position. Further, an image magnified by the present zoom system is observed, with the image being further magnified by an eyepiece optical system, and thus, assuming for example that the liquid crystal screen is within a circle of 22.1 mm diameter and that the aspect ration thereof is 16:9 to calculate the liquid crystal portion, the liquid crystal panel is to have a horizontal size of 19.26 mm and a vertical size of 10.83 mm. In other words, in the case of 1280 pixels, the pixels each have a horizontal size of 19.26 mm/1280=15 µm and a vertical size of 15 µm; and thus, to resolve this pitch, the zoom optical system is required to have a resolution of, in terms of pitch, 30 µm.

The aberration estimation can be implemented by calculating at the best focus position the MTF of, in terms of frequency, $1000/((15+14.3)/2)=34.13$ Hz. However, in the case of an MTF, there is a resolution limit, and when the NA (numerical aperture) is made small, the image itself cannot be resolved, however the lateral aberration and the chromatic aberration are good. Thus, making the NA large is important for the optical system and is also advantageous for obtaining a larger amount of light. However, generally, when the NA is made large, an optical system is significantly affected by, e.g., the spherical aberrations of the lenses included in the optical system, which also causes the MTF deteriorate.

So, in the eighth embodiment optical system, a chromatic aberration correcting lens is incorporated just before the screen, as described above, and, at the same time, a curved surface of the lens having large curvatures located immediately after the moving zoom optical system is constituted by a conic surface, described above. By this, the spherical aberrations of the light beams passing through the lens periphery improve, and thus good aberration characteristics can be obtained with a large NA. Tables 12 and 13 show the optical design values of the eighth embodiment optical system. Tables 12 and 13 constitute originally a single table, but because such single table cannot be included in a single page, it is divided into the two tables.

TABLE 12

| Surface No. | Curvature | Lens Thickness | Glass Material | Effective Radius | Lens Size | Note |
|---|---|---|---|---|---|---|
| Liquid Crystal Display Device Surface | | 97 | | | | Distance between lens and LCD device |
| S1 | −350 | 3 | SNPH2_OHARA | 11.7308 | | |
| S2, S3 | 194 | 2 | SLAH58_OHARA | 11.8343 | | Cemented surface |
| S4 | −350 | | | 11.8789 | 25.7578 | |
| | | 1 | | | | Lens distance |
| S5 | 200 | 5 | SLAH58_OHARA | 11.9231 | 25.8462 | |
| S6 | −400 | | | 11.8654 | | |
| | | 1 | | | | Lens distance |
| S7 | 90 | 4 | SLAH58_OHARA | 11.7667 | 25.5334 | |
| S8 | 115 | | | 11.4302 | | |
| | | 110 | | | | Distance between lens and pupil |
| | | 10 | | | | Lens distance |
| S9 | 40.8 | 3 | SLAH58_OHARA | 2.931 | | |
| S10, S11 | −24 | 3.5 | SNPH2_OHARA | 2.9601 | | Cemented surface |
| S12 | −70 | | | 3.0075 | 8.015 | |
| Variable | | 1 | | | | Lens distance |
| S13 | −38 | 5 | SLAH58_OHARA | 2.9937 | | |
| S14, S15 | 23.2 | 3 | SNPH2_OHARA | 3.1501 | | Cemented surface |

TABLE 12-continued

| Surface No. | Curvature | Lens Thickness | Glass Material | Effective Radius | Lens Size | Note |
|---|---|---|---|---|---|---|
| S16 | 98 | | | 3.2234 | 8.4468 | |
| Variable | | 1 | | | | Lens distance |
| S17 | −38 | 5 | SLAH58_OHARA | 6.3685 | | |
| S18, S19 | 30 | 3 | SNPH2_OHARA | 7.1443 | | Cemented surface |
| S20 | 86 | | | 7.4226 | 16.8452 | |
| Variable | | 50 | | | | Lens distance |

TABLE 13

| Surface No. | Curvature | Lens Thickness | Glass Material | Effective Radius | Lens Size | Note |
|---|---|---|---|---|---|---|
| S21 | −60 | 4 | SLAH66_OHARA | 13.5593 | | |
| S22 | −50 | | | 14.2994 | 44.6 | Conic surface: K = −0.235 |
| | | 0.5 | | | | Lens distance |
| S23 | 500 | 3 | SLAH58_OHARA | 14.7214 | | |
| S24 | −125 | | | 14.8457 | 31.6914 | |
| | | 0.5 | | | | Lens distance |
| S25 | 200 | 3 | SNPH2_OHARA | 14.8804 | 31.7608 | |
| S26, S27 | 53 | 5 | SLAH58_OHARA | 14.7602 | | Cemented surface |
| S28 | −198 | | | 14.7108 | | |
| | | 0.5 | | | | Prism distance |
| | | 32 | SLAH58_OHARA | 14.5996 | 32 | Prism or half-mirror |
| | | 0.5 | | | | Prism distance |
| | | 32 | SLAH58_OHARA | 14.0066 | 32 | Prism or half-mirror |
| | | 0.5 | | | | Prism distance |
| | | 32 | SLAH58_OHARA | 15.4218 | 32 | Prism or cubic glass |
| | | 3 | | | | Lens distance |
| S29 | −80 | 3 | SLAH58_OHARA | 15.5415 | | |
| S30 | −60 | | | 15.8653 | 33.7306 | |
| | | 1.5 | | | | Lens distance |
| S31 | −140 | 3 | SLAH58_OHARA | 15.9076 | | |
| S32 | 160 | | | 16.1997 | 34.3994 | |
| | | 4 | | | | Lens distance |
| S33 | −80 | 3 | SLAH58_OHARA | 16.509 | | |
| S34, S35 | −61 | 3 | SNPH2_OHARA | 16.9972 | | Cemented surface |
| S36 | −79.5 | | | 17.7256 | 37.4512 | |
| | | 57 | | | | Lens distance |
| S37 | −80 | 6 | SNPH2_OHARA | 28.4376 | | |
| S38, S39 | −52 | 3 | SLAH58_OHARA | 29.0976 | | Cemented surface |
| S40 | −80 | | | 30.7272 | 60 | |
| | | 2.19623 | | | | Lens distance |
| Light Emitting Picture Plane G: | INFINITY | 0 | | | | |

Here is used a lens of which S22 surface (the image plane side surface of lens LAB) is a conic one having a conic constant of −0.235, and a 5-time zoom mechanism of which NA is made up to 0.025 is realized.

Note that in the foregoing tables, to specify the glass materials, the notation "product name (code name) maker name" is used. The refractive indexes of each glass materials are shown in Table 14. Among those glass materials, SLAH66 is used as a glass material that can be fabricated in an aspheric form with ease.

TABLE 14

| | | | Refractive Index for Each Wavelength | | | | | | | | |
|---|---|---|---|---|---|---|---|---|---|---|---|
| | Product Name | 1014 | | | | | | | | | |
| MAKER | CODES | nm | 852.1 nm | 706.5 nm | 656.3 nm | 587.6 nm | 546.1 nm | 486.1 nm | 435.8 nm | 404.7 nm | 365 nm |
| SCHOTT | F2 | 1.60279 | 1.60671 | 1.61227 | 1.61503 | 1.62004 | 1.62408 | 1.63208 | 1.64202 | 1.65064 | 1.66623 |
| SCHOTT | SK11 | 1.5533 | 1.55597 | 1.55939 | 1.56101 | 1.56384 | 1.56605 | 1.57028 | 1.5753 | 1.57946 | 1.58653 |
| HOYA | TAFD5 | 1.81445 | 1.81928 | 1.82594 | 1.82919 | 1.853 | 1.83962 | 1.84862 | 1.85955 | 1.86881 | 1.88494 |
| HOYA | FCD1 | 1.49008 | 1.49182 | 1.49408 | 1.49514 | 1.497 | 1.49845 | 1.50123 | 1.50451 | 1.50721 | 1.51175 |
| HOYA | EFDS1 | 1.88185 | 1.89064 | 1.90366 | 1.91038 | 1.92286 | 1.93323 | 1.95457 | 1.98281 | 2.0092 | 2.06216 |
| HOYA | TAC8 | 1.71407 | 1.71788 | 1.72279 | 1.7251 | 1.72916 | 1.73234 | 1.73844 | 1.74571 | 1.75176 | 1.76205 |
| HOYA | TAF3 | 1.78551 | 1.79001 | 1.79607 | 1.799 | 1.8042 | 1.80831 | 1.8163 | 1.82595 | 1.83408 | 1.84819 |
| SCHOTT | SF59 | 1.90974 | 1.91856 | 1.93218 | 1.93927 | 1.9525 | 1.96349 | 1.98604 | 2.01557 | 2.04269 | 2.09604 |
| HOYA | TAF5 | 1.79722 | 1.80172 | 1.8078 | 1.81074 | 1.816 | 1.82017 | 1.82827 | 1.83801 | 1.84619 | 1.86034 |
| OHARA | SNPH2 | 1.87807 | 1.88758 | 1.90181 | 1.90916 | 1.92286 | 1.93429 | 1.95799 | 1.98972 | 2.01976 | 2.08215 |
| HOYA | TAFD30 | 1.8606 | 1.86576 | 1.87299 | 1.87657 | 1.883 | 1.88814 | 1.89821 | 1.91045 | 1.92081 | 1.93892 |

TABLE 14-continued

<table>
<tr><td colspan="11">Refractive Index for Each Wavelength</td></tr>
<tr><td>Product Name</td><td>1014 nm</td><td></td><td></td><td></td><td></td><td></td><td></td><td></td><td></td><td></td></tr>
<tr><td>MAKER CODES</td><td></td><td>852.1 nm</td><td>706.5 nm</td><td>656.3 nm</td><td>587.6 nm</td><td>546.1 nm</td><td>486.1 nm</td><td>435.8 nm</td><td>404.7 nm</td><td>365 nm</td></tr>
<tr><td>HOYA TAFD10</td><td>1.79597</td><td>1.80063</td><td>1.80695</td><td>1.81002</td><td>1.8155</td><td>1.81986</td><td>1.82833</td><td>1.8386</td><td>1.84727</td><td>1.86235</td></tr>
<tr><td>OHARA SLAH58</td><td>1.86054</td><td>1.86572</td><td>1.87298</td><td>1.87656</td><td>1.883</td><td>1.88815</td><td>1.89822</td><td>1.9105</td><td>1.92092</td><td>1.93917</td></tr>
<tr><td>OHARA SLAH66</td><td>1.75541</td><td>1.7596</td><td>1.76514</td><td>1.7678</td><td>1.7725</td><td>1.77621</td><td>1.78337</td><td>1.79197</td><td>1.79917</td><td>1.81158</td></tr>
</table>

Figure 12A:
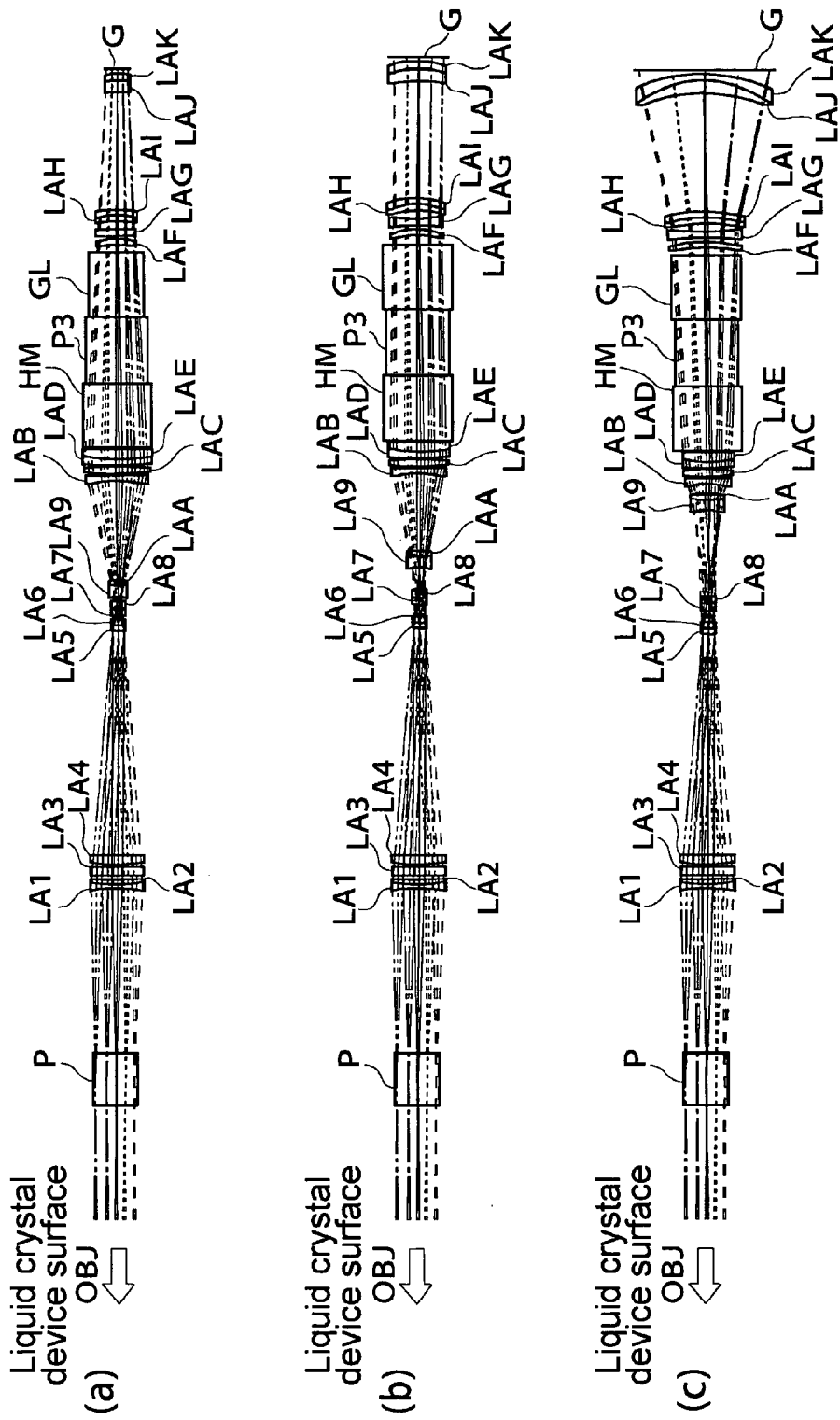
FIG. 12A is an optical path drawing when the field angle of a zoom optical system used in an embodiment of the present invention is varied. (a) corresponds to a field angle of 18.5 mm; (b) corresponds to a field angle of 31.92 mm; (c) corresponds to a field angle of 63.13 mm.

FIG. 12A shows the zoom statuses of such optical system: (a) is the status when the field angle size is 18.5 mm; (b) is the status when the field angle size is 31.92 mm; (c) is the status when the field angle size is 63.13 mm. In FIG. 12A, LA1-LAK denote lenses; P denotes an R-G-B three color multiplexer; HM denotes a half mirror; P3 denotes a total reflection prism; GL denotes an optical path length adjusting glass. Note that with respect to the half mirror and the total reflection prism, for convenience of description, the optical path is illustrated as if the light path was not folded and the light traveled straight.

Figure 12B:
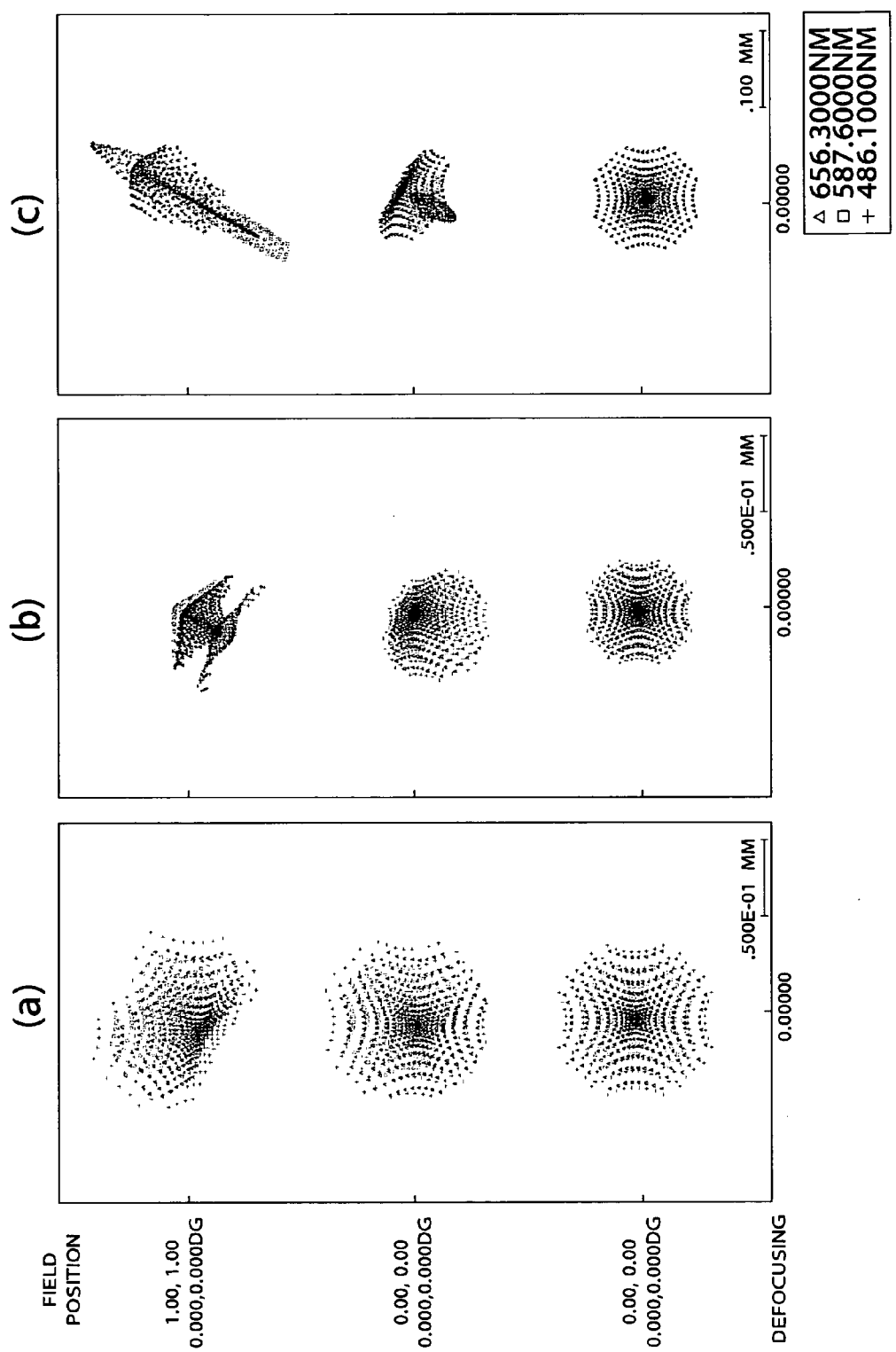
FIG. 12B is a spot diagram output drawing regarding the zoom optical system shown in FIG. 12A.

Each of the combinations of lenses LA1 and LA2, lenses LA5 and LA6, lenses LA7 and LA8, lenses LA9 and LAA, lenses LAD and LAE, lenses LAH and LAI, and lenses LAJ and LAK is a cemented lens, and with the positions of the cemented lens combination of LA7 and LA8 and the cemented lens combination of LA9 and LAA being adjusted, the zoom system is realized. FIG. 12B shows as before the spot diagrams of the lateral aberration and the chromatic aberration, and (a), (b), and (c) respectively correspond to (a), (b), and (c) of FIG. 12A.

Figure 12C:
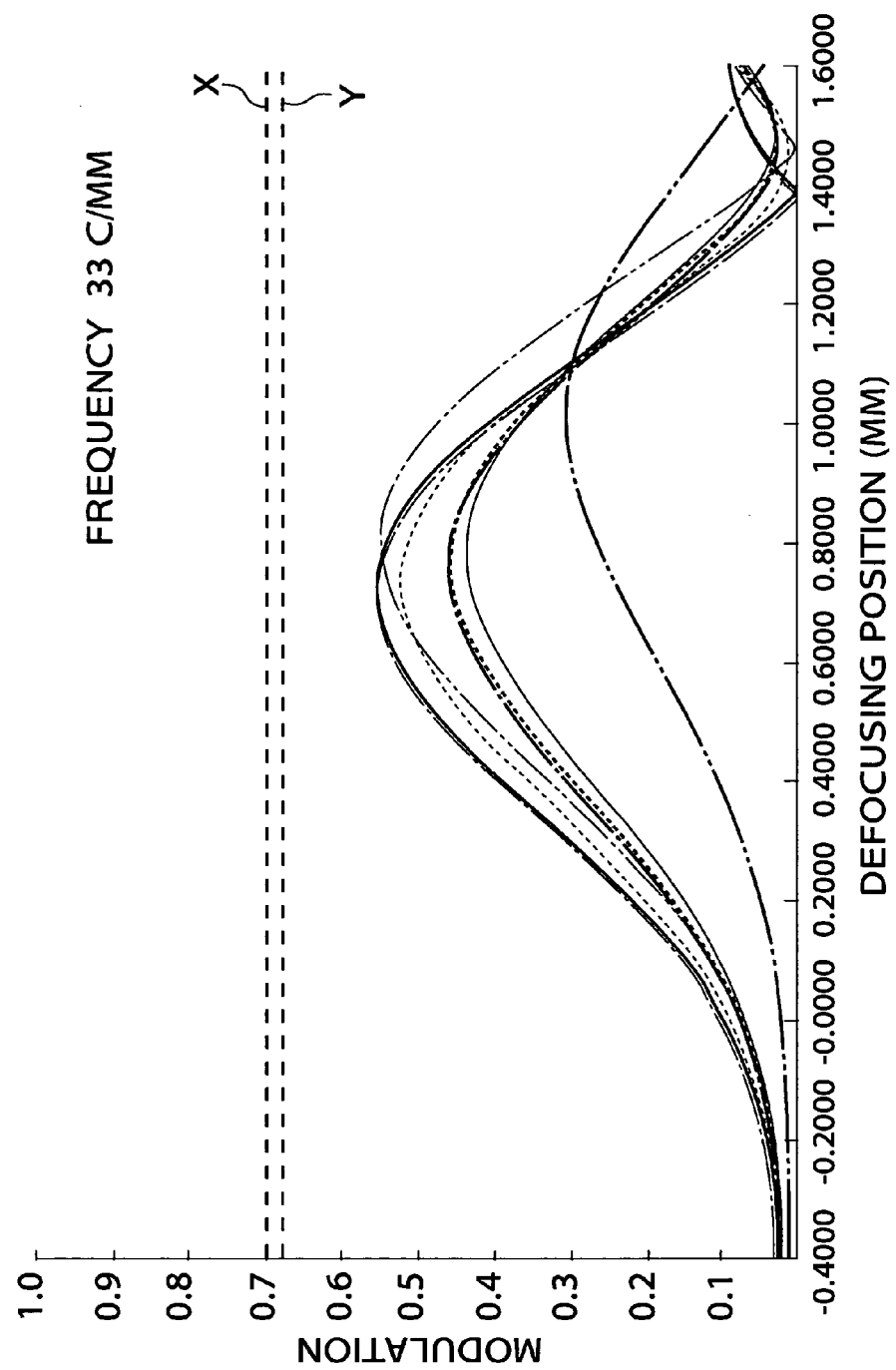
FIG. 12C is a drawing showing the MTF in the state of (a) of FIG. 12A.
Figure 12D:
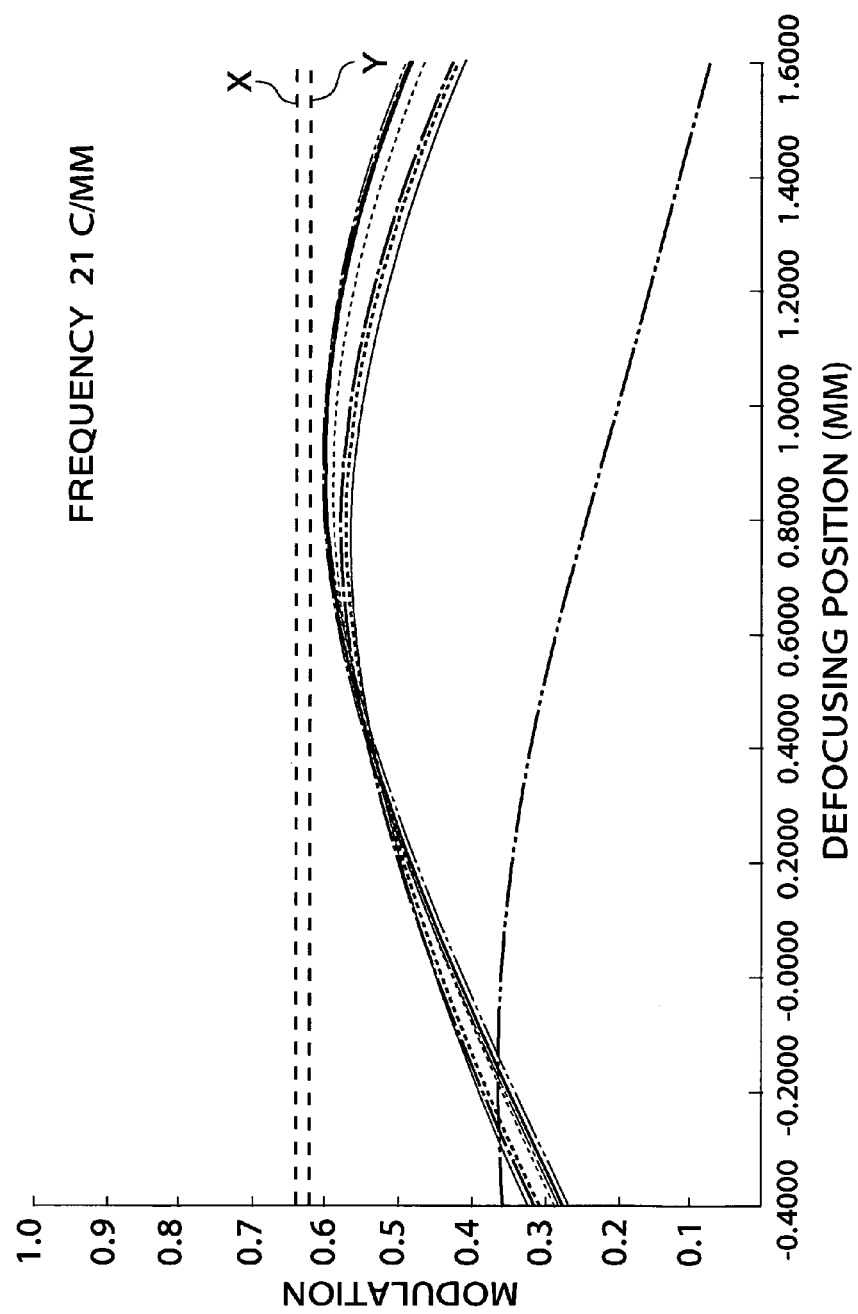
FIG. 12D is a drawing showing the MTF in the state of (b) of FIG. 12A.
Figure 12E:
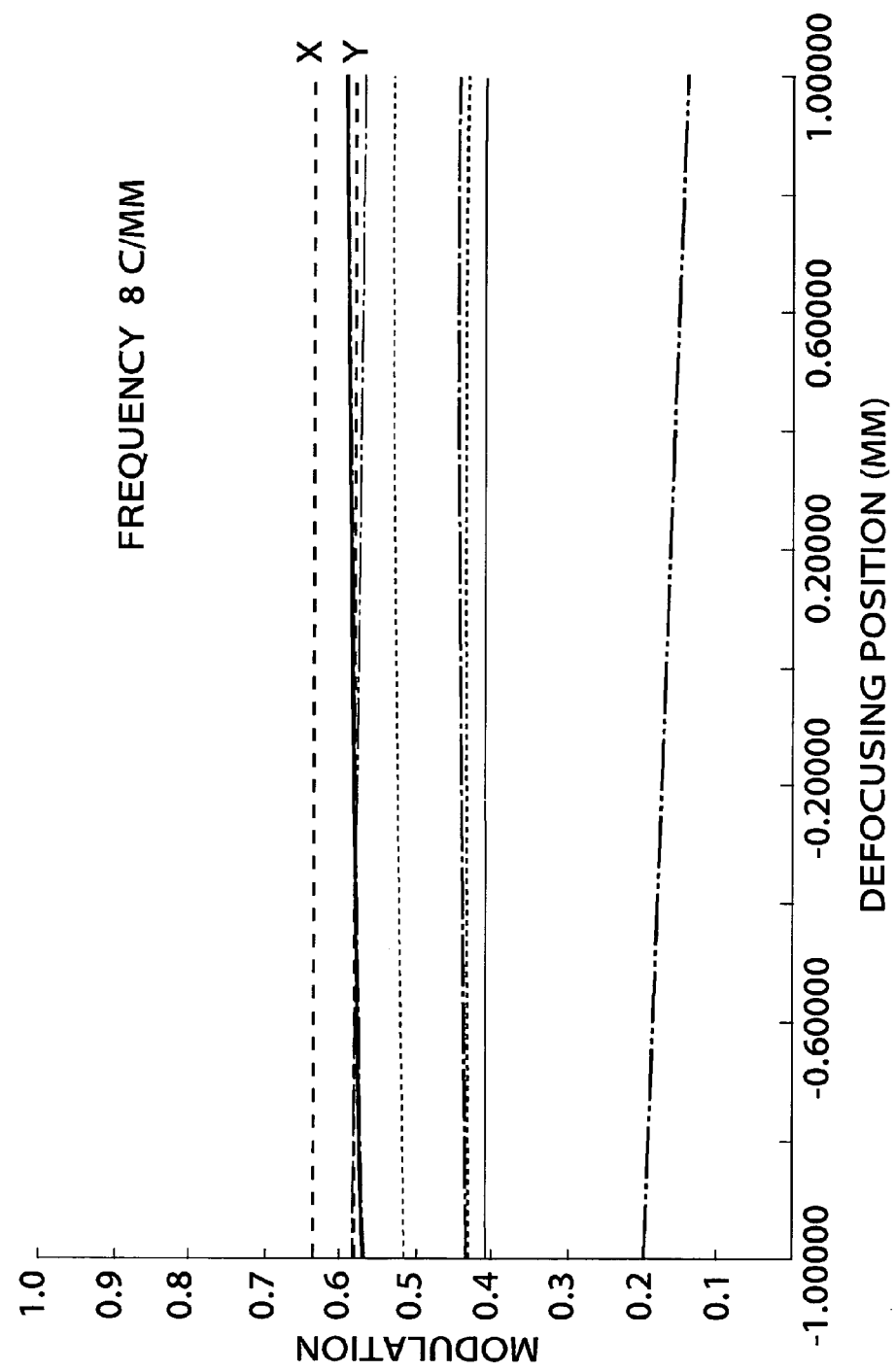
FIG. 12E is a drawing showing the MTF in the state of (c) of FIG. 12A.

In FIGS. 12C, 12D, and 12E are shown MTFs on an image height-by-image height basis when the focus position is altered. FIG. 12C shows the MTF change of the case in which an optical system using the zoom optical system shown in FIG. 12A and the fifth embodiment eyepiece lens is used and the focus position is varied. The simulation condition thereof is that the spatial frequency of the object side image is 33 cycles/mm, the NA is 0.025, and the field of view direction is 18.5 degrees. X shows the ideal MTF change (resolution limit) in the case where the optical system is aberration free and the light intensity changes in the direction perpendicular to the image height direction; Y shows the ideal MTF change (resolution limit) in the case where the optical system is aberration free and the light intensity changes in the same direction as the image height direction. And, the thin dotted line represents the MTF in the X-direction (the direction perpendicular to the image height direction) in the case of 0.25 image height; the thick dotted line represents the MTF in the Y-direction (the direction parallel to the image height direction) in the case of 0.25 image height; the thick solid line represents the MTF in the X-direction (the direction perpendicular to the image height direction) in the case of 0.5 image height; the thin solid line represents the MTF in the Y-direction (the direction parallel to the image height direction) in the case of 0.5 image height; the thin dashed line represents the MTF in the X-direction (the direction perpendicular to the image height direction) in the case of 0.75 image height; the thick dashed line represents the MTF in the Y-direction (the direction parallel to the image height direction) in the case of 0.75 image height; the thin chain double-dashed line represents the MTF in the X-direction (the direction perpendicular to the image height direction) in the case of 1.0 image height; the thick chain double-dashed line represents the MTF in the Y-direction (the direction parallel to the image height direction) in the case of 1.0 image height. Note that the horizontal axis scale represents the distance from an appropriate reference position.

Similarly, the simulation condition of FIG. 12D is that the spatial frequency of the object side image is 21 cycles/mm, and the field of view direction is 31.92 degrees; and the meanings of the lines are the same as in FIG. 12C. Further, the simulation condition of FIG. 12E is that the spatial frequency of the object side image is 8 cycles/mm, and the field of view direction is 60.13 degrees; and the meanings of the lines are the same as in FIG. 12C. Note that the NA is 0.025 in both of FIGS. 12D and 12E.

As can be seen from the above, by altering the focus position, there can be found a position at which the MTF value is more than 0.3 at every image height. In this regard, experience shows that when the MTF value is more than 0.3, a sufficient resolution can be obtained in viewing images. Thus, it can be seen that in the eighth embodiment zoom optical system, a sufficient resolution is obtained for every image height.

Those things are summarized in FIG. 12F, and the evaluation frequencies are determined therein based on the above-described liquid crystal device size and the person having an eyesight of 1.0 who can recognize the gap of 1.5 mm C letter located at a distance of 5 m.

Figure 12G:
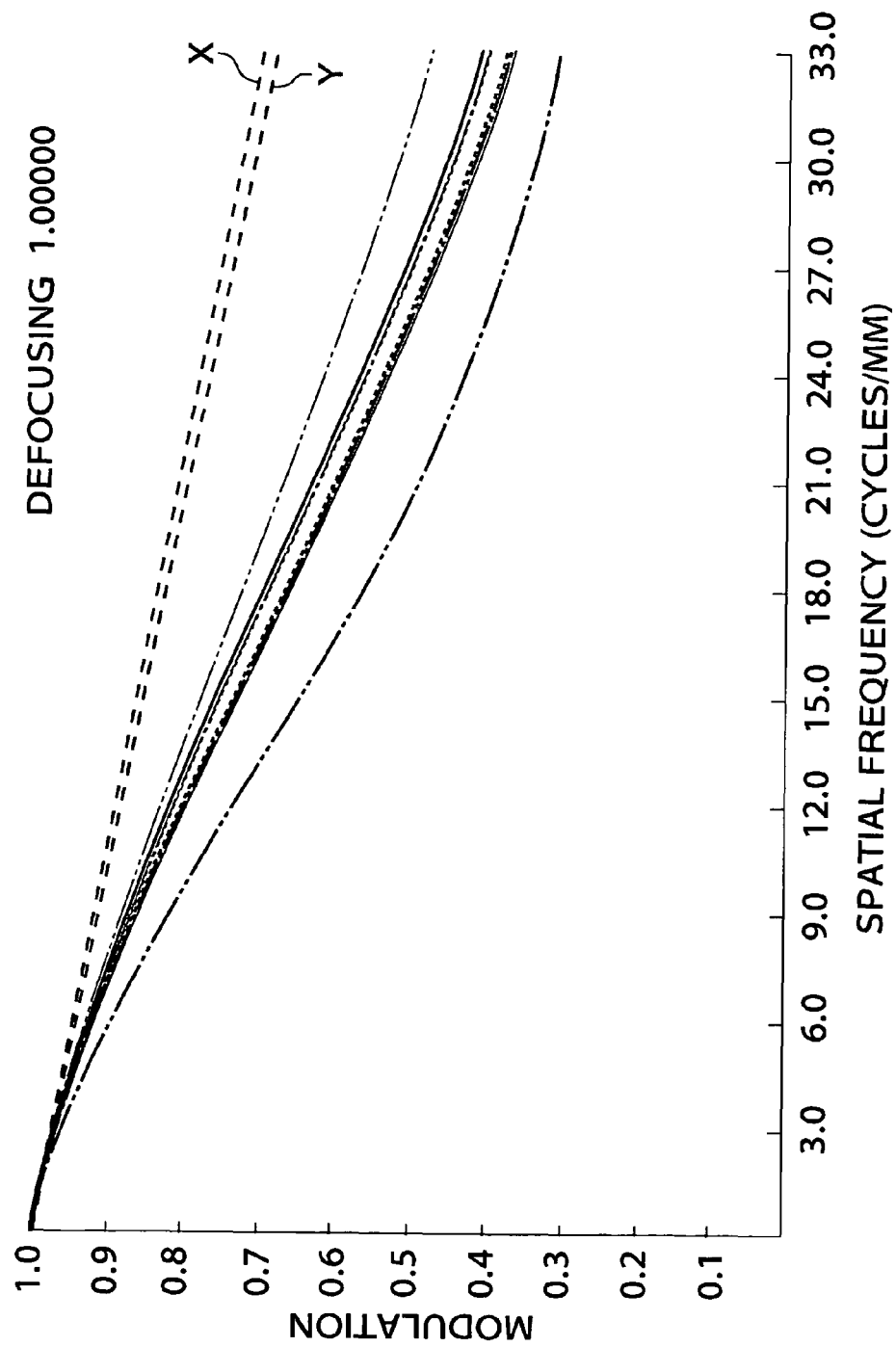
FIG. 12G is a drawing showing each MTF of the zoom optical system shown in FIG. 12A at each frequency starting from an evaluation frequency, when the zoom optical system has a field of view angle of 18.50 degrees.
Figure 12H:
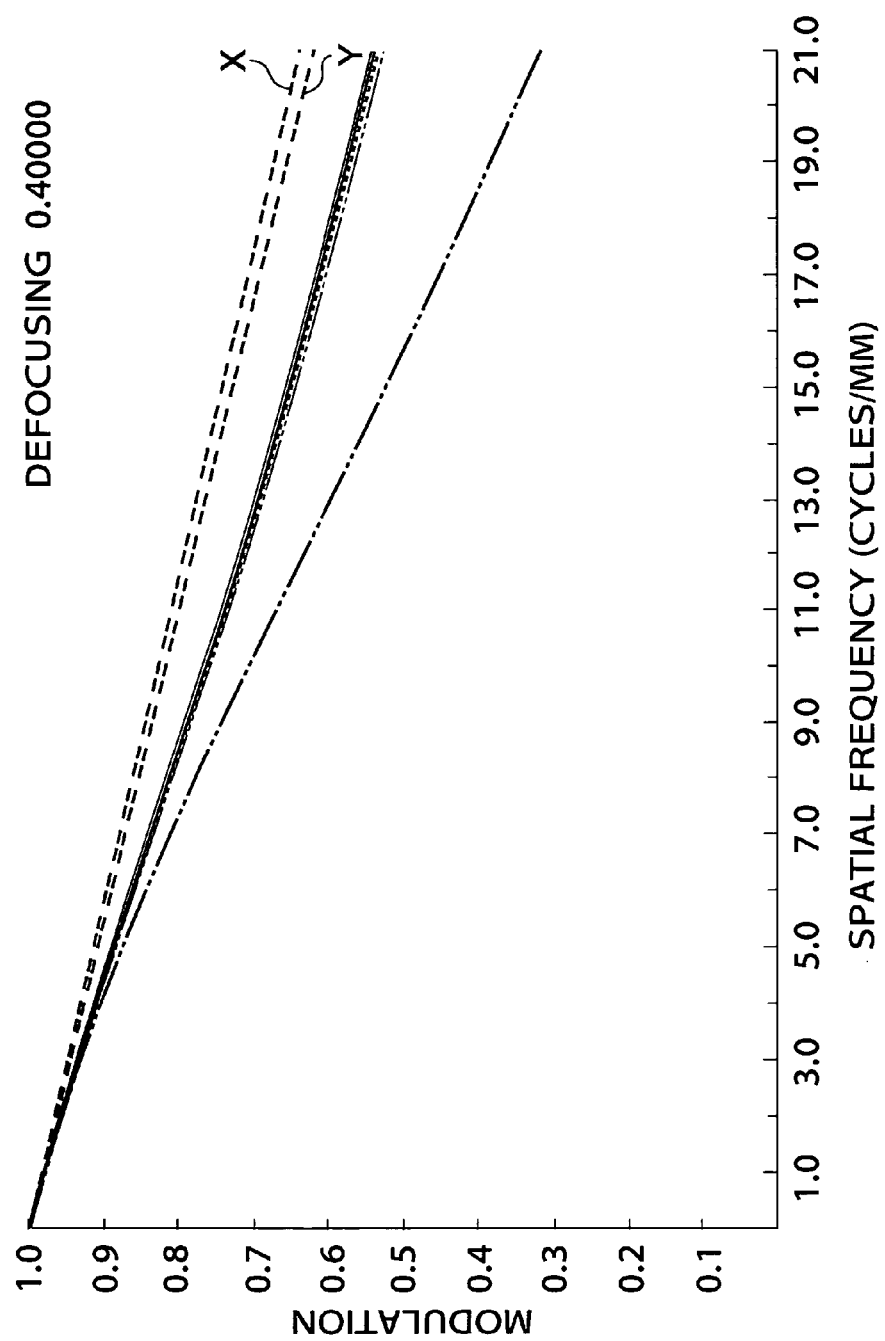
FIG. 12H is a drawing showing each MTF of the zoom optical system shown in FIG. 12A at each frequency starting from an evaluation frequency, when the zoom optical system has a field of view angle of 31.92 degrees.

Referring to FIG. 12F, in the case of the field of view angle of 18.5 degrees (condition 1), the MTF is, even in the case of 1.0 image height, 31.5, which exceeds 30%. Also, in the case of the field of view angle of 31.92 degrees (condition 6), the MTF is, even in the case of 1.0 image height, 31.1, which exceeds 30%. When the field of view angle is more than 34.28 degrees, the MTF in the case of 1.0 image height becomes less than 30%; however, as a matter of course and as described above, at the time of look-around eye action, the field of view angle is more than 45 degrees, which exceeds the effective lens diameter, and thus images cannot be observed directly. Since it is known that the human eye's eyesight decreases significantly at the regions other than the field of view center region, it is configured such that relative to the aberrations of more than 45% that is to be marginal images, the aberrations of the image heights of 0 to 0.5 are set to be more than 40%. Further, while FIG. 12G and FIG. 12H show the MTFs relative to each evaluation frequencies in the case of 18.50 degree field of view angle and in the case of 31.92 degree field of view angle, respectively, the stable frequency characteristics are obtained, with the conic surface being used and with the chromatic aberration correcting lens being used in the vicinity of the screen.

Figure 13A:
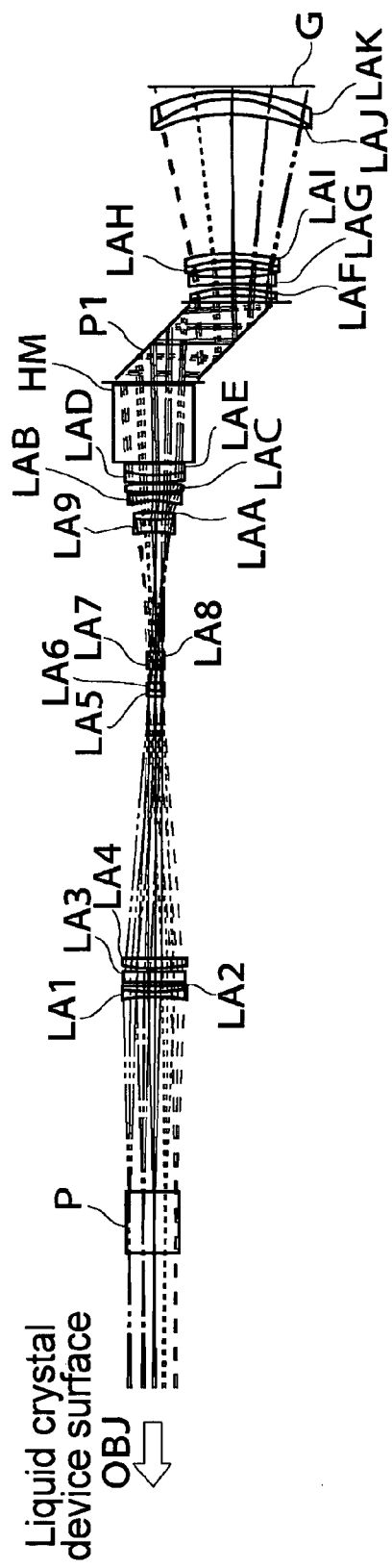
FIG. 13A is a drawing showing an example in which the zoom optical system shown in FIG. 12A is arranged for one eye use.
Figure 13B:
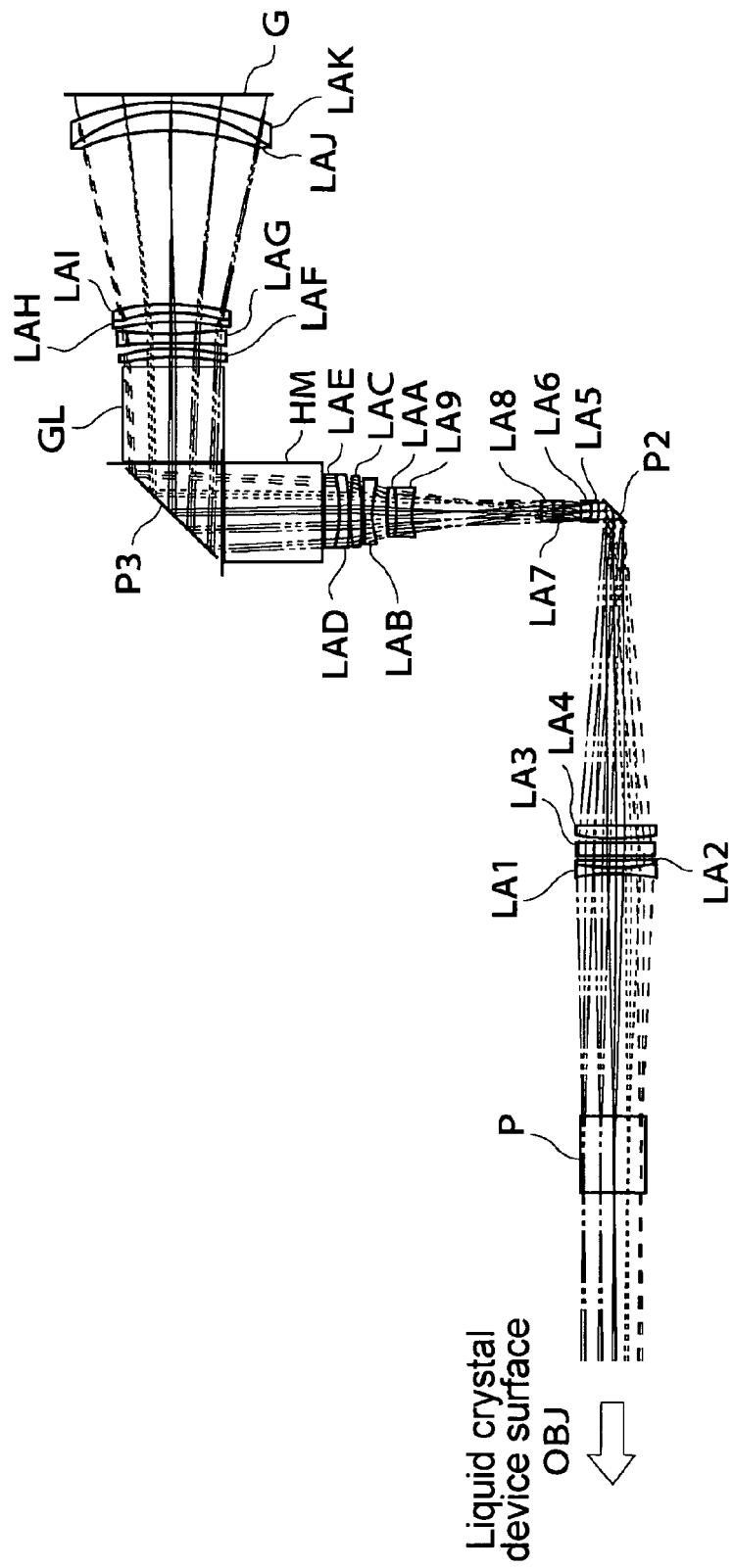
FIG. 13B is a drawing showing an example in which the zoom optical system shown in FIG. 12A is arranged for the other eye use.
Figure 13C:
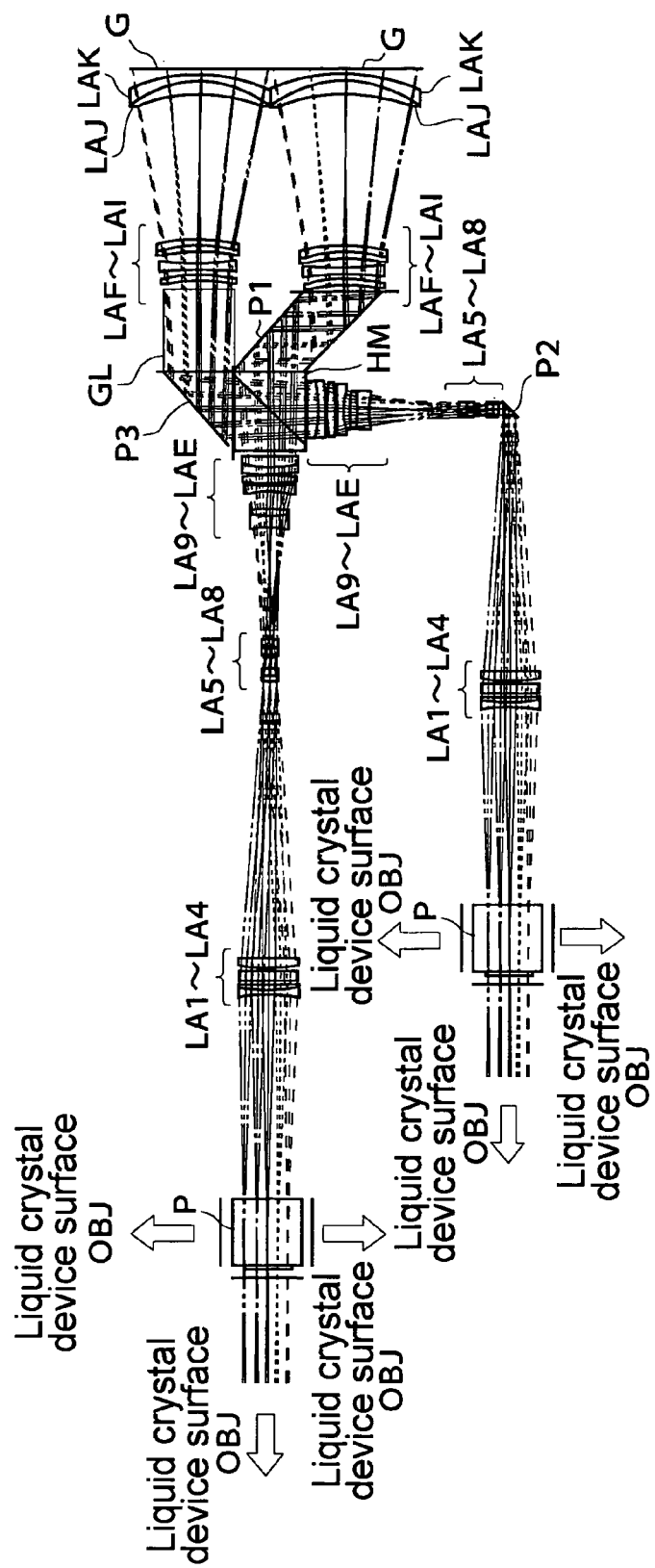
FIG. 13C is a drawing showing the arrangement in which the zoom system shown in FIG. 13A and the zoom optical system shown in FIG. 13B are combined to be used for both eyes use.
Figure 13D:
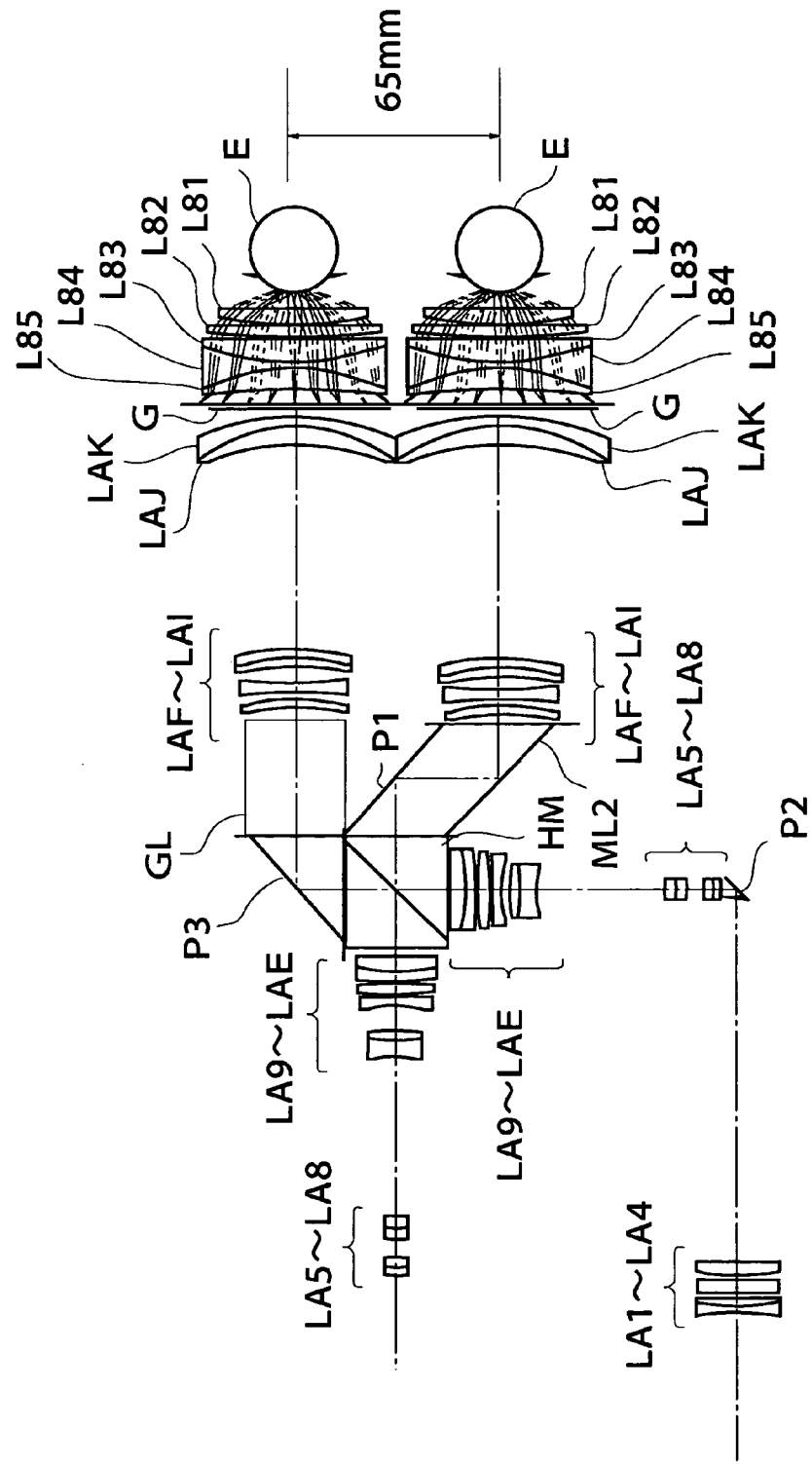
FIG. 13D is a drawing showing the entire arrangement in which eyepiece optical systems are combined with the zoom system shown in FIG. 13C.

While the eighth embodiment of the present invention has been described using FIGS. 12A-12H in the above, in FIGS. 13A-13C is shown an outline configuration drawing in which, in connection with the image display device for both eyes shown in FIG. 25, the zoom optical system of the eighth embodiment of the present invention is applied to zoom optical systems 152X and 152Y; in FIG. 13D is shown an example implementing the configuration shown in FIG. 25, by using the eyepiece lens of the fifth embodiment of the present invention, the zoom optical systems 152X and 152Y (of which configuration is partially omitted) of the eighth embodiment of the present invention, two-dimensional image output devices 150X and 150Y, and screens 149L and 149R coated, in a clean room, with abrasive grains of which grain diameter is precisely controlled with micron-grade.

In FIG. 13A, the eighth embodiment zoom optical system is folded and is made a zoom optical system for the left eye output use; in FIG. 13B, the eighth embodiment zoom optical system is folded and is made a zoom optical system for the right eye output use. When those systems are combined, the mechanism, as shown in FIG. 13(*c*), that provides different images to both eyes results; and when half prism or half mirror HM is used as the dividing/combining optical system, the center high resolution image information supplying image and the marginal information supplying image, each having mutually different sizes, can be simultaneously outputted to both eyes, with the magnification of the zoom optical system shown in FIG. 13A and the magnification of the zoom optical system shown in FIG. 13B being made different from each other.

In those figures, P1, P2, and P3 are total reflection prisms; with respect to total reflection prism P1, the light beams are reflected twice, and the resultant optical axis is parallel to the original optical axis. With respect to total reflection prisms P1 and P2, the optical path is deflected by 90 degrees. Optical path length adjusting glass GL adjusts the optical path differences between the light beams that pass through prism P1 and the light beams that pass through prism P3 and is for making it possible to form the optical systems for both eyes by the same optical system. Further, as shown in FIG. 13C, R-G-B three color multiplexer prism P is for combining the lights from three liquid crystal devices, each for each of the colors of R, B, and G and sending the combined light, as a single light, into the optical system.

All of the binocular type optical systems have a structure in which relative to the reflecting surface of the above-described half mirror or half prism HM, the optical path lengths are the same; the maximum image size on light emitting picture plane G is 65 mm; and there are the same number of reflecting surfaces. Accordingly, a space saving configuration is realized, and also a configuration that facilitates commonality of components and provision of common images to both eyes is realized. FIG. 13D shows an outline of the entire optical system made by combining the optical system shown in FIG. 12C and the optical system shown in FIG. 8. In FIG. 13D, E denotes eyeballs.

The above-described configuration of FIG. 13D brings about new effects when viewing the same image with both eyes. With respect to the device, like this one, that projects independent screen images to both eyes by means of eyepiece lenses, distortions occurring on the right side and the left side can be made to follow the same condition by making the optical center distance between each of the eyepiece lenses coincide with the eye-width, and thus, the sense of discomfort and the eyestrain caused when viewing different images with both eyes can be completely removed. However, because the human eye-width differs in individuals, ranging from about 5.5 cm to 7.5 cm, the distance between the right side and left side overall optical systems ranging from the liquid crystal display devices to the eyepiece optical systems is preferably changed to meet the observer's eye-width. When only a part of the optical systems is moved or when the image output position is electrically changed, the aberration conditions on the left and right sides differ from each other, resulting in different images, and thus the sense of discomfort and the eyestrain caused when viewing different images with both eyes cannot be fully removed.

Figure 13E:
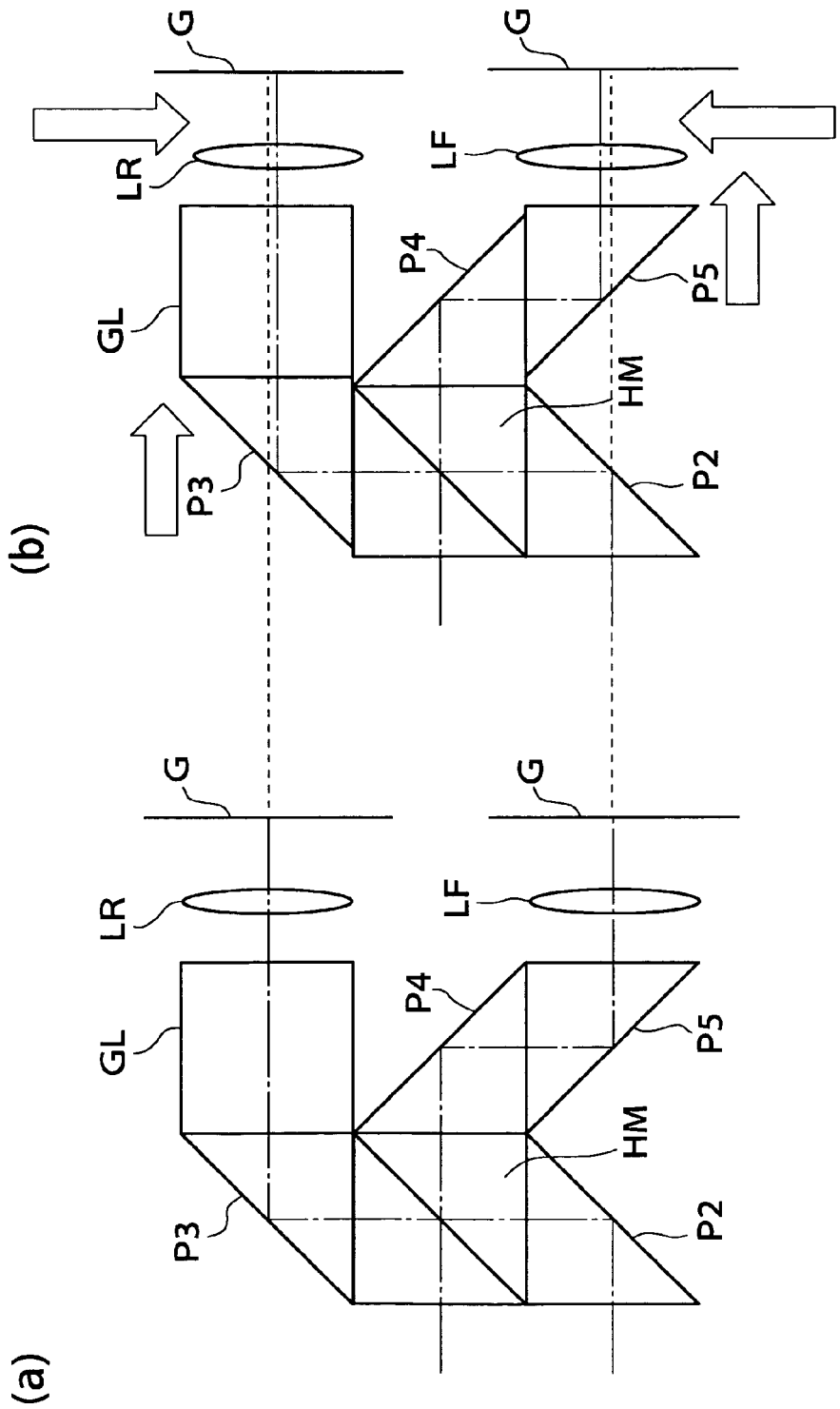
FIG. 13E is a drawing showing an example of an optical system for adjusting the optical system to the eye-width, without the optical length being changed.

FIG. 13E shows a configuration example of an optical system that resolves such problems. In this configuration, the total reflection prism P1 shown in, e.g., FIG. 13C is divided into the two total reflection prisms P4 and P5. Further, it is configured such that total reflection prism P2 and half prism or half mirror HM are fixed; total reflection prism P3 and optical path difference adjusting glass GL can be moved as an integral unit in the right and left directions of the drawing; and total reflection prism P5 can also be moved in the right and left directions of the drawing. LR denotes in a simplified manner the right eye-use optical system; LL the left eye-use optical system. As clearly seen from comparative reference to (a) and (b) of the figure, when total reflection prism P3 and optical path difference adjusting glass GL are moved as an integral unit in the right and left directions of the drawing, the optical length up to the right eye-use optical system LR does not change, and only the optical axis position can be changed (in the up and down directions of the drawing). Further, when total reflection prism P5 is moved in the right and left directions of the drawing, the optical length up to the left eye-use optical system LL does not change, and only the optical axis position can be changed (in the up and down directions of the drawing).

Figure 14:
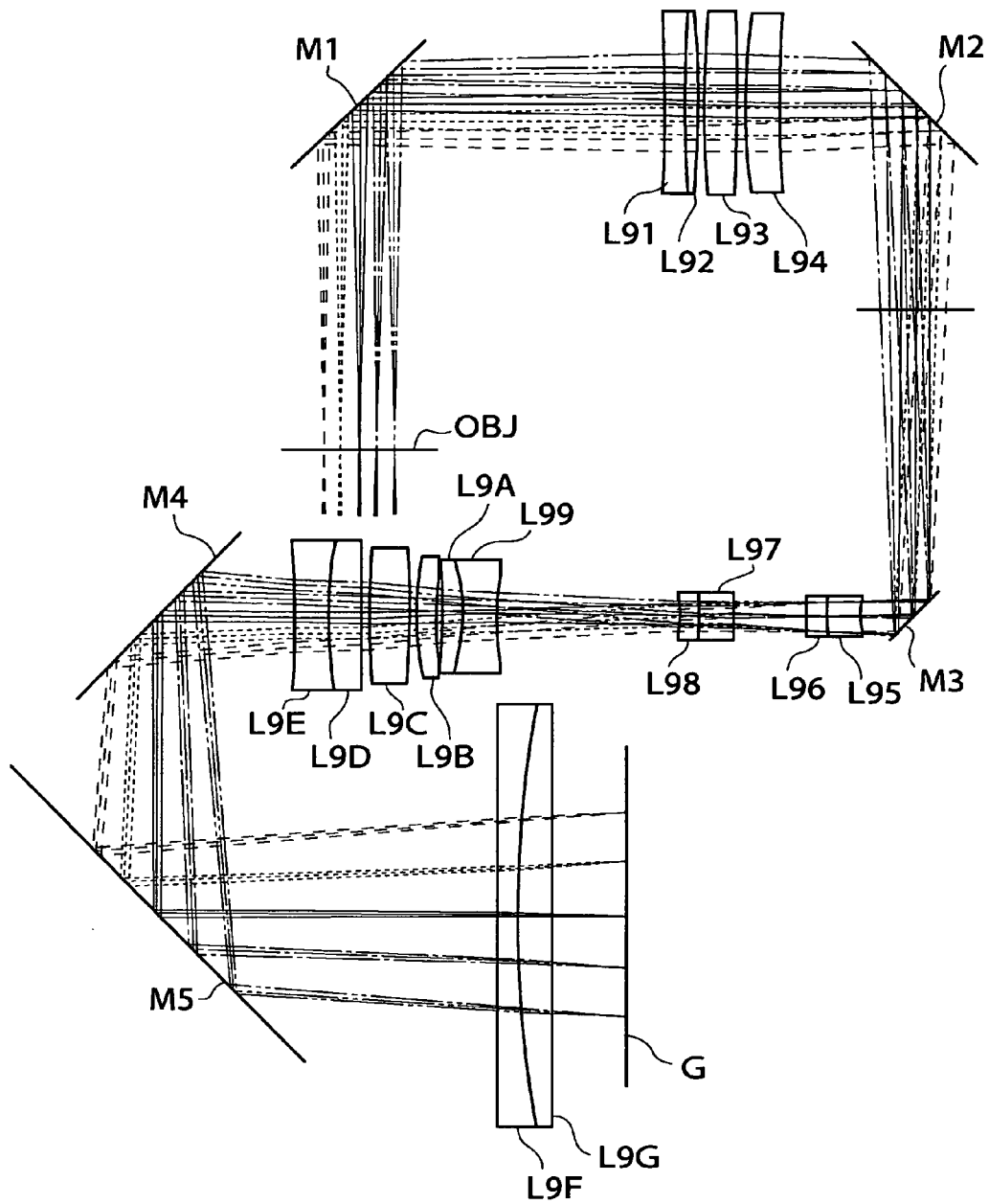
FIG. 14 is an optical path side view showing an example in which the zoom optical system shown in FIG. 9A is arranged in a folding manner so that the zoom optical system is accommodated in a compact manner.

While in FIG. 13D, the optical system is illustrated in a simplified manner for the purpose of understandability, a mechanism having a total optical path length of no less than 350 mm cannot be adopted as an actual image display device, and thus it is desirable that the optical system is folded as much as possible to be accommodated in a small space. So, in FIG. 14 is shown an example in which an optical system of the present invention is accommodated in a small space by using reflecting mirrors M1, M2, M3, M4, and M5. While this optical system is the seventh embodiment zoom optical system shown in FIG. 9A, it is needless to say that even with respect to the eighth embodiment zoom optical system, such configuration can be adopted. It is to be noted that while with respect to each of the reflecting mirrors M1-M5, there are two ones, each for the right or left eye, only one of the two is illustrated here for the sake of simplicity because the two exist in the same position but are displaced in the direction perpendicular to the plane of the drawing.

Figure 15:
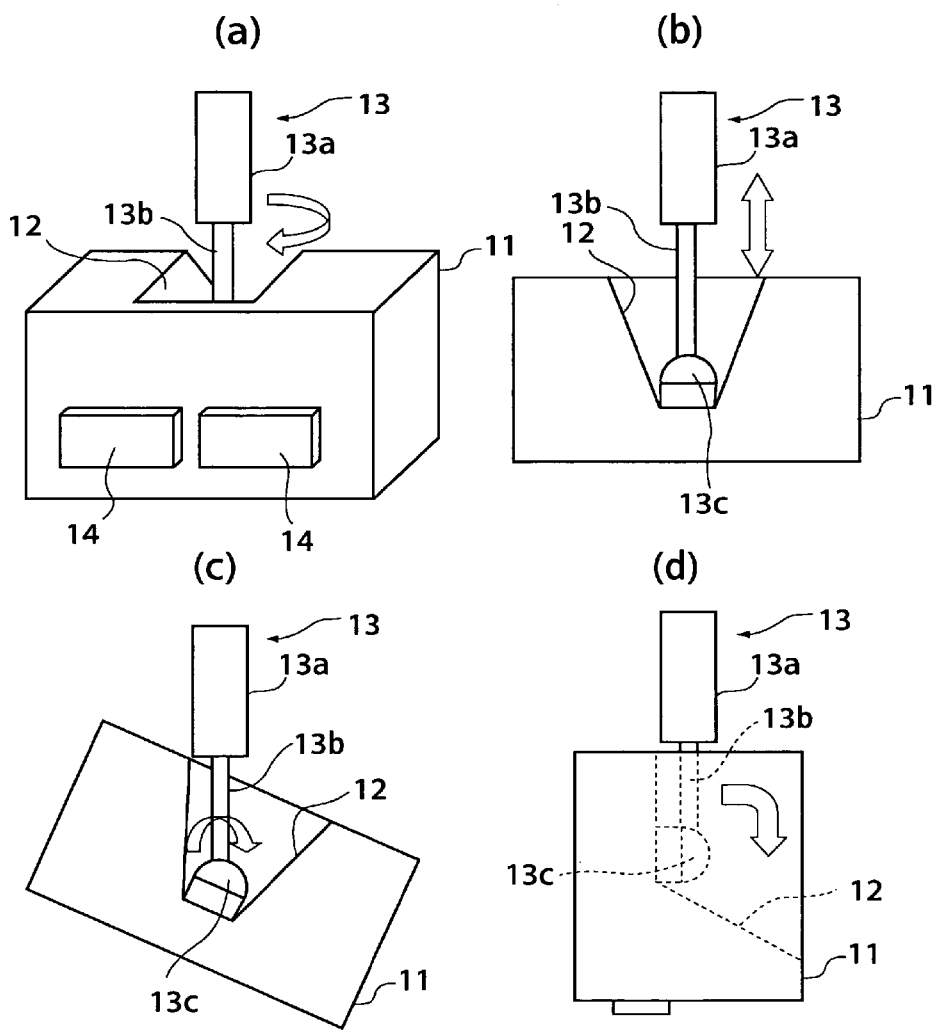
FIG. 15 is an outline drawing showing a holding mechanism for the display portion, an embodiment of the present invention.
Figure 16:
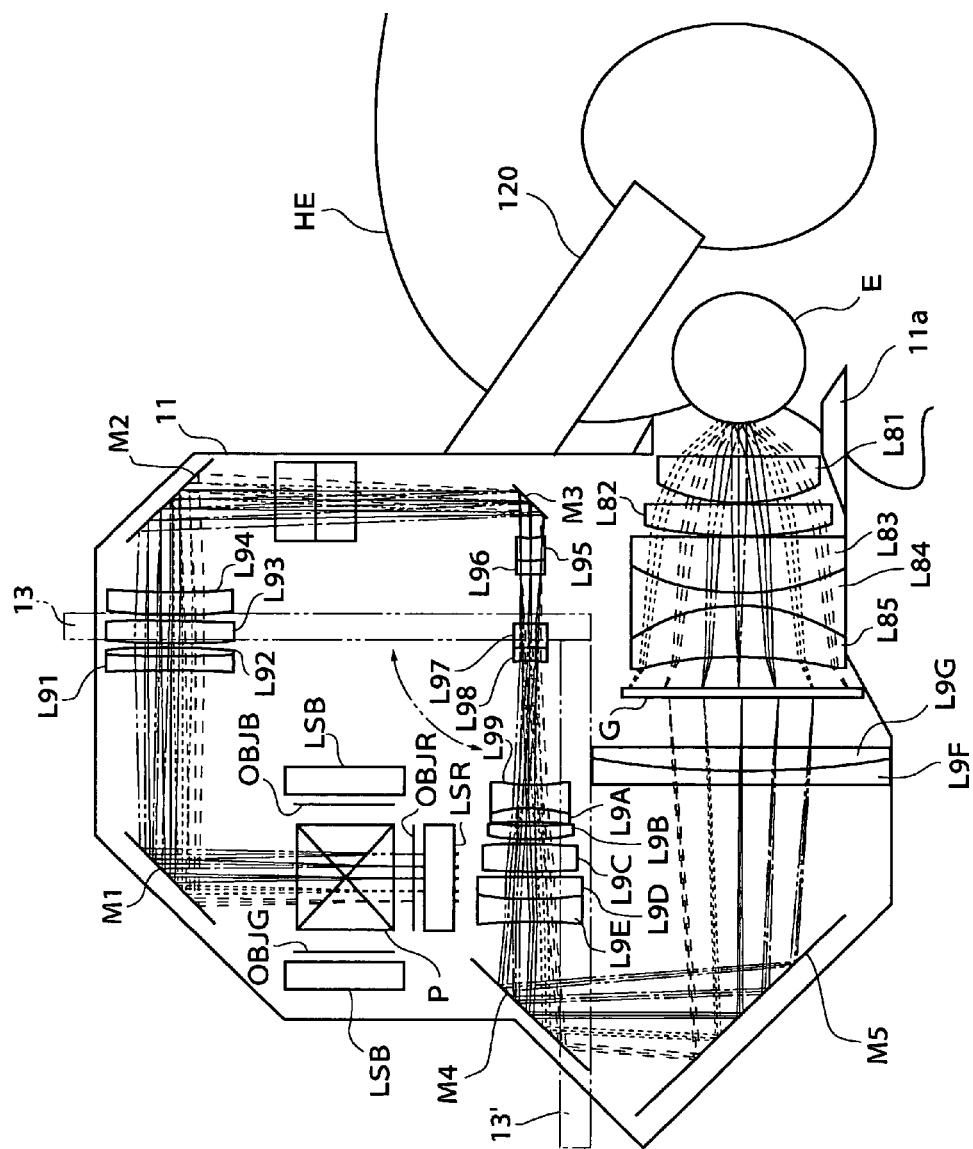
FIG. 16 is a drawing showing an example of the arrangement of the optical path parts where the optical system shown in FIG. 14 is accommodated in a case to be mounted on the face.

The reason that the optical system is, as shown in FIG. 14, folded to be accommodated in a small space is that it was required that the optical system is housed in box 11 as shown in FIG. 15. As described earlier, if liquid crystal display devices having a low resolution are utilized in an embodiment of the present invention, the liquid crystal display devices are to be recognized by the eye in the case of a movie theater class screen, and the sense of reality will be lost. Thus, when an image quality equal to or higher than that of a projector is to be obtained, it is indispensable to introduce the technology in which, as shown in FIG. 16, three liquid crystal display devices (OBJG, OBJR, OBJB), each prepared for each of the colors of GRB, having a dot resolution matrix of 1980 by 1024 or more (1980 by 760 matrix adapted to 19:9 is also available), called SXGA, are respectively and separately illuminated by the green illumination system LSG, the red illumination system LSR, and the blue illumination system LSB; and three color images, each of which corresponds to each color, are separately formed and then combined together to triple the resolution. In addition, when a wide field of view angle image is to be obtained, heavy and complicated system is necessarily to be introduced, also from the optics standpoint. If those requirements are prioritized, both the size and the weight of the resultant image display device necessarily become impermissible for an eyeglass type display or a head mount type display.

Figure 23:
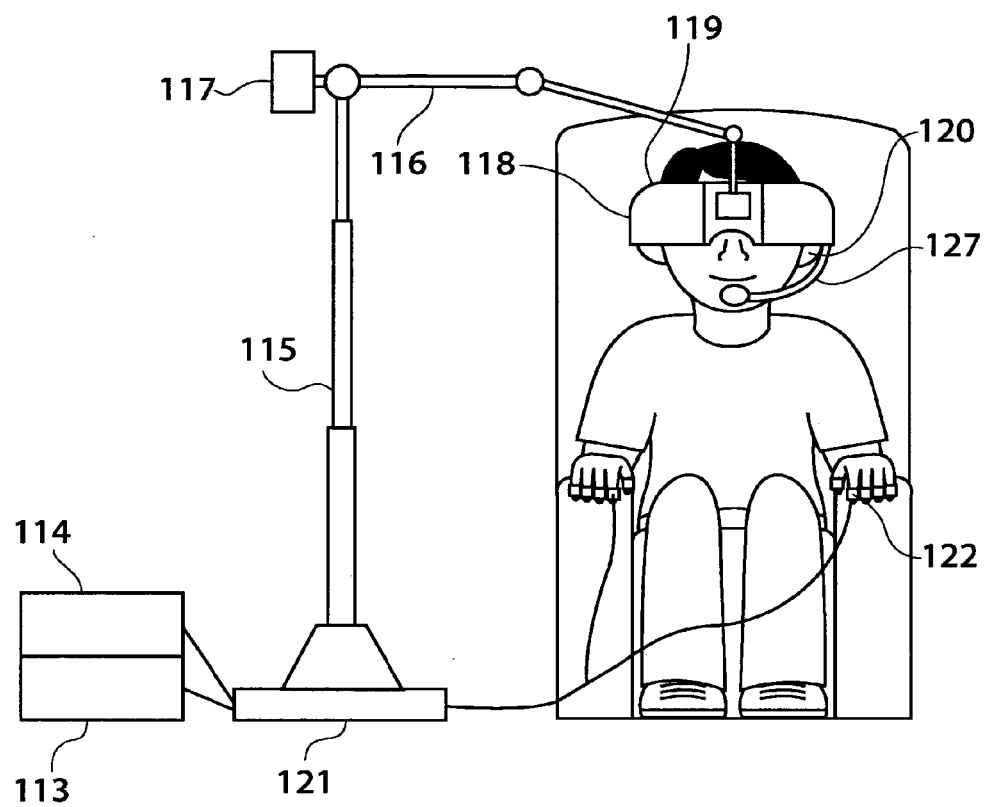
FIG. 23 is a schematic diagram showing the state in which an image display device, an embodiment of the present invention, is used in a sitting posture.

Therefore, in the embodiments of the present invention, a floorstanding type display having a wide field of view angle, as shown in FIG. 23, is adopted. Fixing the display on a chair or on a bed may also be permissible; however, in view of, e.g., being able to readily moving the display at home, this floorstanding type is thought to be most appropriate. However, with respect to a fixed display, the face position cannot be changed with ease, and with the face being fixed, one suffers new fatigue. To address this problem, this mechanism is configured such that the display can be moved to a desired position in accordance with the face position, in a manner that the face is covered with a fit elastic member provided on the optical member and with earphone 120 supported by a leaf spring. This mechanism is connectable with, e.g., a DVD, a video player, or TV image output machine 114, and is, as with the conventional projector, also connectable with, e.g., a personal computer or TV game machine 113. Further, it is designed such that by means of image combining/converting device 121, the existing content images thereof are made free of distortion on the display, and multiple images can be simultaneously displayed on the display.

It is configured such that the converted images of this data can be displayed by full field of view angle display device 118 that is supported, via supporting portion 115 that is constituted by a telescopic bar that can telescope, by vibration isolation type joint bar 116 that has a plurality of joint portions. Here, to the device are attached vibration isolation type joint bar 116 and counterbalance portion (weight free balancer) 117 for canceling the weight of full field of view angle display device 118, and the joint mechanism is devised so that a human does not feel the weight of the full field of view angle display device and, further, the device follows the movement of the face.

Figure 24:
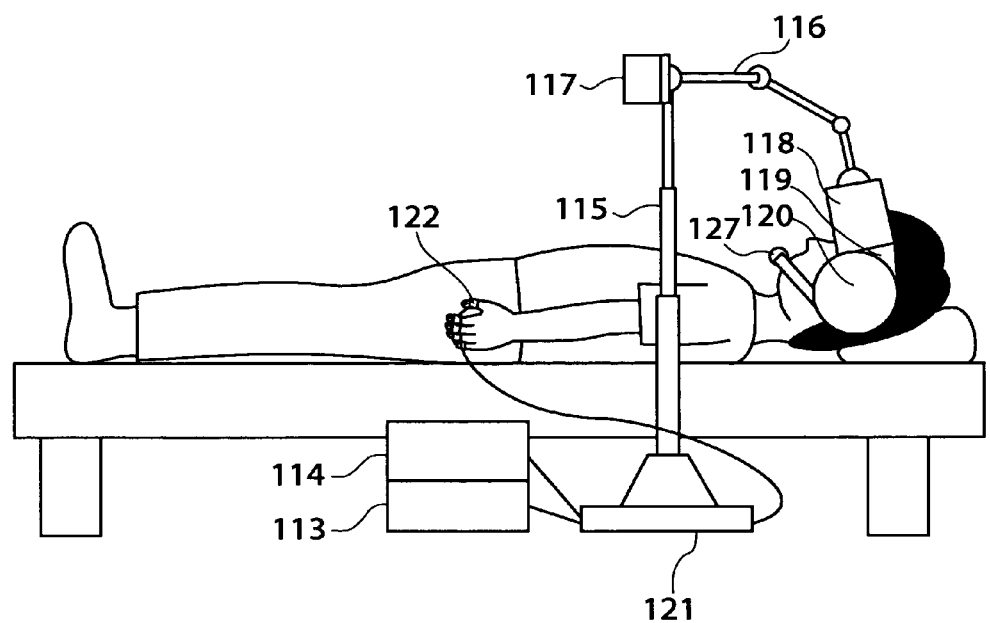
FIG. 24 is a schematic diagram showing the state in which an image display device, an embodiment of the present invention, is used in a lying posture.

Basically, a human feels only the inertia force generated when moving vibration isolation type joint bar 116 and full field of view angle display device 118, and with this mechanism being adopted, high image quality and wide field of view angle images can be obtained. FIG. 24 shows the case where the mechanism is used by a human lying on a bed; for the mechanism to be available in such condition, it is crucial how to construct the jointing portion of vibration isolation type joint bar 116.

In the example shown in FIG. 15, supporting portion 13 supports the gravity center position of full field of view angle display device 11 which is indicated as box 11 in the earlier description. More specifically, concave portion 12 is provided to full field of view angle display device 11, and the gravity center position of full field of view angle display device 11 is supported, via spherical bearing 13c, by supporting portion 13. In FIG. 15, (a) is a perspective view; (b) is an elevational view as viewed from the backside; (c) is a cross sectional plan view; (d) is a side view. Because spherical bearing 13c is used, full field of view angle display device 11 is, as shown in FIG. 15(a), movable around supporting portion 13. Further, supporting portion 13 has a telescope structure constituted by member 13a and member 13b and is, as shown in FIG. 15(b), movable in the up and down directions. Still further, within the range of concave portion 12, full field of view angle display device 11 is, as shown in FIG. 15(c), rotationally movable in the right and left directions in the right and left directions and is also, as shown in FIG. 15(d), rotationally movable in the back and forth directions.

In other words, because spherical bearing (universal joint) 13c is used, a structure is realized in which in whatever way the face moves, there are degrees of freedom with respect to the Θx-, Θy-, and Θz drives. In particular, as shown in FIG. 15(d), the rotational movement within the angle range required when the head is moved in the back and forth directions, especially when the user looks down, is guaranteed.

FIG. 16 shows an example in which the folded optical system of FIG. 14 is accommodated in the full field of view angle display device 11 shown in FIG. 15. In this example, the sixth embodiment eyepiece optical system shown in FIG. 8A and the seventh embodiment zoom optical system shown in FIG. 9A are used. In this example, supporting portion 13 of vibration isolation type joint bar 116 is located at the gravity center position of full field of view angle display device 11, moves between the optical systems of both eyes E, and does not interfere with the optical systems. In this regard, the gravity center position is preferably set as near as possible to the eyepiece optical system. This is because with the gravity center position being set as near as possible to the position of human head HE, the inertia generated when full field of view angle display device 11 is moved in accordance with the rotational face movement of which rotation center is head HE becomes smaller, resulting in smooth tracking motions.

However, since it is impossible to completely remove the inertia, a fixing belt or the like for moving full field of view angle display device 11, with the device and the face being made in close contact with each other, may be additionally used, if necessary.

In the present invention, as a measure for setting the gravity center position as near as possible to the position of the human head, because earphone 120 and the eyepiece optical system are heavy, by setting the gravity center position in the vicinity of the eyepiece optical system as much as possible by devising the layout of the optical system, and by placing heavy components such as the light emitting liquid crystal portions and electrical systems in the 180-degree opposite direction, with the gravity center being the rotation center, relative to the earphone and the eyepiece optical system, the gravity center is successfully located, as shown in FIG. 16, at the position near to the head without providing a new weight. Additionally, in FIG. 16, it is configured such that by providing nosepad portion 11a, positioning of full field of view angle display device 11 is performed. Further, 13' shown in FIG. 16 indicates the position of supporting portion 13 when the user is lying.

Figure 17A:
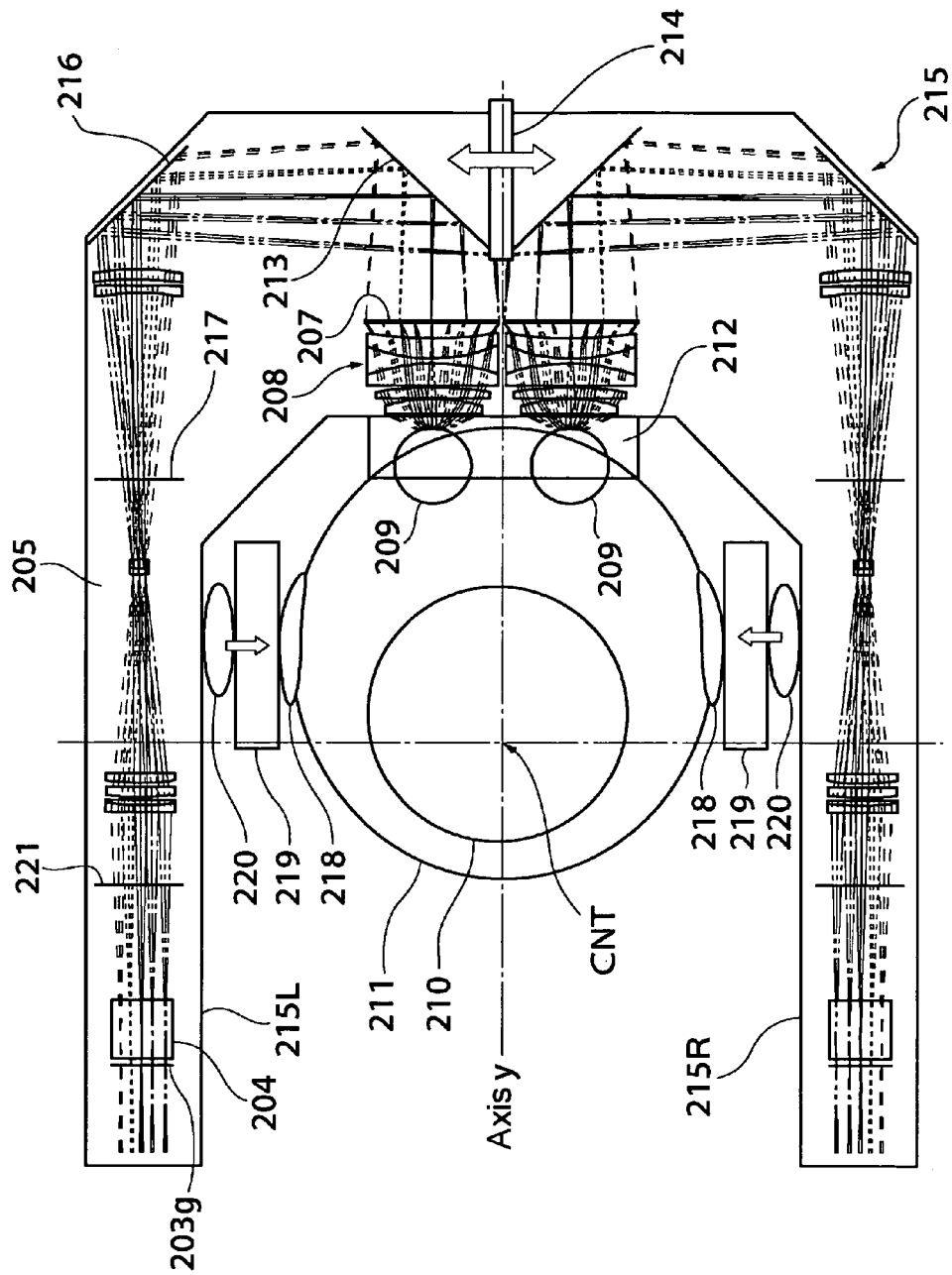
FIG. 17A is a drawing showing an example of optical elements of an image display device, another embodiment of the present invention.
Figure 17B:
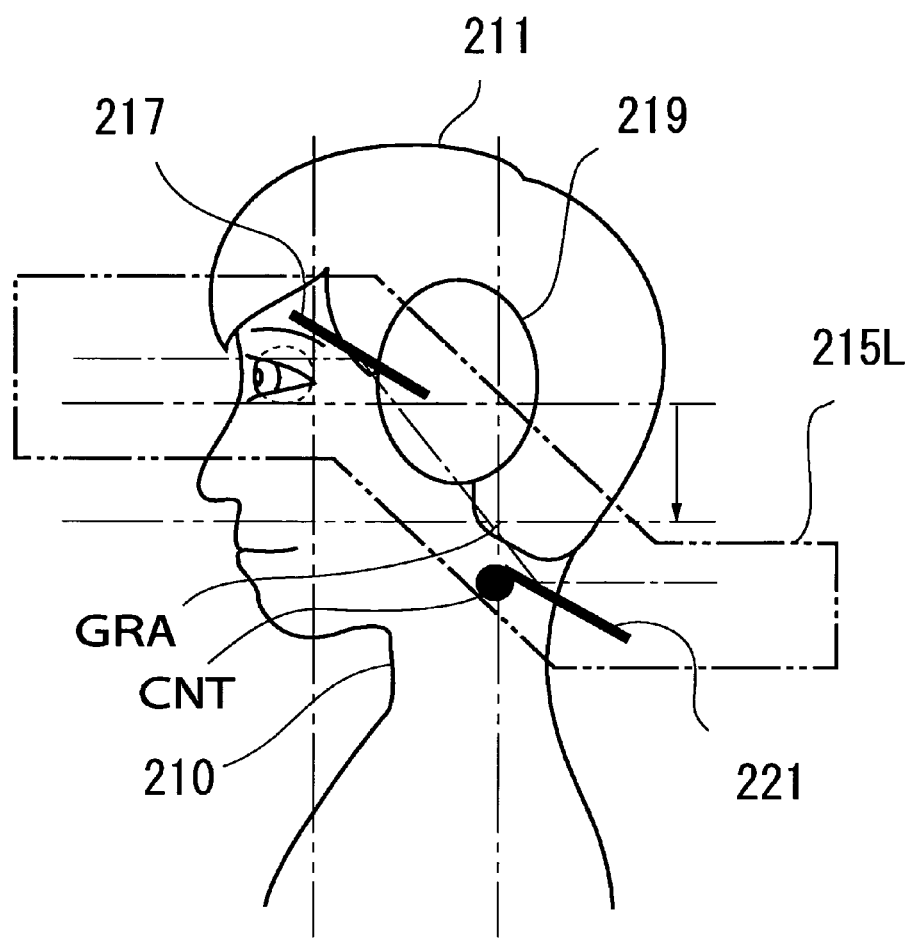
FIG. 17B is an outline drawing showing the state, as viewed from the side, in which the image display device shown in FIG. 17A is mounted on the head.

FIG. 17A shows another embodiment example of the present invention. Because the optical systems for both eyes are plane-symmetrical with each other with respect to the plane that includes axis y dividing the human face into the right and left sides and is perpendicular to the plane of the drawing, only the optical system for the left eye will be described here. The light beams having passed through two-dimensional liquid crystal device 203 are directed to eyeball 209 by the optical system including color beam multiplexing prism 204 and relay magnification optical system 205; further, in the optical system shown in FIG. 17A, with the light beams being deflected by the four mirrors (213, 216, 217, 221) during the traveling process of the beams, left eye image display device 215L and right eye image display device 215R, each having the shape as illustrated, are formed. Note that FIG. 17B is a drawing for showing the layout of mirrors 217 and 221 of the present optical system. Mirrors 217 and 221 are, as shown in FIG. 17A, for deflecting the light beams in the up and down directions and are used for making inertia forces other than torques as small as possible by setting gravity center position GRA of this image display device to be near to rotational movement center CNT of the head. In addition, it is configured such that left eye image display device 215L and right eye image display device 215R can be moved in the right and left directions by eye-width adjusting mechanism 214.

More specifically, with respect to the device, like this invention, that projects independent screen images to both eyes by means of eyepiece lenses, distortions occurring on the right side and the left side can be made to follow the same condition by making the optical centers of the eyepiece lenses coincide with the eye centers, and thus, the sense of discomfort and the eyestrain caused when viewing different images with both eyes can be completely removed. However, because the eye-width, the distance between human both eyes, differs in individuals, ranging from about 5.5 cm to 7.5 cm, the device structure is configured such that in accordance with the observer's eye-width, the distance between the center positions of the light beams incident in the eyes from left eye image display device 215L and right eye image display device 215R can be changed by eye-width adjusting mechanism 214. That is, eye-width adjusting mechanism 214 has a function of being able to change each of the center position of the light beam incident in the left eye from left eye image display device 215L and the center position of the light beam incident in the right eye from right eye image display device 215R, independently of each other, by changing the positions of mirrors 213.

Image display device 215 is provided with sandwiching members 219 functioning as a fixing mechanism that sandwiches ears 218 and also as the earphones for viewing and hearing, and it is designed such that with the face being sandwiched with a predetermined force by elastic members 220, the face and image display device 215 are mutually fixed.

Also, between eyeballs 209 and eyepiece optical system 208 is provided elastic cover 212 for shielding leakage light from the outside and also for preventing eyeballs 209 from coming in contact with eyepiece optical system 208, and the cover not only enhances the sense of realism and absorption, but also functions as a safety mechanism for preventing the eyes from being hurt.

Next, the role of the above-described four mirrors (213, 216, 217, 221) will be explained. While the four mirrors (213, 216, 217, 221) fold the optical system to be accommodated in a small space, they serve an important purpose as well.

In FIG. 17A, both of the cross section of the head 211 and the cross section of the neck 210 are illustrated; in FIG. 17B, the side view posture of the present image display device relative to the face when the device is in use is illustrated. Since the movement of the head is conducted by the neck 210, it can be assumed that the rotational movement center of the head 211 exist within the cross section plane of the neck 210. Assuming tentatively that the rotational movement center is CNT, image display device 215 moves around CNT because the device is fixed to the head 211.

Because the image display device has an layout in which, as shown in FIGS. 17A and 17B, by means of the four mirrors, the device is bilaterally symmetrically constructed and in which also in the vertical direction, the weight allotment is taken account of, the gravity center position is in the vicinity of the rotational movement center CNT of the head. Accordingly, the neck and the head can be moved with ease.

Figure 18:
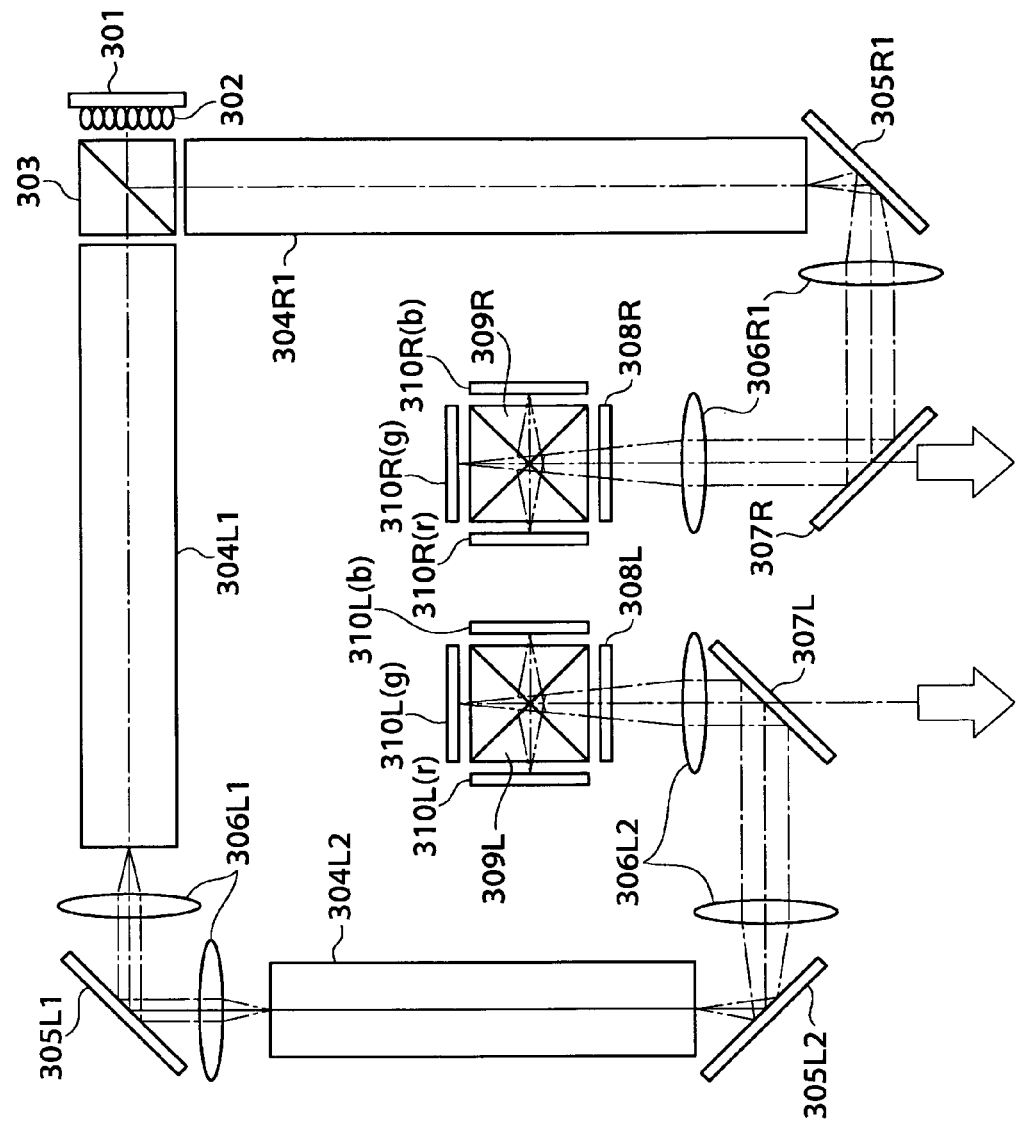
FIG. 18 is a drawing showing a part of an optical system, an embodiment of the present invention.

FIG. 18 shows a part of an optical system embodiment of the present invention. This embodiment is configured such that as the optical devices for forming images, reflection type liquid crystal devices are used; by dividing a light from one light source being into an S-polarized light and a P-polarized light and by using each polarized light for either one of the right and left eyes, the reflection type liquid crystal devices can be illuminated without loss of light; and the reflected light can be transmitted to the subsequent relay optical systems.

First, substrate 301 provided with holes at intervals of 2.5 mm is two-dimensionally lined with the white light LEDs 302 in accordance with the panel shape (when the panel ratio is 16:9, in the form of 19:9 ratio; when the panel ratio is 4:3, in the form of 4:3 ratio), and the LEDs are wired for simultaneous lighting thereof. Here, because LEDs 302 are easily affected by heat, it is devised that a predetermined airspace is provided or an exhaust heat space is inserted, so that their life does not shorten due to mutual heating. The white light beams emitted from LEDs 302 are separated into P-polarized light and S-polarized light by polarization beam splitter 303, and it is arranged such that the P-polarized light beams enter rod 304L1 and the S-polarized light beams enter rod 304R1. While the cross sections of the rods 304L1 and 304R1 have a shape geometrically similar to the panel shape, they are formed by a glass material, plastic glass material, or a member of which cross section is rectangle-shaped and of which four inner surfaces are constituted by two paired, facing mirror surfaces, and the rods have a structure by which after the light beams experience a plurality of inner surface reflections, a uniform illumination can be obtained.

Lenses 306L1 and deflection mirror 305L1 are each arranged so that the exit plane of rod 304L1 and the entrance plane of the subsequent rod 304L2 are conjugate with each other and so that the light beams can be deflected. Generally, with respect to a rod, its light uniformizing effect increases in proportion to the rod's length; and thus, by making the total rod lengths of the optical systems for the right and left eyes substantially equal to each other, the uniformities thereof can be substantially equivalent to each other. In a state that the uniformity has been further increased by the subsequent rod 304L2, it is further arranged by deflection mirrors 305L2, 307L, 305R1, 307R and by lenses 306L2 and 306R1 such that the exit planes of the above-described rods 304L2 and 304R1 are conjugate with the surfaces of each panels 310L(r), 310L(g), 310L(b), 310R(r), 310R(g), and 310R(b), each constituted by a reflection type liquid crystal device, and thus a uniform illumination is performed. Here, the white arrows indicate the direction where relay optical systems described later are located. Here, because each of the light beams is originally either P-polarized light or S-polarized light, they are adjusted so that they are deflected by the predetermined polarization beam splitter 307L or 307R.

Because the operations of this optical system are the same for each of the right and left subsystems thereof, the following description will be made for the left eye subsystem. Note that in the figure, the reference symbol L is attached to the constituent elements for the left eye use and the reference symbol R is attached to the constituent elements for the right eye use, to distinguish therefrom.

The light from LEDs 302 is separated into P-polarized light and S-polarized light by polarization beam splitter 303. The following description will be made assuming that the P-polarized light, among the two, is used for the left eye use; however, even if it is assumed that the S-polarized light is used for the left eye use, the operation/working-effect remains the same. The separated light (P-polarized light) is, as described above, uniformized via rods 304L1 and 304L2, is reflected by polarization beam splitter 307L via deflection mirror 305L2 and lens 306L2, is incident in RGB light beam division multiplexer prism 309L via lens 306L2 and λ/4 plate 308L, and is separated into red light, green light, and blue light.

The separated red light, green light, and blue light respectively illuminate each of the panels 310L(r), 310L(g), and 310L(b), and because, as described above, the exit plane of rod 304L2 is made conjugate with the surfaces of each panels 310L(r), 310L(g), and 310L(b), the surface of each panel is uniformly illuminated.

On each panel is formed a reflecting pattern corresponding to each color; the reflected lights are combined into a single beam, with the lights passing through RGB light beam division multiplexer prism 309L; and the combined beam is incident in polarization beam splitter 307L via λ/4 plate 308L and lens 306L2. Because, in this process, with the beam passing through λ/4 plate 308L twice, the beam has been converted into S-polarized light, the beam this time transmits through polarization beam splitter 307L and is lead to the relay optical system that is located in the direction of the arrow.

If a half mirror or a half prism is used instead of polarization beam splitter 307L, about a half amount of light is lost upon the reflection and the transmission, and thus only a fourth of the original light amount is available; in contrast, in this embodiment, with polarization beam splitter 307L and λ/4 plate 308L being used in combination, substantially the whole amount of light can be effectively used.

In addition, by making the patterns formed on each of panels 310L(r), 310L(g), 310L(b), 310R(r), 310R(g), and 310R(b) different from each other, different images can be sent to each eye to provide three-dimensional image information, and the light amounts reaching right and left eyes can also be adjusted.

It is to be noted that in this embodiment, polarization beam splitter 307L is assumed to reflect P-polarized light and transmit S-polarized light, and, on the other hand, polarization beam splitter 307R is assumed to reflect S-polarized light and transmit P-polarized light, but by providing a λ/2 plate, which converts P-polarized light into S-polarized light, and vice versa, in front of either one of polarization beam splitter 307L and polarization beam splitter 307R, polarization beam splitters having the same characteristics can be used as polarization beam splitter 307L and polarization beam splitter 307R.

Figure 19:
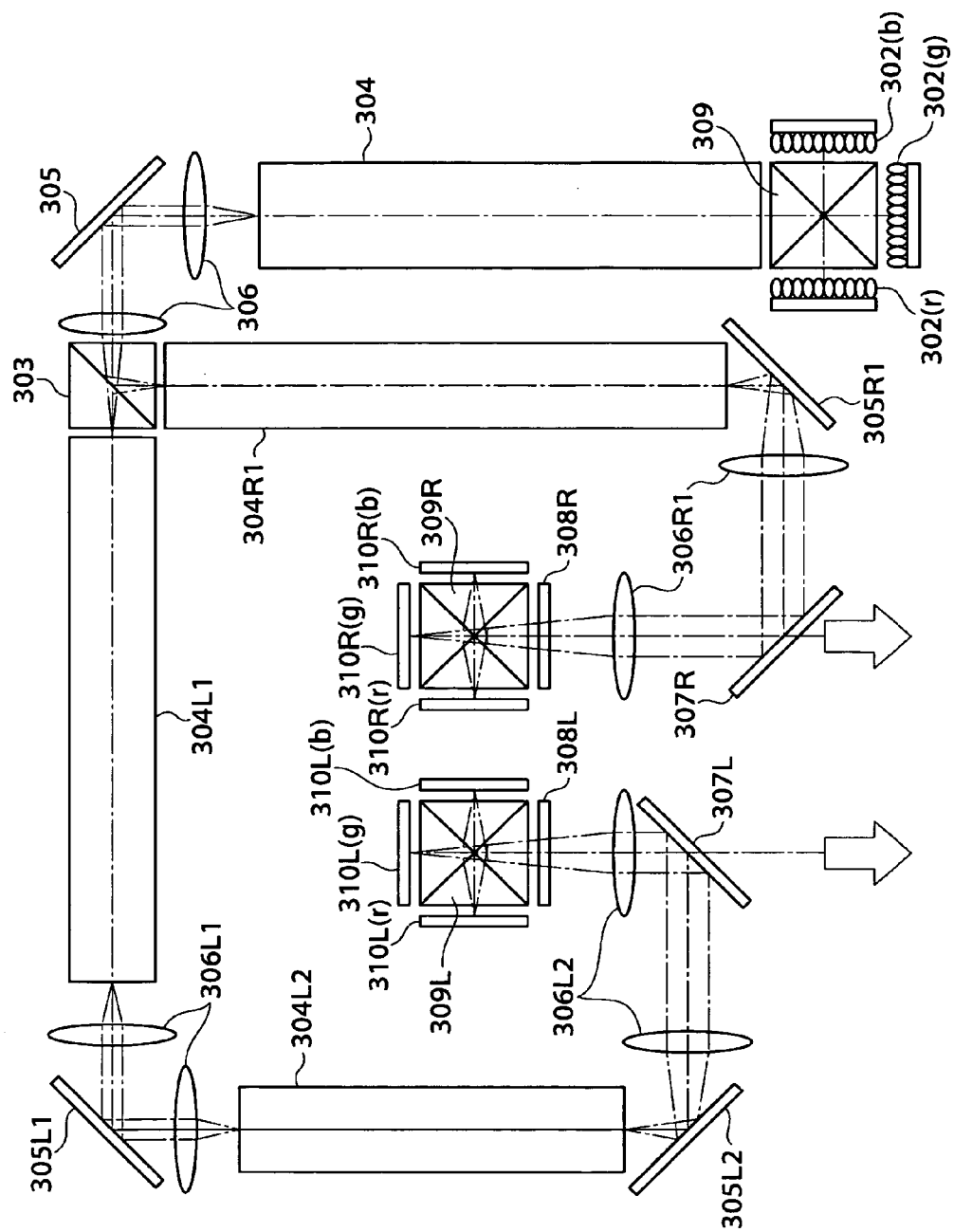
FIG. 19 is a drawing showing a modification example of the optical system shown in FIG. 18.

Next, FIG. 19 shows a modification example of the optical system shown in FIG. 18. In this figure, because the optical system subsequent to polarization beam splitter 303 is the same as the optical system shown in FIG. 18, the same constituent elements as those shown in FIG. 18 are denoted by the same reference numerals, descriptions thereof will be omitted, and only the optical system arranged before polarization beam splitter 303 will be described. The above-described white light LEDs 302 have a simple optical system and excel in space saving; however, because their color wavelength condition and light intensity depend on their specifications, there are many problems in finely adjusting their color condition. In the embodiment shown in FIG. 19, to address such situation, it is configured such that the LEDs are divided into three groups, R-LED group 302(r), G-LED group 302(g), and B-LED group 302(b), each light beams are combined by RGB light beam multiplexer prism 309, and thereafter the relay of the beam and a uniform illumination is performed by rod 304. And, lens 306 that makes the exit plane of rod 304 and the incident planes of rods 304L1 and 304R1 conjugate with each other and defection mirror 305 that changes the beam direction are additionally arranged. In this mechanism, because the light intensity of each LED group can be adjusted through voltage adjustment as required, the color adjustment of the images can be easily performed, and with any combination of color LEDs being available, still better images can be obtained.

Figure 20:
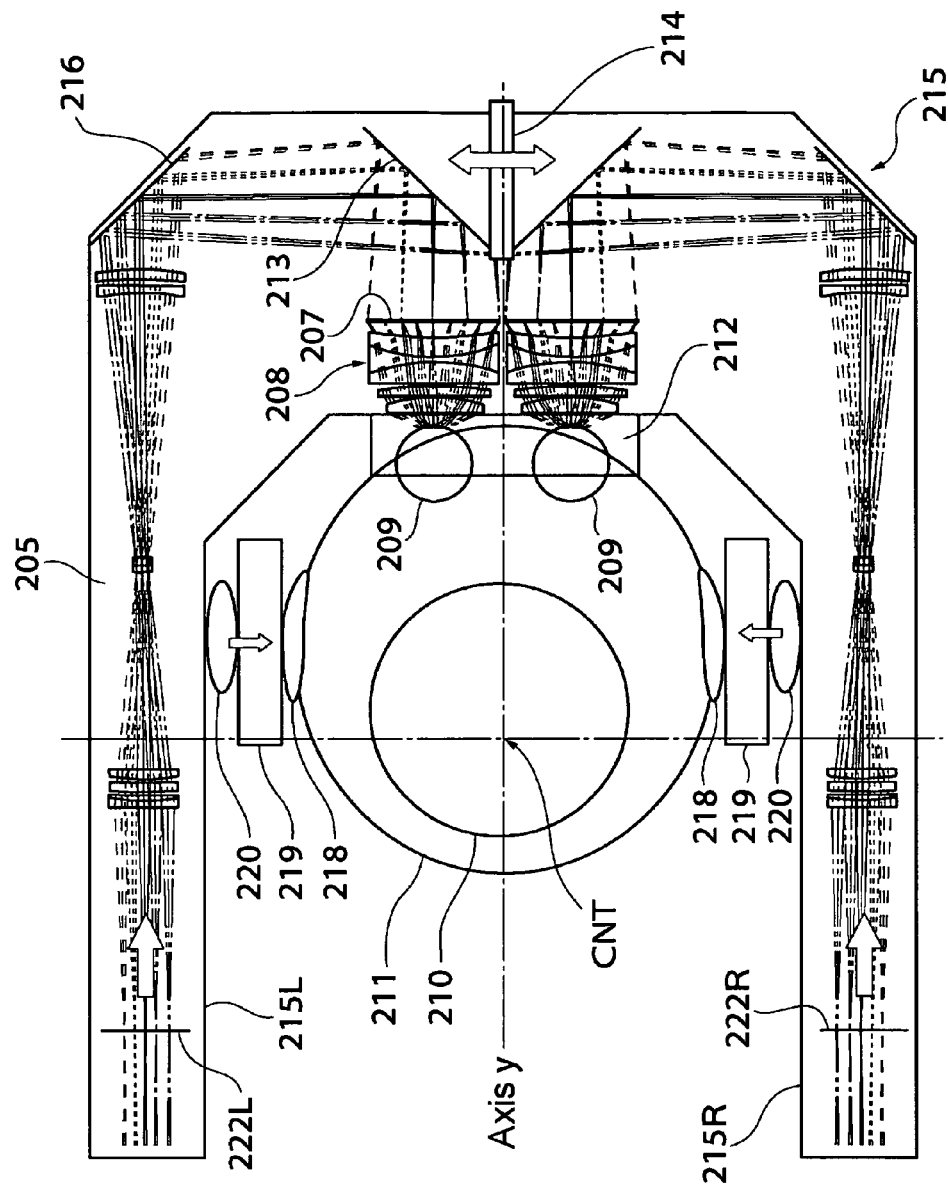
FIG. 20 is a drawing showing an example of an optical system formed behind the optical system shown in FIG. 18 or FIG. 19.

FIG. 20 shows an example of the optical system arranged subsequent to the optical systems shown in FIGS. 18 and 19. Because the optical system shown in FIG. 20 is an optical system that is basically the same as the optical system shown in FIG. 17A, the same constituent elements as those shown in FIG. 17A are denoted by the same reference numerals, and descriptions thereof will be omitted; in contrast to the optical system of FIG. 17A, the optical path is not folded, and thus the deflection mirrors shown in FIG. 17A are not used. Note that in FIG. 20, 222L and 222R denote image planes, and on those planes are projected and imaged the images formed on the panels 310L(r), 310R(r), 310L(g), 310R(g), 310L(b), and 310R(b) of FIGS. 18 and 19.

Figure 21:
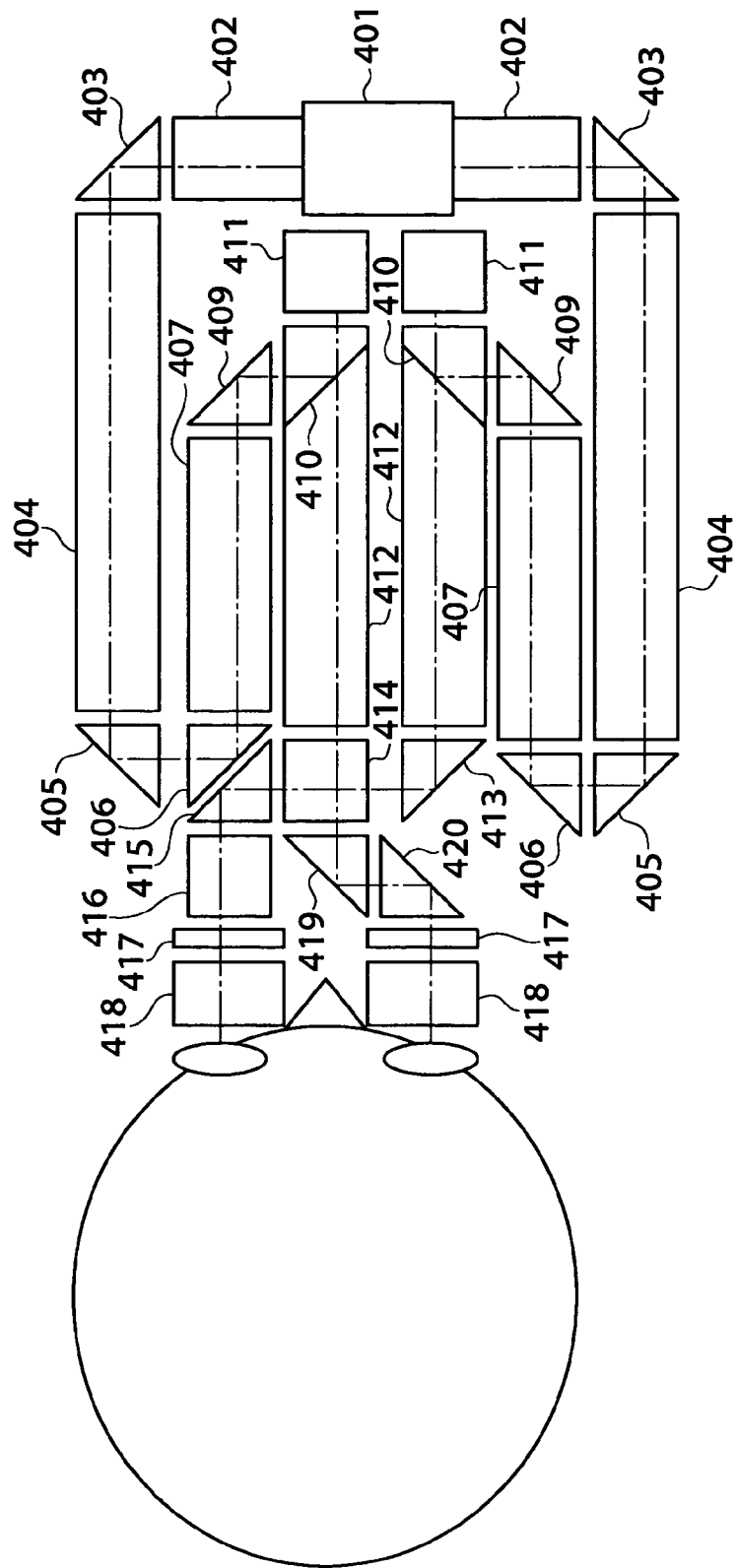
FIG. 21 is a drawing showing an example of an optical system for projecting a combined image from two two-dimensionally light emitting type photoelectric devices (reflection type liquid crystal devices) to the right and left eyes.

FIG. 21 shows an example of an optical system which projects combined images from two two-dimensionally light emitting type photoelectric devices (reflection type liquid crystal devices) on the right and left eyes. 401 denotes a light source device which houses, e.g., the white light LEDs 302 and polarization beam splitter 303 of FIG. 18. The separated P-polarized light and S-polarized light respectively enter the two rods 402. One optical system and the other optical system are substantially equivalent to each other; and thus, in the following description, the corresponding constituent elements will be denoted by the same reference numerals, the description will be made only on one optical path (the one proceeding upwardly from light source device 401), and the different portions relative to the right and left eyes will be described as occasion arises.

The light having exited from rod 402 is deflected by deflection prism 403; after passing through rod 404, the traveling direction of the light beam is reversed by the two deflection prisms 405 and 406; after passing through rod 407, the light beam is deflected by deflection prism 409, is reflected by polarization beam splitter 410, and enters image forming portion 411. Image forming portion 411 is constituted by optical elements, such as 308L, 309L, 310L(r), 310L(g), and 310L(r) of FIG. 18, and reflects the incident light in accordance with the patterns on the reflection type liquid crystal devices. The reflected light passes through polarization beam splitter 410, and is made to have an appropriate magnification by zoom optical system 412.

On the other hand, the optical path of the light having exited from the zoom optical system 412 located on the other optical path is folded by deflection prism 413. The light having exited from the zoom optical system located on the one optical path travels straight, enters half prism 414 together with the former light, and is combined with the light beam having traveled along the other optical path. Of the combined light beams, the one for the left eye passes through deflection prism 415 and optical path length adjusting mechanism 416, is projected on screen 417 (light diffusing body), and is projected on the left eye via eyepiece optical system 418. On the other hand, of the combined light beams, the one for the right eye is projected on screen 417 (light diffusing body) via deflection prisms 419 and 420 and is projected on the right eye via eyepiece optical system 418.

When compared with the optical system shown in FIGS. 13C and 13D, the optical system ranging from zoom optical systems 412 to screens 417 differs in that the deflection prisms' positions differ from those of the optical system shown in FIGS. 13C and 13D, in that the reflection type liquid crystal devices are used instead of the transmission type liquid crystal devices, and in that the image planes thereof are the object planes of zoom optical systems 412. However, other aspects of this embodiment are essentially the same as the optical system shown in FIGS. 13C and 13D; and because the eyepiece optical systems are the same as those described with reference to, e.g., FIG. 1A, descriptions thereof will be omitted.

Additionally, the variable magnification ratio of zoom optical systems 412 should preferably be set not to be too large. More specifically, with respect to the zoom optical system, the aberrations are required to be made small with respect to both of the maximum magnification state and the minimum magnification state, and, for this reason, when the variable magnification ratio is set to be large, the numerical aperture (NA) is required to be set to be small. When the numerical aperture is small, the roughness of screen 417 becomes highly visible when the image is projected on the screen. Because the roughness of the screen becomes less visible when the numerical aperture is large, it is preferable that the variable magnification ratio of zoom optical systems 412 be made smaller and, up to the amount corresponding to the smaller magnification, the numerical aperture be made larger. This applies in common to the zoom optical systems of all of the optical systems described hereinbefore.

Figure 22:
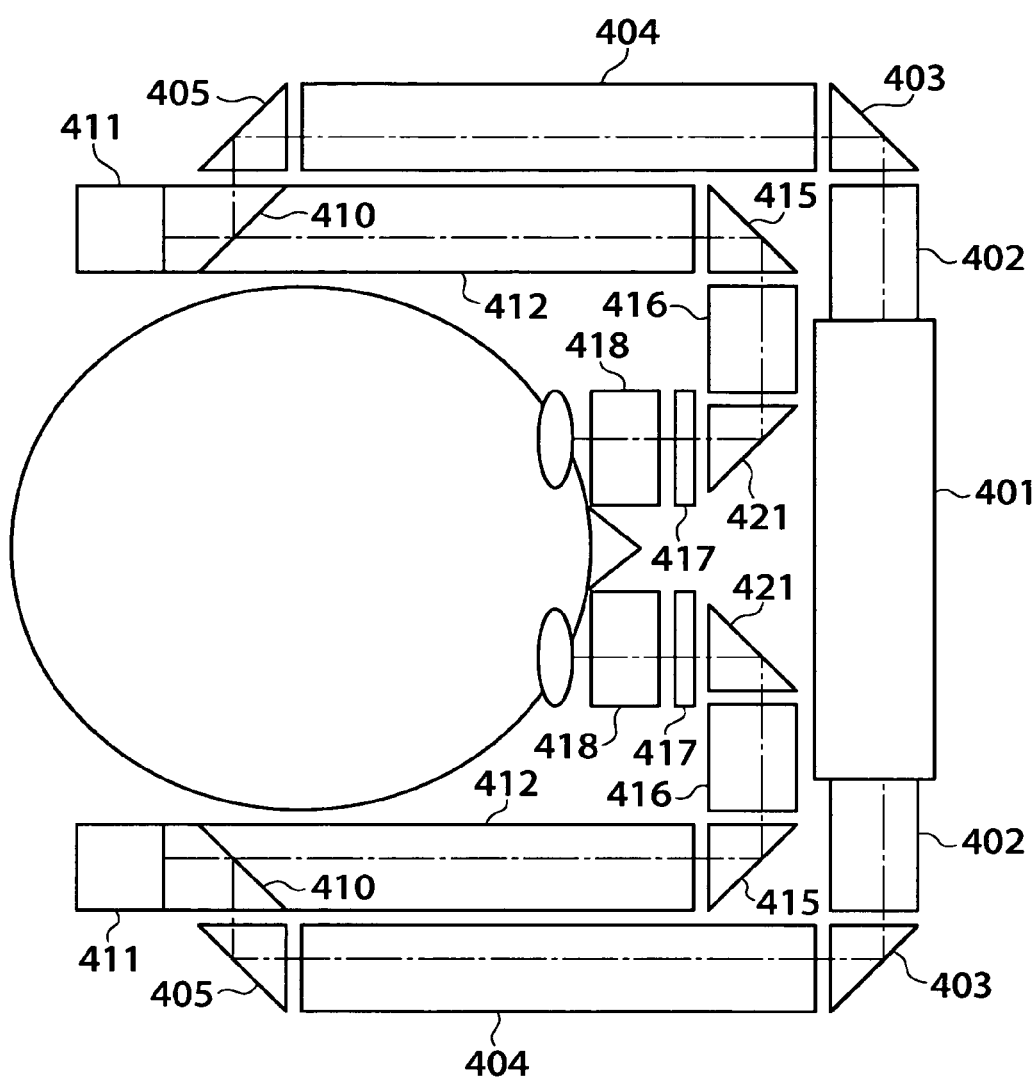
FIG. 22 is a drawing showing an outline of an optical system for projecting images from two-dimensionally light emitting type photoelectric devices (reflection type liquid crystal devices), each provided for each of the right and left eyes, to the right and left eyes.

FIG. 22 shows an outline of an optical system for projecting images from two-dimensionally light emitting type photoelectric devices (reflection type liquid crystal devices), each provided for the right and left eyes, onto the right and left eyes, and the optical system has an optical system corresponding to the zoom optical systems and eyepiece optical systems shown in FIG. 20. In FIG. 22, the same constituent elements as those shown in FIG. 21 are denoted by the same reference numerals, and descriptions thereof will be omitted. In this example, the images formed by the right and left image forming portions 411 are separately projected onto the corresponding right and left eyes. The optical system is similar to the optical system shown in FIG. 21, except that optical path length adjusting mechanisms 416 are respectively provided for the right and left eyes, that deflection prisms 421 are provided, and that there is no image combining by means of half prism 414; and thus no detailed description will be required.

With the optical path folding and reversing optical system shown in FIG. 21 or 22 being used, the overall device can be made compact.

As described above, in accordance with the present invention, high-resolution, high-luminance, and high-quality moving pictures having a large field of view angle comparable to the field of view viewed by a human can be provided. Because the better part of the effects of the present invention has been described in connection with the descriptions of the embodiments, still further effects will be described next. First, regarding the eyepiece optical system, because it is configured such that conic constant k is made to satisfy k<0, i.e., a convex lens having a hyperboloid, a paraboloid, or an ellipsoid is arranged in the vicinity of the pupil position (crystalline lens), and that a cemented lens is arranged in the vicinity of the screen, high image quality images of which various aberrations, including chromatic aberration, are vastly improved can be provided, even in the case of wide range images having a field of view angle of ±22.5 degrees or more. Here, when conic constant k is made to satisfy k<0, the resultant surface may be thought to be a hyperboloid, a paraboloid, or an ellipsoid; however, the aspheric surface is generally a rotationally symmetric quadratic surface, and the curved surface Z(r) of the rotationally symmetric quadratic surface can be expressed:

$$Z(r) = \frac{c \cdot r^2}{1 + \sqrt{\{1-(1+k)\cdot c^2 \cdot r^2\}}} + A \cdot r^4 + B \cdot r^6 + C \cdot r^8 + D \cdot r^{10} + E \cdot r^{12} + F \cdot r^{14} + G \cdot r^{14} + H \cdot r^{18} + J \cdot r^{20}$$

where c is a constant representing a curvature; $r^2=x^2+y^2$; and A, B, C, D, E, and F are aspheric surface coefficients (of even orders). k denotes the conic constant, satisfying k<0. Thus, a lens surface incorporating the discretionary constants, A, B, C, D, E, and F can also be conceived. In the present invention, rotationally symmetric quadratic surfaces using those formulas are also included.

Further, the above-described combination sufficiently meets the time when the eyes conduct the action to look around to widen the field of view and can also provide sharp images. This is an important action for avoiding the "fatigue" felt when the human eyes continually conduct one action and the function of the eyes gradually cannot exercise the original function, and the embodiments of the present invention that provide a field of view during the "look-around" avoiding action play an important role for not feeling the "fatigue."

Next, regarding the zoom mechanism, the mechanism also plays a role in alleviating VE sickness. Normal contents are not assumed to be outputted as wide field of view angle images; and thus the video camera for taking images is not positioned at a fixed position, and, for the purpose of enhancing the image effect, images are often taken with the camera being directed to various directions, or zoom operations are often overused. In the case of a display comparable to the usual television image of 10 to 50 inches, there arises no problem; however, in the case of an image screen of 60 degrees or more (comparable to 100 inches), the symptom of "self-motion perception: 'An illusion felt as if oneself were moving' is created, and the equilibrium sense is affected. A moving image that gives information to a wide range field of view affects the equilibrium sense, and the mismatch between the visual information brought by the image and the somatosensory information may cause discomfort or motion sickness)" may be induced. That said, a landscape taken by a fixed camera and an infinite distance wide range field of view image of 60 degrees or more (comparable to 100 inches) are images akin to reality, are full of realism, and give a natural stereoscopic appearance without parallax, which brings about significant effects of relaxation and remedying eyestrain.

Therefore, with the image display device being adjusted, by using a zoom mechanism, depending not only on the resolution of the content but also on the kind of the content image, comfortable image information can be obtained. For that purpose, the zoom mechanism preferably has a zoom range of over about two times that covers the range ranging from an infinite distance wide range field of view image of 60 degrees or more (comparable to 100 inches) which is likely to create self-motion perception to an image of 30 degrees or less (comparable to 50 inches) which is not likely to create self-motion perception.

Further, contents of existing DVD, video, BS images, etc. have their respective predetermined field angles, and thus the image screen sizes corresponding to their image qualities, instead of a wide field of view, are desirable. More specifically, if the field angle is enlarged blindly, then the coarseness of pixels is recognized by the eyes, and the degree of the disadvantage that one feels uneasy as to the poorness of image quality becomes larger than the degree of advantage that a large-sized image screen can be obtained. Thus, in this embodiment, it is designed that the most appropriate field angles for those contents are set by using the zoom mechanism to always obtain high image qualities. In consideration of the image dot sizes, a zoom mechanism of about 4 to 5 times, i.e., ±18 to +60 degrees in terms of field of view angle, is preferably provided.

In addition, the embodiments of the present invention can provide all kinds of structures, for example, a structure in which the above-described display device is disposed to at least one of the right and left eyeballs, and a structure in which the above-described display devices are respectively disposed to each of the right and left eyeballs and the positions of the devices are adjusted in accordance with the distance between the eyeballs; and thus wide-ranging applications adapted for particular uses can be conceived. This means, without being limited to the functions of the above-described optical system shift in accordance with the eye-width and zoom mechanism, that by configuring such that a part or the whole of the respective eyepiece optical systems existing between the human eyes and the screens can be separately moved in the focus direction, all of myopic persons, hyperopic persons, and astigmatic persons can observe good infinite distance images without wearing eyeglasses or contact lenses. Further, because by shortening the relative distance between the screens and the eyepiece optical systems, a condition, adapted to image contents, in which nearby objects are observed, can be realized, still more enhanced sense of realism can be obtained. In this case, screen G is only required to be provided with a drive mechanism that gives a driving force in the optical axis direction, and the zoom optical system is only required to be provided with a focusing mechanism that varies the focus position in response to the distance between the liquid crystal display device and screen G on which images are projected.

Still further, as the above-described photoelectric devices, two-dimensionally light emitting type liquid crystal display devices which are perpendicular to the light beams are adopted, and thus, image information comparable to the real field of view can be provided with a fine resolution and low power consumption. Regarding the light emitting portion, high intensity LEDs or cold cathode tubes are used, which brings about significant effect in the aspect of low power consumption, life, and size. In addition, by using optical fibers, a high-illuminance, uniform illumination is realized with a small space; and, while red, green, and blue light sources have originally differences with respect to illuminance, light emitting direction, etc., the use of the optical fibers also brings about significant effect in adjusting the different light sources to produce the same resultant illuminance.

However, when the light amounts outputted from the two-dimensionally light emitting type liquid crystal display devices are fixed, there arises a possibility that an illuminance difference between two images due to the magnification difference occurs when the two images are combined by the zoom optical systems and the half mirror. To address this difficulty, in the present invention, it is configured such that by varying the current values given to the above-described light sources in accordance with the magnification difference when the images are combined, the illuminance of the above-described high intensity LEDs or cold cathode tubes themselves is controlled in accordance with the magnification change so that a large illuminance difference within the combined image does not occur. However, the varying of illuminance by varying the current intensities causes a thermal distribution change; the emission wavelengths themselves change; and there arises a possibility that the color balance cannot be adjusted. Thus, instead of varying the current values given to the light sources associated with each images to be combined, the light sources are made sufficiently bright, and with aperture stop STO being arranged in the vicinity of the pupil plane of the zoom optical system, the illuminance of each image is controlled so that the light amount is adjusted in accordance with the magnification change. Further, when the light amount is sufficiently secured, it may be configured such that by combining two polarization plates and by varying the rotation angles thereof, the light is adjusted in accordance with the magnification change; however, because three color multiplexer 162 has respective polarization characteristics for each color, it is preferable that by using, e.g., a λ/4 plate, the polarization characteristics are removed in advance.

Further, by virtue of the above-described configuration, the full field of view angle display device 118 of FIG. 23 does not itself consume a large amount of power. Thus, the connection system attached with BS/CS 110° antenna I/O ports, phone line ports, VHF/UHF antenna I/O ports, audio I/O ports, image I/O ports, S-image I/O ports, D (D1/D2/D3/D4) video I/O ports, optical digital audio output ports, i. LINK ports, analog RGB I/O ports, and DC input ports, all for taking outside information, is entirely separated from the very full field of view angle display device 118 and is attached to image combining/converting device 121. And, it is configured such that all inputted data via the above-described ports from outside information devices of, e.g., a DVD, a television, or a computer are converted to infrared light data; the converted data are sent from an infrared light transmitting portion and are received by the infrared light receiving portion of the above-described full field of view angle display device 118; and, after the received data being converted to image and audio data, image information is provided on the display. Further, regarding the power supply to full field of view angle display device 118, it is configured such that a battery is incorporated in the device and that when the device is not used, the battery is charged via vibration isolation type joint bar 116; and thus, there is no fixed line portion in full field of view angle display device 118. Thus, it may also be configured such that the device is detached from the main body and then carried to any place where a plurality of full field of view angle display device supporting mechanisms 170 are set.

As described above, in accordance with the present invention, high-quality wide range image images can be taken as image information; and by conceiving, by using this fact, various combinations, full-scale information input-output devices that are superior to wearable displays and wearable computers can prospectively be provided. Moreover, new sense game softwares, wide range image DVDs, and wide range image video tapes, efficiently utilizing the wide range image images, can prospectively be sold, and, further, full-scale virtual reality system can prospectively be provided.

The image display device according to the present invention can of course be implemented as a eyeglass type display or as a head mount type display; but, with the image display device being directly positioned on a chair in a movie theater or airplane, on a chair for relaxation, or on a bed for nursing a bedridden elderly person, the device can be provided as a mechanism that has dissolved the problem of discomfort due to the weight or wearing of the device. In particular, the marketability of the device is also high in that provision of images full of reality to a sick person or bedridden elderly person whose moreover is restricted brings about a significant relaxation effect and can give vigor for recovering from illness or vigor for living.

To summarize the above content, the following merchantabilities can be expected in utilizing the present invention.

Large screen personal computers and CADs that do not make one feel the weight and fatigue, large screen displays that substitute movie theaters and projectors, provision of 3D large screen images full of reality, the Internet reception of images from the above-described video mechanism, provision of images full of reality to a sick person or bedridden elderly person, relaxation image display devices, provision of new sense TV game images, provision of large screen images in a small space, high confidentiality information display systems for individual use, virtual reality displays, remote controllable large screen displays, digital newspaper reception systems with a wide screen, relaxation service in the first-class section of an airplane, etc., educational materials that do not injure the eyesight, new display games in an amusement facility, etc. can be conceived.

The invention claimed is:

1. An image display device that:
    (i) projects, via a relay optical system, lights emitted from each of two two-dimensionally light emitting type photoelectric devices which are perpendicular to a light beam emitting direction onto first and second light diffusing bodies that are independent of each other relative to right and left eyes of a user, and (ii) projects and images transmitted images of said light diffusing bodies onto a retina in the respective right and left eyes of the user via first and second eyepiece optical systems which respectively correspond to the first and second light diffusing bodies, wherein the imaged transmitted images are wide range images having a field of view angle of at least ±22.5 degrees, wherein said two two-dimensionally light emitting type photoelectric devices are each a reflection type liquid crystal device element, and wherein the image display device further comprises:
    one light source,
    a first polarization beam splitter that divides light emitted from said light source into P-polarized light and S-polarized light, and
        an optical system that leads each of the divided P-polarized light and S-polarized light respectively to said two two-dimensionally light emitting type photoelectric devices, thereby illuminating said two two-dimensionally light emitting type photoelectric devices,
        wherein the optical system leads the lights reflected by each of said two two-dimensionally light emitting type photoelectric devices to said relay optical system via a second polarization beam splitter, and wherein the reflected lights are one of the P-polarized light converted from the S-polarized light and the S-polarized light converted from the P-polarized light.

2. The image display device according to claim 1, wherein said light source comprises a plurality of white light LEDs two-dimensionally arranged in an array form.

3. The image display device according to claim 1, wherein said light source comprises:
    a group of R color LEDs,
    a group of G color LEDs,
    a group of B color LEDs, and
    an RGB light beam division multiplexer prism that combines lights emitted by the R, G and B groups,
    wherein each group comprises plurality of LEDs of the respective color two-dimensionally arranged in an array form.

4. The image display device according to claim 1, wherein the optical system, which leads the light emitted from said light source to each of said two two-dimensionally light emitting type photoelectric devices, comprises an illumination uniformizing optical system.

5. The image display device according to claim 4, wherein said illumination uniformizing optical system comprises at least one rod, and wherein a final exit plane of said rod and a surface of a corresponding two-dimensionally light emitting type photoelectric device are made substantially conjugate with each other.

6. An image display device that:
    (i) projects, via a relay optical system, lights emitted from each of two sets of two-dimensionally light emitting type photoelectric devices which are perpendicular to a light beam emitting direction onto first and second light diffusing bodies that are independent of each other relative to right and left eyes of a user, and (ii) projects and images transmitted images of said light diffusing bodies onto a retina in the respective right and left eyes of the user via first and second eyepiece optical systems which respectively correspond to the first and second light diffusing bodies, wherein the imaged transmitted images are wide range images having a field of view angle of at least ±22.5 degrees, and wherein each of said two sets of two-dimensionally light emitting type photoelectric devices comprises three reflection type liquid crystal device elements, each corresponding to one of the colors of G, B, and R, and wherein the image display device further comprises:
    one light source,
    a first polarization beam splitter that divides light emitted from said light source into P-polarized light and S-polarized light, and
        an optical system that leads each of the divided P-polarized light and S-polarized light respectively to said two sets of two-dimensionally light emitting type photoelectric devices, thereby illuminating said two sets of two-dimensionally light emitting type photoelectric devices,
        wherein the optical system leads the lights reflected by said two sets of two-dimensionally light emitting type photoelectric devices to said relay optical system, and
        wherein said optical system respectively leads said P-polarized light and S-polarized light to each of said two sets of two-dimensionally light emitting type photoelectric devices, which accommodate the colors of G, B, and R, via a second polarization beam splitter and an RGB light beam division multiplexer prism, and leads the reflected lights to said relay optical system via said RGB light beam division multiplexer prism and said second polarization beam splitter, and wherein the reflected lights are one of the P-polarized light converted from the S-polarized light and the S-polarized light converted from the P-polarized light.

7. The image display device according to claim 6, wherein said light source comprises a plurality of white light LEDs two-dimensionally arranged in an array form.

8. The image display device according to claim 6, wherein said light source comprises:
    a group of R color LEDs,
    a group of G color LEDs,
    a group of B color LEDs, and
    an RGB light beam division multiplexer prism that combines lights emitted by the R, G and B groups, wherein each group comprises a plurality of LEDs of the respective color two-dimensionally arranged in an array form.

9. The image display device according to claim 6, wherein the optical system, which leads the light emitted from said light source to each of said two sets of two-dimensionally light emitting type photoelectric devices, comprises an illumination uniformizing optical system.

10. The image display device according to claim 9, wherein said illumination uniformizing optical system comprises at least one rod, and wherein a final exit plane of said rod and a surface of said a corresponding set of two-dimensionally light emitting type photoelectric devices are made substantially conjugate with each other.

* * * * *